(12) United States Patent  (10) Patent No.: US 8,568,684 B2
Bi et al.  (45) Date of Patent: Oct. 29, 2013

(54) METHODS FOR SYNTHESIZING SUBMICRON DOPED SILICON PARTICLES

(75) Inventors: Xiangxin Bi, San Ramon, CA (US); Nobuyuki Kambe, Menlo Park, CA (US); James T. Gardner, San Jose, CA (US); Ronald J. Mosso, Fremont, CA (US); Shivkumar Chiruvolu, San Jose, CA (US); Sujeet Kumar, Newark, CA (US); William E. McGovern, LaFayette, CA (US)

(73) Assignee: NanoGram Corporation, Milpitas, CA (US)

( * ) Notice: Subject to any disclaimer, the term of this patent is extended or adjusted under 35 U.S.C. 154(b) by 503 days.

(21) Appl. No.: 12/686,803

(22) Filed: Jan. 13, 2010

(65) Prior Publication Data

US 2010/0209328 A1 Aug. 19, 2010
US 2012/0244060 A9 Sep. 27, 2012

Related U.S. Application Data

(60) Continuation of application No. 12/152,428, filed on May 13, 2008, now abandoned, which is a (Continued)

(51) Int. Cl.
*C01B 33/02* (2006.01)
(52) U.S. Cl.
USPC ........... 423/350; 423/600; 423/618; 423/598; 423/599; 423/624; 423/625; 423/263; 423/619; 423/610; 423/635
(58) Field of Classification Search
None
See application file for complete search history.

(56) References Cited

U.S. PATENT DOCUMENTS 4,330,358 A 5/1982 Grabmaier et al.
4,390,743 A 6/1983 Dahlberg
(Continued)

FOREIGN PATENT DOCUMENTS

JP 10045409 A 2/1998
WO 2005049492 A1 6/2005
(Continued)

OTHER PUBLICATIONS

Cannon et al., "Sinterable Ceramic Powders from Laser-Driven Reactions: II, Powder Characteristics and Process Variables," Journal of the American Ceramic Society vol. 65, No. 7, pp. 330-335, Jul. 1982.

(Continued)

*Primary Examiner* — Melvin C Mayes
*Assistant Examiner* — Smita Patel
(74) *Attorney, Agent, or Firm* — Dardi & Herbert, PLLC; Peter S. Dardi; Nikhil Patel

(57) ABSTRACT

Methods are described that have the capability of producing submicron/nanoscale particles, in some embodiments dispersible, at high production rates. In some embodiments, the methods result in the production of particles with an average diameter less than about 75 nanometers that are produced at a rate of at least about 35 grams per hour. In other embodiments, the particles are highly uniform. These methods can be used to form particle collections and/or powder coatings. Powder coatings and corresponding methods are described based on the deposition of highly uniform submicron/nanoscale particles.

19 Claims, 101 Drawing Sheets

Related U.S. Application Data

(60) continuation of application No. 11/357,711, filed on Feb. 17, 2006, now abandoned, which is a division of application No. 10/195,851, filed on Jul. 15, 2002, now Pat. No. 7,384,680, which is a continuation-in-part of application No. 09/715,935, filed on Nov. 17, 2000, now Pat. No. 7,575,784, said application No. 10/195,851 is a continuation-in-part of application No. 09/818,141, filed on Mar. 27, 2001, now Pat. No. 6,599,631, said application No. 10/195,851 is a continuation-in-part of application No. 09/843,195, filed on Apr. 26, 2001, now Pat. No. 6,692,660, and a continuation-in-part of application No. 09/845,985, filed on Apr. 30, 2001, now abandoned, and a continuation-in-part of application No. 09/969,025, filed on Oct. 1, 2001, now abandoned, which is a continuation-in-part of application No. PCT/US01/32413, filed on Oct. 16, 2001, and a continuation-in-part of application No. PCT/US02/01702, filed on Jan. 17, 2002, said application No. 10/195,851 is a continuation-in-part of application No. 10/027,906, filed on Dec. 21, 2001, now Pat. No. 6,952,504, and a continuation-in-part of application No. 10/083,967, filed on Feb. 25, 2002, now Pat. No. 7,226,966, said application No. 10/195,851 is a continuation-in-part of application No. 10/099,597, filed on Mar. 15, 2002, now Pat. No. 6,849,334, said application No. 10/195,851 is a continuation-in-part of application No. 10/119,645, filed on Apr. 10, 2002, now Pat. No. 6,919,054.

(60) Provisional application No. 60/313,588, filed on Aug. 17, 2001, provisional application No. 60/309,887, filed on Aug. 3, 2001, provisional application No. 60/262,273, filed on Jan. 17, 2001, provisional application No. 60/262,274, filed on Jan. 17, 2001, provisional application No. 60/315,438, filed on Aug. 28, 2001, provisional application No. 60/265,169, filed on Jan. 26, 2001, provisional application No. 60/241,200, filed on Oct. 17, 2000.

(56) References Cited

U.S. PATENT DOCUMENTS

| | | | |
|---|---|---|---|
| 4,786,477 A | 11/1988 | Yoon et al. | |
| 4,947,219 A | 8/1990 | Boehm | |
| 5,132,248 A | 7/1992 | Drummond et al. | |
| 5,262,357 A | 11/1993 | Alivisatos et al. | |
| 5,374,413 A | 12/1994 | Kim et al. | |
| 5,429,708 A | 7/1995 | Linford et al. | |
| 5,447,708 A * | 9/1995 | Helble et al. | 423/263 |
| 5,491,114 A | 2/1996 | Goldstein | |
| 5,576,248 A | 11/1996 | Goldstein | |
| 5,695,617 A | 12/1997 | Graiver et al. | |
| 5,850,064 A * | 12/1998 | Goldstein | 204/157.4 |
| 5,861,950 A * | 1/1999 | Knowlton | 356/338 |
| 5,866,471 A | 2/1999 | Beppu et al. | |
| 6,007,869 A | 12/1999 | Schreieder et al. | |
| 6,086,945 A | 7/2000 | Kamata et al. | |
| 6,100,464 A | 8/2000 | Priesemuth | |
| 6,106,739 A | 8/2000 | Stephens et al. | |
| 6,193,936 B1 * | 2/2001 | Gardner et al. | 422/186 |
| 6,268,041 B1 | 7/2001 | Goldstein | |
| 6,281,427 B1 | 8/2001 | Mitsuhiro et al. | |
| 6,287,925 B2 | 9/2001 | Yu | |
| 6,319,314 B1 | 11/2001 | Shoei | |
| 6,348,295 B1 | 2/2002 | Griffith et al. | |
| 6,403,382 B1 | 6/2002 | Zhu et al. | |
| 6,416,721 B1 | 7/2002 | Sanjurjo et al. | |
| 6,531,191 B1 | 3/2003 | Notenboom | |
| 6,552,405 B2 | 4/2003 | Sugawara et al. | |
| 6,585,947 B1 | 7/2003 | Nayfeh et al. | |
| 6,586,785 B2 | 7/2003 | Flagan et al. | |
| 6,599,631 B2 | 7/2003 | Kambe et al. | |
| 6,712,999 B2 | 3/2004 | Haering et al. | |
| 6,794,265 B2 | 9/2004 | Lee et al. | |
| 6,846,565 B2 | 1/2005 | Korgel et al. | |
| 6,878,184 B1 | 4/2005 | Rockenberger et al. | |
| 6,911,385 B1 | 6/2005 | Haubrich et al. | |
| 6,998,288 B1 | 2/2006 | Smith et al. | |
| 7,001,578 B2 | 2/2006 | Nayfeh et al. | |
| 7,029,632 B1 | 4/2006 | Weidhaus et al. | |
| 7,045,851 B2 | 5/2006 | Black et al. | |
| 7,067,069 B2 | 6/2006 | Shiho et al. | |
| 7,067,337 B2 | 6/2006 | Yudasaka et al. | |
| 7,078,276 B1 | 7/2006 | Zurcher et al. | |
| 7,135,350 B1 | 11/2006 | Smith et al. | |
| 7,229,859 B2 | 6/2007 | Yudasaka et al. | |
| 7,267,721 B2 | 9/2007 | Kauzlarich et al. | |
| 7,384,680 B2 | 6/2008 | Bi et al. | |
| 7,473,443 B2 | 1/2009 | Matsuki et al. | |
| 7,521,340 B2 | 4/2009 | Lemmi et al. | |
| 7,575,784 B1 | 8/2009 | Bi et al. | |
| 7,615,393 B1 | 11/2009 | Shah et al. | |
| 2002/0074547 A1 | 6/2002 | Yudasaka et al. | |
| 2003/0045632 A1 | 3/2003 | Shiho et al. | |
| 2006/0137567 A1 | 6/2006 | Yadav | |
| 2006/0157677 A1 | 7/2006 | Kunze et al. | |
| 2006/0237719 A1 | 10/2006 | Colfer et al. | |
| 2007/0094757 A1 | 4/2007 | Pridohl et al. | |
| 2008/0083926 A1 | 4/2008 | Ostergard | |
| 2008/0138966 A1 | 6/2008 | Rogojina et al. | |
| 2008/0152938 A1 | 6/2008 | Kelman et al. | |
| 2008/0171425 A1 | 7/2008 | Poplavskyy et al. | |
| 2008/0191193 A1 | 8/2008 | Li et al. | |
| 2008/0202576 A1 | 8/2008 | Hieslmair | |
| 2008/0220175 A1 | 9/2008 | Mangolini et al. | |
| 2008/0305619 A1 | 12/2008 | Lemmi et al. | |
| 2009/0026421 A1 | 1/2009 | Li et al. | |
| 2009/0263977 A1 | 10/2009 | Rogojina et al. | |
| 2009/0269913 A1 | 10/2009 | Terry et al. | |

FOREIGN PATENT DOCUMENTS

| | | |
|---|---|---|
| WO | 2006009881 A1 | 1/2006 |
| WO | 2007023362 A1 | 3/2007 |
| WO | 2007072162 A1 | 6/2007 |
| WO | 2007117265 A1 | 10/2007 |
| WO | 2008030966 A1 | 3/2008 |
| WO | 2008118865 A2 | 3/2008 |
| WO | 2008039757 A1 | 4/2008 |
| WO | 2008061131 A2 | 5/2008 |
| WO | 2008073763 A2 | 6/2008 |
| WO | 2008091393 A2 | 7/2008 |
| WO | 2008137738 A2 | 11/2008 |
| WO | 2008143716 A2 | 11/2008 |
| WO | 2008152272 A2 | 12/2008 |
| WO | 2009032359 A2 | 3/2009 |
| WO | 2009114026 A1 | 9/2009 |
| WO | 2009117007 A2 | 9/2009 |

OTHER PUBLICATIONS

Cannon et al., "Sinterable Ceramic Powders from Laser-Driven Reactions: I, Process Description and Modeling," Journal of the American Ceramic Society, vol. 65, No. 7, pp. 324-330, Jul. 1982.

Fujii et al., Photoluminescene and free-election absorption in heavily phosphorus-doped Si nanocrystals, Physical Review B, 62(19):12625-12627 (2000).

Goldstein et al., "Observation of Melting in 30 Å Diameter CdS Nanocrystals", Mat. Res. Sco. Symp. Proc., 206:271-274 (1991).

* cited by examiner

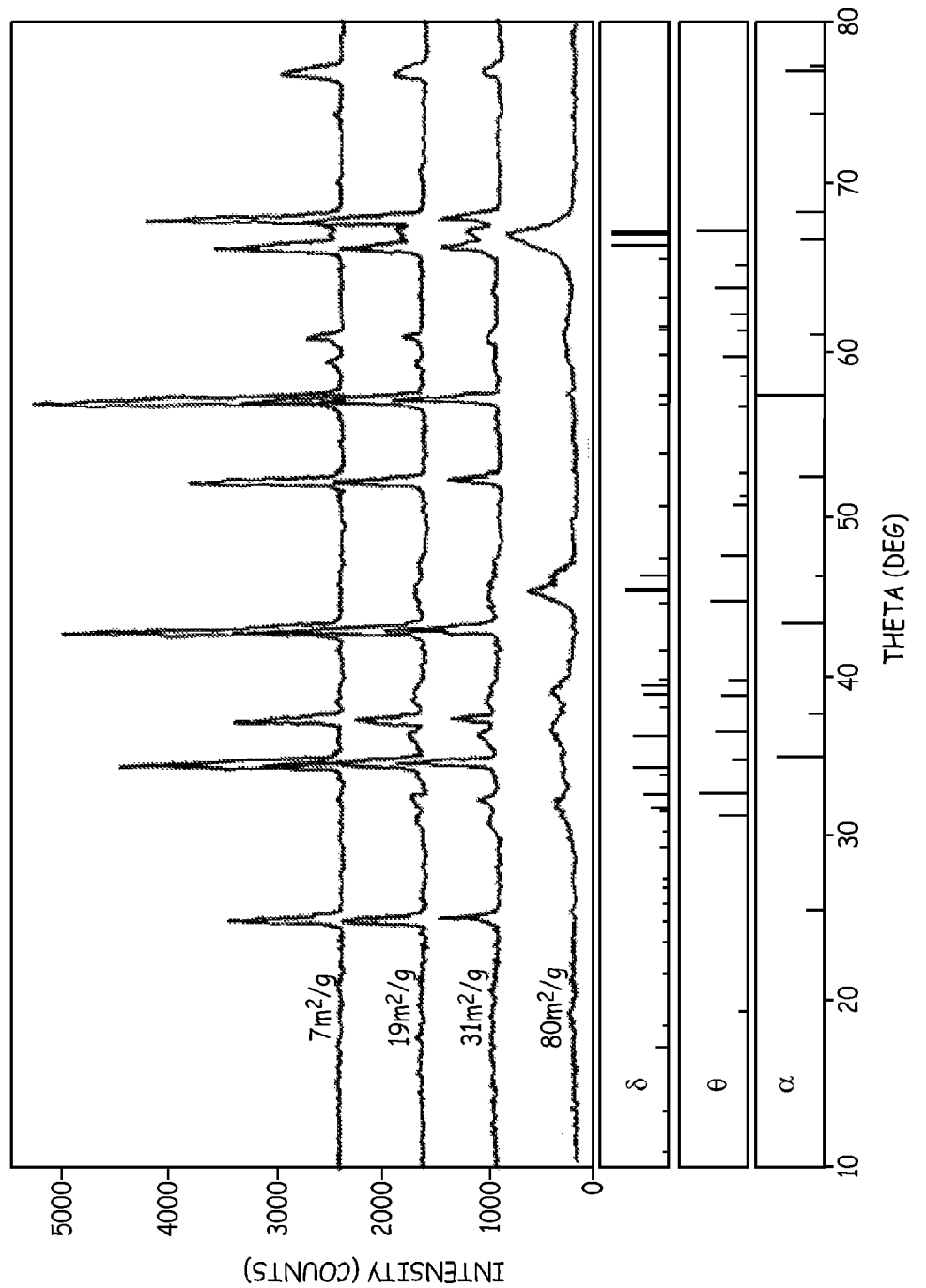

METHODS FOR SYNTHESIZING SUBMICRON DOPED SILICON PARTICLES

CROSS REFERENCE TO RELATED APPLICATIONS

This application is a continuation of U.S. patent application Ser. No. 12/152,428, filed on May 13, 2008 to Bi et. al, now abandoned, entitled "Nanoparticle Production and Corresponding Structures," incorporated herein by reference, which is a continuation of U.S. patent application Ser. No. 11/357,711, filed on Feb. 17, 2006 to Bi et al., now abandoned, entitled "Nanoparticle Production and Corresponding Structures," incorporated herein by reference; which is a divisional of U.S. patent application Ser. No. 10/195,851, filed Jul. 15, 2002 now U.S. Pat. No. 7,384,680 to Bi et al., entitled "Nanoparticle-Based Powder Coatings And Corresponding Structures," incorporated herein by reference, which is continuation-in-part of the following twelve patents/patent applications: (1) U.S. patent application Ser. No. 09/715,935, filed Nov. 17, 2000 now U.S. Pat. 7,575,784 to Bi et al., entitled "Coating Formation By Reactive Deposition" which claims priority to U.S. provisional application Ser. No. 60/241,200 filed Oct. 17, 2000; (2) U.S. application Ser. No. 09/818,141, filed Mar. 27, 2001 now U.S. Pat. No. 6,599,631 to Kambe et al. entitled "Polymer Inorganic Particle Composites," which claims priority to U.S. Provisional application Ser. No. 60/265,169 filed Jan. 26, 2001; (3) U.S. patent application Ser. No. 09/843,195, filed Apr. 26, 2001 now U.S. Pat. No. 6,692,660 to Kumar et al., entitled "High Luminescence Phosphor Particles"; (4) U.S. patent application Ser. No. 09/845,985 filed Apr. 30, 2001 to Chaloner-Gill et al., now abandoned, entitled "Phosphate Powder Compositions And Methods For Forming Particles With Complex Anions"; (5) U.S. patent application Ser. No. 09/969,025 filed Oct. 1, 2001 to Chiruvolu et al., now abandoned, entitled "Aluminum Oxide Powders"; (6) copending U.S. Provisional Patent Application Ser. No. 60/315,438 Aug. 28, 2001 to Horne et al., entitled "Optical Waveguide Preforms"; (7) copending PCT application designating the U.S. Ser. No. PCT/US01/32413 filed Oct. 16, 2001 to Bi et al., entitled "Coating Formation By Reactive Deposition"; (8) a copending PCT application designating the U.S. Ser. No. PCT/US02/01702 filed Jan. 17, 2002 to Bryan et al. entitled "Optical Material With Selected Index Of Refraction" which claims priority to U.S. Provisional application 60/262,274 filed Jan. 17, 2001 and U.S. Provisional application 60/262,273 filed Jan. 17, 2001; (9) U.S. patent application Ser. No. 10/027,906, filed Dec. 21, 2001 now U.S. Pat. No. 6,952,504 to Bi et al., entitled "Three Dimensional Engineering Of Planar Optical Structures"; (10) U.S. patent application Ser. No. 10/083,967 filed Feb. 25, 2002 now U.S. Pat. No. 7,226,966 to Kambe et al., entitled "Structures Incorporating Polymer-Inorganic Particle Blends," which claims priority to U.S. Provisional patent application Ser. No. 60/309,887 filed Aug. 3, 2001; (11) U.S. application Ser. No. 10/099,597 to Horne et al., filed on Mar. 15, 2002, now U.S. Pat. No. 6,849,334, entitled "Optical Materials And Optical Devices," which claims priority to U.S. provisional application 60/313,588 filed Aug. 17, 2001; and (12) U.S. patent application Ser. No. 10/119,645, filed Apr. 10, 2002 now U.S. Pat. No. 6,919,054 to Gardner et al., entitled "Reactant Nozzles Within Flowing Reactors," each of which above is incorporated herein by reference except for 60/241,200.

FIELD OF THE INVENTION

This application relates to high rate production of submicron/nanoscale particles, especially high uniformity particles that are generally un-fused. In addition, this application relates to structures, such as powder coatings, formed with submicron/nano scale particles with high uniformity.

BACKGROUND OF THE INVENTION

Advances in a variety of fields have created a demand for many types of new materials. In particular, a variety of chemical powders can be used in many different processing contexts, such as the production of electrical components, optical components, electro-optical components and batteries. Similarly, technological advances have increased the demand for improved material processing with strict tolerances on processing parameters. As miniaturization continues even further, material parameters will need to fall within stricter tolerances. Current integrated circuit technology already requires tolerances on processing dimensions on a submicron scale.

The consolidation or integration of mechanical, electrical and optical components into integral devices has created enormous demands on material processing. Furthermore, the individual components integrated in the devices are shrinking in size. Therefore, there is considerable interest in the formation of specific compositions applied to substrates.

An explosion of communication and information technologies including internet based systems has motivated a world wide effort to implement optical communication networks to take advantage of a large bandwidth available with optical communication. The capacity of optical fiber technology can be expanded further with implementation of Dense Wavelength Division Multiplexing technology. With increasing demands, more channels are needed to fulfill the system functions. Integrated planar components can be used to replace discrete optical components to supply the desired capacity. To form these integrated structures, there is considerable interest in the formation of specific compositions applied to substrates. In order to form optical devices with high quality optical coatings from these materials, the coating properties need to be specified accordingly.

SUMMARY OF THE INVENTION

In a first aspect, the invention pertains to methods for producing product particles comprising an inorganic composition. The product particles have an average particle size of no more than about 75 nm. The methods comprise reacting at least one precursor compound to produce the product particles at a rate of at least about 35 grams per hour. Particles refer to dispersible units within the collection of particles, while primary particles refer to distinguishable units in a transmission electron micrograph, as described further below. Product particles comprise a collection of particles and generally have primary particles identifiable from appropriate micrographs.

In another aspect, the invention pertains to methods for producing product particles comprising an inorganic composition. The product particles have an average particle size of no more than about 500 nm, and the particles have effectively no particles with a diameter greater than about 4 times the average particle size. The methods comprise reacting at least one precursor compound to produce the product particles at a rate of at least about 35 grams per hour.

Furthermore, the invention pertains to methods for producing product particles comprising an inorganic composition. The product particles have an average primary particle size of no more than about 500 nm, and the primary particles have effectively no particles with a diameter greater than about 4 times the average particle size. The methods comprise reacting at least one precursor compound to produce the product particles at a rate of at least about 35 grams per hour.

In a further aspect, the invention pertains to methods for producing product particles comprising an inorganic composition. The product particles have an average particle size of no more than about 500 nm, and the product particles have a distribution of particle sizes in which at least about 95 percent of the particles have a diameter greater than about 60 percent of the average diameter and less than about 140 percent of the average diameter. The methods comprise reacting at least one precursor compound to produce the product particles at a rate of at least about 35 grams per hour.

In additional aspects, the invention pertains to methods for producing product particles comprising an inorganic composition. The product particles have an average primary particle size of no more than about 500 nm, and the primary particles have a distribution of particle sizes in which at least about 95 percent of the particles have a diameter greater than about 60 percent of the average diameter and less than about 140 percent of the average diameter. The methods comprise reacting at least one precursor compound to produce the product particles at a rate of at least about 35 grams per hour.

In addition, the invention pertains to a powder coating comprising an inorganic composition. The coating comprises primary particles having an average particle size less than about 500 nm and effectively no primary particles having a diameter greater than about 4 times the average primary particle diameter.

In other embodiments, the invention pertains to methods for forming a powder coating, the method comprising reacting a flowing reactant stream to form a flow of product particles and depositing the product particles on a substrate from the flow. The flow of product particles has an average diameter less than about 500 nanometers and has effectively no particles with a diameter greater than about 4 times the average diameter.

In further embodiments, the invention pertains to a collection of particles comprising a metal borate wherein the particles have an average diameter less than about 500 nm.

The invention further pertains to particle collections and powder coatings produced by the above methods. The invention further pertains to products made from particle collections and powder coatings formed by the above methods and to products made from the powder coatings described above.

In additional aspects, the invention pertains to methods for producing product particles comprising an inorganic composition wherein the product particles have an average particle size of no more than about 75 nm. The methods comprise a step for producing the product particles at a rate of at least about 35 grams per hour.

In further aspects, the invention pertains to methods for producing product particles comprising an inorganic composition wherein the product particles have an average particle size of no more than about 500 nm. The particles have effectively no particles with a diameter greater than about 4 times the average particle size. The methods comprise a step for producing the product particles at a rate of at least about 35 grams per hour.

In other aspects, the invention pertains to methods for producing product particles comprising an inorganic composition wherein the product particles have an average particle size of no more than about 500 nm. The product particles have a distribution of particle sizes in which at least about 95 percent of the particles have a diameter greater than about 60 percent of the average diameter and less than about 140 percent of the average diameter. The methods comprise a step for producing the product particles at a rate of at least about 35 grams per hour.

BRIEF DESCRIPTION OF THE DRAWINGS

FIG. 90 is a plot of an x-ray diffractogram for three samples of aluminum oxide particles following a heat treatment (upper curves) and a representative sample prior to heat treatment (lower plot) produced by laser pyrolysis with vapor reactants. For comparison, a line plot of the diffractogram peaks for three phases of aluminum oxide are presented in the bottom of the figure.

DETAILED DESCRIPTION OF THE INVENTION

Figure 1:
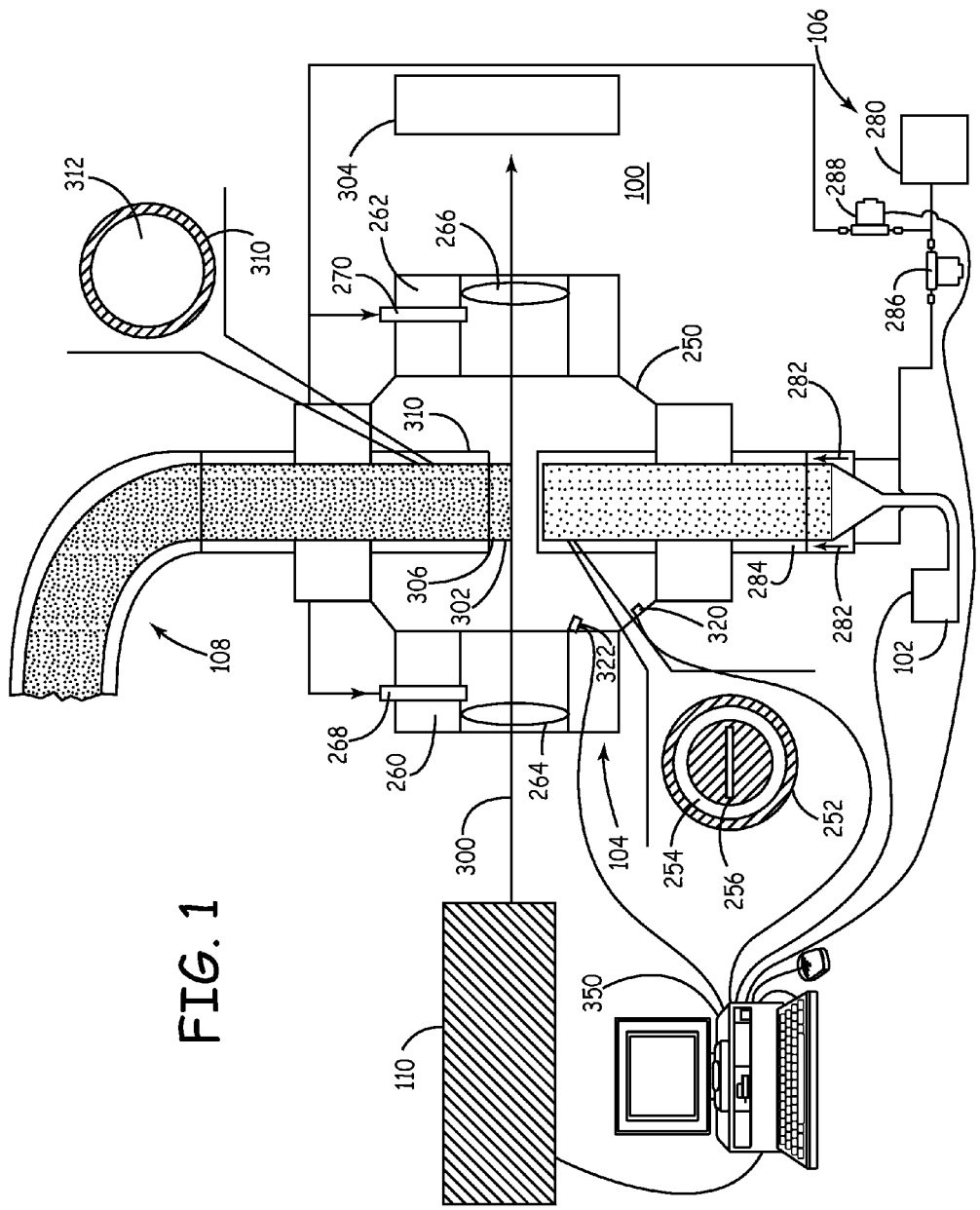
FIG. 1 is a schematic, sectional view of an embodiment of a laser pyrolysis apparatus, where the cross section is taken through the middle of a radiation path. The upper insert is a bottom view of a collection nozzle, and the lower insert is a top view of an injection nozzle.

Submicron/nanoscale particles with excellent properties can be produced at high rates. The high rate submicron/nanoscale particle production generally involves a chemical reaction within a flow originating from a reactant inlet nozzle, although other methods based on a chemical reaction can be used to produce particles. In particular, rates of at least about 35 grams per hour (g/h) can be achieved. Specifically, particles with average particle sizes less than about 75 nanometers (nm) as well as larger particles can be produced at high rates. In some embodiments, the particles have very high uniformity in particle size, e.g., a narrow particle size distribution as measured by width of the peak or the lack of a tail in the distribution at larger particle sizes. In addition, powder coatings/powder coatings can be formed with unique characteristics due to small primary particle size and the uniformity of the primary particle size, in which the primary particles strike a surface to form the powder coating.

In some embodiments, radiation, e.g., as a radiation beam, intersects the reactant flow to drive the reaction. The formation of a well defined reaction zone involving the region at which the radiation intersects the reactant flow can result in the formation of substantially uniformly sized particles. The reaction conditions can be established such that unfused particles are formed within the flow even at the high particle production rates. An elongated reactant inlet nozzle can be used to achieve high throughput through the reaction zone while having the radiation intersect with a significant fraction or all of the reactant flow to obtain high yields. The particles can be deposited onto a substrate to form powder coatings.

Generally, the flowing reaction approaches discussed herein incorporate a reactant flow that can comprise vapor(s), aerosol(s) or combinations thereof to introduce desired elements into the flow stream. In addition, selection of the reaction conditions can correspondingly vary the nature of the resulting reaction product. Thus, a tremendous versatility has been achieved with respect to the production of desirable inorganic materials, such as amorphous particles, crystalline particles, combinations thereof and corresponding coatings. In addition, treatment of the particles or coatings following formation can be used to modify the nature of the materials, for example, the composition and/or crystal structure, which may not alter significantly the character of the materials, such as the average particle size, if the treatment is appropriately selected. Coatings can be densified or consolidated into a uniform material with approximately uniform density through the material.

Some of the principles underlying laser pyrolysis can be adapted for directly forming a coating. The resulting coating process is a radiation-based reactive deposition. Specifically, a process has been developed, termed light reactive deposition, to form highly uniform coatings and structures from a reactive flow. Light reactive deposition involves a radiation driven, e.g., laser driven, flowing reactor configured for the immediate deposition of particles onto a surface, i.e., without collecting the particles as a separate powder. As with laser pyrolysis, the reactants are directed from a reactant source into a flow that proceeds to a reaction zone formed by the intersection of radiation with the flow. The reactants can be reacted in the flow to form product particles within the flow, which can be subsequently deposited on a substrate surface from the flow. The resulting coating can be termed a powder coating, which can range in properties from a stack of unfused particles to a porous network of fused particles. The deposition can be performed within the reaction chamber or in a coating chamber operably connected to the reaction chamber.

Reactant delivery approaches developed for laser pyrolysis can be adapted for light reactive deposition. In particular, a wide range of reaction precursors can be used in gaseous/vapor and/or aerosol form, and a wide range of highly uniform product particles can be efficiently produced for the deposition in the form of a coating, such as a powder coating. Specifically, light reactive deposition can be used to form highly uniform coatings of materials, optionally comprising dopant(s)/additive(s) and/or complex composition(s). The coating formed by light reactive deposition can be a collection of particles on a surface or a powder coating, depending on the deposition conditions. For convenience, this application refers interchangeably to radiation-driven pyrolysis, light-driven pyrolysis and laser pyrolysis. For convenience, this application also refers interchangeably to radiation-based reactive deposition and light reactive deposition. In other words, as used herein, laser pyrolysis and light reactive deposition refer generally to all radiation based particle synthesis and radiation based coating approaches, respectively, unless explicitly indicated otherwise. A powder coating is a network on a substrate of fused, partly fused or un-fused particles in which at least some characteristics of the initial primary particles are reflected within the coating.

Submicron/nanoscale inorganic particles and corresponding coatings with various stoichiometries, sizes and crystal structures can be produced by a variety of reaction methodologies and have been produced by chemical reaction with flowing reactants, especially by laser pyrolysis/light reactive deposition using an intense radiation, alone or with additional processing. Specifically, it has been discovered that submicron/nanoscale particles with a range of compositions can be produced, optionally, with selected dopant(s)/additive(s), such as rare earth metal(s) and/or other elements. In addition, dopant(s)/additive(s) generally can be introduced at desired amounts by varying the composition of the reactant stream. Also, modifying element(s), such as dopant(s)/additive(s), can be introduced into an appropriate host material following formation of particles or a powder coating.

Specifically, with respect to particles, collections of particles of particular interest have an average primary particle diameter less than a micron. Collections of particles, as distinguished from coatings, refer to substantially un-fused primary particles that can be correspondingly dispersed under appropriate conditions. Particles produced in a radiation driven reactor can have high uniformity with respect to composition and particle size, such as a lack of particles with sizes much larger than the average particle size and/or a narrow distribution of particle diameters around the average diameter. In particular, radiation-driven pyrolysis has been found to be a valuable process for efficiently producing submicron (in the range(s) of less than about 1 micron average diameter) and nanoscale (in the range(s) of less than about 100 nanometer (nm) average diameter) particles with high uniformity at high production rates.

In some embodiments, the reactor apparatus, e.g., a laser pyrolysis apparatus or a light reactive deposition apparatus, includes an extended reactant inlet such that a stream of particles is generated within a flowing sheet forming a reactant/product stream. Generally, the reactant flow is oriented to intersect the radiation such that most or all of the reactant flow intersects with the radiation such that high yields are obtained. Using an extended reactant inlet, a line or stripe of particles at a high throughput can be collected or simultaneously deposited onto a substrate. It has been discovered how to obtain high reactant throughput such that a high particle production rate can be maintained without sacrificing control of the product particle properties or uniformity of the particles and/or the deposited powder coating. For coating embodiments, by depositing a line or stripe of particles, the coating process can be performed more rapidly.

More specifically, in a reactor with an elongated reactant inlet, particle production rates are readily achievable in the range(s) of at least about 50 grams per hour (g/h) and in other embodiments in the range(s) of at least about 100 g/h. These rates can be used to achieve particles with a wide range of compositions and with high particle uniformity. Specifically, collections of particles can be formed with a distribution of particle diameters that is highly peaked at or near the average such that the distribution of a majority of the particles is narrow and that has a cut off in the tail of the distribution such that effectively no particles have a diameter larger than a cut off value of a low multiple of the average diameter. Corresponding high coating rates also can be achieved. The uniformity of the particles in the flow can result in desirable properties for the corresponding coating formed from the particles.

Light reactive deposition has considerable advantages for the production of particles for coating substrate surfaces. First, light reactive deposition can be used in the production of a large range of product particles. Thus, the composition of the corresponding coating can be adjusted based on the features of the light reactive deposition approach. Furthermore, light reactive deposition can produce very small particles with a high production rate. When small particles are coated onto the surface of the substrate, a smoother coating with a more uniform thickness can be generated if particle packing is not an issue.

Because of the achievability of high chemical and physical uniformity of submicron/nanoscale product particles, laser pyrolysis is a desirable approach for producing submicron/nanoscale particles, such as particles with simple compositions or complex compositions. However, other approaches involving flowing reactant streams can be used to synthesize submicron/nanoscale particles based on the disclosure herein. Alternative approaches include, for example, flame pyrolysis and thermal pyrolysis. The approaches for particle formation have the common characteristic that the reactants are fed into a flow (possibly with other compositions, such as inert gas and radiation absorbers), which reactants are then reacted to generate product particles in a continuous production process. The product particles within the flow are directed to a collector and/or substrate surface for coating, which results in the removal of the product particles from the flow. While the product particles are produced within a flow, the composition and other characteristics of the product particles can be modified prior to, during or following removal of the particles from the flow.

Flame pyrolysis can be performed with a hydrogen-oxygen flame, wherein the flame supplies the energy to drive the pyrolysis. Such a flame pyrolysis approach should produce some of the materials, which can be produced by the laser pyrolysis techniques herein, except that flame pyrolysis approaches generally do not produce comparable high uniformity and a narrow particle size distribution that can be obtained by laser pyrolysis, which has a well defined reaction zone. Furthermore, flame pyrolysis is restricted with respect to the product compositions by the chemistry of the flame. In addition, flame pyrolysis typically does not have production rates comparable to high production rates obtainable with high rate laser pyrolysis systems. A flame production apparatus used to produce oxides is described in U.S. Pat. No. 5,447,708 to Helble et al., entitled "Apparatus for Producing Nanoscale Ceramic Particles," incorporated herein by reference. Furthermore, submicron/nanoscale doped amorphous particles can be produced by adapting inventive reactant delivery aspects of the laser pyrolysis methods with a thermal reaction chamber such as the apparatus described in U.S. Pat. No. 4,842,832 to Inoue et al., "Ultrafine Spherical Particles of Metal Oxide and a Method for the Production Thereof," incorporated herein by reference. Relative to other approaches, laser pyrolysis has an external heating source de-coupled from the reaction chemistry, which results in a greatly expanded range of compositions that can be produced by the method.

One feature of applying laser pyrolysis/light reactive deposition for the production of desired particles/coatings, e.g., doped particles and particles with complex compositions, can be production of a reactant stream comprising suitable amounts of appropriate host precursor(s) and dopant(s)/additive(s) precursor(s), if any. Similarly, the reactant stream can further comprise an additional radiation absorber, optionally, for example, when one or more of the precursor(s) is an appropriate radiation absorber. Other additional reactants can be used to adjust the oxidizing/reducing environment in the reactant stream. Inert gases can be added to the reactant flow as carrier gases and/or reaction moderators.

In laser pyrolysis/light reactive deposition, the reactant stream can be pyrolyzed by an intense radiation beam, such as a laser beam. While a laser beam is a convenient energy source, other intense electromagnetic radiation (e.g., light) sources can be used in laser pyrolysis/light reactive deposition. Laser pyrolysis/light reactive deposition provides for formation of phases of materials that can be difficult to form under thermodynamic equilibrium conditions. As the reactant stream leaves the light beam, the product particles are rapidly quenched. The reaction zone in a laser pyrolysis system that forms as a result of the intersection of the laser with the reactant stream involves a chemical that is significantly different from that present in other pyrolysis approaches. This reaction chemistry in laser pyrolysis provides a surprising ability to generate a wide range of compositions within the reaction zone.

To perform laser pyrolysis/light reactive deposition, one or more reactants can be supplied in vapor form. Alternatively or additionally, one or more reactants can be supplied as an aerosol. The use of an aerosol provides for the use of a wider range of precursors for laser pyrolysis/light reactive deposition than are suitable for vapor delivery only. In some cases, less expensive precursors can be used with aerosol delivery. Suitable control of the reaction conditions with the aerosol and/or vapor results in submicron/nanoscale particles with a narrow particle size distribution. In addition, particles produced by laser pyrolysis can be subjected to heating to alter the particle properties and/or to consolidate the coatings, such as a powder coating, into a uniform material.

In general, the inorganic particles generally comprise metal and/or metalloid elements in their elemental form and/or in compounds. Specifically, the inorganic particles can comprise, for example, elemental metal or elemental metalloid, i.e. un-ionized elements such as silver and silicon, metal/metalloid oxides, metal/metalloid nitrides, metal/metalloid carbides, metal/metalloid sulfides, metal/metalloid arsinides, metal/metalloid phosphides, e.g., InP, metal/metalloid selenides, metal/metalloid tellurides, or the like, or combinations thereof. In addition, there is the capability for producing submicron/nano-particulate carbon solids, which can be crystalline, e.g., graphitic, amorphous, or a combination thereof. Elemental carbon materials, which can include impurities/dopants, such as hydrogen and/or nitrogen, can be considered inorganic since they are not hydrocarbon based. Some metal/metalloid oxides are particularly desirable for various applications, such as phosphors, electro-active materials for batteries or optical applications, and/or for their ability to consolidate into desirable uniform materials.

Complex systems of ternary, quaternary and higher complexity compounds can also be made. In particular, compounds with multiple metal/metalloid elements can be formed. In addition, metal/metalloid compounds with complex anions, such as phosphates, sulfates and silicates can be formed. Also, dopant(s)/additive(s) can be incorporated into the materials. In summary, a wide range of inorganic compositions can be generated at high rates based on the approaches described herein.

Furthermore, dopant(s)/additive(s) can be introduced to vary properties of the particles, a corresponding uniform layer and/or a powder coating. With respect to uniform layers, incorporation of the dopant(s)/additive(s) into the particles used to form a coating can result in a distribution of the dopant(s)/additive(s) through the densified material directly as a result of the powder deposition. Desired dopant(s)/additive(s) can be incorporated into particles/powder coating by introducing the dopant/additive element(s) into the reactant stream and selecting the reaction conditions appropriately. Alternatively or additionally, one or more dopant/additive can be contacted with the powder or powder coating following deposition but before consolidation.

For example, dopant(s)/additive(s) can be introduced to change the index-of-refraction or processing properties, e.g., flow temperature, of a material. For optical applications, the index-of-refraction can be varied to form specific optical devices that operate with light of a selected frequency range. Dopant(s)/additive(s) can also interact within the materials. For example, some dopant(s)/additive(s) can be introduced to increase the solubility of other dopant(s)/additive(s). Suitable dopant(s)/additive(s) for some applications include, for example, metal elements, metalloid elements, and combinations thereof. In addition, metal/metalloid oxides can also be doped with fluorine, chlorine, nitrogen and/or carbon, which substitute for oxygen in an oxide composition. Other dopant(s)/additive(s) can be added to change the absorption properties, emission properties, magnetic properties and/or photosensitivity, e.g., the change of index-of-refraction in response to irradiation with appropriate light.

While laser pyrolysis and light reactive deposition generally can be used to form single phase materials, under some reaction conditions multiple phase materials can be formed. Thus, a collection of particles or a powder coating can comprise, for example, amorphous particles, crystalline particles of a single crystal structure (possibly selected from a plurality of possible crystalline isomorphs with the same chemical composition), crystalline particles with a mixture of crystal structures and/or amorphous structures, or a combination thereof. Similarly, a collection of particles has approximately uniform stoichiometry/composition or a mixture of stoichiometries/compositions. The reactions conditions generally can be varied to select desired stoichiometries/compositions and/or phase(s) (e.g., crystal structure or lack thereof) of the product particles or powder coating.

While laser pyrolysis and light reactive deposition are very versatile with respect to adjustments in the composition of materials formed from the process, additional processing after the formation of the particles/coating can be used to further modify the materials. In particular, thermal (e.g., heat or cold) treatment(s) of particles can be used to alter the stoichiometry/composition and/or the phase(s), e.g., crystal structure(s), of the particles. For example, heat treatments under mild conditions have been used to alter the oxidation state of metals, alter the crystal structure, improve the crystallinity and/or introduce other metal/metalloid elements into powder, all without large amounts of sintering of the particles. Powder coatings can be modified using comparable processing. Similarly, dopant(s)/additive(s) can be introduced into powders and/or powder coatings. In general, the composition, along with optional dopant(s)/additive(s) and phase can be selected to produce materials with desired properties generally associated with the intended application of the material, as described further below.

While powder coatings and other coatings can be useful as formed, the coatings can be densified to form substantially uniform materials. To form a substantially uniform layer, a coating, such as a powder coating, can be consolidated. The substantially uniform layer after consolidation can be an amorphous layer, a polycrystalline layer, a crystalline layer or any combination thereof. To consolidate the materials, a powder coating is heated to a temperature above which the particles coalesce via one of several possible densification mechanisms—viscous sintering, vapor-phase sintering, and/or liquid-phase sintering. In general, for amorphous particles, the glass transition temperature serves as a lower bound whereas the melting temperature serves as an upper bound. In general, for crystalline particles, temperatures in which adequate vapor pressure forms to transport of matter from the concave particle surface (high vapor pressure) to the convex contact point of neighboring particles (low vapor pressure) serves as a lower bound whereas the melting temperature serves as an upper bound. At these temperatures, the powder or powder coating densifies to form a substantially uniform layer of material.

In summary, the composition of a powder/powder coating/coating can be adjusted, among other means, by selection of the chemical composition of the flowing reactant stream and the reaction conditions within the reaction chamber. Laser pyrolysis/light reactive deposition under controlled reaction conditions can form highly uniform particles, powder coatings with a structure reflecting the particle uniformity, and highly smooth substantially uniform coatings generally following consolidation. Additional treatments can be performed following initial formation of particles or powder coatings to further select the composition and/or structures of the materials.

Regardless of specific desirable applications or specific materials, the approaches described herein for producing submicron/nanoscale particles at high rates and/or with narrow size distributions are broadly applicable to inorganic particles and corresponding powder coatings. The description herein generally relates to all types of inorganic materials. However, certain types of materials are of particular interest due to their usefulness in specific applications. In some embodiments, optical properties are of interest, while in other embodiments other properties, such as various electrical properties, energy storage properties and mechanical properties, are particularly relevant for a particular application. Some of these specific materials are described further below.

The approaches herein for generating particles, powder coatings and uniform materials are desirable for a variety of applications, such as the formation of materials having useful optical properties. Specifically, submicron/nanoparticle powders can be useful, for example, as phosphors in displays, abrasives for polishes, catalysts, dielectric materials for capacitors, electro-active materials for energy storage applications, such as batteries and/or battery electrodes, UV absorbers, electro-magnetic shielding, photoactive materials, optical materials, materials for electro-optical devices and/or optical devices, materials for solar cells, optical devices and/or electro-optical devices, catalysts, electrical components, such as semiconducting devices and or electrical conductors, and the like. Powder coatings can be useful for the formation of high surface area coatings with functional properties determined by the composition of the coating. Thus, powder coatings can have many uses even if the material is not consolidated into a uniform material. Furthermore, consolidated coatings of uniform materials have similar applications that relate to the composition of the coating.

With respect to the formation of optical and/or electro-optical devices, the powders themselves can be suitable optical materials and, additionally or alternatively, can be incorporated by further processing into additional optical materials. For example, powders can be incorporated into composites with polymers such that the resulting composite has desirable optical properties. Polymer-inorganic particle composites are described further in copending and commonly assigned U.S. patent application Ser. No. 09/818,141, now U.S. Pat. No. 6,599,631 to Kambe et al., entitled "Polymer-Inorganic Particle Composites," incorporated herein by reference, and copending and commonly assigned U.S. patent application Ser. No. 10/083,967, now U.S. Pat. No. 7,226,966 to Kambe et al., entitled "Structures Incorporating Polymer-Inorganic Particle Blends," incorporated herein by reference.

The consolidated materials also can be used for optical and/or electro-optical applications as well as various other applications involving thin, substantially smooth inorganic coatings. With respect to optical applications, optical components and/or functionality can be integrated onto a planar chip-type base similar to an electronic integrated circuit. By placing the optical components and/or functionality onto a substrate surface such as a silicon wafer, many optical components and/or functionality can be squeezed into a small footprint. The selection of substrate material is based on factors, or combinations of factors, such as thermal expansion, cost, strength, compatibility with film/coating material, as well as optical properties. The only fundamental requirement for a substrate material is the ability to withstand processing temperatures. Other possible substrate materials include, but are not limited to: fused silica, quartz, alumina, lithium tantalate, lithium niobate, gallium arsenide, indium phosphide, soda-lime silicate glass, borosilicate glass, and aluminosilicate glass.

The optical materials on the substrate surface can be fashioned into specific devices. In particular, a promising technology for the integration of optical components centers around the production of planar waveguides. Semiconductor processing approaches have been adapted to form the waveguides following the deposition of optical materials. The formation of integrated optical devices using light reactive deposition is described further in copending and commonly assigned U.S. patent application Ser. No. 10/027,906, now U.S. Pat. No. 6,952,504 to Bi et al., entitled "Three Dimensional Engineering of Optical Structures," incorporated herein by reference. The powder coatings can be also used for forming upon consolidation optical fiber preforms and, by processing of the optical fiber preforms, optical fibers. The structure and composition(s) of the preforms and fibers can be selected to have desired optical properties. Optical fiber preforms are described further, for example, in copending U.S. provisional application Ser. No. 60/315,438 to Home et al., entitled "Optical Waveguide Preforms," and PCT application designating the U.S. Ser. No. PCT/US01/45762 to Bi et al., entitled "Multilayered Optical Structures," both of which are incorporated herein by reference.

In some embodiments, the optical properties of the materials can be significant for their application even if the materials are not used for optical communications channels through waveguides/fibers. For example, for the formation of displays and the like, phosphor particles can be used. Phosphor particles generally comprise a host crystalline material, such as ZnO and ZnS, that has desired optical properties, which can further comprise a dopant/additive to increase the luminescence and/or shift the emission frequency. For ultaviolet blocks and photocatalytic materials, compositions that absorb electromagnetic radiation in the ultraviolet part of the spectrum can be useful. Suitable ultraviolet absorbing compositions include, for example, $TiO_2$ and ZnO. In the production of some embodiments of solar cells, carbon particles, such as laser black and fullerenes, can be used as electron acceptors, as described further in U.S. Pat. No. 5,986,206 to Kambe et al., entitled "Solar Cell," incorporated herein by reference.

Optical materials can be placed in periodic or approximately periodic arrays to form photonic band gap materials, e.g., photonic crystals. The periodicity of the materials results in a corresponding periodicity in index-of-refraction that can extend in one, two or three dimensions. Photonic crystals can provide a frequency gap covering a range of frequencies of electromagnetic radiation that cannot propagate for any wavevector, i.e., in any direction, including spontaneous emission. Light can be introduced into a photonic crystal by applying light at an angle to the periodic lattice. The frequency gap depends on, for example, the unit cell size, the crystallographic orientation of the periodic structure, the indices-of-refraction including the differences in index between different materials of the lattice and other optical properties. Defects can be introduced into the photonic crystal to provide for electromagnetic propagation within the forbidden band gap. The defects introduce broken symmetry that interrupts the periodicity. The periodicity can be produced, for example, using self-assembly as described further in copending U.S. patent application Ser. No. 09/558,266, now U.S. Pat. No. 6,890,624 to Kambe et al., entitled "Self-Assembled Structures," incorporated herein by reference. Similarly, particles can be incorporated into particle-inorganic particle blends for self-assembly or other organization into periodic structures, as described further in copending U.S. patent application Ser. No. 10/083,967, now U.S. Pat. No. 7,226,966 to Kambe et al., entitled "Structures Incorporating Polymer-Inorganic Particle Blends," incorporated herein by reference.

Materials for non-optical applications can be similarly selected to have desired properties. For example, abrasive particles can be used for chemical-mechanical polishing to produce very smooth surfaces based on the uniformity and dispersability of the particles. The hardness and chemical properties of the particles generally is selected based on the character of the surface to be polished, and suitable abrasive particles include, for example, $SiO_2$, $CeO_2$, $TiO_2$ and $Al_2O_3$. For electromagnetic shielding applications, magnetic particles can be used effectively, such as particles comprising $Fe_2O_3$, $Fe_3O_4$, $Fe_3C$ and $Fe_7C_3$. Due to the high surface area of submicron/nanoscale particles, these particles can have advantages for catalyst applications. Compositions for catalyst particles generally depend on the particular catalytic function. Many inorganic materials, such as metal oxides (e.g., $Al_2O_3$) and metal particles (e.g., the noble metals), have commercially significant catalytic function.

Furthermore, submicron and nanoscale particles can have desirable properties for energy storage applications, such as for the formation of batteries, battery electrodes, and the like. The particles can function as electro-active materials and/or as electrically conductive materials. Suitable electrically conductive materials include for example metal particles. Electro-active particles in general can undergo reduction-oxidation reactions. In some embodiments, lithium-based batteries are of interest. In some lithium-based batteries, the cathode comprises a compound that can incorporate lithium ions within the material as elemental lithium while the anode comprises elemental lithium that oxidizes to lithium ions. It has been found that vanadium oxides submicron/nanoscale particles have surprisingly high energy densities in lithium-based batteries, as described in U.S. Pat. Nos. 5,952,125 and 6,130,007 to Bi et al., entitled "Batteries With Electroactive Nanoparticles," incorporated herein by reference. Similarly, submicron/nanoscale particles have the capability of achieving high rates of discharge. Other advantageous submicron/nanoscale powders of metal compositions, of which a large number are described further below, that can incorporate lithium into their lattices can be formed for use in anodes and/or cathodes, as described herein.

Other compositions for submicron/nanoscale particles can be selected to yield advantageous properties for electronic applications. For example, electrically conductive particles can advantageously used to form electrical interconnects within electronic structures, such as integrated electrical circuits or electro-optical circuits. Similarly, silicon particles, germanium particles, or gallium arsenide particles can be formed for the introduction of semiconductor materials. Other materials introduce high electrical capacitance capabilities due to their dielectric properties, such as $BaTiO_3$ and Ta.

Particle Synthesis within a Reactant Flow

Laser pyrolysis has been demonstrated to be a valuable tool for the production of submicron/nanoscale particles with a wide range of particle compositions and structures alone or with additional processing. Using light reactive deposition, the particles can be deposited onto a substrate as a coating. The reactant delivery approaches described in detail below can be adapted for producing particles and/or coatings in flowing reactant systems, with or without a radiation, e.g., a light source. In some embodiments, other chemical reaction synthesis methods, as discussed above, using a flowing reactant stream, as well as other chemical synthesis methods, can be adapted for producing desired particles and/or coatings. Laser pyrolysis is a particularly appropriate approach in some applications for producing a doped particles and/or complex particle compositions because laser pyrolysis can produce highly uniform product particles at high production/deposition rates.

Flowing reactant systems generally comprise a reactant delivery apparatus that directs a flow through a reaction chamber. The reaction of the reactant flow takes place in the reaction chamber. The reaction zone may or may not be localized in a narrow region within the reaction chamber. The use of a radiation, e.g., light, beam, to drive the reaction can result in a localized reaction zone that leads to high uniformity of the particles. Beyond the reaction zone, the flow comprises product particles, unreacted reactants, reaction by-products and inert gases. The flow can continue to a collector and/or a deposition surface at which at least a portion of the product particles are harvested from the flow. Continuous supply of reactants to the flow and removal of product particles from the flow during the course of the reaction characterizes the reaction process within the flowing reactant system.

Light reactive deposition can incorporate some of the particle production features of laser pyrolysis for the production of coatings. In particular, the versatility of forming particles with a range of particle compositions and structures can be adapted for the formation of particle coatings by light reactive deposition with a comparable range in particle compositions. In general, product particles within a flowing reactant system can be deposited onto a substrate as a coating within the reaction chamber, or directed to a separate coating chamber for deposition onto a substrate, or directed to a collector for collection as a powder.

Laser pyrolysis has become the standard terminology for flowing chemical reactions driven by an intense radiation, e.g., light, with rapid quenching of product after leaving a narrow reaction region defined by the radiation. The name, however, is a misnomer in the sense that radiation from non-laser sources, such as a strong, incoherent light or other radiation beam, can replace the laser. Also, the reaction is not a pyrolysis in the sense of a thermal pyrolysis. The laser pyrolysis reaction is not solely thermally driven by the exothermic combustion of the reactants. In fact, in some embodiments, laser pyrolysis reactions can be conducted under conditions where no visible light emissions are observed from the reaction, in stark contrast with pyrolytic flames. Thus, as used herein, laser pyrolysis refers generally to a radiation-driven flowing reaction. Light reactive deposition involves comparable processes as laser pyrolysis for the particle production, although some characteristics of the flow may be altered to accommodate the coating process.

The reaction conditions can determine the qualities of the particles produced by laser pyrolysis. The reaction conditions for laser pyrolysis can be controlled relatively precisely in order to produce particles with desired properties. For example, the reaction chamber pressure, flow rates, composition and concentration of reactants, radiation intensity, radiation energy/wavelength, type and concentration of inert diluent gas or gases in the reaction stream, temperature of the reactant flow can affect the composition and other properties of the product particles, for example, by altering the time of flight of the reactants/products in the reaction zone and the quench rate. Thus, in a particular embodiment, one or more of the specific reaction conditions can be controlled. The appropriate reaction conditions to produce a certain type of particles generally depend on the design of the particular apparatus. Specific conditions used to produce selected particles in particular apparatuses are described below in the Examples. Furthermore, some general observations on the relationship between reaction conditions and the resulting particles can be made.

Increasing the light power results in increased reaction temperatures in the reaction region as well as a faster quenching rate. A rapid quenching rate tends to favor production of higher energy phases, which may not be obtained with processes near thermal equilibrium. Similarly, increasing the chamber pressure also tends to favor the production of higher energy phases. Also, increasing the concentration of the reactant serving as the oxygen source or other secondary reactant source in the reactant stream favors the production of particles with increased amounts of oxygen or other secondary reactant.

Reactant velocity of the reactant gas stream is inversely related to particle size so that increasing the reactant velocity tends to result in smaller particle sizes. A significant factor in determining particle size is the concentration of product composition condensing into product particles. Reducing the concentration of condensing product compositions generally reduces the particle size. The concentration of condensing product can be controlled by dilution with non-condensing, e.g., inert, compositions or by changing the pressure with a fixed ratio of condensing product to non-condensing compositions, with a reduction in pressure generally leading to reduced concentration and a corresponding reduction in particle size and vice versa, or by combinations thereof, or by any other suitable means.

Light power also influences particle size with increased light power favoring larger particle formation for lower melting temperature materials and smaller particle formation for higher melting temperature materials. Also, the growth dynamics of the particles have a significant influence on the size of the resulting particles. In other words, different forms of a product composition have a tendency to form different size particles from other phases under relatively similar conditions. Similarly, under conditions at which populations of particles with different compositions are formed, each population of particles generally has its own characteristic narrow distribution of particle sizes.

Materials of interest include amorphous materials, crystalline materials and combinations thereof. Amorphous materials possess short-range order that can be very similar to that found in crystalline materials. In crystalline materials, the short-range order comprises the building blocks of the long-range order that distinguishes crystalline and amorphous materials. In other words, translational symmetry of the short-range order building blocks found in amorphous materials creates long-range order that defines a crystalline lattice. For example, silica glass is an amorphous material comprised of $(SiO_4)^{4-}$ tetrahedra that are bonded together at irregular bond angles. The regularity of the tetrahedra provides short-range order but the irregularity of the bond angles prevents long-range order. In contrast, quartz is a crystalline silica material comprised of the same $(SiO_4)^{4-}$ tetrahedra that are bonded together at regular bond angles to form long-range order which results in a crystalline lattice. In general, the crystalline form is a lower energy state than the analogous amorphous form. This provides a driving force towards formation of long-range order. In other words, given sufficient atomic mobility and time, long-range order can form.

In laser pyrolysis, a wide range of inorganic materials can be formed in the reactive process. Based on kinetic principles, higher quench rates favor amorphous particle formation while slower quench rates favor crystalline particle formation as there is time for long-range order to develop. Faster quenches can be accomplished with a faster reactant stream velocity through the reaction zone. In addition, some precursors may favor the production of amorphous particles while other precursors favor the production of crystalline particles of similar or equivalent stoichiometry. Low laser power can also favor formation of amorphous particles. Specifically, amorphous particles can be consolidated/densified under appropriate conditions to form amorphous layers, such as optical glasses. Amorphous particles are more easily consolidated into a glass layer since amorphous particles do not have a long-range order that is disrupted to form a glass layer. The formation of amorphous oxides is described further in U.S. Pat. No. 6,106,798 to Kambe et al., entitled "Vanadium Oxide Nanoparticles," incorporated herein by reference. Also, crystalline materials are of interest for optical and/or other applications. Crystalline particles can be consolidated into single crystalline or polycrystalline materials. While it may be easier to consolidate amorphous particles into glasses and crystalline particles into crystalline layers, crystalline particles can be consolidated into amorphous layers under appropriate consolidation conditions such as heating the particles to a temperature above the melting temperature followed by quenching at a rate that prevents long-range order formation. Amorphous particles can be consolidated into crystalline layers under appropriate consolidation conditions including the heating and cooling at rates that provide time for long-range order to develop.

To form a desired composition in the reaction process, one or more precursors supply the one or more metal/metalloid elements that form the desired composition. The reactant stream generally would include the desired metal and, additionally or alternatively, metalloid elements to form the host material and, optionally, dopant(s)/additive(s) in appropriate proportions to produce product particles with a desired composition. The composition of the reactant stream can be adjusted along with the reaction condition(s) to generate desired product particles with respect to composition and structure. Based on the particular reactants and reaction conditions, the product particles may not have the same proportions of metal/metalloid elements as the reactant stream since the elements may have different efficiencies of incorporation into the particles, i.e., yields with respect to unreacted materials. The designs of the reactant nozzles for radiation driven reactions described herein are designed for high yields with high reactant flows. Furthermore, additional appropriate precursor(s) can supply any desired dopant/additive element(s).

Metalloids are elements that exhibit chemical properties intermediate between or inclusive of metals and nonmetals. Metalloid elements comprise silicon, boron, arsenic, antimony, and tellurium. While phosphorous is located in the periodic table near the metal elements, it is not generally considered a metalloid element. However, phosphorous in the form of $P_2O_5$ is a composition of interest. For convenience, as used herein including in the claims, phosphorous is also considered a metalloid element. Astatine perhaps can be considered a metalloid also, but it is highly radioactive with the longest lived isotopes having a half life of about 8 hours. Elements from the groups Ib, IIb, IIIb, IVb, Vb, VIb, VIII) and VIIIb are referred to as transition metals. In addition to the alkali metals of group I, the alkali earth metals of group II and the transition metals, other metals include, for example, aluminum, gallium, indium, thallium, germanium, tin, lead, bismuth and polonium. The non-metal/metalloid elements include hydrogen, the noble gases, carbon, nitrogen, oxygen, fluorine, sulfur, chlorine, selenium, bromine, and iodine. Inorganic compositions broadly cover compositions/materials without carbon-carbon chains defining the chemical structures of the compositions. Thus, carbon solids dominated by carbon networks, for example, fullerenes, carbon black, graphite and the like, rather than carbon-carbon chains are also considered inorganic materials.

Laser pyrolysis has been performed generally with gas/vapor phase reactants. Many precursor compositions, such as metal/metalloid precursor compositions, can be delivered into the reaction chamber as a gas. Appropriate precursor compositions for gaseous delivery generally include compositions with reasonable vapor pressures, i.e., vapor pressures sufficient to get desired amounts of precursor gas/vapor into the reactant stream. The vessel holding liquid or solid precursor compositions can be heated (cooled) to increase (decrease) the vapor pressure of the precursor, if desired. Solid precursors generally are heated to produce a sufficient vapor pressure. A carrier gas can be bubbled through a liquid precursor to facilitate delivery of a desired amount of precursor vapor. Similarly, a carrier gas can be passed over the solid precursor to facilitate delivery of the precursor vapor. Alternatively or additionally, a liquid precursor can be directed to a flash evaporator to supply a composition at a selected vapor pressure.

The use of exclusively gas phase reactants can be challenging with respect to the types of precursor compositions that can be used conveniently. Thus, techniques have been developed to introduce aerosols containing precursors, such as metal/metalloid precursors, into laser pyrolysis chambers. Improved aerosol delivery apparatuses for flowing reaction systems are described further in U.S. Pat. No. 6,193,936 to Gardner et al., entitled "Reactant Delivery Apparatuses," incorporated herein by reference.

Using aerosol delivery apparatuses, solid precursor compositions can be delivered by dissolving the compositions in a solvent. Alternatively, powdered precursor compositions can be dispersed in a liquid/solvent for aerosol delivery. Liquid precursor compositions can be delivered as an aerosol from a neat liquid, a multiple liquid dispersion or a liquid solution. Aerosol reactants can be used to obtain a significant reactant throughput. A solvent/dispersant can be selected to achieve desired properties of the resulting solution/dispersion. Suitable solvents/dispersants include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional light absorbing composition may be needed within the reactant stream if a $CO_2$ laser is used as a light source.

If precursors are delivered as an aerosol with a solvent present, the solvent generally can be rapidly evaporated by the radiation (e.g., light) beam in the reaction chamber such that a gas phase reaction can take place. The resulting particles are not generally highly porous, in contrast to other approaches based on aerosols in which the solvent cannot be driven off rapidly. Thus, the fundamental features of the laser pyrolysis reaction can be unchanged by the presence of an aerosol. Nevertheless, the reaction conditions are affected by the presence of the aerosol. Below in the Examples, conditions are described for the production of submicron/nanoscale particles using aerosol precursors in laser pyrolysis reaction chambers. Thus, the parameters associated with aerosol reactant delivery can be explored further based on the description below.

The precursor compositions for aerosol delivery are dissolved in a solution generally with a concentration in the range(s) greater than about 0.1 molar. Generally, increasing the concentration of precursor in the solution increases the throughput of reactant through the reaction chamber. As the concentration increases, however, the solution can become more viscous such that the aerosol may have droplets with larger sizes than desired. Thus, selection of solution concentration can involve a balance of factors in the selection of a suitable solution concentration.

For embodiments involving a plurality of metal/metalloid elements, the metal/metalloid elements can be delivered all as vapor, all as aerosol or as any combination thereof. If a plurality of metal/metalloid elements is delivered as an aerosol, the precursors can be dissolved/dispersed within a single solvent/dispersant for delivery into the reactant flow as a single aerosol. Alternatively, the plurality of metal/metalloid elements can be delivered within a plurality of solutions/dispersions that are separately formed into an aerosol. The generation of a plurality of aerosols can be helpful if convenient precursors are not readily soluble/dispersible in a common solvent/dispersant. The plurality of aerosols can be introduced into a common gas flow for delivery into the reaction chamber through a common nozzle. Alternatively, a plurality of reactant inlets can be used for the separate delivery of aerosol and/or vapor reactants into the reaction chamber such that the reactants mix within the reaction chamber prior to entry into the reaction zone. Exemplary reactant delivery apparatuses are described further below.

In addition, for the production of highly pure materials, it may be desirable to use a combination of vapor and aerosol reactants. Vapor/gas reactants generally can be supplied at higher purity than is generally available at reasonable cost for aerosol delivered compositions. This can be particular convenient for the formation of doped optical glasses. For example, very pure silicon can be delivered in an easily vaporizable form, such as silicon tetrachloride. At the same time, some elements, especially rare earth dopant(s)/additive(s), cannot be conveniently delivered in vapor form. Thus, in some embodiments, a majority of the material for the product compositions can be delivered in vapor/gas form while other elements are delivered in the form of an aerosol. The vapor and aerosol can be combined for reaction, among other ways, following delivery through a single reactant inlet or a plurality of inlets.

The particles, in some embodiments, further comprise one or more non-(metal/metalloid) elements. For example, several compositions of interest are oxides. Thus, an oxygen source should also be present in the reactant stream. The oxygen source can be the metal/metalloid precursor itself if it comprises one or more oxygen atoms or a secondary reactant can supply the oxygen. The conditions in the reactor should be sufficiently oxidizing to produce the oxide materials.

In particular, secondary reactants can be used in some embodiments to alter the oxidizing/reducing conditions within the reaction chamber and/or to contribute non-metal/metalloid elements or a portion thereof to the reaction products. Suitable secondary reactants serving as an oxygen source include, for example, $O_2$, CO, $H_2O$, $CO_2$, $O_3$ and the like and mixtures thereof. Molecular oxygen can be supplied as air. In some embodiments, the metal/metalloid precursor compositions comprise oxygen such that all or a portion of the oxygen in product particles is contributed by the metal/metalloid precursors. Similarly, liquids used as a solvent/dispersant for aerosol delivery can similarly contribute secondary reactants, e.g., oxygen, to the reaction. In other words, if one or more metal/metalloid precursors comprise oxygen and/or if a solvent/dispersant comprises oxygen, a separate secondary reactant, e.g., a vapor reactant, may not be needed to supply oxygen for product particles. Other secondary reactants of interest are described below.

In one embodiment, a secondary reactant composition should not react significantly with the metal/metalloid precursor(s) prior to entering the radiation reaction zone since this can result in the formation of larger particles and/or damage the inlet nozzle. Similarly, if a plurality of metal/metalloid precursors is used, these precursors should not significantly react prior to entering the radiation reaction zone. If the reactants are spontaneously reactive, a metal/metalloid precursor and the secondary reactant and/or different metal/metalloid precursors can be delivered in separate reactant inlets into the reaction chamber such that they are combined just prior to reaching the light beam.

Laser pyrolysis can be performed with radiation at a variety of optical frequencies, using either a laser or other intense light source. Convenient light sources operate in the infrared portion of the electromagnetic spectrum, although other wavelengths can be used, such as the visible and infrared regions of the spectrum. Excimer lasers can be used as ultraviolet sources. $CO_2$ lasers are particularly useful sources of infrared light. Infrared absorber(s) for inclusion in the reactant stream include, for example, $C_2H_4$, isopropyl alcohol, $NH_3$, $SF_6$, $SiH_4$ and $O_3$. $O_3$ can act as both an infrared absorber and as an oxygen source. The radiation absorber(s), such as the infrared absorber(s), can absorb energy from the radiation beam and distribute the energy to the other reactants to drive the pyrolysis.

Generally, the energy absorbed from the radiation beam, e.g., light beam, increases the temperature at a tremendous rate, many times the rate that heat generally would be produced by exothermic reactions under controlled condition(s). While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction. Thus, while the light driven process is referred to as laser pyrolysis, it is not a traditional pyrolysis since the reaction is not driven by energy given off by the reaction but by energy absorbed from a radiation beam. In particular, spontaneous reaction of the reactants generally does not proceed significantly, if at all, back down the reactant flow toward the nozzle from the intersection of the radiation beam with the reactant stream. If necessary, the flow can be modified such that the reaction zone remains confined as desired.

An inert shielding gas can be used to reduce the amount of reactant and product molecules contacting the reactant chamber components. Inert gases can also be introduced into the reactant stream as a carrier gas and/or as a reaction moderator. Appropriate inert gases generally include, for example, Ar, He and $N_2$.

The particle production rate based on improved reactant delivery configurations described below can yield particle production rates in the range(s) of at least about 50 g/h, in other embodiments in the range(s) of at least about 100 g/h, in further embodiments in the range(s) of at least about 250 g/h, in additional embodiments in the range(s) of at least about 1 kilogram per hour (kg/h) and in general up in the range(s) up to at least about 10 kg/h. In general, these high production rates can be achieved while obtaining relatively high reaction yields, as evaluated by the portion of metal/metalloid nuclei in the flow that are incorporated into the product particles. In general, the yield can be in the range(s) of at least about 30 percent based on the limiting reactant, in other embodiments in the range(s) of at least about 50 percent, in further embodiments in the range(s) of at least about 65 percent, in other embodiments in the range(s) of at least about 80 percent and in additional embodiments in the range(s) of at least about 95 percent based on the metal/metalloid nuclei in the reactant flow. A person of ordinary skill in the art will recognize that additional values of particle production rate and yield within these specific values are contemplated and are within the present disclosure.

Compositions of Particles and Coatings

A variety of particles can be produced by laser pyrolysis. Adaptation of laser pyrolysis for the performance of light reactive deposition can be used to produce coatings of comparable compositions as the particles with selected compositions that can be produced by laser pyrolysis. Specifically, the compositions can include one or more metal/metalloid elements forming a crystalline or amorphous material with an optional dopant or additive composition. In addition, dopant(s)/additive(s) can be used to alter the optical, chemical and/or physical properties of the particles. Generally, the powders comprise fine or ultrafine particles with particle sizes in the submicron/nanometer range. The particles may or may not partly fuse or sinter during the deposition while forming a powder coating. To form a densified layer, a powder coating can be consolidated. Incorporation of the dopant(s)/additive(s) into the powder coating, during its formation or following its formation, results in a distribution of the dopant(s)/additive(s) through the densified material.

In general, the submicron/nanoscale particles, as a particle collection or a powder coating, can generally be characterized as comprising a composition including a number of different elements and present in varying relative proportions, where the number and the relative proportions can be selected as a function of the application for the particles. Typical numbers of different elements include, for example, numbers in the range(s) from about 2 elements to about 15 elements, with numbers of 1, 2, 3, 4, 5, 6, 7, 8, 9, 10, 11, 12, 13, 14, and 15 being contemplated, in which some or all of the elements can be metal/metalloid element. General numbers of relative proportions include, for example, values in the range(s) from about 1 to about 1,000,000, with numbers of about 1, 10, 100, 1000, 10000, 100000, 1000000, and suitable sums thereof being contemplated. In addition, elemental materials are contemplated in which the element is in its elemental, un-ionized form, such as a metal/metalloid element, i.e., $M^0$.

Alternatively or additionally, such submicron/nanoscale particles can be characterized as having the following formula:

$$A_aB_bC_cD_dE_eF_fG_gH_hI_iJ_jK_kL_lM_mN_nO_o,$$

where each A, B, C, D, E, F, G, H, I, J, K, L, M, N, and O is independently present or absent and at least one of A, B, C, D, E, F, G, H, I, J, K, L, M, N, and O is present and is independently selected from the group consisting of elements of the periodic table of elements comprising Group 1A elements, Group 2A elements, Group 3B elements (including the lanthanide family of elements and the actinide family of elements), Group 4B elements, Group 5B elements, Group 6B elements, Group 7B elements, Group 8B elements, Group 1B elements, Group 2B elements, Group 3A elements, Group 4A elements, Group 5A elements, Group 6A elements, and Group 7A elements; and each a, b, c, d, e, f, g, h, i, j, k, l, m, n, and o is independently selected and stoichiometrically feasible from a value in the range(s) from about 1 to about 1,000,000, with numbers of about 1, 10, 100, 1000, 10000, 100000, 1000000, and suitable sums thereof being contemplated. The materials can be crystalline, amorphous or combinations thereof. In other words, the elements can be any element from the periodic table other than the noble gases. As described herein, all inorganic compositions are contemplated, as well as all subsets of inorganic compounds as distinct inventive groupings, such as all inorganic compounds or combinations thereof except for any particular composition, group of compositions, genus, subgenus, alone or together and the like.

While some compositions are described with respect to particular stoichiometries/compositions, stoichiometries generally are only approximate quantities. In particular, materials can have contaminants, defects and the like. Similarly, some amorphous materials can comprise essentially blends such that the relative amounts of different components are continuously adjustable over ranges in which the materials are miscible. In other embodiments, phase separated amorphous materials can be formed with differing compositions at different domains due to immiscibility of the materials at the average composition. Furthermore, for amorphous and crystalline materials in which metal/metalloid compounds have a plurality of oxidation states, the materials can comprise a plurality of oxidation states. Thus, when stoichiometries are described herein, the actual materials may comprise other stoichiometries of the same elements also, such as $SiO_2$ also include some SiO and the like.

In some embodiments, such as for optical materials, powders comprise as a host material, for example, silicon particles, metal particles, and metal/metalloid compositions, such as, metal/metalloid oxides, metal/metalloid carbides, metal/metalloid nitrides, metal/metalloid phosphides, metal/metalloid sulfides, metal/metalloid tellurides, metal/metalloid selenides, metal/metalloid arsinides and mixtures and combinations thereof. Especially in amorphous materials, great varieties of elemental compositions are possible within a particular material. While laser pyrolysis is versatile with respect to the production of particles, with a wide range of compositions, in one embodiment, certain host materials for the introduction of dopant(s)/additive(s) are desirable because of their particular ability to be processed into glass layers and/or their desirability for optical materials that are processable into optical devices. For optical materials, some materials of particular interest comprise, for example, silicon oxide (silica), phosphate glasses, germanium oxide, aluminum oxide, indium phosphide, lithium niobate, lithium tantalate, telluride glasses, aluminum oxide, titanium oxide, gallium arsenide, combinations thereof and doped versions thereof. Some metal/metalloid oxides are particularly desirable for optical applications and/or for their ability to consolidate into uniform glass layers. Suitable glass forming host oxides for doping include, for example, $TiO_2$, $SiO_2$, $GeO_2$, $Al_2O_3$, $P_2O_5$, $B_2O_3$, $TeO_2$, $CaO—Al_2O_3$, $V_2O_5$, $BiO_2$, $Sb_2O_5$ and combinations and mixtures thereof. Other metal/metalloid oxides have desirable optical properties in crystalline form, such as $LiNbO_3$, $LiTaO_3$, $Y_3Al_5O_{12}$ (YAG) and rare earth, especially Nd, doped YAG. The approaches described herein for particle formation and coating formation are particularly suitable for formation of metal/metalloid oxide particles with or without dopant(s)/additive(s). Similarly, laser pyrolysis and light reactive deposition are suitable approaches for producing particle collections and powder coatings for the non-oxide materials, as described further below.

In addition, particles and powder coatings can include one or more dopants/additives within an amorphous material and/or a crystalline material. Dopant(s)/additive(s), which can be complex blends of dopant/additive composition(s), generally are included in non-stoichiometric amounts. A dopant/additive is generally metal or metalloid element, although other dopant(s)/additive(s) of interest include fluorine, chlorine, nitrogen and/or carbon, which substitute for oxygen in oxides or other anions relative to metal/metalloid components. Since these anion dopant(s)/additive(s), like some cation dopants, tend to disrupt the oxygen bonded network of oxides, these tend to lower the flow temperature of oxide glasses, and these dopant(s)/additive(s) tend to lower the index-of-refraction and the dielectric constant. The dopant(s)/additive(s) generally can replace other constituents within the material in order to maintain overall electrical neutrality. Dopant(s)/additive(s) can impart desirable properties to the resulting materials. The amount of dopant(s)/additive(s) can be selected to yield desired properties while maintaining appropriate chemical stability to the material. In crystalline materials, dopant/additive element(s) can replace host elements at lattice sites, dopant/additive element(s) can reside at previously unoccupied lattice sites and/or dopant/additive element(s) can be located at interstitial sites. Unlike dopant(s)/additive(s) within crystalline materials in which the crystal structure influences incorporation of the dopant(s)/additive(s), dopant(s)/additive(s) within amorphous materials can behave more as a composition dissolved within the host material to form a solid mixture. Thus, the overall composition of the material influences the chemical properties, including the processing parameters and stability, of the resulting combined materials. Solubility of dopant(s)/additive(s) within a host amorphous material can influence the amount of a particular dopant/additive that can be homogeneously integrated into a consolidated glass.

A dopant, such as a rare earth dopant, generally comprises in the range(s) less than about 15 mole percent of the metal/metalloid in the composition, in further embodiments in the range(s) less than about 10 mole percent, in some embodiments in the range(s) from about 0.001 mole percent to about 5 mole percent, and in other embodiments in the range(s) from about 0.025 to about 1 mole percent of the metal/metalloid in the composition. A person of ordinary skill in the art will recognize that the present disclosure similarly covers ranges within these specific ranges. Additive compositions are similar to dopant compositions except that they generally are included at higher amounts while still being a minority component of the composition, i.e., in the range(s) less than about 50 mole percent of the composition. For amorphous materials, additive(s) can be modifiers or intermediate compositions between glass formers and modifiers. Modifiers can disrupt the oxygen network within an oxide glass to modify the glass properties, such as flow temperature, coefficient of thermal expansion, chemical durability and the index-of-refraction. Thus, additive(s) can be useful for many of the same purposes as dopant(s). Doped and doping, for convenience, can refer to materials with dopants and/or additives and the process of incorporating dopants and/or additives, respectively. Suitable dopant(s)/additive(s) include, for example, rare earth metals among other suitable metal/metalloid element. Rare earth dopants can impart desirable modifications of properties, such as index-of-refraction, photosensitivity, fluorescence and paramagnetism.

Powders and coatings, e.g., glass layers, can be formed with complex compositions including, for example, one or more metal/metalloid elements in a host material and, optionally, one or more selected dopants/additives in the amorphous host material. Similarly, crystalline materials can be formed with dopant(s)/additive(s) within a crystalline host material. The doped materials can be formed by directly depositing particles to form a powder coating using light reactive deposition and subsequently consolidating the powder coating into a uniform layer of a glass, polycrystalline or crystalline material. Alternatively, any dopant(s)/additive(s) can be introduced to a powder coating following its formation for incorporation into a consolidated uniform material, as described further below.

Submicron/nanoscale particles can be produced with complex compositions using laser pyrolysis and light reactive deposition. Materials can be formed with desired compositions by appropriately introducing a reactant composition to form the desired host material. The elements that modify the composition, such as elements introduced in approximately stoichiometric amounts as well as dopant(s)/additive(s), can be introduced into an appropriate host material, which can be particle collections or powder coatings, either during the formation of the host material or subsequent to formation of the particles/powder coating. Specifically, selected elements can be introduced at desired amounts by varying the composition of the reactant stream. The conditions in the reactor can also be selected to produce the desired materials. In alternative embodiments, a modifying element is applied to an already formed particle collection or powder coating in proportion to the desired levels for the ultimate composition. Upon heat treatment, the desired composition is formed. Heat treatments to introduce modifying elements are described further below.

With respect to glasses, while a variety of materials are of interest, silica ($SiO_2$)-based glasses are of interest due to their existing commercial applications. Other glass forming materials that are suitable for combining with silica to form amorphous host materials include, for example, $Al_2O_3$, $Na_2O$, $B_2O_3$, $P_2O_3$, $GeO_2$, and the like and combinations thereof. Thus, a plurality of glass forming compositions can be combined to form a blended glass host composition with desired properties, such as index-of-refraction and glass transition temperature. The blended glass host materials can be doped with further materials to further adjust the properties of the material.

A wide range of silica glass compositions have significant optical applications or potential optical applications. Generally, these silica glasses can be formed by light reactive deposition based on the description herein. The silica glass generally is combined with other glass forming compositions to alter the optical properties, such as index-of-refraction, and or alter the processing properties, such as lowering the flow temperature. Some representative compositions with suitable optical properties are summarized below.

Aluminosilicate glasses form a group of compositions with useful optical applications. This group comprises compositions in mole percents of interest about 70% $SiO_2$, about 30% $Al_2O_3$ and about 0.025% $Er_2O_3$; about 93.5% $SiO_2$, about 5.6% $Al_2O_3$ and about 0.9% $Er_2O_3$; and, about 58% $SiO_2$, about 23% $Al_2O_3$, about 19% $Tb_2O_3$ and about 0.4% $Sb_2O_3$. Sodium aluminosilicates are described further in the example, and can comprise a composition in mole percent about 59% $SiO_2$, about 20% $Al_2O_3$, about 20% $Na_2O$ and about 1% $Er_2O_3$. A representative soda-lime silicate has a composition in mole percent of about 70% $SiO_2$, about 15% CaO, about 15% $Na_2O$ and about 0.03% $CrO_2$. Control of oxygen partial pressure during consolidation can be used to oxidize $Cr^{+2}$ ($CrCl_2$) and/or $Cr^{+3}$ ($Cr(NO_3)_3$) to $Cr^{+4}$. A representative silica can be doped with chromium, about 0.05% $CrO_2$. Another example is phosphosilicate glasses, exemplified by a composition comprising about 88% $SiO_2$, about 11% $P_2O_3$ and about 0.8% $Er_2O_3$, in mole percent.

Some non-silica glasses are also very suitable for optical applications, such as germinates, phosphates, aluminocalcinates and tellurides. Representative germanate glasses in mole percent comprise a first composition of about 80% $GeO_2$, about 20% $SiO_2$ and about 0.5% $Er_2O_3$; a second composition of about 72% $GeO_2$, about 18% $SiO_2$, about 10% $Al_2O_3$, about 0.5% $Er_2O_3$ and about 0.5 $Yb_2O_3$; a third composition of about 72% $GeO_2$, about 18% $SiO_2$, about 10% $P_2O_5$, about 0.5% $Er_2O_3$ and about 0.5 $Yb_2O_3$; or a fourth composition of about 60% $GeO_2$, about 24% $K_2O$, about 16% $Ga_2O_3$ and about 0.1% $Tm_2O_3$. Two representative phosphate glasses comprise compositions in mole percents of about 58% $P_2O_5$, about 23% $Na_2O$, about 13% $Al_2O_3$ and about 6% $Er_2O_3$; and, about 50% $P_2O_5$, about 17% $Na_2O$, about 30% $SiO_2$ and about 3% $Er_2O_3$. Some representative aluminocalcinates comprise compositions in mole percent in the range(s) of about 57.75% to about 59.55% CaO, about 23% to about 28% $Al_2O_3$, about 4% to about 8% MgO, about 7% to about 8.5% $SiO_2$, about 0 to about 1% $Er_2O_3$ and about 0 to about 1% $Yb_2O_3$. Two representative telluride glasses comprise a composition in mole percent of about 75% $TeO_2$, about 20% ZnO, about 5% $Na_2O$, and about 0.15% $Er_2O_3$; or a composition in mole percent of about 80% $TeO_2$, about 10% ZnO, about 10% $Na_2O$, about 1% ($Er_2O_3$, $Tm_2O_3$ or $Nd_2O_3$).

Some crystalline materials also have desirable optical properties. Some representative crystalline optical materials comprise compositions in mole percent of about 97% $Al_2O_3$ and about 3% $Er_2O_3$; about 90% $Al_2O_3$, about 10% ($Er_2O_3$, $Nd_2O_3$ or $Tb_2O_3$); about 99.3% $TiO_2$ and about 0.75% $Er_2O_3$; and, about 96.7% $YVO_4$, about 3% $Yb_2O_3$ and about 0.3% $Er_2O_3$.

Dopant(s)/additive(s) can be introduced to vary properties, such as optical properties and physical properties, of the particles and/or a resulting layer of particles with or without consolidation. For example, dopant(s)/additive(s) can be introduced to change the index-of-refraction of the material. For optical applications, the index-of-refraction can be varied to form specific optical devices that operate with light of a selected frequency range. Dopant(s)/additive(s) can also be introduced to alter the processing properties of the material. In particular, some dopant(s)/additive(s) change the flow temperature, i.e., the glass transition temperature, such that the glass can be processed at lower temperatures. Dopants/additives can also interact within the materials. For example, some dopant(s)/additive(s), such as $P_2O_5$ and $Al_2O_3$, are introduced to increase the solubility of other dopant(s)/additive(s). Doped materials are useful in the production of optical devices. Using the techniques described herein, the doped materials can be formulated into planar optical devices.

In one aspect, particles of interest comprise amorphous compositions that form optical glasses with a plurality of dopants/additives. In some embodiments, the one or plurality of dopants/additives comprise rare earth metals. Rare earth metals are particularly desirable because of their modification of optical properties of the materials. If the particles are consolidated into a substantially uniform layer, the resulting material can have an index-of-refraction influenced by the rare earth dopant(s)/additive(s) as well as other dopant(s)/additive(s). In addition, the rare earth dopant(s)/additive(s) can influence the optical emission properties that can alter the application of the materials for the production of optical amplifiers and other optical devices. Rare earth metals comprise the transition metals of the group IIIb of the periodic table. Specifically, the rare earth elements comprise Sc, Y and the Lanthanide series. Other suitable dopant(s)/additive(s) include elements of the actinide series. For optical glasses, the rare earth metals of interest as dopants/additives comprise Er, Yb, Nd, La, Ce, Tb, Dy, Ho, Sm, Eu, Gd, Pr, Tm, Sc, Y, and the like and combinations thereof. Suitable non-rare earth metal dopants/additives include, for example, Al, Ga, Mg, Sr, Zn, Bi, Sb, Zr, Pb, Li, Na, K, Ba, W, Si, Ge, P, B, Te, Ca, Rb, Sn, In, Ti, Au, Ag, Ta, Mo, Nb, and the like and combinations thereof. Also, certain first-row transition metals have optical emission properties in the visible or infrared regions of the spectrum. Suitable first-row transition element having desirable optical properties as dopants/additives include, for example, V, Cr, Mn, Fe, Co, Ni and Cu. the wavelength of the optical emission depends on the oxidation-state of the transition-metal. This oxidation state generally can be controlled by adjusting the oxygen partial-pressure during the consolidation process.

Various materials have been formed as submicron/nanoscale particles using laser pyrolysis. Some of these materials are described in the following description. Using light reactive deposition, these materials can be formed directly as coatings in the form of powder coatings. Based on the description and examples herein, a range of additional materials can be produced by laser pyrolysis and light reactive deposition. Specifically, suitable approaches for the formation of some improved materials are outlined below.

For example, the production of silicon oxide submicron/nanoscale particles is described in copending and commonly assigned U.S. patent application Ser. No. 09/085,514, now U.S. Pat. No. 6,726,990 to Kumar et al., entitled "Silicon Oxide Particles," incorporated herein by reference. This patent application describes the production of amorphous $SiO_2$. The production of titanium oxide submicron/nanoscale particles and crystalline silicon dioxide submicron/nanoscale particles is described in U.S. Pat. No. 6,387,531 to Bi et al., entitled "Metal (Silicon) Oxide/Carbon Composites," incorporated herein by reference. In particular, this application describes the production of anatase and rutile $TiO_2$.

In addition, submicron/nanoscale manganese oxide particles have been formed. The production of these particles is described in copending and commonly assigned U.S. patent application Ser. No. 09/188,770, now U.S. Pat. No. 6,506,493 to Kumar et al., entitled "Metal Oxide Particles," incorporated herein by reference. This application describes the production of MnO, $Mn_2O_3$, $Mn_3O_4$ and $Mn_5O_8$.

Also, the production of vanadium oxide submicron/nanoscale particles is described in U.S. Pat. No. 6,106,798 to Bi et al., entitled "Vanadium Oxide Nanoparticles," incorporated herein by reference. Similarly, silver vanadium oxide submicron/nanoscale particles have been produced, as described in U.S. Pat. No. 6,225,007 to Horne et al., and U.S. Pat. No. 6,394,494 to Reitz et al., both entitled "Metal Vanadium Oxide Particles," and 09/649,752, now U.S. Pat. No. 6,503,646 to Ghantous et al., entitled "High Rate Batteries," all three of which are incorporated herein by reference.

Furthermore, lithium manganese oxide submicron/nanoscale particles have been produced by laser pyrolysis along with or without subsequent heat processing, as described in copending and commonly assigned U.S. patent application Ser. No. 09/188,768, now U.S. Pat. No. 6,607,706 to Kumar et al., entitled "Composite Metal Oxide Particles," and 09/334,203, now U.S. Pat. No. 6,482,374 to Kumar et al., entitled "Reaction Methods for Producing Ternary Particles," and U.S. Pat. No. 6,136,287 to Horne et al., entitled "Lithium Manganese Oxides and Batteries," all three of which are incorporated herein by reference. The production of lithium cobalt oxide, lithium nickel oxide, lithium cobalt nickel oxide, lithium titanium oxide and other lithium metal oxides is described in copending and commonly assigned U.S. patent application Ser. No. 09/595,958, now U.S. Pat. No. 6,749,648 to Kumar et al., entitled "Lithium Metal Oxides," incorporated herein by reference.

The production of aluminum oxide submicron/nanoscale particles is described in copending and commonly assigned, U.S. patent application Ser. No. 09/136,483 to Kumar et al., entitled "Aluminum Oxide Particles," incorporated herein by reference. In particular, this application discloses the production of $\gamma$-$Al_2O_3$. The formation of delta-$Al_2O_3$ and theta-$Al_2O_3$ by laser pyrolysis/light reactive deposition along with doped-crystalline and amorphous alumina is described in copending and commonly assigned U.S. patent application Ser. No. 09/969,025 to Chiruvolu et al., entitled "Aluminum Oxide Powders," incorporated herein by reference.

Amorphous aluminum oxide materials can be combined with other glass formers, such as $SiO_2$ and/or $P_2O_5$. For example, suitable metal oxide dopant(s)/additive(s) for aluminum oxide for optical glass formation comprise cesium oxide ($Cs_2O$), rubidium oxide ($Rb_2O$), thallium oxide ($Tl_2O$), lithium oxide ($Li_2O$), sodium oxide ($Na_2O$), potassium oxide ($K_2O$), beryllium oxide (BeO), magnesium oxide (MgO), calcium oxide (CaO), strontium oxide (SrO), barium oxide (BaO), and the like and combinations of any two or more thereof. Glass dopant(s)/additive(s) can affect, for example, the index-of-refraction, consolidation temperature and/or the porosity of the glass. Suitable metal oxide dopants/additives for infrared emitters comprise, for example, cobalt oxide ($CO_3O_4$), $Er_2O_3$, $CrO_2$, $Tm_2O_3$, $Nd_2O_3$, $Yb_2O_3$, $Pr_2O_3$, $Dy_2O_3$, $Ho_2O_3$, and the like, and combinations of any two or more thereof.

In addition, tin oxide submicron/nanoscale particles have been produced by laser pyrolysis, as described in U.S. Pat. No. 6,200,674 to Kumar et al., entitled "Tin Oxide Particles," incorporated herein by reference. The production of zinc oxide submicron/nanoscale particles is described in copending and commonly assigned U.S. patent application Ser. No. 09/266,202, now U.S. Pat. No. 7,423,512 to Reitz et al., entitled "Zinc Oxide Particles," incorporated herein by reference. In particular, the production of ZnO submicron/nanoscale particles is described.

Submicron/nanoscale particles and corresponding coatings of rare earth metal oxide particles, rare earth doped metal/metalloid oxide particles, rare earth metal/metalloid sulfides and rare earth doped metal/metalloid sulfides are described in copending and commonly assigned U.S. patent application Ser. No. 09/843,195, now U.S. Pat. No. 6,692,660 to Kumar et al, entitled "High Luminescence Phosphor Particles," incorporated herein by reference. Suitable host materials for the formation of phosphors comprise ZnO, ZnS, $Zn_2SiO_4$, SrS, $YBO_3$, $Y_2O_3$, $Al_2O_3$, $Y_3Al_5O_{12}$ and $BaMgAl_{14}O_{23}$, and combinations of any two or more thereof. Exemplary non-rare earth metals for activating phosphor particles as dopant(s)/additive(s) include, for example, manganese, silver, lead, and the like and combinations thereof. Exemplary rare earth metals for forming metal oxide phosphors include, for example, europium, cerium, terbium, erbium and the like and combinations thereof. Generally, heavy metal ions or rare earth ions are used as activators in phosphors. For phosphor applications, the particles are generally crystalline.

The production of iron, iron oxide and iron carbide is described in a publication by Bi et al., entitled "Nanocrystalline $\alpha$-Fe, $Fe_3C$, and $Fe_7C_3$ produced by $CO_2$ laser pyrolysis," J. Mater. Res. Vol. 8, No. 7 1666-1674 (July 1993), incorporated herein by reference. The production of submicron/nanoscale particles of silver metal is described in U.S. Pat. No. 6,394,494 to Reitz et al., entitled "Metal Vanadium Oxide Particles," incorporated herein by reference. Submicron/nanoscale carbon particles produced by laser pyrolysis is described in a reference by Bi et al., entitled "Nanoscale carbon blacks produced by $CO_2$ laser pyrolysis," J. Mater. Res. Vol. 10, No. 11, 2875-2884 (November 1995), incorporated herein by reference.

The production of iron sulfide ($Fe_{1-x}S$) submicron/nanoscale particles by low rate laser pyrolysis is described in Bi et al., Material Research Society Symposium Proceedings, vol. 286, p. 161-166 (1993), incorporated herein by reference. Precursors for laser pyrolysis production of iron sulfide were iron pentacarbonyl ($Fe(CO)_5$) and hydrogen sulfide ($H_2S$). Other suitable gaseous sulfur precursors for vapor delivery comprise, for example, pyrosulfuryl chloride ($S_2O_5Cl_2$), sulfur chloride ($S_2Cl_2$), sulfuryl chloride ($SO_2Cl_2$), thionyl chloride ($SOCl_2$), and the like, and combinations of any two or more thereof. Suitable sulfur precursors for aerosol delivery comprise, for example, ammonium sulfate (($NH_4)_2S$), sulfuric acid ($H_2SO_4$), and the like, and any combinations thereof, which are soluble in water. Other metal/metalloid sulfide materials can be similarly produced.

Metal borates can be similarly formed using one or more metal precursors and a boron precursor. As a specific example, $TiB_2$ has potential utility in battery applications. Suitable titanium precursors include, for example, titanium tetrachloride ($TiCl_4$), titanium isopropoxide ($Ti[OCH(CH_3)_2]_4$), and the like, and combinations of any two or more thereof. Suitable boron precursors comprise, for example, boron trichloride ($BCl_3$), diborane ($B_2H_6$), $BH_3$, and the like, and combinations of any two or more thereof.

Cerium oxide can be produced using the laser pyrolysis apparatuses described above. Suitable precursors for aerosol delivery comprise, for example, cerous nitrate ($Ce(NO_3)_3$), cerous chloride ($CeCl_3$), cerous oxalate ($Ce_2(C_2O_4)_3$), and the like, and combinations of any two or more thereof. Similarly, zirconium oxide can be produced using the laser pyrolysis apparatuses described above. Suitable zirconium precursors for aerosol delivery comprise, for example, zirconyl chloride ($ZrOCl_2$), zirconyl nitrate ($ZrO(NO_3)_2$), and the like, and combinations of any two or more thereof.

The deposition of coatings of dielectric materials for chip capacitors is described in copending and commonly assigned U.S. Provisional Patent Application Ser. No. 60/312,234 to Bryan, entitled "Reactive Deposition For The Formation Of Chip Capacitors," incorporated herein by reference. Suitable dielectric materials include a majority of barium titanate ($BaTiO_3$), optionally mixed with other metal oxides. Other dielectric oxides suitable for incorporation into ceramic chip capacitors with appropriate dopant(s)/additive(s) comprise, for example, $SrTiO_3$, $CaTiO_3$, $SrZrO_3$, $CaZrO_3$, $Nd_2O_3$-$2TiO_3$, $La_2O_3$-$2TiO_2$, and the like, and any two or more thereof.

The production of ternary submicron/nanoscale particles of aluminum silicate and aluminum titanate can be performed by laser pyrolysis following procedures similar to the production of silver vanadium oxide submicro/nanoscale particles described in U.S. Pat. No. 6,394,494 to Reitz et al., entitled "Metal Vanadium Oxide Particles," incorporated herein by reference. Suitable precursors for the production of aluminum silicate comprise, for vapor delivery, a mixture of aluminum chloride ($AlCl_3$), silicon tetrachloride ($SiCl_4$), and the like, and combinations thereof, and, for aerosol delivery, a mixture of tetra(N-butoxy) silane and aluminum isopropoxide ($Al(OCH(CH_3)_2)_3$), a mixture of tetraethoxysilane and aluminum nitrate, or tetraethoxysilane and aluminum chloride, or tetraethoxysilane and aluminum isopropoxide, and the like, and combinations of any two or more thereof. Similarly, suitable precursors for the production of aluminum titanate comprise, for aerosol delivery, a mixture of aluminum nitrate ($Al(NO_3)_3$) and titanium dioxide ($TiO_2$) powder dissolved in sulfuric acid, a mixture of aluminum isopropoxide and titanium isopropoxide ($Ti(OCH(CH_3)_2)_4$), and the like, and combinations of any two or more thereof.

The formation of submicron/nanoscale particles along with coatings of metal/metalloid compositions with complex anions is described in copending and commonly assigned U.S. patent application Ser. No. 09/845,985 to Chaloner-Gill et al., entitled "Phosphate Powder Compositions And Methods For Forming Particles With Complex Anions," incorporated herein by reference. Suitable polyatomic anions comprise, for example, phosphate ($PO_4^{-3}$), sulfate ($SO_4^{-2}$), silicate ($SiO_4^{-4}$), and the like, and combinations of any two or more thereof. Suitable phosphorous precursors for forming the phosphate anion, sulfur precursors for forming the sulfate anion and silicon precursors for forming the silicate anion are discussed above. Suitable cations comprise, for example, metal and metalloid cations. Phosphate glasses can be used in a variety of contexts. Phosphate compositions for glasses comprise, for example, aluminum phosphate ($AlPO_4$), calcium phosphate ($Ca_3(PO_4)_2$), and the like, and combinations of any two or more thereof. Suitable gaseous phosphate precursor compositions for vapor delivery comprise, for example, phosphine ($PH_3$), phosphorus trichloride ($PCl_3$), phosphorous pentachloride ($PCl_5$), phosphorus oxychloride ($POCl_3$), $P(OCH_3)_3$, and the like, and combinations of any two or more thereof. Suitable phosphorous precursors for aerosol delivery comprise, for example, $(C_2H_5O)_3P$, $(C_2H_5O)_3$ PO, ammonium phosphate $((NH_4)_3PO_4)$, ammonium phosphate—dibasic $((NH_4)_2HPO_4)$, ammonium phosphate—monobasic $((NH_4)H_2PO_4)$, phosphoric acid ($H_3PO_4$), and the like, and combinations of any two or more thereof, which are all moderately soluble in water.

The synthesis by laser pyrolysis of silicon carbide and silicon nitride is described in copending and commonly assigned U.S. patent application Ser. No. 09/433,202 to Reitz et al., entitled "Particle Dispersions," incorporated herein by reference. Other metal/metalloid carbides and meta/metalloid nitrides can be similarly produced.

The formation of a powder coating comprising boron and phosphorous doped amorphous silica ($SiO_2$) is described in copending and commonly assigned U.S. patent application Ser. No. 09/715,935, now U.S. Pat. No. 7,575,784 to Bi et al. entitled "Coating Formation By Reactive Deposition," incorporated herein by reference. The doped silica powder coating was consolidated into a glass layer. Rare earth metal and other dopants for amorphous particles and powder coatings as well as complex glass compositions for powder coatings, and in particular, erbium doped aluminum silicate and aluminum-lanthanum-silicate powder coatings and glasses, are described in copending and commonly assigned U.S. patent application Ser. No. 10/099,597 to Horne et al., filed on Mar. 15, 2002, now U.S. Pat. No. 6,849,334, entitled "Optical Materials And Optical Devices," incorporated herein by reference.

For some host glass forming materials and/or dopant(s)/additive(s) of particular interest for optical applications, suitable precursors can be described as a representative listing of precursor materials. Such a representative list follows.

Suitable silicon precursors for vapor delivery comprise, for example, silicon tetrachloride ($SiCl_4$), trichlorosilane ($Cl_3HSi$), trichloromethyl silane $CH_3SiCl_3$, tetraethoxysilane ($Si(OC_2H_5)_4$, also known as ethyl silane and tetraethyl silane), and the like, and combinations of any two or more thereof. Suitable boron precursors comprise, for example, boron trichloride ($BCl_3$), diborane ($B_2H_6$), $BH_3$, and the like, and combinations of any two or more thereof. Suitable phosphate precursor compositions for vapor delivery comprise, for example, phosphine ($PH_3$), phosphorus trichloride ($PCl_3$), phosphorous pentachloride ($PCl_5$), phosphorus oxychloride ($POCl_3$), $P(OCH_3)_3$, and the like, and combinations of any two or more thereof. Suitable germanium precursors comprise, for example, $GeCl_4$, and the like, and combinations of any two or more thereof. Suitable titanium precursors comprise, for example, titanium tetrachloride ($TiCl_4$), titanium isopropoxide ($Ti[OCH(CH_3)_2]_4$), and the like, and combinations of any two or more thereof. Suitable liquid, aluminum precursors comprise, for example, aluminum s-butoxide (Al $(OC_4H_9)_3$), trimethyl aluminum ($Al(CH_3)_3$, trimethyl ammonia aluminum $Al(CH_3)_3NH_3$, and the like, and combinations of any two or more thereof. A number of suitable solid, aluminum precursor compositions are available, such compositions comprising, for example, aluminum chloride ($AlCl_3$), aluminum ethoxide ($Al(OC_2H_5)_3$), aluminum isopropoxide ($Al[OCH(CH_3)_2]_3$), and the like, and combinations of any two or more thereof. Suitable tellurium precursors comprise, for example, $Te(C_2H_5)_2$, $Te(CH_3)_2$, Te $(C_3H_7)_2$, $Te(C_4H_9)_2$, $Te(C_3H_4)_2$, $Te(CH_3C_3H_4)_2$, and the like, and combinations of any two or more thereof.

With respect to rare earth metal precursors, suitable precursors for vapor delivery include, for example, erbium heptafluorodimethyloctanedionate, $Er(C_{11}H_{19}O_2)_3$, $Yb(C_{11}H_{19}O_2)_3$, $Pr(C_{11}H_{19}O_2)_3$, $Nb(C_{11}H_{19}O_2)_3$, $Tm(C_{11}H_{19}O_2)_3$, and the like, and combinations of any two or more thereof. Some representative precursors for other desirable metal dopant(s)/additive(s) comprise, for example, liquid zinc precursor compositions, such as diethyl zinc (Zn $(C_2H_5)_2$), dimethyl zinc ($Zn(CH_3)_2$), and the like, and combinations of any two or more thereof. Suitable solid, zinc precursors with sufficient vapor pressure of gaseous delivery comprise, for example, zinc chloride ($ZnCl_2$), and the like, and combinations of any two or more thereof. Suitable lithium precursors for vapor delivery comprise, for example, solids, such as lithium acetate ($Li_2O_2CCH_3$), liquids, such as lithium amide ($LiNH_2$) dissolved in hexane, and the like, and combinations of any two or more thereof.

Suitable silicon precursors for aerosol production comprise, for example, silicon tetrachloride $Si(Cl_4)$, which is soluble in ether, trichlorosilane ($Cl_3HSi$), which is soluble in carbon tetrachloride, coilloidal silica, $Si(OC_2H_5)_4$, which is soluble in alcohol, $Si(OCH_3)_4$, $(CH_3)_3SiOSi(CH_3)_3$, and the like, and combinations of any two or more thereof. Similarly, suitable boron precursors for aerosol delivery include, for example, ammonium borate $((NH_4)_2B_4O_7)$, which is soluble in water and various organic solvents, $B(OC_2H_5)_3$, $B(C_2H_5)_3$, and the like, and combinations of any two or more thereof. Suitable phosphorous precursors for aerosol delivery comprise, for example, ammonium phosphate $((NH_4)_3PO_4)$, ammonium phosphate—dibasic $((NH_4)_2HPO_4)$, ammonium phosphate—monobasic $((NH_4)H_2PO_4)$ and phosphoric acid $(H_3PO_4)$, which are all moderately soluble in water, as well as $OP(OC_2H_5)_3$, which is soluble in alcohol and ether, $P(OC_2H_5)_3$, $OP(OCH_3)_3$, and the like, and combinations of any two or more thereof. Suitable aluminum precursors for aerosol delivery comprise, for example, aluminum chloride $(AlCl_3.6H_2O)$, which is soluble in many organic solvents, and aluminum nitrate $(Al(NO_3)_3.9H_2O)$ and aluminum hydroxychloride $(Al_2(OH)_5Cl.2H_2O)$, which are soluble in water, as well as $Al(C_2H_5)_3$, $Al(OC_4H_9)_3$, $Al(C_5H_7O_2)_3$, $Al(C_{18}H_{35}O_2)_3$, and the like, and combinations of any two or more thereof. Suitable titanium precursors for aerosol delivery comprise, for example, $Ti(N(CH_3)_2)_4)$, $TiO_2OH$, and the like, and combinations of any two or more thereof. Suitable germanium precursors for aerosol delivery comprise, for example, $Ge(OC_2H_5)_3$, $Ge(OCH_3)_4$, and the like, and combinations of any two or more thereof. Suitable tellurium precursors for aerosol delivery comprise, for example $TeCl_4$, which is soluble in alcohol, and the like, and combinations of any two or more thereof.

Similarly, rare earth dopant/additive precursor(s) can be supplied as an aerosol. Some representative rare earth precursors suitable for aerosol delivery are presented below with suitable solvents. Yttrium chloride ($YCl_3$) and yttrium nitrate ($Y(NO_3)_3$) are soluble in water. Lanthanum chloride ($LaCl_3$ and $LaCl_3.7H_2O$) and lanthanum nitrate hexahydrate ($La(NO_3)_3.6H_2O$) are soluble in water. Thulium chloride ($TmCl_3$ and $TmCl_3.7H_2O$) is soluble in water. Ytterbium chloride ($YbCl_3$ and $YbCl_3.6H_2O$) is soluble in water. Praseodymium chloride ($PrCl_3$ and $PrCl_3.7H_2O$) and praseodymium nitrate hexahydrate ($Pr(NO_3)_3.6H_2O$) are soluble in water. Neodymium chloride ($NdCl_3$ and $NdCl_3.6H_2O$) and neodymium nitrate hexahydrate ($Nd(NO_3)_3.6H_2O$) are soluble in water. Erbium chloride ($ErCl_3$ and $ErCl_3.6H_2O$) is soluble in water. Other suitable rare earth dopant(s)/additive(s) include, for example, $Er(NO_3)_3$, $CeCl_3$ and $Ce(NO_3)_3$.

Other non-rare earth metal dopant(s)/additive(s) also can be delivered by aerosol. For example, zinc chloride ($ZnCl_2$) and zinc nitrate ($Zn(NO_3)_2$) are soluble in water and some organic solvents, such as isopropyl alcohol. Suitable lithium precursors for aerosol delivery from solution comprise, for example, lithium acetate ($LiCH_3CO_2$) and lithium nitrate ($LiNO_3$), which are soluble in water and alcohol, lithium chloride (LiCl), which is somewhat soluble in water, alcohol and some other organic solvents, lithium hydroxide (LiOH), which is somewhat soluble in water and alcohol, and the like, and combinations of any two or more thereof. Suitable bismuth precursors for aerosol delivery comprise, for example, bismuth nitrate ($Bi(NO_3)_3$), which is soluble in dilute aqueous acid solutions, and the like, and combinations of any two or more thereof. Antimony trichloride ($SbCl_3$) is soluble in alcohol. Barium azide ($Ba(N_3)_2$ and $Ba(N_3)_2.H_2O$) and barium chloride ($BaCl_2$) are soluble in water. Other barium compounds suitable for aerosol delivery include, for example, $Ba(C_2H_3O_2)_2$, $Ba(C_2H_3O_2)_2.H_2O$, $Ba(C_2H_3O_2)_2.H_2O$ and combinations thereof. Suitable antimony precursors comprise, for example, $Sb(C_2H_5)_3$, $Sb(OC_2H_5)_3$, $Sb_2(C_4H_4O_6)_3.6H_2O$ and combinations thereof.

As noted above, fluorine dopant(s)/additive(s) are of interest for some applications. For phosphate coating silica glasses, a fluoride precuror of particular interest comprises for example, phosphorus trifluoride ($PF_3$), which is a gas such that it is suitable for vapor delivery into a laser pyrolysis/light reactive deposition chamber. Other fluoride precursors for vapor and/or aerosol delivery comprises, for example, $(C_2H_5O)_3SiF$, $(C_2H_5O)_2SiF_2$, $(C_2H_5O)SiF_3$, $(C_2H_5)_2SiF_2$, $C_2H_5SiF_3$, $C_6H_5SiF_3$, $H_2SiF_6.xH_2O$, $SiF_4$, $Si_4F_3Cl$, $SiF_2Cl_2$, $SiFCl_3$, $HPO_2F_2$, $HPF_6.6H_2O$, $(i\text{-}C_3H_7O)_2POF$, $H_2PO_3F$, $CF_4$, $CF_3COCF_3.H_2O$, $AlF_3$, $SnF_2$, $SnF_4$, $GeF_2$, $GeF_4$, $GeF_3Cl$, $GeF_2Cl_2$, $GeFCl_3$, $TiF_4$, $FCH_9CO_2H$, $C_2F_6$, $CCl_2F_2$, $BF_3.2H_2O$, $[(CH_3)2N]2BF$, $C_6H_5BF_2$, $(4\text{-}CH_3C_6H_4)BF_2$, $(4\text{-}CH_3C_6H_4)BF_2$, $HBF_4$, and the like, and combinations of any two or more thereof. Chlorine dopant(s)/additive(s) can be introduced as the chloride of a metal/metalloid element or in similar compounds as fluorine. Carbon and nitrogen dopant(s)/additive(s) can be introduced as elements associated with other precursors, and carbon can be supplied as ethylene or other hydrocarbon.

In general, the selection of the composition of particles and/or corresponding powder coatings are based on the intended use of the materials. Similarly, any dopants/additives are similarly selected. The resulting properties of the particles depend on the compositions, including any dopants/additives and the phase(s), e.g., crystallinity or amorphous character, of the particles as well as, in some embodiments, the particle size and particle size distribution. Desirable properties for some applications are described above in some detail either with respect to specific compositions or more generally.

Particle Production Apparatus

A variety of particle production methods can be used to form product particles and powder coatings of interest. In one embodiment, the production methods are based on a flowing reaction system in which flowing reactants from a reactant delivery system are reacted and product particles are formed within the flow. In a flowing reaction system, the product particles are harvested from the flow. In particular, laser pyrolysis is a flowing reaction system in which the reaction of the flowing reactant stream is driven by an intense light beam that intersects with the flowing reactant stream.

An appropriate laser pyrolysis apparatus generally comprises a reaction chamber isolated from the ambient environment. A reactant inlet connected to a reactant delivery apparatus generates a reactant stream as a flow through the reaction chamber. A radiation beam path, e.g., a light beam path, intersects the reactant stream at a reaction zone. The reactant/product stream continues after the reaction zone to an outlet, where the reactant/product stream exits the reaction chamber and passes into a collection apparatus. For light reactive deposition, the coating can be performed in the reaction chamber or in a separate coating chamber connected to the reaction chamber, as described further below. In some embodiments, the radiation source, such as a laser, is located external to the reaction chamber, and the light beam enters the reaction chamber through an appropriate window or lens. The dimensions of the reactant inlet(s) can be selected in part to obtain a desired production rate, although the dimensions of the reactant inlets and the flow rate should be correlated with the other reaction parameters, as described above and below, to obtain desired particle/powder coating properties.

Referring to FIG. 1, a particular embodiment 100 of a laser pyrolysis system involves a reactant delivery apparatus 102, reaction chamber 104, shielding gas delivery apparatus 106, collection apparatus 108 and radiation (e.g., light) source 110. A first reaction delivery apparatus described below can be used to deliver one or more exclusively gaseous/vapor reactants. An alternative reactant delivery apparatus is described for delivery of one or more reactants as an aerosol.

A further reactant delivery apparatus permits delivery of one or more reactants as an aerosol and one or more reactant as a vapor/gas.

Figure 2:
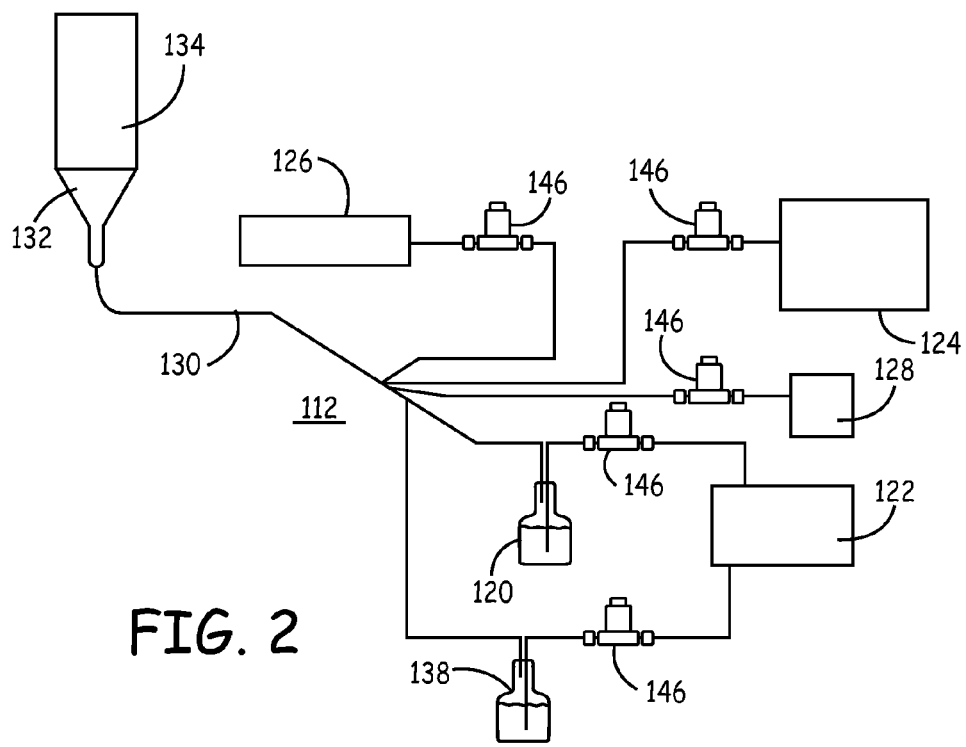
FIG. 2 is a schematic, side view of an embodiment of a reactant delivery apparatus for the delivery of vapor reactants to the laser pyrolysis apparatus of FIG. 1.

Referring to FIG. 2, a first embodiment 112 of reactant delivery apparatus 102 includes a source 120 of a precursor composition. For liquid or solid reactants, a carrier gas from one or more carrier gas sources 122 can be introduced into precursor source 120 to facilitate delivery of the reactant. Precursor source 120 can comprise a liquid holding container, a solid precursor delivery apparatus or other suitable container. The carrier gas from carrier gas source 122 can comprise either an infrared absorber and/or an inert gas. In some embodiments, the precursor source comprises a flash evaporator that supplies a vapor of the precursor at a selected vapor pressure, generally without a carrier gas. The flash evaporator can be connected to a liquid reservoir to supply liquid precursor. Suitable flash evaporators are available from, for example, MKS Instruments, Inc., Albuquerque, N. Mex. or can be produced from readily available components.

The gas/vapor from precursor source 120 can be mixed with gases from infrared absorber source 124, inert gas source 126 and/or secondary reactant source 128 by combining the gases in a single portion of tubing 130. Tubing 130 can be heated to prevent condensation of precursors within the tube. The gases/vapors are combined a sufficient distance from reaction chamber 104 such that the gases/vapors become well mixed prior to their entrance into reaction chamber 104. The combined gas/vapor in tube 130 passes through a duct 132 into channel 134, which is in fluid communication with reactant inlet 256 (FIG. 1).

A second precursor/reactant can be supplied from second precursor source 138, which can be a liquid reactant delivery apparatus, a solid reactant delivery apparatus, a gas cylinder, a flash evaporator or other suitable container or containers. As shown in FIG. 2, second precursor source 138 delivers a second reactant to duct 132 by way of tube 130. Alternatively, mass flow controllers 146 can be used to regulate the flow of gases within the reactant delivery system of FIG. 2. In alternative embodiments, the second precursor can be delivered through a second duct for delivery into the reaction chamber through a second channel such that the reactants do not mix until they are in the reaction chamber. A laser pyrolysis apparatus with a plurality of reactant delivery nozzles is described further in copending and commonly assigned U.S. patent application Ser. No. 09/970,279, now U.S. Pat. No. 7,507,382 to Reitz et al., entitled "Multiple Reactant Nozzles For A Flowing Reactor," incorporated herein by reference. One or more additional precursors, e.g., a third precursor, fourth precursor, etc., can be similarly delivered based on a generalization of the description for two precursors.

As noted above, the reactant stream can comprise one or more aerosols. The aerosols can be formed within reaction chamber 104 or outside of reaction chamber 104 prior to injection into reaction chamber 104. If the aerosols are produced prior to injection into reaction chamber 104, the aerosols can be introduced through reactant inlets comparable to those used for gaseous reactants, such as reactant inlet 134 in FIG. 2.

Figure 3A:
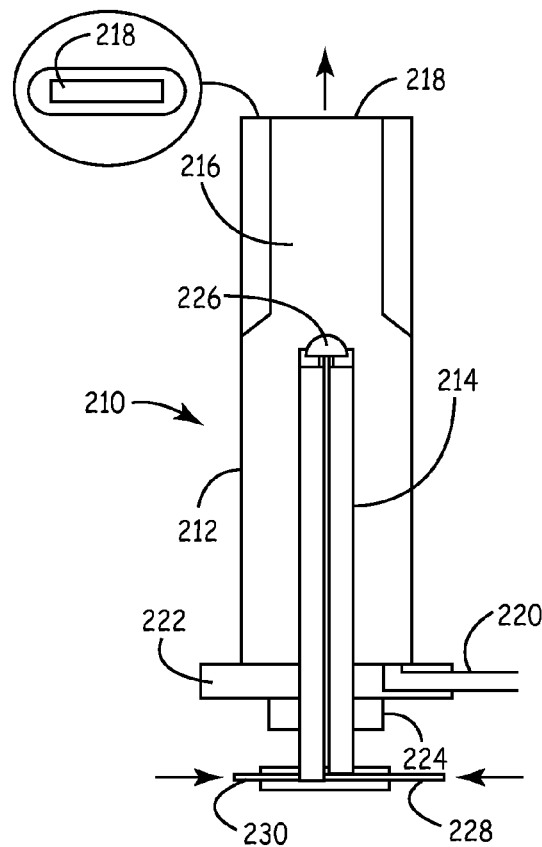
FIG. 3A is a schematic, sectional view of an alternative embodiment of the reactant delivery apparatus for the delivery of an aerosol reactant to the laser pyrolysis apparatus of FIG. 1, the cross section being taken through the center of the apparatus.

Referring to FIG. 3A, embodiment 210 of the reactant supply system 102 can be used to supply an aerosol to duct 132. Reactant supply system 210 comprises an outer nozzle 212 and an inner nozzle 214. Outer nozzle 212 has an upper channel 216 that leads to a rectangular outlet 218 at the top of outer nozzle 212, as shown in the insert in FIG. 3A. Rectangular outlet 218 has selected dimensions to produce a reactant stream of desired expanse within the reaction chamber. Outer nozzle 212 comprises a drain tube 220 in base plate 222. Drain tube 220 is used to remove condensed aerosol from outer nozzle 212. Inner nozzle 214 is secured to outer nozzle 212 at fitting 224.

The top of inner nozzle 214 can comprise a twin orifice internal mix atomizer 226. Liquid is fed to the atomizer through tube 228, and gases for introduction into the reaction chamber are fed to the atomizer through tube 230. Interaction of the gas with the liquid assists with droplet formation.

Figure 3B:
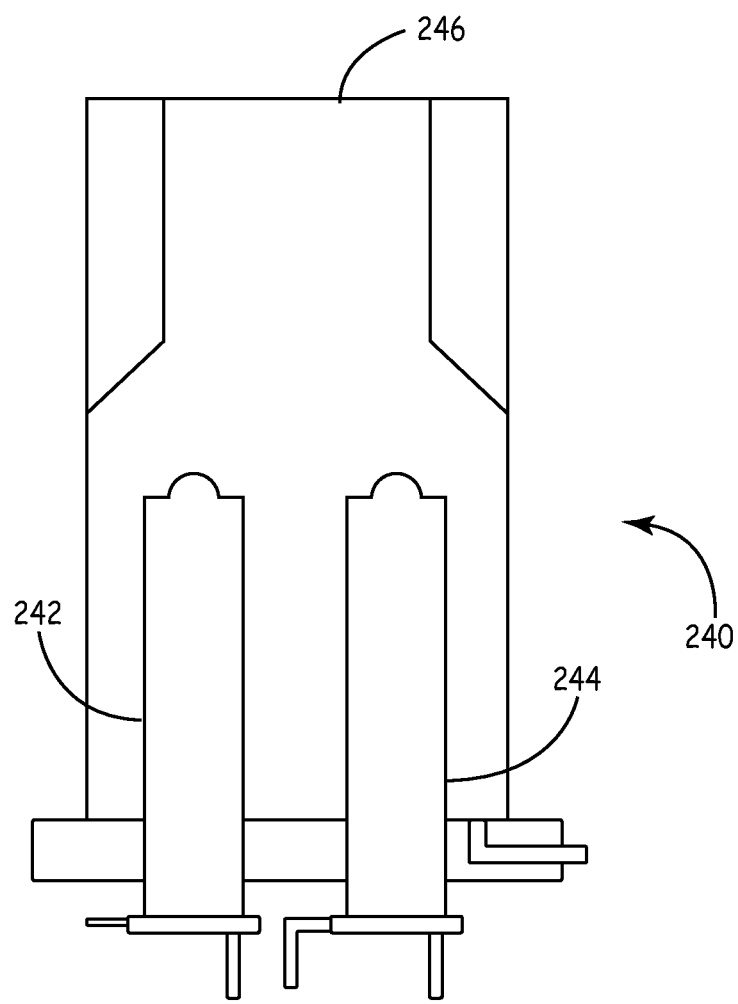
FIG. 3B is a schematic, sectional view of a reactant delivery apparatus with two aerosol generators within a single reactant inlet nozzle.

A plurality of aerosol generators can be used to produce aerosol within the reaction chamber or within one or more inlets leading to the reaction chamber. The aerosol generators can be used to generate the same or different aerosol composition from each other. For embodiments in which the aerosol generators product aerosols of different compositions, the aerosols can be used to introduce reactants/precursors that are not easily or conveniently dissolved/dispersed into the same solvent/dispersant. Thus, if a plurality of aerosol generators is used to form an aerosol directly within the reaction chamber, the aerosol generators can be oriented to mix the reactants or to deliver separate streams, possibly overlapping, along the reaction zone. If two or more aerosols are generated within a single inlet nozzle the aerosols can be mixed and flowed within a common gas flow. An inlet nozzle with two aerosol generators is shown in FIG. 3B. Inlet nozzle 240 includes aerosol generators 242, 244, which generate aerosols directed to outlet 246.

Alternatively, aerosol generators can generate aerosols within separate inlets such that the aerosols are combined within the reaction chamber. The use of a plurality of aerosol generators within a single inlet nozzle or a plurality of inlet nozzles can be useful for embodiments in which it is difficult to introduce desired compositions within a single solution/dispersion. Multiple aerosol generators producing aerosols within different inlets are described further in copending and commonly assigned U.S. patent application Ser. No. 09/362,631 to Mosso et al., entitled "Particle Production Apparatus," incorporated herein by reference.

In any of these aerosol embodiments, one or more vapor/gas reactants/precursors can also be introduced. For example, the vapor/gas precursors can be introduced within the aerosol generator itself to help form the aerosol. In alternative embodiments, the vapor can be delivered through a separate inlet into the delivery channel into which the aerosol is generated such that the vapor and aerosol mix and are delivered into the reaction chamber through the same reactant inlet. In further embodiments, the vapor precursors are delivered into the reaction chamber through separate reactant inlets to combine with the flow comprising the aerosol. In addition, these approaches can be combined for the delivery of a single vapor precursor, different vapor precursors through different delivery channels or a combination thereof.

Figure 4:
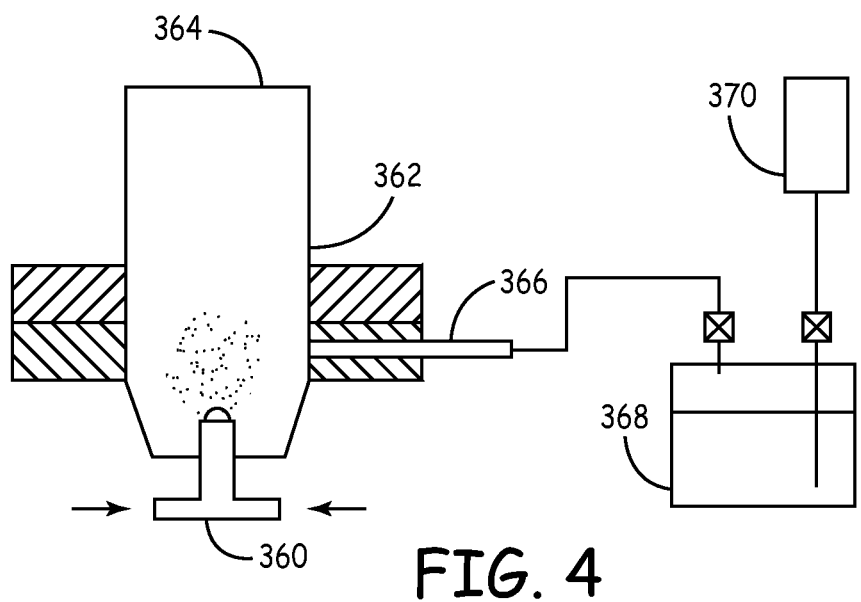
FIG. 4 is a schematic sectional view of an inlet nozzle of a reactant delivery system for the delivery of both vapor and aerosol reactants in which the vapor and aerosol reactants combine within the nozzle.

An embodiment of an inlet nozzle that is configured for delivery of a vapor precursor into a channel with an aerosol for delivery together into a reaction chamber is depicted in FIG. 4. Referring to FIG. 4, aerosol generator 360 delivers an aerosol into channel 362. Channel 362 leads to reactant inlet 364 that generally leads into a reaction chamber. Reactant inlet 364 can be positioned, as desired, to deliver the reactant stream/flow a suitable distance from a radiation path within the reaction chamber. Vapor channel 366 leads into channel 362 such that vapor precursors can mix with aerosols from aerosol generator 360 for delivery through reactant inlet 364. Vapor channel 366 connects to a flash evaporator 368, although other vapor sources, such as a bubbler or solid vapor source, can be used. Flash evaporator heats a liquid precursor to a temperature to deliver a selected vapor pressure to vapor channel 366. Vapor channel 366 and/or channel 362 can be heated to reduce or eliminate condensation of vapor reactants. Flash evaporator 368 connects to a liquid source 370.

Figure 5:
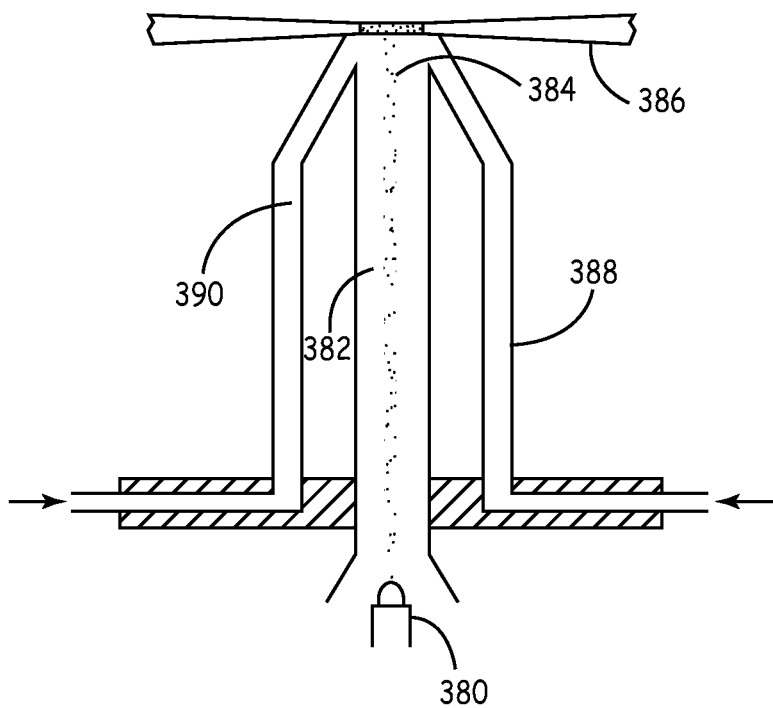
FIG. 5 is a schematic sectional view of an inlet nozzle of a reactant delivery system for the delivery of both vapor and aerosol reactants in which the vapor and aerosol combine within the reaction chamber prior to reaching a radiation beam.

An embodiment of a reactant delivery system is depicted in FIG. 5 for the delivery of a vapor precursor into the reaction chamber independently from a reactant flow comprising an aerosol. Referring to FIG. 5, aerosol generator 380 generates an aerosol within channel 382 that leads to reactant inlet 384. The aerosol from reactant inlet 382 leads to radiation beam 386. Vapor channels 388, 390 deliver vapor reactants into the reaction chamber to mix with the aerosol just before reaching radiation beam 386.

In alternative embodiments, aerosol precursors can be delivered through channels 388, 390 of FIG. 5 while a vapor/gaseous reactant(s) are delivered through channel 382. For example, a vapor silicon precursor and/or other glass forming host elements can be delivered through central channel 382 while aerosol dopant(s)/additive(s) can be delivered through channels 388, 390. In further embodiments, precursor(s), e.g., dopant/additive precursor(s), can be delivered to intersect another reactant flow at a radiation beam and/or just beyond a radiation beam. If a dopant/additive precursor(s) intersect a reactant/product flow just beyond a radiation beam, the particles may still be forming such that the dopant(s)/additive(s) are introduced into the matrix of the particles, or the dopant(s)/additive(s) can be associated with hot particles such that they are incorporated into the final uniform material upon consolidation.

Referring to FIG. 1, the reaction chamber 104 comprises a main chamber 250. Reactant supply system 102 connects to the main chamber 250 at injection nozzle 252. Reaction chamber 104 can be heated to a surface temperature above the dew point of the mixture of reactants and inert components at the pressure in the apparatus.

The end of injection nozzle 252 has an annular opening 254 for the passage of inert shielding gas, and a reactant inlet 256 (left lower insert) for the passage of reactants to form a reactant stream in the reaction chamber. Reactant inlet 256 can be a slit, as shown in the lower inserts of FIG. 1. Annular opening 254 has, for example, a diameter of about 1.5 inches and a width along the radial direction from about 1/8 in to about 1/16 in. The flow of shielding gas through annular opening 254 helps to prevent the spread of the reactant gases and product particles throughout reaction chamber 104.

Tubular sections 260, 262 are located on either side of injection nozzle 252. Tubular sections 260, 262 comprise, for example, ZnSe windows/lenses 264, 266, respectively. Windows 264, 266 are about 1 inch in diameter. Windows 264, 266 can comprise cylindrical lenses with a focal length equal to the distance between the center of the chamber to the surface of the lens to focus the light beam to a point just below the center of the nozzle opening. Windows 264, 266 can further comprise an antireflective coating. Appropriate ZnSe lenses are available from Laser Power Optics, San Diego, Calif. Tubular sections 260, 262 provide for the displacement of windows 264, 266 away from main chamber 250 such that windows 264, 266 are less likely to be contaminated by reactants and/or products. Window 264, 266 are displaced, for example, about 3 cm from the edge of the main chamber 250. In place of lenses, reflective optics can be used.

Windows 264, 266 are sealed with a rubber o-ring to tubular sections 260, 262 to prevent the flow of ambient air into reaction chamber 104. Tubular inlets 268, 270 provide for the flow of shielding gas into tubular sections 260, 262 to reduce the contamination of windows 264, 266. Tubular inlets 268, 270 are connected to shielding gas delivery apparatus 106. A vacuum, such as supplied by a venturi jet pump, can be connected to the inlet tube in place of a shielding gas source.

Referring to FIG. 1, shielding gas delivery system 106 comprises inert gas source 280 connected to an inert gas duct 282. Inert gas duct 282 flows into annular channel 284 leading to annular opening 254. A mass flow controller 286 regulates the flow of inert gas into inert gas duct 282. If reactant delivery system 112 of FIG. 2 is used, inert gas source 126 can also function as the inert gas source for duct 282, if desired. Referring to FIG. 1, inert gas source 280 or a separate inert gas source can be used to supply inert gas to tubes 268, 270. Flow to tubes 268, 270 can be controlled by a mass flow controller 288.

Radiation source 110 is aligned to generate an electromagnetic radiation, e.g., light, beam 300 that enters window 264 and exits window 266. Windows/lenses 264, 266 define a light path through main chamber 250 intersecting the flow of reactants at reaction zone 302. After exiting window 266, electromagnetic radiation beam 300 strikes power meter 304, which also acts as a beam dump. An appropriate power meter is available from Coherent Inc., Auburn, Calif. Radiation source 110 can be a laser or an intense conventional light source such as an arc lamp. In one embodiment, radiation source 110 is an infrared laser, especially a CW $CO_2$ laser such as an 1800 watt maximum power output laser available from PRC Corp., Landing, N.J.

Reactants passing through reactant inlet 256 in injection nozzle 252 result in a reactant stream. The reactant stream passes through reaction zone 302, where reaction involving the metal/metalloid precursor composition(s) and dopant/additive precursor composition(s) takes place. Heating of the gases in reaction zone 302 is extremely rapid, roughly on the order of about $10^5$ degree C./sec depending on the specific conditions. The reaction is rapidly quenched upon leaving reaction zone 302, and particles 306 are formed in the reactant/product stream. The nonequilibrium nature of the process can lead to the production of submircon/nanoparticles with a highly uniform size distribution and structural homogeneity.

The path of the reactant stream continues to collection nozzle 310. Collection nozzle 310 has a circular opening 312, as shown in the upper insert of FIG. 1. Circular opening 312 feeds into collection system 108.

The chamber pressure is monitored with a pressure gauge 320 attached to the main chamber. A suitable chamber pressure for the production of the desired oxides generally are in the range(s) from about 80 Torr to about 650 Torr.

Collection system 108 can comprise a curved channel 330 leading from collection nozzle 310. Because of the small size of the particles, the product particles follow the flow of the gas around curves. Collection system 108 comprises a filter 332 within the gas flow to collect the product particles. Due to curved section 330, the filter is not supported directly above the chamber. A variety of materials such as Teflon® (polytetrafluoroethylene), stainless steel, glass fibers and the like can be used for the filter as long as the material is substantially inert and has a fine enough mesh to trap the particles. Suitable materials for the filter include, for example, a glass fiber filter from ACE Glass Inc., Vineland, N.J., cylindrical Nomex® filters from AF Equipment Co., Sunnyvale, Calif. and stainless steel filters from All Con World Systems, Seaford, Del. Filters can be replaced with electrostatic collectors.

Pump 334 can be used to maintain collection system 108 at a selected pressure. It may be desirable to flow the exhaust of the pump through a scrubber 336 to remove any remaining reactive chemicals before venting into the atmosphere.

The pumping rate can be controlled by either a manual needle valve or an automatic throttle valve 338 inserted between pump 334 and filter 332. As the chamber pressure increases due to the accumulation of particles on filter 332, the manual valve or the throttle valve can be adjusted to maintain the pumping rate and the corresponding chamber pressure.

The apparatus can be controlled by a computer 350. Generally, the computer controls the radiation (e.g., light) source and monitors the pressure in the reaction chamber. The computer can be used to control the flow of reactants and/or the shielding gas.

The reaction can be continued until sufficient particles are collected on filter 332 such that pump 334 can no longer maintain the desired pressure in the reaction chamber 104 against the resistance through filter 332. When the pressure in reaction chamber 104 can no longer be maintained at the desired value, the reaction is stopped, and filter 332 is removed. With this embodiment, about 1-300 grams of particles can be collected in a single run before the chamber pressure can no longer be maintained. A single run generally can last up to about 10 hours depending on the reactant delivery system, the type of particle being produced and the type of filter being used.

Figure 6:
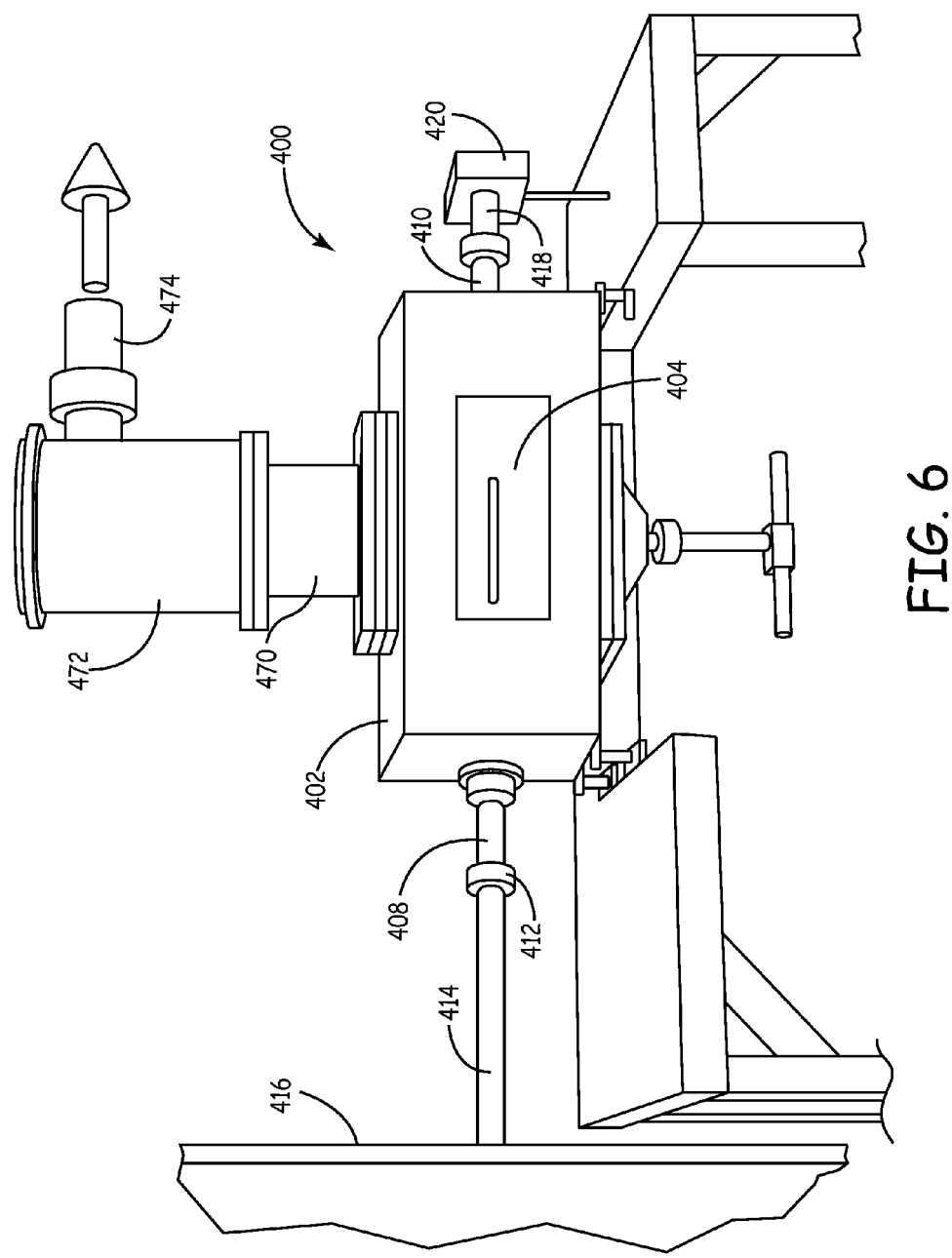
FIG. 6 is a perspective view of an alternative embodiment of a laser pyrolysis apparatus.

An alternative embodiment of a laser pyrolysis apparatus is shown in FIG. 6. Laser pyrolysis apparatus 400 comprises a reaction chamber 402. The reaction chamber 402 comprises a shape of a rectangular parallelapiped. Reaction chamber 402 extends with its longest dimension along the laser beam. Reaction chamber 402 has a viewing window 404 at its side, such that the reaction zone can be observed during operation.

Reaction chamber 402 further comprises tubular extensions 408, 410 that define an optical path through the reaction chamber. Tubular extension 408 is connected with a seal to a cylindrical lens 412. Tube 414 connects laser 416 or other optical radiation source with lens 412. Similarly, tubular extension 410 is connected with a seal to tube 418, which further leads to beam dump/light meter 420. Thus, the entire light path from optical radiation source 416 to beam dump 420 is enclosed.

Figure 7:
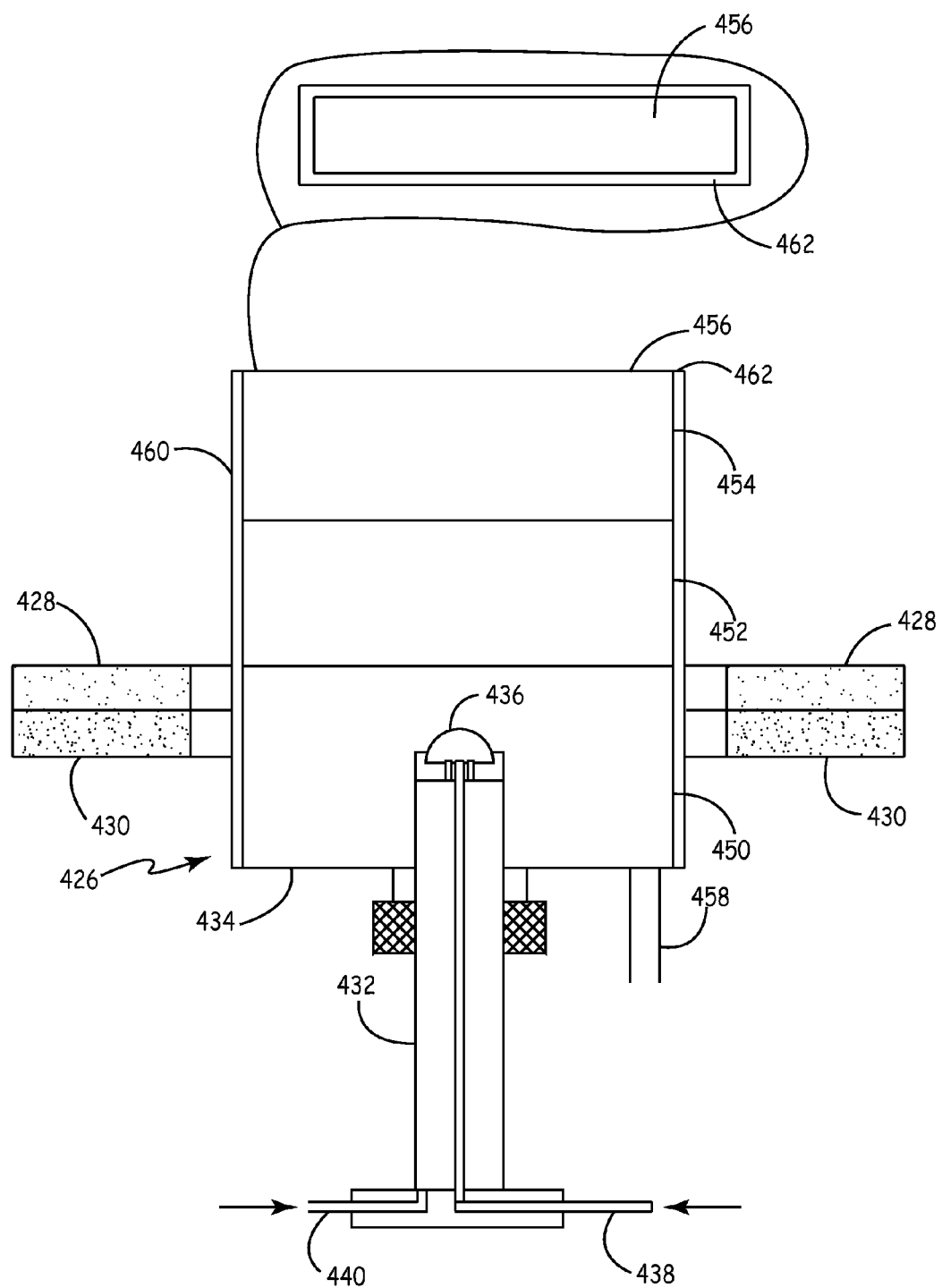
FIG. 7 is a sectional view of an inlet nozzle of the alternative laser pyrolysis apparatus of FIG. 4, the cross section being taken along the length of the nozzle through its center.
Figure 8:
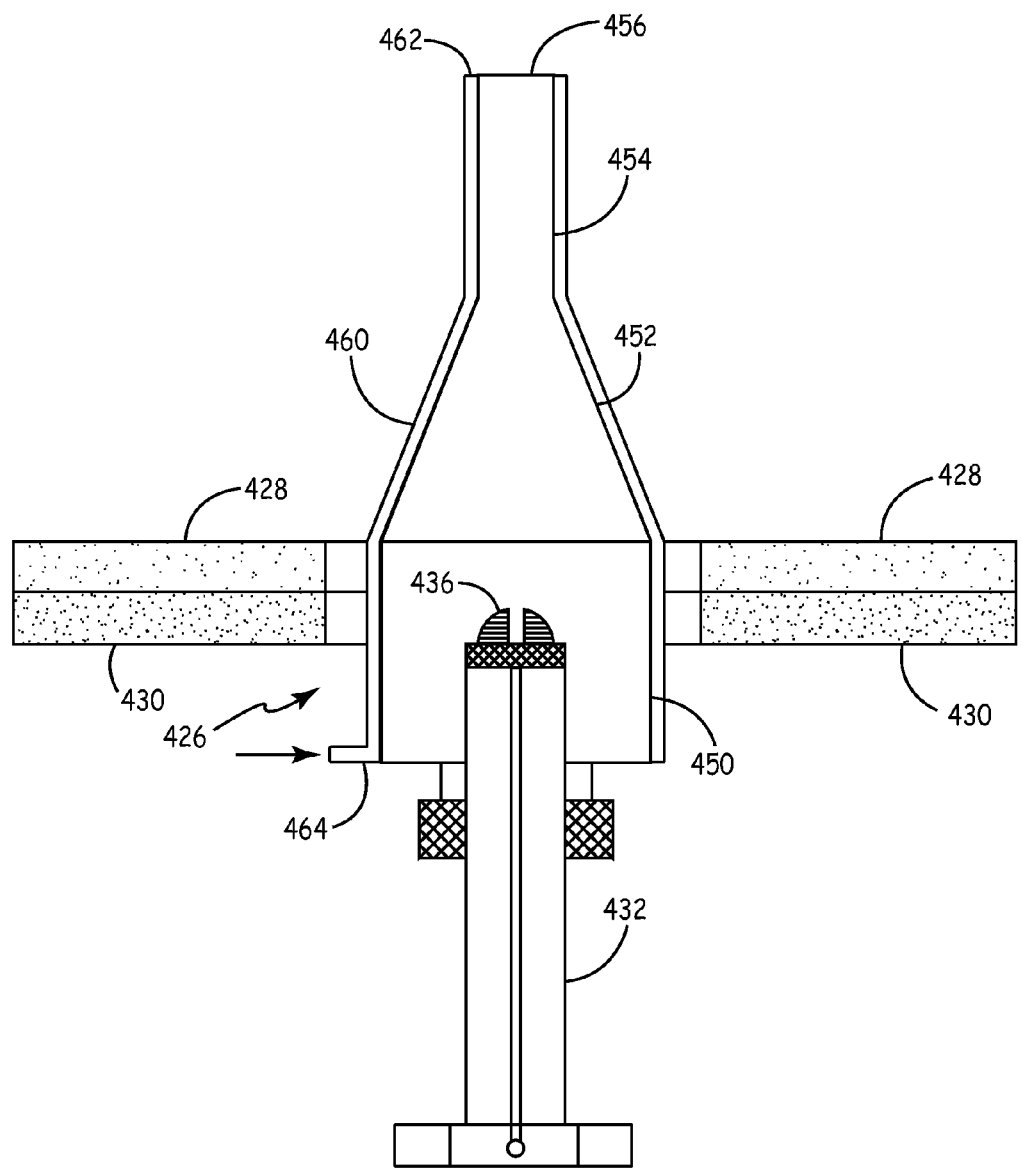
FIG. 8 is a sectional view of an inlet nozzle of the alternative laser pyrolysis apparatus of FIG. 4, the cross section being taken along the width of the nozzle through its center.

Inlet nozzle 426 connects with reaction chamber 402 at its lower surface 428. Inlet nozzle 426 comprises a plate 430 that bolts into lower surface 428 to secure inlet nozzle 426. Referring to sectional views in FIGS. 7 and 8, inlet nozzle 426 comprises an inner nozzle 432 and an outer nozzle 434. Inner nozzle 432 can have a twin orifice internal mix atomizer 436 at the top of the nozzle. Suitable gas atomizers are available from Spraying Systems, Wheaton, Ill. The twin orifice internal mix atomizer 436 has a fan shape to produce a thin sheet of aerosol and gaseous precursors. Liquid is fed to the atomizer through tube 438, and gases for introduction into the reaction chamber are fed to the atomizer through tube 440. Interaction of the gas with the liquid assists with droplet formation.

Outer nozzle 434 comprises a chamber section 450, a funnel section 452 and a delivery section 454. Chamber section 450 holds the atomizer of inner nozzle 432. Funnel section 452 directs the aerosol and gaseous precursors into delivery section 454. Delivery section 450 leads to an about 3 inch by 0.5 inch rectangular outlet 456, shown in the insert of FIG. 7. Outer nozzle 434 comprises a drain 458 to remove any liquid that collects in the outer nozzle. Outer nozzle 434 is covered by an outer wall 460 that forms a shielding gas opening 462 surrounding outlet 456. Inert gas is introduced through inlet 464. The nozzle in FIGS. 7 and 8 can be adapted for the delivery of aerosol and vapor precursors as discussed above with respect to FIGS. 3-5.

Referring to FIG. 6, exit nozzle 470 connects to apparatus 400 at the top surface of reaction chamber 402. Exit nozzle 470 leads to filter chamber 472. Filter chamber 472 connects with pipe 474, which leads to a pump. A cylindrical filter is mounted at the opening to pipe 474. Suitable cylindrical filters are described above.

Another alternative design of a laser pyrolysis apparatus has been described in U.S. Pat. No. 5,958,348 to Bi et al., entitled "Efficient Production of Particles by Chemical Reaction," incorporated herein by reference. This alternative design is intended to facilitate production of commercial quantities of particles by laser pyrolysis. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference.

In one embodiment of a commercial capacity laser pyrolysis apparatus, the reaction chamber and reactant inlet are elongated significantly along the light beam to provide for an increase in the throughput of reactants and products. The embodiments described above for the delivery of aerosol reactants can be adapted for the elongated reaction chamber design. Additional embodiments for the introduction of an aerosol with one or more aerosol generators into an elongated reaction chamber are described in U.S. Pat. No. 6,193,936 to Gardner et al., entitled "Reactant Delivery Apparatuses," incorporated herein by reference. A combination of vapor and aerosol precursors can be delivered into this reaction chamber by generalizing the approaches discussed above with respect to FIGS. 3-5. These improved reactors and corresponding nozzles can be adapted for light reactive deposition with vapor precursors, aerosol precursors and combinations thereof.

In general, the laser pyrolysis apparatus with the elongated reaction chamber and reactant inlet is designed to reduce contamination of the chamber walls, to increase the production capacity and/or to make efficient use of resources. To accomplish these objective(s), the elongated reaction chamber provides for an increased throughput of reactants and products without a corresponding increase in the dead volume of the chamber. The dead volume of the chamber can become contaminated with unreacted compositions and/or reaction products. Furthermore, an appropriate flow of shielding gas confines the reactants and products within a flow stream through the reaction chamber. The high throughput of reactants makes efficient use of the laser energy.

Figure 9:
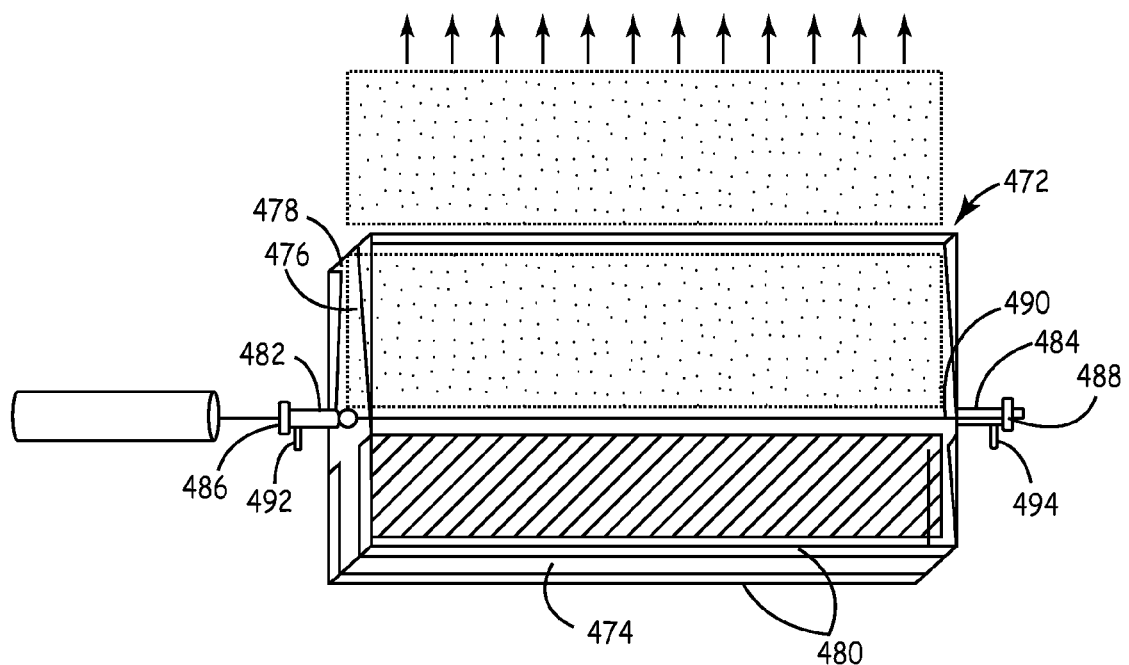
FIG. 9 is a perspective view of an embodiment of an elongated reaction chamber for performing laser pyrolysis.

The design of the improved reaction chamber 472 is shown schematically in FIG. 9. A reactant inlet 474 leads to main chamber 476. Reactant inlet 474 conforms generally to the shape of main chamber 476. Main chamber 476 includes an outlet 478 along the reactant/product stream for removal of particulate products, any unreacted gases and inert gases. The configuration can be reversed with the reactants supplied from the top and product collected from the bottom, if desired. Shielding gas inlets 480 are located on both sides of reactant inlet 474. Shielding gas inlets are used to form a blanket of inert gases on the sides of the reactant stream to inhibit contact between the chamber walls and the reactants or products. The dimensions of elongated main chamber 476 and reactant inlet 474 can be designed for high efficiency particle production.

Reasonable lengths for reactant inlet 474 for the production of ceramic submicron/nanoscale particles, when used with an 1800 watt $CO_2$ laser, are in the range(s) from about 5 mm to about 1 meter. More specifically with respect to the reactant inlet, the inlet generally has an elongated dimension in the range(s) of at least about 0.5 inches (1.28 cm), in other embodiments in the range(s) of at least about 1.5 inches (3.85 cm), in other embodiments in the range(s) of at least about 2 inches (5.13 cm), in further embodiments in the range(s) of at least about 3 inches (7.69 cm), in further embodiments in the range(s) of at least about 5 inches (12.82 cm) and in additional embodiments in the range(s) from about 8 inches (20.51 cm) to about 200 inches (5.13 meters). A person of ordinary skill in the art will recognize that additional ranges of inlet lengths within these specific ranges are contemplated and are within the present disclosure. In addition, the inlet can be characterized by an aspect ratio that is the ratio of the length divided by the width. If the inlet is not rectangular, the aspect ratio can be evaluated using the longest dimension as the length and the width as the largest dimension perpendicular to the line segment along the length. In some embodiments, the aspect ratio is at least about 5, in other embodiments the aspect ratio is at least about 10 and in further embodiments, the aspect ratio is from about 50 to about 400. A person of ordinary skill in the art will recognize that additional ranges of aspect ratio within these explicit ranges of aspect ratio are contemplated and are within the present disclosure. Nozzle parameters for particle production by laser pyrolysis are described further in copending U.S. patent application Ser. No. 10/119,645, now U.S. Pat. No. 6,919,054 to Gardner et al., entitled "Reactant Nozzles Within Flowing Reactors," incorporated herein by reference.

To obtain high yields at high production rates, the radiation beam can be directed in a way to intersect with a significant fraction or the entire reactant flow. Thus, the widest width of the reactant flow can be less than the narrowest width of a radiation beam. If the beam is focused with a cylindrical lens, the lens can be oriented to focus the beam orthogonal to the flow such that the beam does not narrow relative to the width of the flow. Thus, a high production rate can be achieved while efficiently using resources. In general, the radiation beam and the reactant flow can be configured such that effectively none of reactant flow is excluded from the path of the radiation beam. In some embodiments, the radiation beam intersect with at least about 80 volume percent of the reactant flow, in other embodiment at least about 90 volume percent, in further embodiments at least about 95 volume percent and in additional embodiments at least about 99 volume percent of the reactant flow, which can be considered to exclude effectively none of the reactant flow from the path of the radiation beam.

Tubular sections 482, 484 extend from the main chamber 476. Tubular sections 482, 484 hold windows 486, 488 to define a light beam path 490 through the reaction chamber 472. Tubular sections 482, 484 can comprise inert gas inlets 492, 494 for the introduction of inert gas into tubular sections 482, 484.

The improved reaction system comprises a collection apparatus to remove the submicron/nanoscale particles from the reactant stream. The collection system can be designed to collect particles in a batch mode with the collection of a large quantity of particles prior to terminating production. A filter or the like can be used to collect the particles in batch mode. Alternatively, the collection system can be designed to run in a continuous production mode by switching between different particle collectors within the collection apparatus or by providing for removal of particles without exposing the collection system to the ambient atmosphere. A suitable embodiment of a collection apparatus for continuous particle production is described in U.S. Pat. No. 6,270,732 to Gardner et al., entitled "Particle Collection Apparatus And Associated Methods," incorporated herein by reference.

Figure 10:
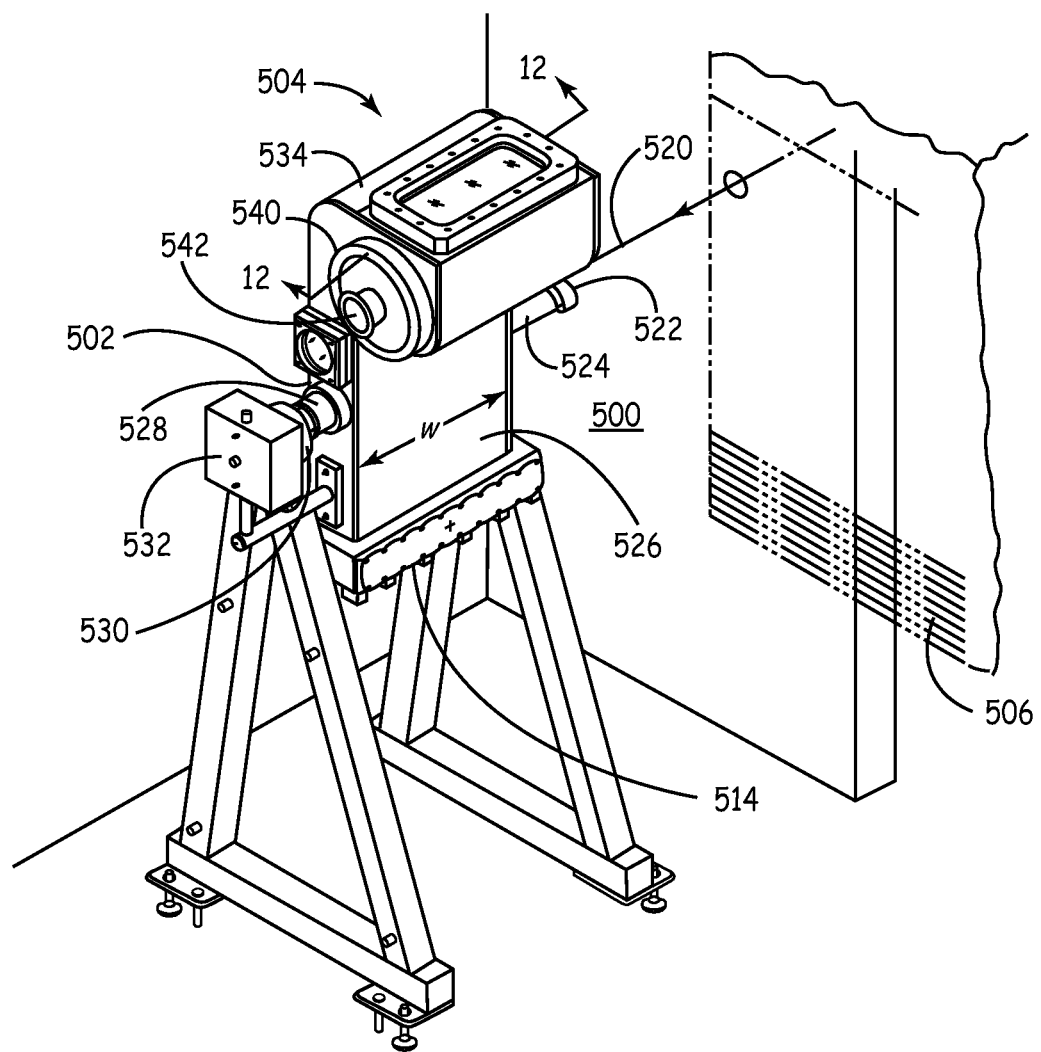
FIG. 10 is a perspective view of an embodiment of an elongated reaction chamber for performing laser pyrolysis.
Figure 11:
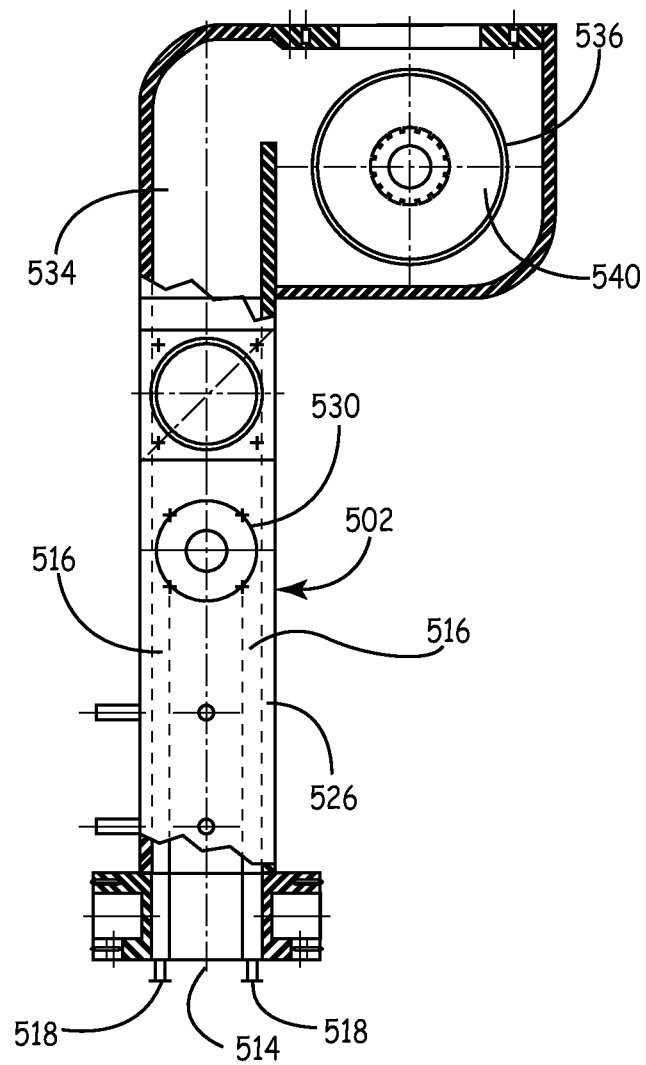
FIG. 11 is a cut away, side view of the reaction chamber of FIG. 10.
Figure 12:
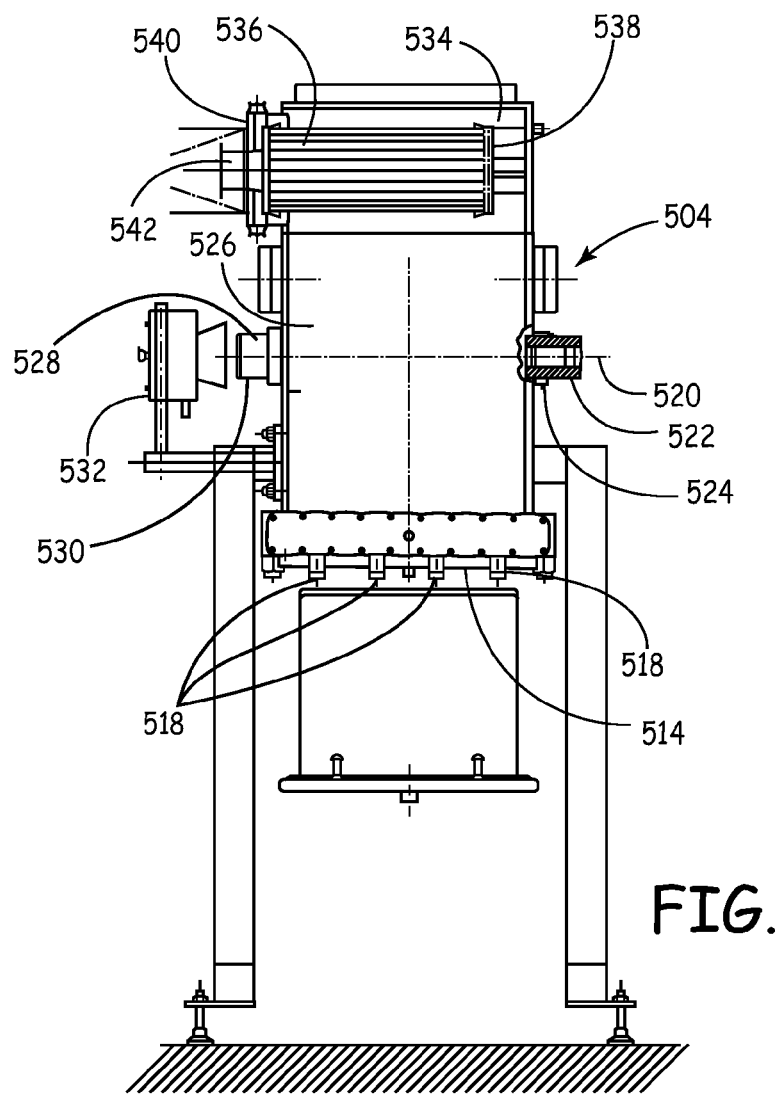
FIG. 12 is a partially sectional, side view of the reaction chamber of FIG. 10, taken along line 12-12 of FIG. 10.

Referring to FIGS. 10-12 a specific embodiment of a laser pyrolysis reaction system 500 includes reaction chamber 502, a particle collection system 504, laser 506 and a reactant delivery system 508 (described below). Reaction chamber 502 comprises reactant inlet 514 at the bottom of reaction chamber 502 where reactant delivery system 508 connects with reaction chamber 502. In this embodiment, the reactants are delivered from the bottom of the reaction chamber while the products are collected from the top of the reaction chamber.

Shielding gas conduits 516 are located on the front and back of reactant inlet 514. Inert gas is delivered to shielding gas conduits 516 through ports 518. The shielding gas conduits direct shielding gas along the walls of reaction chamber 502 to inhibit association of reactant gases or products with the walls.

Reaction chamber 502 is elongated along one dimension denoted in FIG. 10 by "w". A radiation, e.g., light or laser, beam path 520 enters the reaction chamber through a window 522 displaced along a tube 524 from the main chamber 526 and traverses the elongated direction of reaction chamber 502. The radiation beam passes through tube 528 and exits window 530. In one particular embodiment, tubes 524 and 528 displace windows 522 and 530 about 11 inches from the main chamber. The radiation beam terminates at beam dump 532. In operation, the radiation beam intersects a reactant stream generated through reactant inlet 514.

The top of main chamber 526 opens into particle collection system 504. Particle collection system 504 comprises outlet duct 534 connected to the top of main chamber 526 to receive the flow from main chamber 526. Outlet duct 534 carries the product particles out of the plane of the reactant stream to a cylindrical filter 536. Filter 536 has a cap 538 on one end. The other end of filter 536 is fastened to disc 540. Vent 542 is secured to the center of disc 540 to provide access to the center of filter 536. Vent 542 is attached by way of ducts to a pump. Thus, product particles are trapped on filter 536 by the flow from the reaction chamber 502 to the pump. Suitable pumps were described above. Suitable pumps include, for example, an air cleaner filter for a Saab 9000 automobile (Pur-o-lator part A44-67), which comprises wax impregnated paper with Plastisol or polyurethane end caps.

Figure 13:
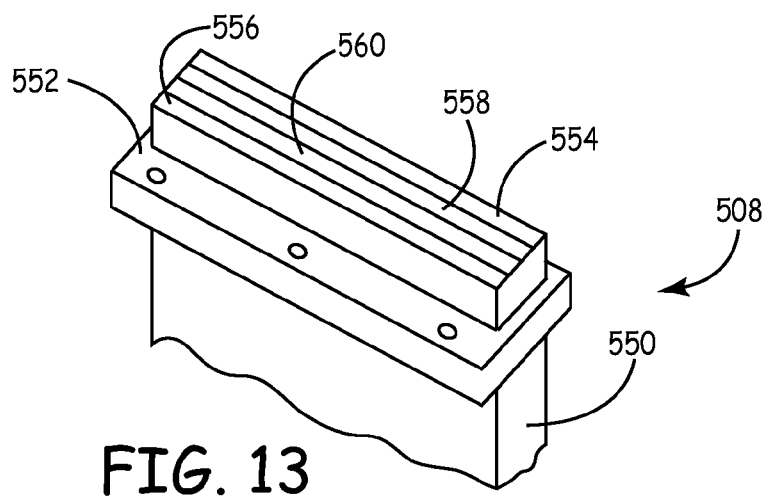
FIG. 13 is a fragmentary, perspective view of an embodiment of a reactant nozzle for use with the chamber of FIG. 10.

In a specific embodiment, reactant delivery system 508 comprises a reactant nozzle 550, as shown in FIG. 13. Reactant nozzle 550 can comprise an attachment plate 552. Reactant nozzle 550 attaches at reactant inlet 514 with attachment plate 552 bolting to the bottom of main chamber 526. In one embodiment, nozzle 550 has four channels that terminate at four slits 554, 556, 558, 560. Slits 558 and 560 can be used for the delivery of precursors and other desired components of the reactant stream. Slits 554, 556 can be used for the delivery of inert shielding gas. If a secondary reactant is spontaneously reactive with the vanadium precursor, it can be delivered also through slits 554, 556. One apparatus used for the production of oxide particles had dimensions for slits 554, 556, 558, 560 of 3 inches by 0.04 inches.

Coating Deposition

Light reactive deposition is a coating approach that uses an intense radiation source, e.g., a light source, to drive synthesis of desired compositions from a reactant stream. It has similarities with laser pyrolysis in that an intense radiation source drives the reaction. However, in light reactive deposition, the resulting compositions are directed to a substrate surface where a coating is formed. The characteristics of laser pyrolysis that lead to the production of highly uniform particles correspondingly can result in the production of coatings with high uniformity. In addition, reaction features that result in high particle production rates by laser pyrolysis can be adapted for high coating rates in light reactive deposition.

In light reactive deposition, the coating of the substrate can be performed in a coating chamber separate from the reaction chamber or the coating can be performed within the reaction chamber. In either of these configurations, the reactant delivery system can be configured similarly to a reactant delivery system for a laser pyrolysis apparatus for the production of particles. Thus, the description of the production of particles by laser pyrolysis described above and in the examples below can be adapted for coating production using the approaches described in this section.

If the coating is performed in a coating chamber separate from the reaction chamber, the reaction chamber can be essentially the same as the reaction chamber for performing laser pyrolysis, although the throughput and the reactant stream size may be designed to be appropriate for the coating process. For these embodiments, the coating chamber and a conduit connecting the coating chamber with the reaction chamber replace the collection system of the laser pyrolysis system.

Figure 14:
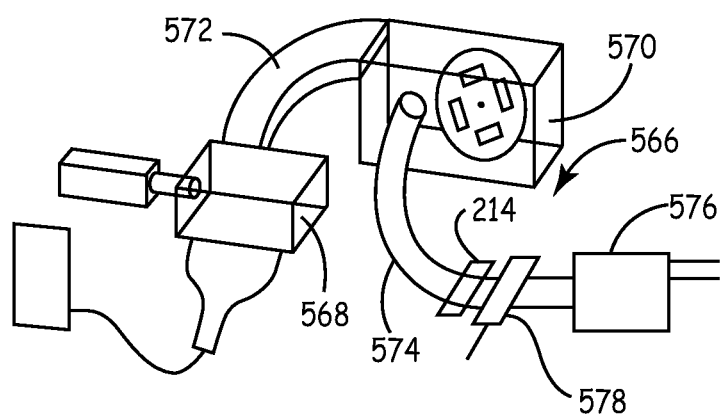
FIG. 14 is a schematic diagram of a light reactive deposition apparatus formed with a particle production apparatus connected to a separate coating chamber through a conduit.

A coating apparatus with a separate reaction chamber and a coating chamber is shown schematically in FIG. 14. Referring to FIG. 14, the coating apparatus 566 comprises a reaction chamber 568, a coating chamber 570, a conduit 572 connecting the reaction apparatus with coating chamber 570, an exhaust conduit 574 leading from coating chamber 570 and a pump 576 connected to exhaust conduit 574. A valve 578 can be used to control the flow to pump 576. Valve 578 can be, for example, a manual needle valve or an automatic throttle valve. Valve 578 can be used to control the pumping rate and the corresponding chamber pressures.

Figure 15:
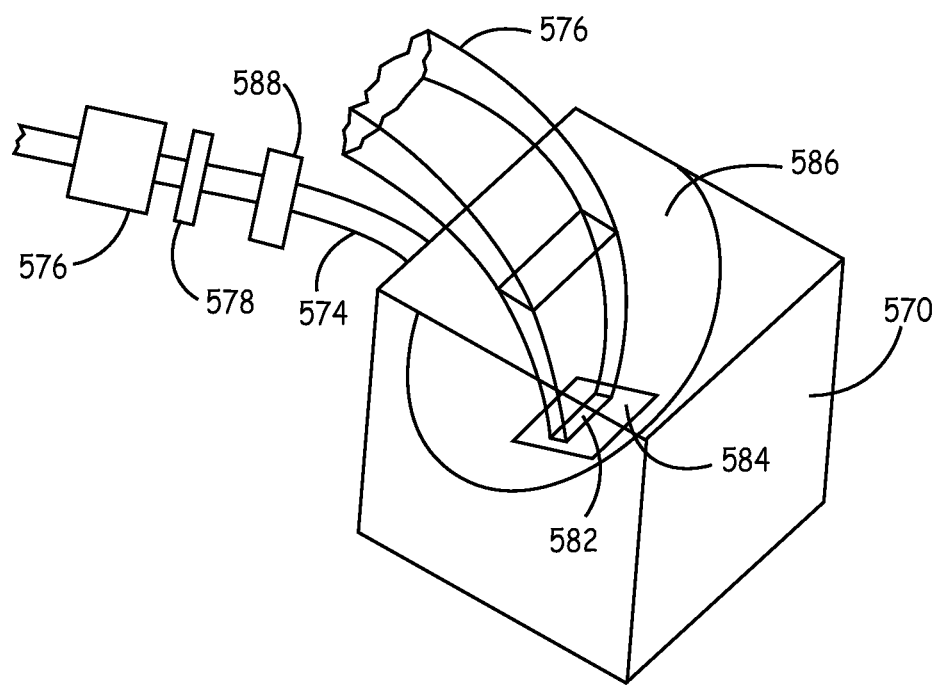
FIG. 15 is a perspective view of a coating chamber where the walls of the chamber are transparent to permit viewing of the internal components.

Referring to FIG. 15, conduit 572 from the particle production apparatus 568 leads to coating chamber 570. Conduit 572 terminates at opening 582 within chamber 570. In some embodiments, opening 572 is located near the surface of substrate 584 such that the momentum of the particle stream directs the particles directly onto the surface of substrate 584. Substrate 584 can be mounted on a stage or other platform 586 to position substrate 584 relative to opening 582. A collection system, filter, scrubber or the like 588 can be placed between the coating chamber 570 and pump 576 to remove particles that did not get coated onto the substrate surface.

Figure 16:
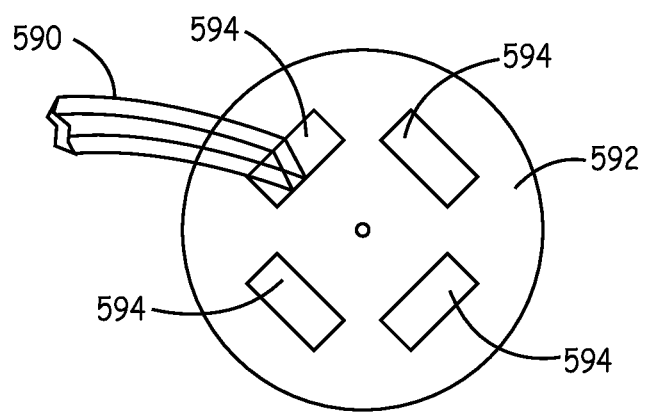
FIG. 16 is perspective view of a particle nozzle directed at a substrate mounted on a rotating stage.

An embodiment of a stage to position a substrate relative to the conduit from the particle production apparatus is shown in FIG. 16. A particle nozzle 590 directs particles toward a rotating stage 592. As shown in FIG. 16, four substrates 594 are mounted on stage 592. More or fewer substrates can be mounted on a moveable stage with corresponding modifications to the stage and size of the chamber. Movement of stage 592 sweeps the particle stream across a substrate surface and positions particular substrate 594 within the path of nozzle 590. As shown in FIG. 16, a motor is used to rotate stage 592. Stage 592 can comprise thermal control features that provide for the control of the temperature of the substrates on stage 592. Alternative designs involve the linear movement of a stage or other motions. In other embodiments, the particle stream is unfocused such that an entire substrate or the desired portions thereof is simultaneously coated without moving the substrate relative to the product flow.

If the coating is performed within the reaction chamber, the substrate is mounted to receive product compositions flowing from the reaction zone. The compositions/particles may not be fully solidified into solid particles, although quenching may be fast enough to form solid particles. Whether or not the compositions are solidified into solid particles, the particles can be highly uniform. In some embodiments, the substrate is mounted near the reaction zone. In general, the substrate/wafer is placed in the range(s) from about 1 millimeter (mm) to about 1 meter coaxial to the reactant flow vector measured from the radiation beam edge, i.e., the downstream locus of points where the radiation intensity is a factor of $1/e^2$ of the maximum beam intensity, in other embodiments in the range(s) from about 2 mm to 50 centimeters (cm), and in further embodiments in the range(s) from about 3 mm to about 30 cm, although in some circumstances it is conceived that distances less than 1 mm and/or greater than 1 meter can have utility. A person of ordinary skill in the art will understand that additional ranges within the explicit ranges of substrate distances are conceived and are within the present disclosure. If the substrate is closer to the reaction zone, the coating process is more dynamic since the well defined product flow can be directed to desired substrate locations. However, if the substrate is placed farther away from the reaction zone, the coating process is more static in the sense that a more diffuse cloud of product particles is directed at the substrate.

Figure 17:
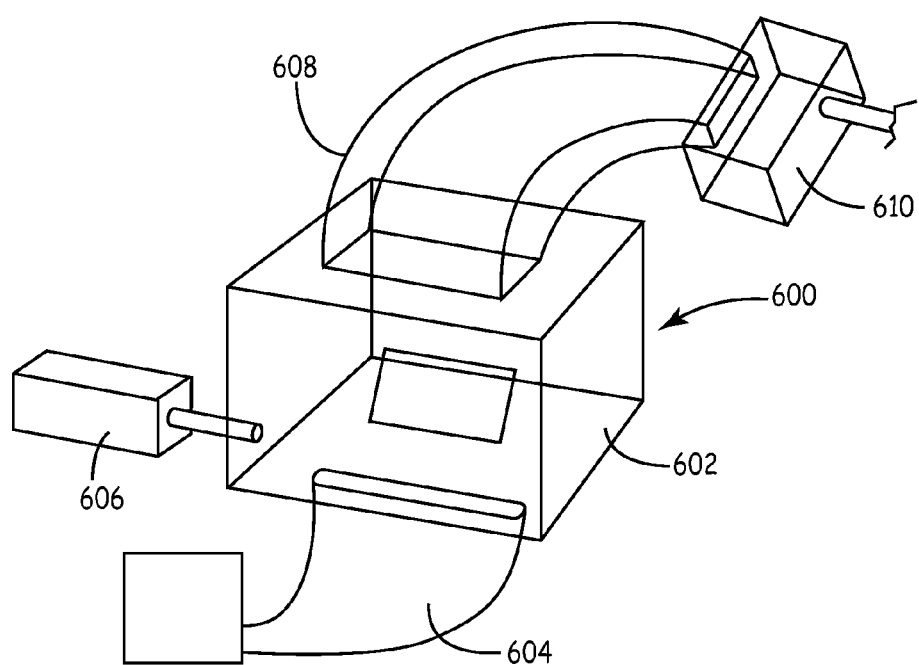
FIG. 17 is a schematic diagram of a light reactive deposition apparatus in which a particle coating is applied to a substrate within the particle production chamber.

An apparatus 600 to perform substrate coating within the reaction chamber is shown schematically in FIG. 17. The reaction/coating chamber 602 is connected to a reactant supply system 604, a radiation source 606 and an exhaust 608. Exhaust 608 can be connected to a pump 610, although the pressure from the reactants themselves can maintain flow through the system.

Figure 18:
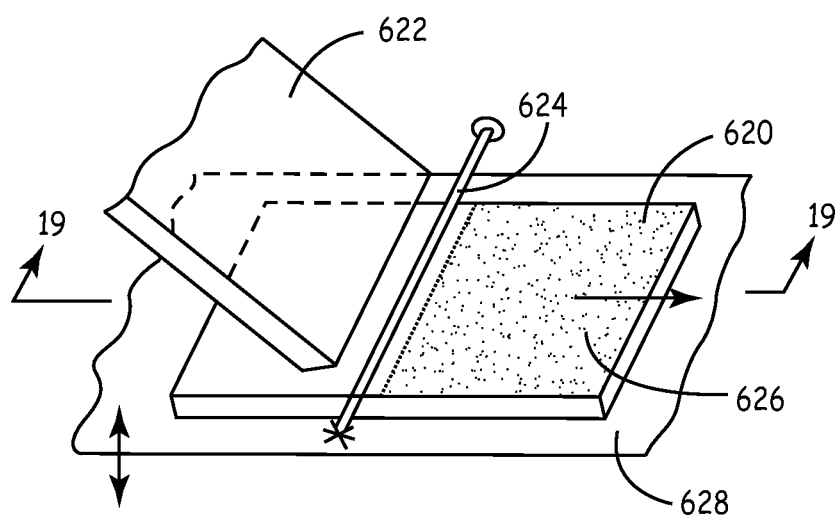
FIG. 18 is a perspective view of a reactant nozzle delivering reactants to a reaction zone positioned near a substrate.
Figure 19:
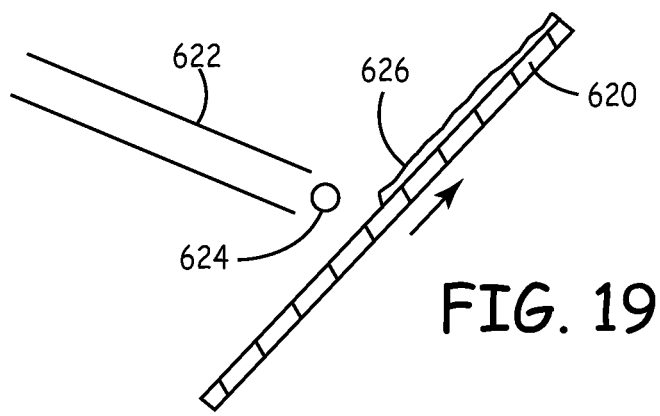
FIG. 19 is a sectional view of the apparatus of FIG. 18 taken along line 19-19.

Various configurations can be used to sweep the coating across the substrate surface as the product leaves the reaction zone. One embodiment is shown in FIGS. 18 and 19. A substrate 620 moves relative to a reactant nozzle 622, as indicated by the right directed arrow. The reactant nozzle and/or the substrate can move relative to the reaction chamber. Reactant nozzle 622 is located just above substrate 620. An optical path 624 is defined by suitable optical elements that direct a radiation, e.g., light, beam along path 624. Optical path 624 is located between nozzle 622 and substrate 620 to define a reaction zone just above the surface of substrate 620. The hot particles tend to stick to the substrate surface. A sectional view is shown in FIG. 19. A particle coating 626 is formed as the substrate is scanned past the reaction zone.

In general, substrate 620 can be carried on a conveyor 628 or a turret (turntable). In some embodiments, the position of conveyor 628 can be adjusted to alter the distance from substrate 626 to the reaction zone. A change in the distance from substrate to the reaction zone correspondingly alters the temperature of the particles striking the substrate. The temperature of the particles striking the substrate generally alters the properties of the resulting coating and the conditions for subsequent processing, such as a subsequent heat processing consolidation of the coating. The distance between the substrate and the reaction zone can be adjusted empirically to produce desired coating properties. In addition, the stage/conveyor supporting the substrate can include thermal control features such that the temperature of the substrate can be adjusted to higher or lower temperatures, as desired.

Figure 20:
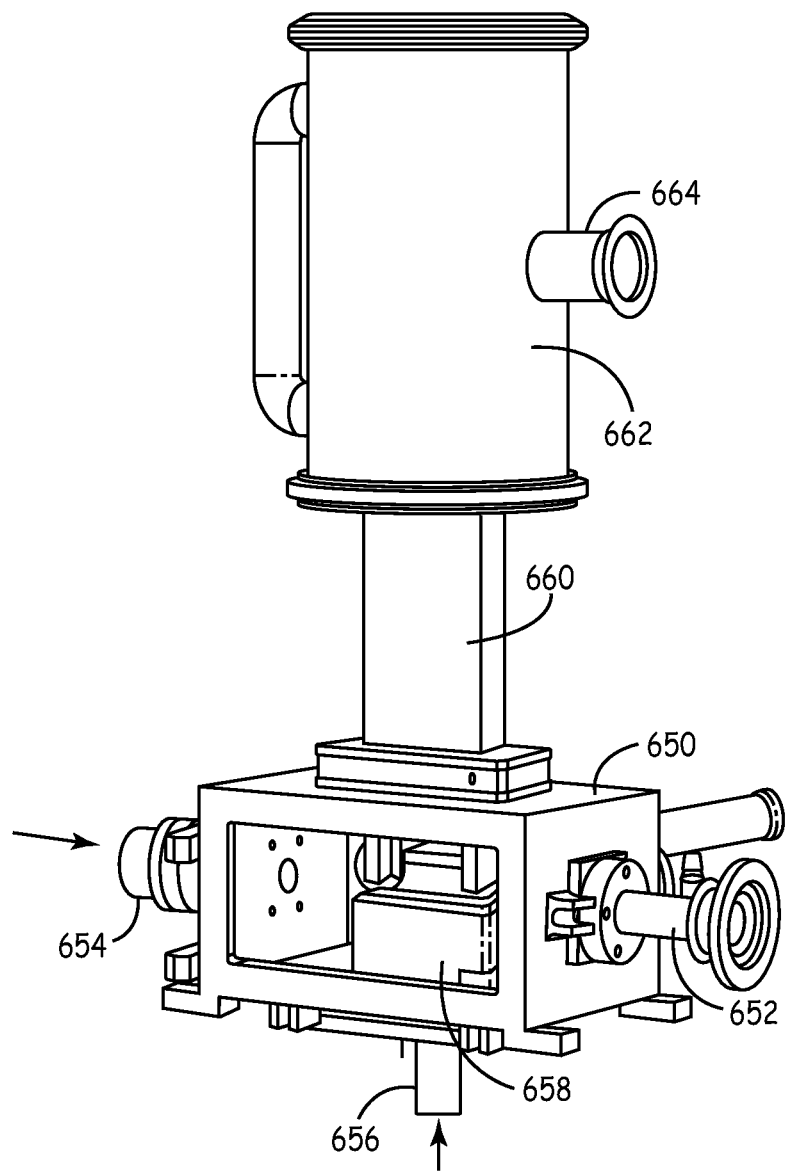
FIG. 20 is a perspective view of an embodiment of a light reactive deposition chamber.
Figure 21:
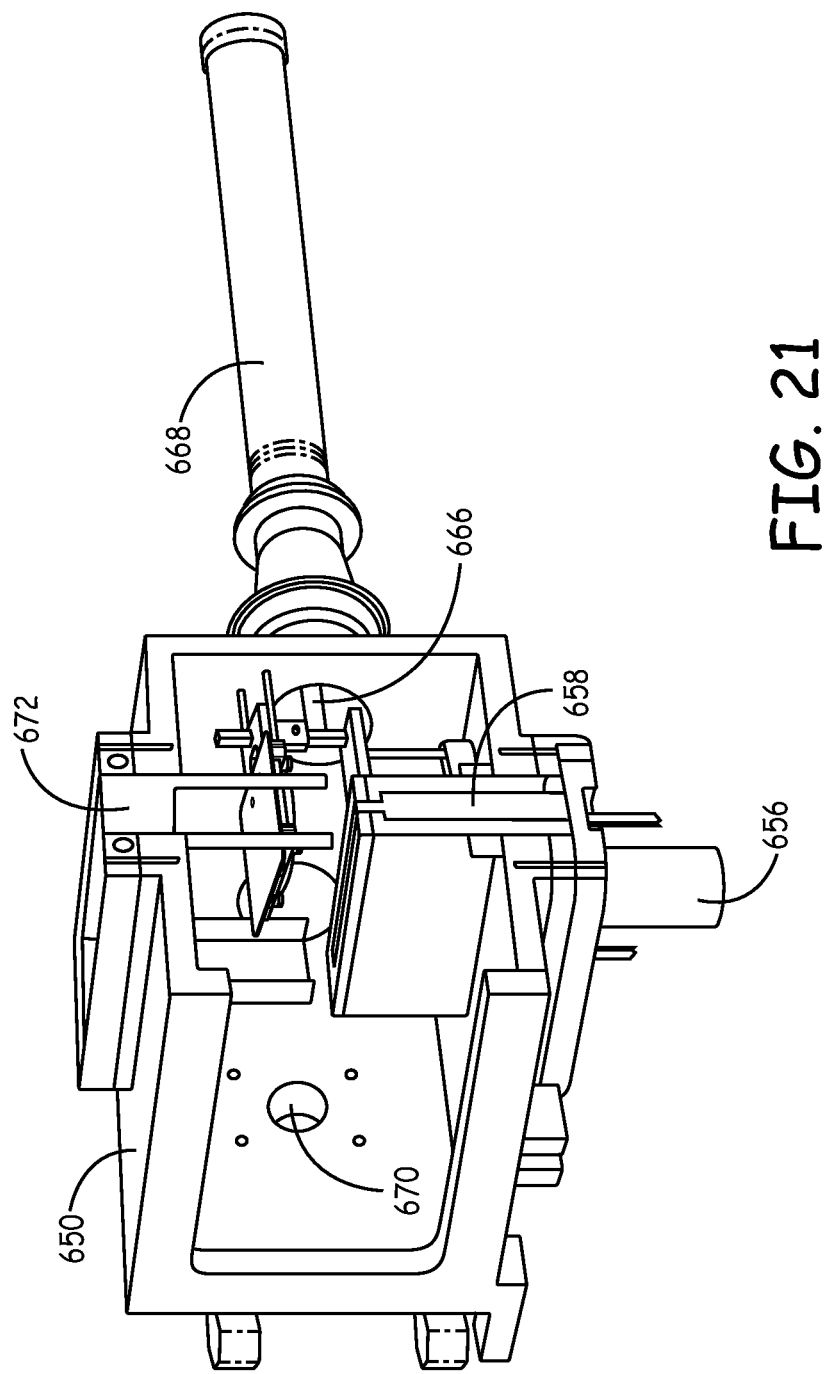
FIG. 21 is an expanded view of the reaction chamber of the light reactive deposition chamber of FIG. 20.
Figure 22:
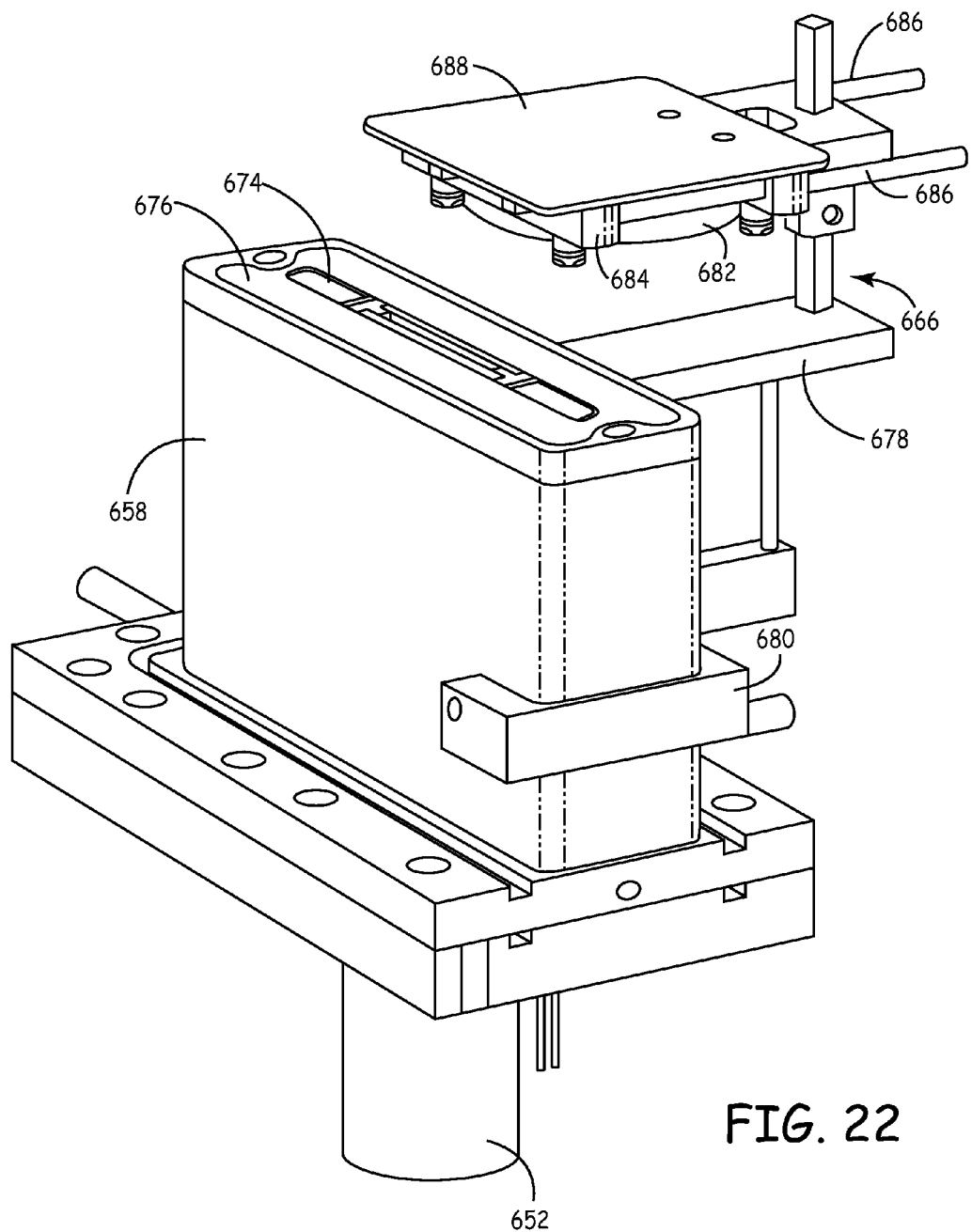
FIG. 22 is an expanded view of the substrate support of the reaction chamber of FIG. 21.

A particular embodiment of a light reactive deposition apparatus is shown in FIGS. 20-22. Referring to FIG. 20, process chamber 650 comprises a light tube 652 connected to a $CO_2$ laser (not shown) and a light tube 654 connected to a beam dump. An inlet conduit 656 connects with a precursor delivery system that delivers vapor reactants and carrier gases. Inlet conduit 656 leads to process nozzle 658. An exhaust tube 660 connects to process chamber 650 along the flow direction from process nozzle 658. Exhaust tube 660 leads to a particle filtration chamber 662. Particle filtration chamber 662 connects to a pump at pump connector 664.

An expanded view of process chamber 650 is shown in FIG. 21. A wafer carrier 666 supports a wafer above process nozzle 658. Wafer carrier 666 is connected with an arm 668, which translates the wafer carrier to move the wafer through the particle stream emanating from the reaction zone where the laser beam intersects the precursor stream from process nozzle 658. Arm 668 comprises a linear translator that is shielded with a tube. A laser entry port 670 is used to direct a laser beam between process nozzle 658 and the wafer. Unobstructed flow from process nozzle would proceed directly to exhaust nozzle 672, which leads to particle transport tube 660.

An expanded view of wafer carrier 666 and process nozzle 658 is shown in FIG. 22. The end of process nozzle 658 has an opening for precursor delivery 674 and a shielding gas opening 676 around precursor opening to confine the spread of precursor and product particles. Wafer carrier 666 comprises a support 678 that connects to process nozzle 658 with a bracket 680. A circular wafer 682 is held in a mount 684 such that wafer 682 slides within mount 684 along tracks 686 to move wafer 682 into the flow from the reaction zone. Backside shield 688 prevents uncontrolled deposition of particles on the back of wafer 682. Tracks 686 connect to arm 668.

For any of the coating configurations, the intersection of the flow with the substrate deflects the trajectory of the flow. Thus, it may be desirable to alter the position of the reaction chamber outlet to account for the change in direction of the flow due to the substrate. For example, it may be desirable to alter the chamber design to direct the reflected flow to the outlet and/or to change the position of the outlet accordingly.

The temperature of the substrate during the deposition process can be adjusted to achieve particular objectives. For example, the substrate can be cooled during the deposition process since a relatively cool substrate can attract the particles to its surface through thermophoretic force. However, in some embodiments, the substrate is heated, for example to about 500° C., during the deposition process. In embodiments in which that the substrate is close enough to the reaction zone, the particle may be in a semi-molten state when they reach the substrate surface. Semi-molten particles may deform upon impact and may stick better due to the deformation. In addition, the particles tend to compact and fuse on a heated substrate such that a subsequent consolidation of the coating into a fused glass or other material is facilitated if the coating were formed initially on a heated substrate.

The formation of coatings by light reactive deposition, silicon glass deposition and optical devices in general are described further in copending and commonly assigned U.S. patent application Ser. No. 09/715,935, now U.S. Pat. No. 7,575,784 to Bi et al., entitled "Coating Formation By Reactive Deposition," incorporated herein by reference, and in copending and commonly assigned PCT application designating the U.S. serial number PCT/US01/32413 to Bi et al. filed on Oct. 16, 2001, entitled "Coating Formation By Reactive Deposition," incorporated herein by reference.

The well-defined reactant stream as a sheet of flow leading into the reaction zone tends to spread after the reaction zone due to heat from the reaction. If the substrate is swept through the reaction zone near the reaction zone, the spreading of the flow may not be significant. In some embodiments, it may be desirable to coat the substrate from the flow farther away from the reaction zone such that the flow has spread significantly and the entire substrate or desired portion thereof can be coated simultaneously without moving the substrate. The appropriate distance to obtain a uniform coating of particles depends on the substrate size and the reaction conditions. A typical distance of about 15 centimeters would be suitable for simultaneously coating an entire wafer with a 4-inch diameter. A general description of ranges of the wafer from the radiation beam is given above.

In embodiments in which the entire substrate surface is simultaneously coated, when the composition of the product particle flow is changed in time during the deposition process, the composition of the particles changes through the thickness of the coating. If the composition is changed continuously, a continuous composition gradient through the layer results. For optical materials, generally a continuous composition gradient layer comprising a continuous composition change from a first composition to a second composition has a thickness of no more than about 300 microns, in other embodiments no more than about 150 microns, in further embodiments, in the range(s) from about 250 nm to about 100 microns and in still other embodiments in the range(s) from about 1 micron to about 50 microns. A person of ordinary skill in the art will recognize that other ranges and subranges within the explicit ranges are contemplated and are encompassed within the present disclosure. Alternatively or additionally, gradients can be formed within a layer or layers, such as parallel to a surface, for example, along one or more dimensions of x-y Cartesian coordinates relative to a z-axis that is normal to a substrate surface or a layered structure, if the structure is formed in layers.

Alternatively, the composition can be changed incrementally or discretely to produce layers with varying composition, which can involve a gradual change in composition between two compositions or discrete layers with discrete composition differences. The resulting transition material has a step-wise change in composition from a first composition to a second composition. Generally, the first composition and second composition are the compositions of the adjacent layers (or adjacent compositions on the same layer) such that the transition material provides a gradual transition in composition between the two adjacent layers (or adjacent compositions). While a transition material can have two layers, the transition material generally comprises at least three layers, in other embodiments at least 4 layers and in further embodiments in the range(s) from 5 layers to 100 layers. A person of ordinary skill in the art will recognize that additional range(s) within these specific ranges are contemplated and are within the present disclosure. The total thickness generally is similar to the continuous gradient layers described in the previous paragraph. Each layer within the step-wise transition material generally has a thickness less than about 100 microns, in other embodiments less than about 25 microns, in further embodiments in the range(s) from about 500 nm to about 20 microns and in additional embodiments in the range(s) from about 1 micron to about 10 microns. The layers within the step-wise transition material may or may not have approximately equal thickness. Similarly, the step-wise change in composition may or may not take equivalent steps between layers of the transition material.

For the production of discrete structures on a substrate surface, the composition of the optical material generally can be different at different locations within the structure. To introduce the composition variation, the deposition process itself can be manipulated to produce specific structures. Alternatively, various patterning approaches can be used following the deposition. Patterning following deposition of one or more coating layers is described further below.

Using the deposition approaches described herein, the composition of product particles deposited on the substrate can be changed during the deposition process to deposit particles with a particular composition at selected locations on the substrate to vary the resulting composition of the optical material along the x-y plane. For example, if the product particle compositions are changed while sweeping the substrate through the product particle stream, stripes or grids can be formed on the substrate surface with different particle compositions in different stripes or grid locations. Using light reactive deposition, the product composition can be varied by adjusting the reactants that react to form the product particle or by varying the reaction conditions. The reaction conditions can affect the resulting composition and/or properties of product particles. For example, the reaction chamber pressure, flow rates, radiation intensity, radiation energy/wavelength, concentration of inert diluent gas in the reaction stream, temperature of the reactant flow can affect the composition and other properties of the product particles.

In some embodiments, the reactant flow can comprise vapor and/or aerosol reactants, which can be varied to alter the composition of the products. In particular, concentrations of elements can be changed by varying the composition and/or quantity of elements in the flow.

While product particle composition changes can be introduced by changing the reactant flow composition or the reaction conditions while sweeping a substrate through the product stream, it may be desirable, especially when more significant compositional changes are imposed to stop the deposition between the different deposition steps involving the different compositions. For example, to coat one portion of a substrate with a first composition and the remaining portions with another composition, the substrate can be swept through the product stream to deposit the first composition to a specified point at which the deposition is terminated. The substrate is then translated the remaining distance without any coating being performed. The composition of the product is then changed, by changing the reactant flow or reaction conditions, and the substrate is swept, after a short period of time for the product flow to stabilize, in the opposite direction to coat the second composition in a complementary pattern to the first composition. A small gap can be left between the coatings of the first composition and the second composition to reduce the presence of a boundary zone with a mixed composition. The small gap can fill in during the consolidation step to form a smooth surface with a relatively sharp boundary between the two materials.

The deposition process can be generalized for the deposition of more than two compositions and/or more elaborate patterns on the substrate. In more elaborate processes, a shutter can be used to block deposition while the product flow is stabilized and/or while the substrate is being positioned. A precision controlled stage/conveyor can precisely position and sweep the substrate for the deposition of a particular composition. The shutter can be rapidly opened and closed to control the deposition. Gaps may or may not be used to slightly space the different location of the compositions within the pattern.

In other embodiments, a discrete mask is used to control the deposition of particles. A discrete mask can provide an efficient and precise approach for the patterning of particles. With chemical vapor deposition and physical vapor deposition, a layer of material is built up from an atomic or molecular level, which can involve intimate binding of the mask to the underlying substrate at an atomic or molecular level to prevent migration of the material being deposited under the mask to blocked regions. Thus, the coated masks are a coating on the surface without an independent, self-supporting structure corresponding to the mask, and the coated mask is chemically or physically bonded to the surface with atomic level contact along the coated mask. In contrast, with particle deposition as described herein, the particles generally can be at least macromolecular in size with diameters in the range(s) of about 1 nanometers (nm) or more such that a mask with a flat surface placed against another flat surface provides sufficient contact to prevent significant particle migration past the mask. While coated masks can be effectively used in light reactive deposition, physical masks provide an efficient alternative to coated masks for patterning a surface. The discrete masks have an intact self-supporting structure that is not bonded to the surface such that the mask can be removed intact from the surface that is coated. Therefore, the discrete mask approach herein is different from previous masking approaches adapted from photolithography for vapor deposition approaches.

In these embodiments, the formation of the particle coating correspondingly involves directing a product particle stream at the substrate shielded with the discrete mask. The discrete mask has a surface, generally a planar surface, with openings at selected locations. The discrete mask blocks the surface except at the openings such that particles can deposit on the surface through the openings. Thus, the mask provides for patterning compositions on the surface by the selected placement of the openings. In some embodiments, suitable discrete masks comprise a mask with a slit that is narrower than the product particle flow such that the deposition process can be very precisely controlled. Movement of the slit can form a desired, precisely controlled pattern with one or more compositions. After use of a discrete mask, it can be removed and reused.

In some embodiments, a plurality of masks can be used to deposit particles along a single layer. For example, following deposition of a pattern through a first mask, a second complementary mask can be used to deposit material over at least a portion of the surface left uncovered during deposition with the first mask. Further complementary masks can be used to form complex patterns while completing a single layer or portion thereof with a coating having varying chemical composition over the layer.

Thus, using light reactive deposition, a range of effective approaches are available to vary the chemical composition of optical materials within layers and in different layers to form three-dimensional optical structures with selected compositions at selected positions within the material. The patterning of compositions of optical materials during the deposition process is described further in copending and commonly assigned U.S. patent application Ser. No. 10/027,906, now U.S. Pat. No. 6,952,504 to Bi et al., entitled "Three Dimensional Engineering of Optical Structures," incorporated herein by reference.

As described in detail above, laser pyrolysis apparatuses and corresponding light reactive deposition apparatuses have been designed for the production of commercial quantities of submicron/nanoscale powders and powder coatings. Alternatively or in addition, the invention provides that the rate of production and/or deposition of the particles can be varied substantially, depending on a number of factors (e.g., the starting materials being utilized, the desired reaction product, the reaction conditions, the deposition efficiency, and the like, and combinations thereof). Thus, in one embodiment, the rate of particle production can vary in the range(s) from about 5 grams per hour of reaction product to about 10 kilograms per hour of desired reaction product. Specifically, using apparatuses described herein, coating can be accomplished at particle production rates in the range(s) of up to at least about 10 kilograms per hour (kg/hr), in other embodiments in the range(s) of at least about 1 kg/hr, in further embodiments with lower production rates in the range(s) of at least about 250 grams per hour (g/hr) and in additional embodiments in the range(s) of at least about 50 g/hr. A person of ordinary skill in the art will recognize that production rates intermediate between these explicit production rates are contemplated and are within the present disclosure. Exemplary rates of particle production (in units of grams produced per hour) include in the range(s) of not less than about 5, 10, 50, 100, 250, 500, 1000, 2500, 5000, or 10000.

Not all of the particles generated are deposited on the substrate. In general the deposition efficiency depends on the relative speed of the substrate through the product stream with the particles, for embodiments based on moving the substrate through a sheet of product particles. At moderate relative rates of substrate motion, coating efficiencies in the range(s) of not less than about 15 to about 20 percent have been achieved, i.e. about 15 to about 20 percent of the produced particles are deposited on the substrate surface. Routine optimization can increase this deposition efficiency further. At slower relative motion of the substrate through the product particle stream, deposition efficiencies in the range(s) of at least about 40% have been achieved. In some embodiments, the rates of particle production are in the range(s) such that at least about 5 grams per hour, or alternatively or in addition, in the range(s) of at least about 25 grams per hour, of reaction product are deposited on the substrate. In general, with the achievable particle production rates and deposition efficiencies, deposition rates can be obtained in the range(s) of at least about 5 g/hr, in other embodiments in the range(s) of at least about 25 g/hr, in further embodiments in the range(s) of at least from about 100 g/hr to about 5 kg/hr and in still other embodiment in the range(s) from about 250 g/hr to about 2.5 kg/hr. A person of ordinary skill in the art will recognize that deposition rates between these explicit rates are contemplated and are within the present disclosure. Exemplary rates of particle deposition (in units of grams deposited per hour) include in the range(s) of not less than about 0.1, 0.5, 1, 5, 10, 25, 50, 100, 250, 500, 1000, 2500, or 5000.

Alternatively or in addition, the invention provides that the rate of the movement of the substrate and the particle flow relative to each other can vary substantially, depending on the desired specifications for the coated substrate. Thus, in one embodiment, the rate can be measured on an absolute scale, and can vary in the range(s) from about 0.001 inches per second to about 12 inches per second, or even more. Further, in another embodiment, the rate can be measured on a scale relative to the substrate being coated, and can vary in the range(s) from about 0.05 substrates per minute to about 1 substrate per second.

For suitable wafer/substrate sizes, at least a substantial portion of the substrate surface can be coated with a sufficient thickness to form a consolidated material at a rate in the range(s) of 2 microns per minute, in other embodiments in the range(s) of at least about 5 microns per minute, in some embodiments in the range(s) at least about 20 microns per minute, and in further embodiments in the range(s) at least about 100 microns per minute, in which the thickness refers to a powder coating sufficiently thick to form a consolidated material at the specified thickness. A person or ordinary skill in the art will recognize that additional ranges within these explicit ranges are contemplated and are within the present disclosure.

For appropriate embodiments using a sheet of product particles, the rate of substrate motion generally is a function of the selected deposition rate and the desired coating thickness as limited by the ability to move the substrate at the desired rate while obtaining desired coating uniformity. Due to the high deposition rates achievable with light reactive deposition, extremely fast coating rates are easily achievable. These coating rates by LRD are dramatically faster than rates that are achievable by competing methods. In particular, at particle production rates of about 10 kg/hr, an eight-inch wafer can be coated with a thickness of about 10 microns of powder in approximately one second even at a deposition efficiency of only about 2.5 percent, assuming a powder density of about 10% of the bulk density. A person of ordinary skill in the art can calculate with simple geometric principles any one of the following variables based on one or more of the other variables from the group of a coating rate, the deposition rate, the desired thickness and the density of powder on the substrate.

In particular, apparatus designs based on an actuator arm moving a substrate through the product particle stream within a reaction chamber, as described herein, can straightforwardly move a substrate at rates to coat an entire eight-inch wafer in about 1 second or less. Generally, in embodiments of particular interest that take advantage of the rapid rates achievable, substrates are coated at rates in the range(s) of at least about 0.1 centimeters per second (cm/s), in additional embodiments in the range(s) at least about 0.5 cm/s, in other embodiments in the range(s) at least about 1 cm/s, in further embodiments in the range(s) from about 2 cm/s to about 30 cm/s, and in other embodiments in the range(s) from about 5 cm/s to about 30 cm/s. A person of ordinary skill in the art will recognize that coating rates intermediate between these explicit rates are contemplated and are within the present disclosure.

Particle and Coating Properties

Laser pyrolysis/light reactive deposition is particularly suitable for the formation of highly uniform particles, especially submicron/nanoscale particles. The particles can be collected for further processing, or the particles can be directly deposited onto a substrate to form a particle coating. Small particle size and particle uniformity can contribute overall to the uniformity of the resulting coating, for example, with respect to composition as well as the smoothness of the surface and interfaces between materials. In particular, the lack of particles significantly larger than the average can lead to a more uniform coating.

A collection of particles of interest generally has an average diameter for the primary particles in the range(s) of less than about 2500 nm, in most embodiments in the range(s) less than about 500 nm, in additional embodiments in the range(s) less than about 250 nm, in other embodiments in the range(s) from about 1 nm to about 100 nm, in some embodiments in the range(s) from about 2 nm to about 95 nm, in further embodiments in the range(s) from about 3 nm to about 75 nm, and still other embodiments in the range(s) from about 5 nm to about 50 nm. A person of ordinary skill in the art will recognize that other average diameter ranges within these specific ranges are also contemplated and are within the present disclosure. Particle diameters generally are evaluated by transmission electron microscopy. Diameter measurements on particles with asymmetries are based on an average of length measurements along the principle axes of the particle. In general, a collection of particles, as described herein, has substantially all primary particles that are not fused, i.e., hard bonded to remove a distinct separable interface, although they can be attracted by electrostatic forces, as described below. Powder coatings, which maintain characteristics of the primary particles, are described further above and below.

Particles refer to dispersable units within the collection of particles. Thus, hard fused primary particles collectively form a particle. Primary particles represent distinguishable units in a transmission electron micrograph, which can be hard fused as indicated by necking or the like in the micrograph. The degree of hard fusing can require some effort to evaluate. In particular, the particles can be dispersed in a liquid in which they are insoluble to evaluate how the secondary particle size, i.e., the dispersed particle size, compares with the primary particle size. To the extent that the secondary particle size is approximately equal to the primary particle size, the primary particle have little if any hard fusing is present. In other words, if the primary particles are substantially unfused, the average particle size is approximately equal to the average primary particle size, and the particle size distribution is approximately equal to the primary particle size distribution. The dispersion of the particles in a liquid can involve some empirical adjustment to fully disperse the particles with respect to any soft fusing, which are generally characterized by weak electrostatic interactions. The formation of particle dispersions is described further, for example, in copending U.S. patent application Ser. No. 09/433,202 to Rietz et al., entitled "Particle Dispersions," and in copending U.S. patent application Ser. No. 09/818,141, now U.S. Pat. No. 6,599,631 to Kambe et al., entitled "Polymer-Inorganic Particle Composites," both of which are incorporated by reference.

Depending on the composition of the particles, some particles are more prone to hard fusing than other particles. Laser pyrolysis/light reactive deposition provide a versatile approach for forming unfused particles with a wide range of compositions. In particular, the reactions conditions can be altered to ensure that substantially no hard fusing of the particles occurs. Specifically, the reactant density can be selected to be low enough that substantially no hard particle fusing occurs. The overall reaction conditions can be maintained by the inclusion of inert diluent gas(es) to compensate for the flow changes in the reactant precursors. The reactant nozzle can be further elongated to maintain the desired particle production rate while operating under conditions in which substantially no hard particle fusing occurs. As noted above, the reactant inlet nozzle can be elongated to large lengths while effectively performing laser pyrolysis/light reactive deposition. Thus, high quality substantially unfused particles of desired compositions can be formed at high rates based on the disclosure herein.

The primary particles usually have a roughly spherical gross appearance. Upon closer examination, crystalline particles generally have facets corresponding to the underlying crystal lattice, for crystalline particles. Nevertheless, crystalline primary particles tend to exhibit growth in laser pyrolysis that is roughly equal in the three physical dimensions to give a gross spherical appearance. Amorphous particles generally have an even more spherical aspect. In some embodiments, in the range(s) of about 95 percent of the primary particles, and in some embodiments in the range(s) of about 99 percent, have ratios of the dimension along the major axis to the dimension along the minor axis less than about 2.

A variety of chemical particles, generally solid particles, can be produced by the methods described herein. Solid particles generally are deposited as powders. For some applications, it is desirable to have very uniform particles. Processes using focused radiation are particularly suitable for the formation of highly uniform particles, especially submicron/nanoscale particles. In laser pyrolysis, the collector generally is placed a sufficient distance from the reaction zone such that the particles are well quenched when they reach the collector. If the reaction conditions are controlled appropriately, the primary particles are quenched such that they are formed as independent primary particles with substantially no hard fusing, i.e., non-dispersable fusing, to other primary particles.

Because of their small size, the primary particles tend to form loose agglomerates, following collection, due to van der Waals and other electromagnetic forces between nearby particles. These agglomerates can be dispersed to a significant degree or essentially completely, if desired. Even though the particles may form loose agglomerates, the submicron/nanoscale of the primary particles is clearly observable in transmission electron micrographs of the particles. The particles generally have a surface area corresponding to particles on a submicron/nanoscale as observed in the micrographs. Furthermore, the particles can manifest unique properties due to their small size and large surface area per weight of material. For example, vanadium oxide submicron/nanoscale particles can exhibit substantially high energy densities in lithium batteries, as described in U.S. Pat. No. 5,952,125 to Bi et al., entitled "Batteries With Electroactive Nanoparticles," incorporated herein by reference.

The primary particles can have a high degree of uniformity in size. Laser pyrolysis, as described above, generally results in particles having a very narrow range of particle diameters. Furthermore, heat processing under suitably mild conditions does not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the primary particles generally have a distribution in sizes such that in the range(s) of at least about 80 percent, in other embodiments in the range(s) of at least about 95 percent, and in some embodiments in the range(s) 99 percent, of the primary particles have a diameter greater than about 40 percent of the average diameter and less than about 700 percent of the average diameter. IN further embodiments, the primary particles generally have a distribution in sizes such that in the range(s) of at least about 80 percent, in other embodiments in the range(s) of at least about 95 percent, and in some embodiments in the range(s) 99 percent, of the primary particles have a diameter greater than about 40 percent of the average diameter and less than about 300 percent of the average diameter. In alternative or additional embodiments, the primary particles have a distribution of diameters such that in the range(s) of at least about 95 percent, and in further embodiments in the range(s) 99 percent, of the primary particles have a diameter greater than about 45 percent of the average diameter and less than about 200 percent of the average diameter. A person of ordinary skill in the art will recognize that other ranges within these explicit ranges are contemplated and are within the present disclosure.

Furthermore, in some embodiments no primary particles have an average diameter in the range(s) of greater than about 10 times the average diameter, in some embodiments in the range(s) of greater than about 5 times the average diameter, in further embodiments in the range(s) of greater than about 4 times the average diameter, in additional embodiments in the range(s) of greater than about 3 times the average diameter, and in other embodiment in the range(s) greater than about 2 times the average diameter. A person of ordinary skill in the art will recognize that other ranges of distribution cut-offs within these explicit ranges are contemplated and are within the present disclosure. In other words, the particle size distribution effectively does not have a tail indicative of a small number of particles with significantly larger sizes relative to the average size. This cut-off in the particle size distribution is a result of the small reaction zone and corresponding rapid quench of the particles. An effective cut off in the tail of the size distribution indicates that there are less than about 1 particle in $10^6$ that have a diameter greater than a specified cut off value above the average diameter. In some embodiments, the evaluation of the lack of a tail can be performed with computational analysis of transmission electron microscopy micrographs. Narrow size distributions, lack of a tail in the distributions and the roughly spherical morphology can be exploited in a variety of applications.

In addition, the submicron/nanoscale particles generally have a very high purity level. Furthermore, crystalline submicron/nanoscale particles produced by laser pyrolysis can have a high degree of crystallinity. Certain impurities on the surface of the particles may be removed by heating the particles to temperatures below their sintering temperatures to achieve not only high crystalline purity but high purity overall.

When collecting the particles directly onto a substrate surface, the distance from the substrate to the reaction zone and the temperature of the substrate can be adjusted to control the character of the deposit on the substrate surface. The particles on the surface form a powder coating. The powder coating can be in the form of independent primary particles randomly stacked on the surface. The coating of primary particles may only be held together by electromagnetic forces between adjacent and nearby particles. In some embodiments, it may be desirable to form a powder coating with some degree of hard fusing between primary particles. Fusing between primary particles can be achieved by placing the substrate closer to the reaction zone such that the particles are not fully quenched when they strike the substrate surface and/or by heating the substrate, for example, using a wafer heating apparatus, the flame resulting from the reaction of non-particle producing reactants, and/or the gases emanating from the reaction zone during particle production. Even if the primary particles are hard fused, the resulting powder coating maintains character due to the submicron/nanoscale size of the primary particles. In particular, primary particles incorporated into the powder coating may be visible in scanning electron micrographs. In addition, channels between fused particles generally will reflect the submicron/nanoscale of the surrounding fused particles, e.g., by having submicron/nanoscale diameter channels extending into the powder coating. Thus, the submicron/nanoscale character of the primary particles is built into the resulting powder coating formed from the submicron/nanoscale primary particles.

While submicron/nanoscale particles can in principle pack densely on a surface due to their small size, the particles tend to coat a surface as a loose collection due to electrostatic forces between the particles. The relative or apparent density of the powder coating can depend on the particle size, particle composition and the deposition conditions, which may affect particle fusing as well as the forces between the particles and with the surface. The relative density is evaluated relative to the fully densified material of the same composition. In general, the relative density for the powder coating formed from submicron/nanoscale particles is in the range(s) of less than about 0.6, in other embodiments in the range(s) from about 0.02 to about 0.55 and in further embodiments in the range(s) from about 0.05 to about 0.4. A person of ordinary skill in the art will recognize that additional ranges within these specific ranges are contemplated and are within the present disclosure.

To obtain particular objectives, the features of a coating can be varied with respect to composition of layers of the powders as well as location of materials on the substrate. Generally, to form an optical device the uniform optical material can be localized to a particular location on the substrate. In addition, multiple layers of particles can be deposited in a controlled fashion to form layers with different compositions. Similarly, the coating can be made a uniform thickness, or different portions of the substrate can be coated with different thicknesses of particles. Different coating thicknesses can be applied such as by varying the sweep speed of the substrate relative to the particle nozzle, by making multiple sweeps of portions of the substrate that receive a thicker particle coating or by patterning the layer, for example, with a mask. Approaches for the selective deposition of particles are described above. Alternatively or additionally, a layer can be contoured by etching or the like following deposition either before or after consolidation into a uniform material.

Thus, layers of materials, as described herein, may comprise particular layers that do not have the same planar extent as other layers. For example, some layers may cover the entire substrate surface or a large fraction thereof while other layers cover a smaller fraction of the substrate surface. In this way, the layers can form one or more localized devices. At any particular point along the planar substrate, a sectional view through the structures may reveal a different number of identifiable layers than at other point along the surface. Generally, for optical applications, the particle coatings have a thickness in the range(s) of less than about 500 microns, in other embodiments, in the range(s) of less than about 250 microns, in additional embodiments in the range(s) from about 50 nanometers to about 100 microns and in further embodiments in the range(s) from about 100 nanometers to about 50 microns. A person of ordinary skill in the art will recognize that additional range(s) within these explicit ranges and subranges are contemplated and are encompassed within the present disclosure.

Heat Processing

Significant properties of submicron/nanoscale particles can be modified by heat processing. Suitable starting material for the heat treatment include particles produced by laser pyrolysis. In addition, particles used as starting material for a heat treatment process can have been subjected to one or more prior heating steps under different conditions. For the heat processing of particles formed by laser pyrolysis, the additional heat processing can improve/alter the crystallinity, remove contaminants, such as elemental carbon, and/or alter the stoichiometry, for example, by incorporation of additional oxygen or another element or removal of oxygen or another element to change the oxidation state of a metal/metalloid element. Furthermore, a heat processing process can be used to alter the composition of the particles, for example, by the introduction of another metal/metalloid element into the particles, which can be accompanied by changes in other elements, such as oxygen, also.

In some embodiments of interest, mixed metal/metalloid oxides formed by laser pyrolysis can be subjected to a heat processing step. This heat processing can convert the particles into desired high quality crystalline forms, if not formed in a desired form. The heat treatment can be controlled to substantially maintain the submicron/nanoscale size and size uniformity of the particles from laser pyrolysis. In other words, particle size is not compromised significantly by thermal processing.

The particles can be heated in an oven or the like to provide generally uniform heating. The processing conditions generally are mild, such that significant amounts of particle sintering does not occur. Thus, the temperature of heating preferably is low relative to the melting point of the starting material and the product material.

The atmosphere over the particles can be static, or gases can be flowed through the system. The atmosphere for the heating process can be an oxidizing atmosphere, a reducing atmosphere, a reactive atmosphere (such as $H_2S$ for sulfidation) or an inert atmosphere. In particular, for conversion of amorphous particles to crystalline particles or from one crystalline structure to a different crystalline structure of essentially the same stoichiometry, the atmosphere generally can be inert.

Appropriate oxidizing gases include, for example, $O_2$, $O_3$, CO, $CO_2$, and combinations thereof. The $O_2$ can be supplied as air. Reducing gases include, for example, $H_2$ and $NH_3$. The oxidizing/reducing nature of the gas flow can be adjusted to yield desired oxidation states of metal/metalloid elements in the particles. For example, a reducing atmosphere can be used for the heat treatment of $BaMgAl_{14}O_{23}$ doped with europeum since the europeum is generally supplied in a +3 state while it operates as a phosphor activator in a +2 state. Oxidizing gases or reducing gases optionally can be mixed with inert gases such as Ar, He and $N_2$. When inert gas is mixed with the oxidizing/reducing gas, the gas mixture can include in the range(s) from about 1 percent oxidizing/reducing gas to about 99 percent oxidizing/reducing gas, and more preferably in the range(s) from about 5 percent oxidizing/reducing gas to about 99 percent oxidizing/reducing gas. Alternatively, essentially pure oxidizing gas, pure reducing gas or pure inert gas can be used, as desired. Care must be taken with respect to the prevention of explosions when using highly concentrated reducing gases.

The precise conditions can be altered to vary the type of metal/metalloid oxide particles that are produced. For example, the temperature, time of heating, heating and cooling rates, the surrounding gases and the exposure conditions with respect to the gases can all be selected to produce desired product particles. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

Figure 23:
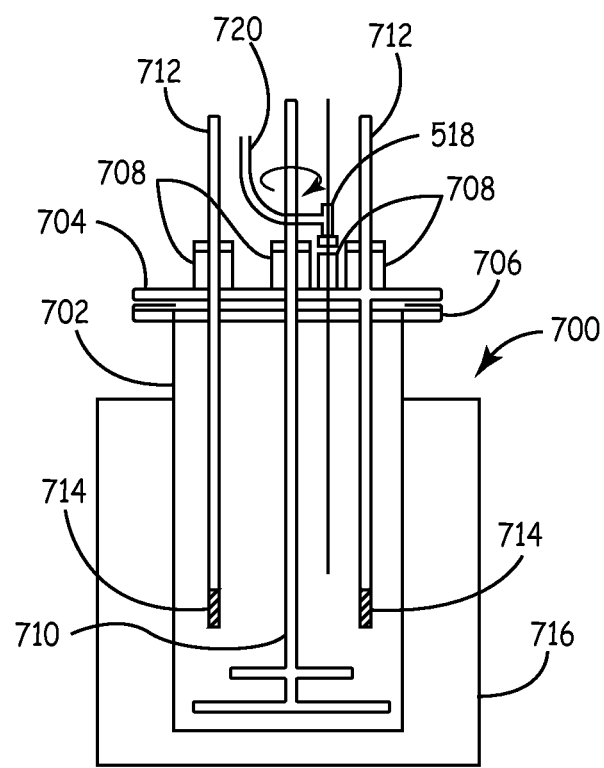
FIG. 23 is a schematic, sectional view of an apparatus for heat treating submicron/nanoscale particles, in which the section is taken through the center of the apparatus.

A variety of ovens or the like can be used to perform the heating. An example of an apparatus 500 to perform this processing is displayed in FIG. 23. Apparatus 700 includes a jar 702, which can be made from glass or other inert material, into which the particles are placed. Suitable glass reactor jars are available from Ace Glass (Vineland, N.J.). For higher temperatures alloy jars can be used to replace the glass jars. The top of glass jar 702 is sealed to a glass cap 704, with a Teflon® gasket 706 between jar 702 and cap 704. Cap 704 can be held in place with one or more clamps. Cap 704 includes a plurality of ports 708, each with a Teflon® bushing. A multi-blade stainless steel stirrer 710 preferably is inserted through a central port 708 in cap 704. Stirrer 710 is connected to a suitable motor.

One or more tubes 712 are inserted through ports 708 for the delivery of gases into jar 702. Tubes 712 can be made from stainless steel or other inert material. Diffusers 714 can be included at the tips of tubes 712 to disperse the gas within jar 702. A heater/furnace 716 generally is placed around jar 702. Suitable resistance heaters are available from Glas-col (Terre Haute, Ind.). One port preferably includes a T-connection 718. The temperature within jar 702 can be measured with a thermocouple 718 inserted through T-connection 718. T-connection 718 can be further connected to a vent 720. Vent 720 provides for the venting of gas circulated through jar 702. Preferably vent 720 is vented to a fume hood or alternative ventilation equipment.

Preferably, desired gases are flowed through jar 702. Tubes 712 generally are connected to an oxidizing/reducing gas source and/or an inert gas source. Oxidizing gas/reducing gas, inert gas or a combination thereof to produce the desired atmosphere is placed within jar 702 from the appropriate gas source(s). Various flow rates can be used. The flow rate preferably is between about 1 standard cubic centimeters per minute (sccm) to about 1000 sccm and more preferably from about 10 sccm to about 500 sccm. The flow rate generally is constant through the processing step, although the flow rate and the composition of the gas can be varied systematically over time during processing, if desired. Alternatively, a static gas atmosphere can be used.

Figure 24:
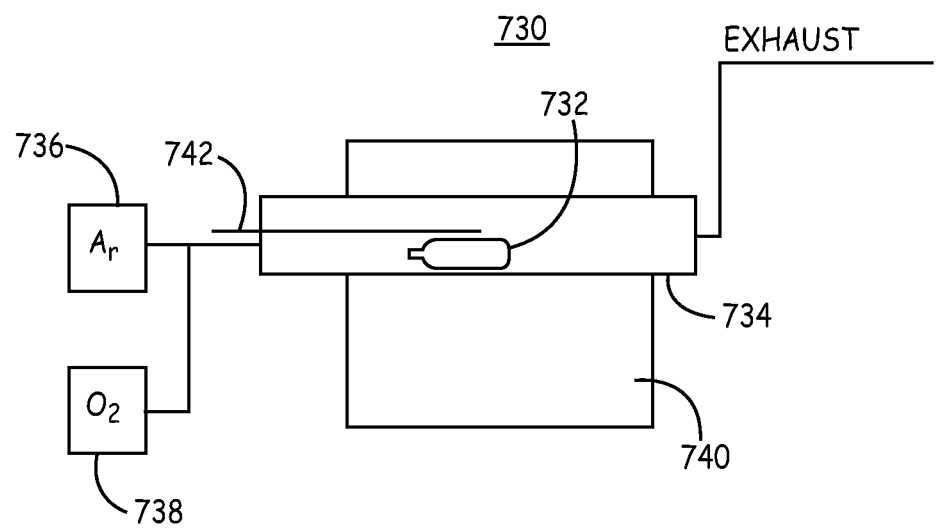
FIG. 24 is a schematic, sectional view of an oven for heating submicron/nanoscale particles, in which the section is taken through the center of a tube.

An alternative apparatus 730 for the heat treatment of modest quantities of submicron/nanoscale particles is shown in FIG. 24. The particles are placed within a boat 732 or the like within tube 734. Tube 734 can be produced from, for example, quartz, alumina or zirconia. Preferably, the desired gases are flowed through tube 734. Gases can be supplied for example from inert gas source 736 or oxidizing gas source 738.

Tube 734 is located within oven or furnace 740. Oven 740 can be adapted from a commercial furnace, such as Mini-Mite™ 1100° C. Tube Furnace from Lindberg/Blue M, Asheville, N.C. Oven 740 maintains the relevant portions of the tube at a relatively constant temperature, although the temperature can be varied systematically through the processing step, if desired. The temperature can be monitored with a thermocouple 742.

For the introduction of a metal/metalloid element into the particles, a composition comprising the metal/metalloid element can be combined with the particles prior to or during the heat treatment. For example, the composition can be combined with the particles as a solution or as a powder. If the composition is applied as a solution, the solvent should not dissolve the particles, and the solvent generally is removed at the initial portion of the heating process. In some embodiments, the additional element(s) can be introduced as a powder of the elemental form of the element, i.e., the un-ionized form of the element. Generally, the composition or elemental powder is mixed with the particles to get even incorporation into the particles.

Suitable temperature ranges depend on the starting material and the target product metal/metalloid oxide. For the processing of many submicron/nanoscale particles, the temperature varies in the range(s) from about 150° C. to about 1400° C. The heating generally is continued for in the range(s) of greater than about 5 minutes, and typically is continued for in the range(s) from about 10 minutes to about 120 hours, in most circumstances in the range(s) from about 10 minutes to about 5 hours. A person of ordinary skill in the art will recognize that other ranges within these explicit temperature and heating time ranges are contemplated and are within the present disclosure. Suitable heating times also depend on the particular starting material and target product as well as the temperature. Some empirical adjustment may be helpful to produce the conditions appropriate for yielding a desired material. Typically, submicron/nanoscale powders can be processed at lower temperatures while still achieving the desired reaction. The use of mild conditions avoids significant interparticle sintering resulting in larger particle sizes. To prevent particle growth, the particles preferably are heated for short periods of time at high temperatures or for longer periods of time at lower temperatures. Some controlled sintering of the particles can be performed at somewhat higher temperatures to produce slightly larger, average particle diameters.

As noted above, heat treatment can be used to perform a variety of desirable transformations for submicron/nanoscale particles. For example, the conditions to convert crystalline $VO_2$ to orthorhombic $V_2O_5$ and 2-D crystalline $V_2O_5$, and amorphous $V_2O_5$ to orthorhombic $V_2O_5$ and 2-D crystalline $V_2O_5$ are describe in U.S. Pat. No. 5,989,514, to Bi et al., entitled "Processing of Vanadium Oxide Particles With Heat," incorporated herein by reference. Conditions for the removal of carbon coatings from metal oxide submicron/nanoscale particles is described in U.S. Pat. No. 6,387,531, entitled "Metal (Silicon) Oxide/Carbon Composite Particles," incorporated herein by reference. The incorporation of lithium from a lithium salt into metal oxide submicron/nanoscale particles in a heat treatment process is described in U.S. Pat. No. 6,136,287 to Home et al., entitled "Lithium Manganese Oxides And Batteries," and copending and commonly assigned U.S. patent application Ser. No. 09/334,203, now U.S. Pat. No. 6,482,374 to Kumar et al., entitled "Reaction Methods for Producing Ternary Particles," both of which are incorporated herein by reference. The incorporation of silver metal into vanadium oxide particles through a heat treatment is described in U.S. Pat. No. 6,225,007 to Home et al., entitled "Metal Vanadium Oxide," incorporated herein by reference. For metal incorporation into vanadium oxide, the temperature is generally about 200° C. to about 500° C. and in other embodiments from about 250° C. to about 375° C.

In addition, metal/metalloid oxide particles can be converted to the corresponding metal/metalloid sulfides by heating the oxide in a sulfurizing atmosphere formed by a $H_2S$ gas atmosphere or a $CS_2$ vapor atmosphere. The metal/metalloid oxides can be heated gently to form the sulfide. Since the sulfides are extremely reactive, the heating can be very gentle, generally less than about 500° C. and alternatively or additionally in the range(s) of less than about 300° C. Suitable concentrations of sulfurizing agent and reaction times can be evaluated empirically by examining the x-ray diffractograms of the resulting materials or by performing an elemental analysis.

Modifying the Composition of Powder Coatings

While the compositions can be selected during deposition by appropriately introducing elements into the reactant stream for particle production, alternatively or additionally, the powder coating composition can be modified following formation of the powder coating. In particular, the techniques used for the modification of particle composition using a heat treatment can be similarly used to modify the composition of powder coatings. The composition modifications of powder coatings may involve introduction of approximately stoichiometric amounts of element(s) and/or dopant(s)/additive(s). Due to the submicron/nanoscale of the primary particles incorporated into the powder coating, the powder coating has a large surface area that facilitates incorporation of the additional element(s) into the initial material. One or more additional elements can be incorporated into the powder coating by a gentle heating, as described above with respect to particles, or into a densified material during consolidation of the powder coating into a uniform material. The additional element(s) can be applied to the powder coating within the reaction chamber or following removal from the reaction/coating chamber. If the element(s) is applied to the powder coating following removal of the coated substrate from the reaction chamber, the additional element(s) can be applied to powder coating directly or using electro-migration deposition. In these approaches, the powder coating can be partly consolidated prior to initiating the composition introduction process to stabilize the coating, generally without removing all of the submicron/nano-structured character of the coating.

Generally, one or more modifying element is applied as a composition comprising the desired element. Any remaining elements in the compositions generally would volatilize during the heating process, although it is possible that oxygen or other non-metal/metalloid elements from the compositions may also incorporate into the powder coating. For example, metal/metalloid nitrates during the heat treatment can involve the incorporation of the metal/metalloid element into the host material and the removal of nitrogen oxides to remove the counter-ions of the composition. The composition can be applied to the powder coating as a solution, an aerosol, and/or as a powder. In general, the use of a solution can facilitate the even spread of the composition through the powder coating by the flow of the solution over and into the powder coating. The concentration of a solution can be selected to contribute to more even distribution of the composition at desired amounts of modification element through the use of a volume of liquid that appropriately wets the powder coating. Surfactants and/or choice of solvent can be used to reduce surface tension and facilitate substantially even spread of the solution. The solvent can be evaporated prior to or during the heat processing of the powder coating to incorporate the modification element into the powder coating. Any surfactants can be selected to volatize during the consolidation step.

The reactant delivery system can be used to apply a composition to a powder coating within a reaction chamber. In particular, the composition comprising the modifying element can be applied within the coating apparatus by spraying a solution of the composition through the reactant inlet such that the composition is applied to all or selected portions of the substrate. The composition comprising the modifying element can be applied, for example, as an aerosol using an aerosol delivery system. The radiation beam can be either turned off during spraying of the composition or turned to a very low power to evaporate a portion of the solvent without reacting the composition. The reactant delivery systems described above can be adapted for the delivery of the unreacted composition. The coating process can be used to apply an approximately even coating onto the powder coating, e.g., by sweeping the substrate through a delivery stream of the solution with the modifying element at a constant rate.

Alternatively, the modifying element can be applied to the powder coating following removal of the powder coating from the reaction/coating chamber. The modifying element can be applied, generally as a composition, as a liquid, aerosol and/or a powder, to the powder coating, for example, by spraying, brushing, dipping or the like. As with solutions applied within the reaction chamber, the concentration and other properties of the solution can be selected to obtain even distribution of the modifying element within the powder coating and/or consolidated material. Dip coating of the powder coating can be a convenient approach for obtaining uniform distribution of composition over the powder coating.

Rather than allowing natural migration of the composition with the modifying element over and through the powder coating, an electric field can be used to drive ions of the modifying element(s) into the host matrix. Specifically, modifying element(s) can be introduced into material using electrophoretic or electro-migration deposition. In this approach, an electric field is used to drive ions into the host matrix of the powder coating. A solution containing the host ions is contacted with the powder coating. Generally, an electrode is placed behind the substrate coating while a counter electrode is placed within the solution. More than one electrode of each type can be used, if desired. If the ions of the modifying element(s) are cations, the anode is placed in the solution and the cathode is placed behind the substrate. The cations are driven toward the cathode. Since the powder coating is located between the cathode and the anode, the ions are driven into the powder coating.

Figure 25:
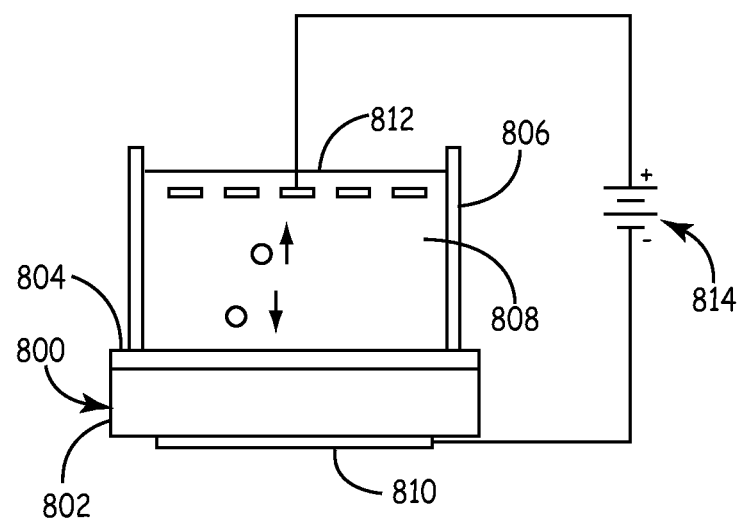
FIG. 25 is a sectional side view of an apparatus for introducing dopant(s)/additive(s) by electro-migration deposition.

An embodiment of an apparatus for performing electro-migration deposition of ions of modifying element(s) into a powder coating is shown in FIG. 25. Coated substrate 800 includes substrate 802 and powder coating 804. Barriers 806 are used to confine dopant/additive solution 808 in contact with powder coating 804. First electrode 810 is placed adjacent substrate 802 while second electrode 812 is placed within solution 808. Electrodes 810 and 812 are connected to an appropriate power source 814, such as a battery or an adjustable power supply connected to line voltage, to apply the electric current/field between the electrodes.

Parameters affecting the electro-migration process include, for example, current density, solution concentration, and doping time. The current can be applied in constant field or in pulses. These parameters can be adjusted to select the deposition rate, concentration of the modifying elements within the powder coating, depth profile of the modifying elements, and uniformity of the deposition of the modifying elements. Due to the submicron/nano-structuring of the powder coating, less clustering of the modifying elements can be expected following the electro-migration deposition. In addition, multiple modifying elements can be simultaneously or sequentially introduced into the powder coating by electro-migration deposition. Multiple elements can be simultaneously introduced by including multiple ions within the solution with concentrations appropriately selected to yield desired amounts of each of the modifying elements. Similarly, multiple modifying elements can be introduced sequentially by changing solutions following deposition of a first modifying element.

Figure 26:
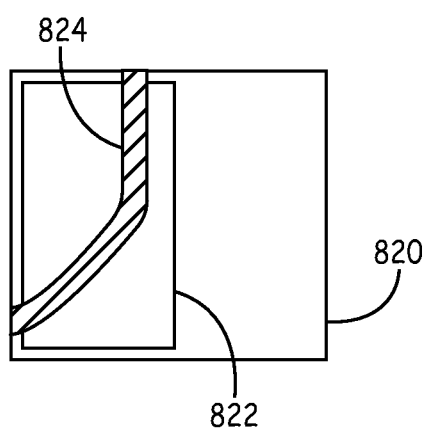
FIG. 26 is a top view of a device configured for electro-migration deposition over a portion of a substrate.

The modifying element, e.g., a dopant(s)/additive(s), can be introduced into a selected portion of the powder coating by selectively contacting the solution with only a portion of the powder coating using solution barriers. Alternatively or additionally, a portion of the powder coating can be covered with a mask, such as conventional resist used in electronic processing, to block migration of the modifying element into the masked regions. Referring to an embodiment in FIG. 26, coated substrate 820 is in contact with barrier 822 confining a solution to a portion of the coated substrate. Furthermore, a portion of coated substrate 820 is covered with a mask 824. In this embodiment, the powder coating is doped in un-masked portions in contact with the solution comprising a modifying element. Masking generally is selected to form desired devices following consolidation of the layers into a uniform material. Multiple modifying elements can be sequentially applied to the same and/or different, although optionally overlapping, portions of a coated substrate by altering the masking between electro-migration deposition of the different modifying elements.

In further embodiments, a composition comprising the desired modifying element, e.g., a dopant(s)/additive(s), is reacted separately in the reaction chamber for coating onto a powder coating. Thus, a separate layer of powder comprising a modifying element can be deposited on top of a host powder. As a particular example, if the host powder is a metal/metalloid oxide, a powder of a modifying metal/metalloid oxide can be formed as a separate powder coating on top of the host powder coating. Upon consolidation, the materials fuse into a uniform composition that can have approximately uniform distribution of modifying element through the material. The amount of powder of the modifying element can be selected to yield the desired levels of the modifying element, e.g., a dopant(s)/additive(s). The coating processes can be repeated to form layers of host powder coating (H) and modifying powder coating (D) in desired proportions—HDHDHD . . . or alternatively HDHDH . . . , with modifying powder coating layers always surrounded by host layers, except if the modified powder coating layer is at the bottom or the top of the multiple layer coating stack where the substrate or surface, respectively, surround one side of the modified layer. Of course, in forming a single host or modifying powder coating layer in some embodiments, multiple coating passes can be used in the coating apparatus with each pass involving a sweep of a substrate through the reactant/product stream. The number of alternating layers can be selected to yield the desired total thickness and modifying element distribution. In particular, thinner host layers and corresponding modifying powder coating layers may result in a more uniform distribution of modifying element within the final consolidated material. In general, the alternating layers comprise at least one host layer and one modifying powder coating layer and in some embodiments in the range(s) of less than about 50 host layers and less than about 50 modifying powder coating layers and in further embodiment in the range(s) from 3 host layers and 2 modifying powder coating layers to less than about 25 host layers and less than about 25 modifying powder coating layers. A person of ordinary skill in the art will recognize that other ranges within these explicit ranges are contemplated and are within the present disclosure. As noted above, a periodic variation in index-of-refraction, such as through a composition variation, can be used to form photonic band gap materials.

In general, the various approaches for introducing a modifying element into a powder coating can be combined for the introduction of one or more than one modifying element into a powder coating and, in some embodiments, an ultimate consolidated material. In particular, a method for introducing one or more modifying elements, such as a dopant(s)/additive(s), during formation of a powder coating and methods for introducing modifying elements following deposition of a powder coating are described above. For example, a particular modifying element can be introduced using a plurality of techniques to achieve desired levels of modifying element and/or distributions of modifying element within the powder coating and/or consolidated material. In addition, for the deposition of a plurality of modifying elements, each modifying element can be deposited using one or more of the techniques described above, for convenience of processing and/or to achieve desired properties of the resulting consolidated materials.

Consolidation to Form Optical Materials

Heat treatment can sinter the particles and lead to compaction, i.e., densification, of the powders to form the desired material density, such as an optical material. This sintering of the particles is generally referred to as consolidation. The completely consolidated or densified material is generally a uniform material, i.e., it is generally not a porous network, although there can be random imperfections in the uniformity of the material. A partially consolidated or densified material is one in which the pore network remains but the pore size has been reduced and the solid matrix strengthened through the fusing of particles to form rigid interparticle necks. To consolidate, i.e., densify, the optical materials, the materials can be heated to a temperature above the melting point for crystalline materials or the flow temperature for amorphous materials, e.g., above the glass transition temperature and possibly above the softening point below which a glass is self-supporting, to consolidate the coating into a densified material. Consolidation can be used to form amorphous, crystalline or polycrystalline phases in layers. These layers can be completely or partially densified. In general, consolidation can be performed before or after patterning of a layer. A preliminary heat treatment can be applied with the reactor flame to reduce dopant(s)/additive(s) migration during the consolidation process and to partly densify the material. Using the techniques described herein, doped glasses can be formulated into planar optical devices.

Generally, the heating is performed under conditions to lower the viscosity of the material to promote flow. To form the viscous liquid, crystalline particles are heated above their melting point and amorphous particles are heated above their glass transition temperature. Because of the high viscosity, the material generally does not flow significantly on the substrate surface, although small gaps may fill in. Processing at higher temperatures to reduce the viscosity of the melt can result in undesirable melting of the substrate, migration of compositions between layers or in flow from a selected area of the substrate. The heating and quenching times can be adjusted to change the properties of the consolidated coatings, such as density. While the final consolidated material may be uniform, the density of the material may vary slightly depending on the processing conditions. In addition, heat treatment can remove undesirable impurities and/or change the stoichiometry and crystal structure of the material, as described further above with respect to modification of composition using heat treatment.

Following deposition of the powder layer, the precursors can be shut off such that the reactant stream only comprises a fuel and an oxygen source that reacts to form gaseous/vapor products without particles. The flame resulting from the reaction of the fuel and oxygen source can be used to heat the coated substrate without depositing any additional materials on the substrate. Such a heating step is observed to reduce dopant(s)/additive(s) migration upon full consolidation of a doped silica glass. A flame heating step can be performed between coating steps for several layers or after deposition of several layer, in which each coating layer may or may not have the same composition as other layers. Generally, after a desired number of layers or quantity of material is deposited, a final consolidating heat treatment is performed to fully consolidate the material. In forming a coating with a uniform composition, one or more layers of particles with the same composition can be deposited. All of the layers can be deposited prior to any consolidation or partial consolidation, e.g., with a flame, or complete or partial consolidation can be performed after each layer or subset of layers formed with particles having the same composition. After final consolidation, a layer formed with particles of a uniform composition can have some variation in dopant/additive concentration(s) through the thickness of the material due to migration of dopant(s)/additive(s) during the consolidation process.

Suitable processing temperatures and times generally depend on the composition of the particles. Small particles on the submicron/nanometer scale generally can be processed at lower temperatures and/or for shorter times relative to powders with larger particles due to lower melting points for the submicron/nanoscale particles in comparison with bulk material. However, it may be desirable to use a comparable melting temperature to obtain greater surface smoothness from improved melting of the submicron/nanoscale particles.

For the processing of silicon oxide submicron/nanoscale particles, the particle coatings can be heated to a temperature in the range(s) from about 800° C. to 1700° C., although with silicon substrates the upper limit can be about 1350° C. Higher temperatures can be reached with appropriate ceramic substrates. Dopant(s)/additive(s) in the silicon oxide particles can lower the appropriate consolidation temperatures. Thus, the dopant(s)/additive(s) can be selected to flow into a uniform optical material at a lower temperature. Suitable dopant(s)/additive(s) to lower the flow temperature when placed into silicon oxide ($SiO_2$) include, for example, boron, phosphorous, germanium, fluorine, germanium, aluminum, sodium, calcium, and combinations thereof. The amount and composition of one or more dopants/additives can be selected to yield a desired flow temperature for consolidation and index-of-refraction of the consolidated optical material.

Heat treatments can be performed in a suitable oven. It may be desirable to control the atmosphere in the oven with respect to pressure and/or the composition of the gases. Suitable ovens comprise, for example, an induction furnace, a box furnace or a tube furnace with gas(es) flowing through the space containing the coated substrate. The heat treatment can be performed following removal of the coated substrates from the coating chamber. In alternative embodiments, the heat treatment is integrated into the coating process such that the processing steps can be performed sequentially in the apparatus in an automated fashion.

For many applications, it is desirable to apply multiple particle coatings with different compositions. In general, these multiple particle coatings can be arranged adjacent to each other across the x-y plane of the substrate being coated (e.g., perpendicular to the direction of motion of the substrate relative to the product stream), or stacked one on top of the other across the z plane of the substrate being coated, or in any suitable combination of adjacent domains and stacked layers. Each coating can be applied to a desired thickness.

For some embodiments, different compositions can be deposited adjacent to each other and/or in alternating layers. Similarly, distinct layers of different compositions can be deposited in alternating layers. Specifically, two layers with different compositions can be deposited with one on top of the other, and or additionally or alternatively, with one next to the other, such as layer A and layer B formed as AB. In other embodiments, more than two layers each with different compositions can be deposited, such as layer A, layer B and layer C deposited as three sequential (e.g., stacked one on top of the other, or adjacent to the other, or adjacent and stacked) layers ABC. Similarly, alternating sequences of layers with different compositions can be formed, such as ABABAB . . . or ABCABCABC . . . . Other combinations of layers can be formed as desired.

Individual uniform layers, each of a particular composition, generally have after consolidation an average thickness in the range(s) of less than 100 microns, in many embodiments in the range(s) from about 0.1 micron to about 50 microns, in other embodiments in the range(s) from about 0.2 microns to about 20 microns. A person of skill in the art will recognize that ranges within these specific ranges are contemplated and are within the scope of the present disclosure. Each uniform layer formed from particles with the same composition can be formed from one or more passes through a product flow in a light reactive deposition apparatus. Thickness is measured perpendicular to the projection plane in which the structure has a maximum surface area.

The material with multiple particle coatings can be heat treated after the deposition of each layer or following the deposition of multiple layers or some combination of the two approaches. The optimal processing order generally would depend on the melting point of the materials. Generally, however, it is desirable to heat treat and consolidate a plurality of layers simultaneously. Specifically, consolidating multiple layers simultaneously can reduce the time and complexity of the manufacturing process and, thus, reduce manufacturing costs. If the heating temperatures are picked at reasonable values, the melted materials remain sufficiently viscous that the layers do not merge undesirable amounts at the interface. Slight merging of the layers generally does not affect performance by unacceptable amounts. By changing reaction conditions, such as precursor flow or total gas flow, particles can be deposited with changing particle size in the z-direction within a single layer or between layers. Thus, smaller particles can be deposited on top of larger particles. Since the smaller particles generally soften at lower temperatures, the consolidation of the upper layer can be less likely to damage the lower layers during the consolidation step. To form patterned structures following deposition, patterning approaches, such as lithography and photolithography, along with etching, such as chemical etching, dry etching or radiation-based etching, can be used to form desired patterns in one or more layers. This patterning generally is performed on a structure prior to deposition of additional material. Patterning can be performed on particle layers or consolidated layers.

EXAMPLES

While the emphasis herein is on the high rate production of particles, the following examples demonstrate the ability to generate particles over a range of rates. The examples however demonstrate the ability of using laser pyrolysis with or without additional processing to generate a range of inorganic particle compositions. Using the description herein, the processes of the examples can be scaled up to higher production rates, over the ranges specified. In general, the scale up is performed to maintain equivalent reaction conditions such that comparable product particles are produced. In particular, the chamber pressure, laser intensity, reactant density in the reaction zone and flow rate can be adjusted to match the conditions of a particular example at a particular flow rate. The reactant inlet can be increased in length to generate the desired overall reactant flow rate and particle production rate. Further descriptions of nozzle designs are found in copending U.S. patent application Ser. No. 10/119,645, now U.S. Pat. No. 6,919,054 to Gardner et al., entitled "Reactant Nozzles Within Flowing Reactors," incorporated herein by reference.

Example 1

Single Phase $V_2O_5$

The synthesis of $V_2O_5$ described in this example was performed by laser pyrolysis. The $VOCl_3$ (Strem Chemical, Inc., Newburyport, Mass.) precursor vapor is carried into the reaction chamber by bubbling Ar gas through the $VOCl_3$ liquid stored in a container at room temperature. The reactant gas mixture containing $VOCl_3$, Ar, $O_2$ and $C_2H_4$ is introduced into the reactant gas nozzle for injection into the reactant chamber. The reactant gas nozzle had an opening with dimensions as specified in Table 1. $C_2H_4$ gas acts as a laser absorbing gas. Argon was used as an inert gas.

The synthesized vanadium oxide nanoscale particles can be directly handled in the air. The production rate was typically about 5-10 g/hour of nanoparticles. Based on the teachings herein both above and in this example, the particles described in this example can be produced with equivalent properties in appropriate apparatuses and at appropriate conditions at rates in the range(s) of at least about 35 grams per hour and at higher rates described above. The samples were subsequently examined by transmission electron microscopy (TEM) to determine particle sizes and by x-ray diffraction to evaluate the composition and structure.

Using laser pyrolysis, both amorphous $V_2O_5$ and 2-D crystalline $V_2O_5$ have been produced. Representative reaction conditions used to produce these particles are described in the following table.

TABLE 1

| Phase | $V_2O_5$ | $V_2O_5$ | $V_2O_5$ | $V_2O_5$ |
| --- | --- | --- | --- | --- |
| Crystal Structure | Amorphous | Amorphous | Amorphous | 2D Crystal |
| Battery Capacity (mAh/g) | 182 | | | 146 |
| Pressure (Torr) | 135 | 142.5 | 110 | 300 |
| Argon-Win. (sccm) | 700 | 700 | 700 | 700 |
| Argon-Sld. (slm) | 0.98 | 0.98 | 2.1 | 1.12 |
| Ethylene (sccm) | 603 | 1072 | 173 | 268 |
| Carrier Gas (sccm) | 116(Ar) | 676(Ar) | 140(Ar) | 676(Ar) |
| Oxygen (sccm) | 284 | 642 | 88 | 400 |
| Laser Output (watts) | 180 | 215 | 150 | 67 |
| Nozzle Size | ⅝" × 1/16" | ⅝" × 1/16" | ⅝" × ⅛" | ⅝" × 1/16" | sccm = standard cubic centimeters per minute
slm = standard liters per minute
Argon-Win. = argon flow through inlets 216, 218
Argon-Sld. = argon flow through annular channel 142

Figure 27:
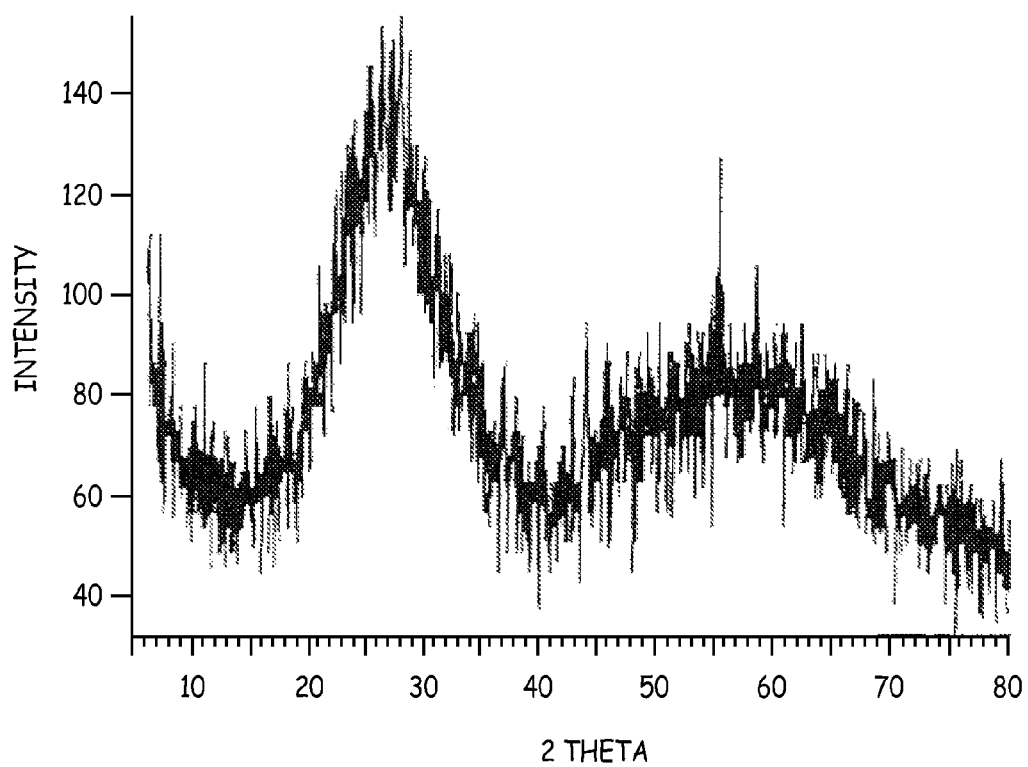
FIG. 27 is an x-ray diffractogram of amorphous $V_2O_5$ nanoparticles.
Figure 28:
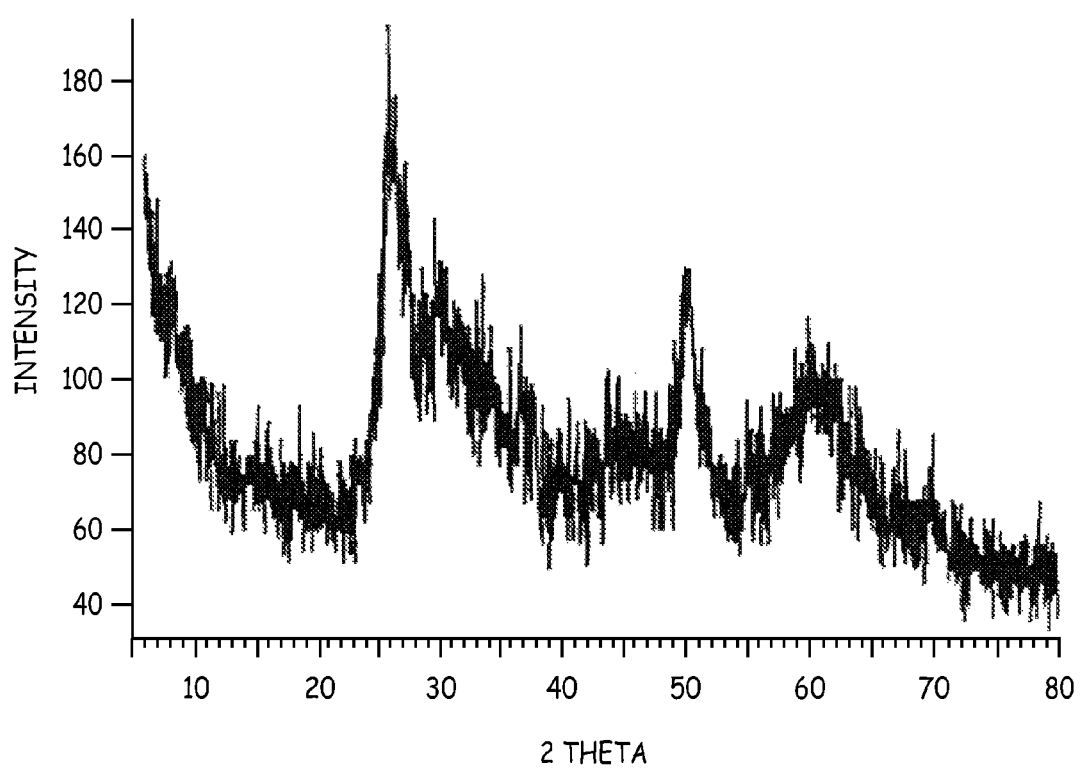
FIG. 28 is an x-ray diffractogram of 2-D crystals of $V_2O_5$ nanoparticles.
Figure 29:
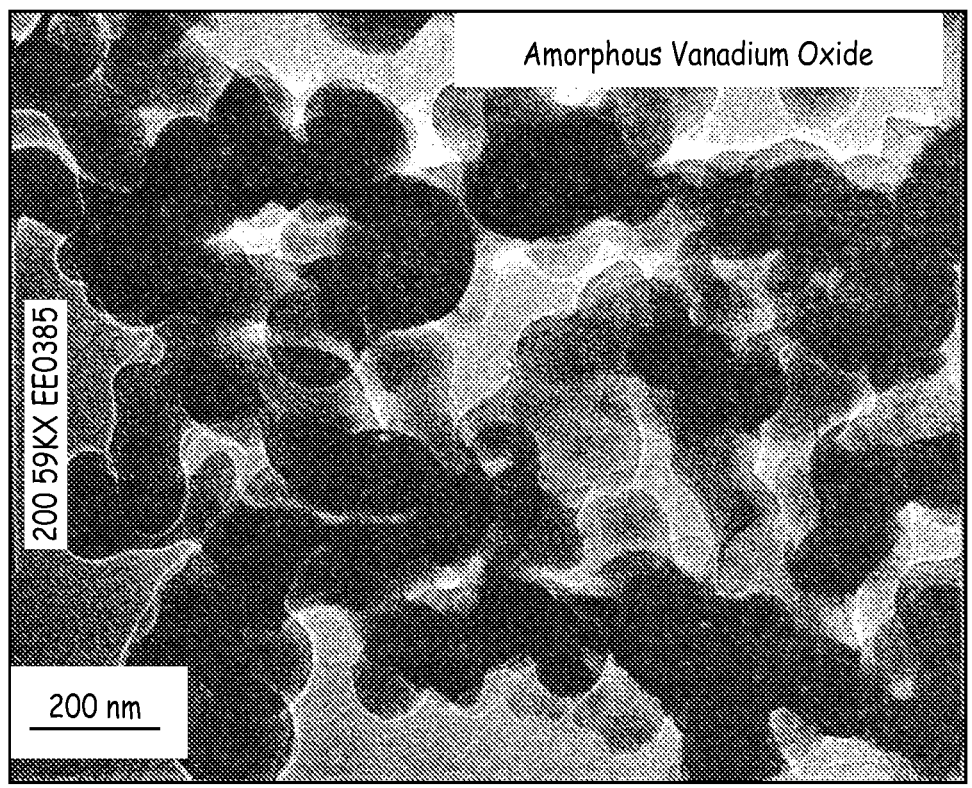
FIG. 29 is a transmission electron microscope view of amorphous $V_2O_5$ nanoparticles.

Representative x-ray diffractograms for amorphous $V_2O_5$ and 2-D $V_2O_5$ are shown in FIGS. 27 and 28, respectively. The x-ray diffractograms were obtained using Cu(Kα) radiation line on a Siemens D500 x-ray diffractometer. Referring to FIG. 27, the broad peaks centered around 2Θ~28 degrees and 58 degrees are typical of amorphous phase of vanadium oxide. See, U.S. Pat. No. 4,675,260. The amorphous nature of the sample is confirmed by transmission electron microscopy examination as shown in FIG. 29. The TEM micrograph shows a material that has disordered atomic arrangement.

The diffractogram in FIG. 28 corresponds to a recently reported 2-D crystal structure for $V_2O_5$.

Example 2

Single Phase $VO_2$

These particles were produced using a similar laser pyrolysis set up as described in Example 1. The reactant gas nozzle had dimensions ⅝ in×1/16 in. For the production of $VO_2$, $C_2H_4$ was bubbled through the $VOCl_3$ liquid precursor at room temperature. Representative reaction conditions for the production of this material are described in Table 2.

TABLE 2

| Phase | $VO_2$ | $VO_2$ | $VO_{1.27}$ |
| --- | --- | --- | --- |
| Crystal Structure | Monoclinic | Monoclinic | Tetragonal |
| Battery Capacity (mAh/g) | 249 | | 118.4 |
| Pressure (Torr) | 320 | 127 | 200 |
| Argon-Win (sccm) | 700 | 700 | 700 |
| Argon-Sld. (slm) | 5.6 | 0.98 | 2.8 |
| Ethylene (sccm) | 460 | 268 | 402 |
| Carrier Gas (sccm) | 460(Ethyl.) | 676(Ar) | 402(Ethyl.) |
| Oxygen (sccm) | 36 | 200 | 196 |
| Laser Output (watts) | 96 | 220 | 100 |

Figure 30:
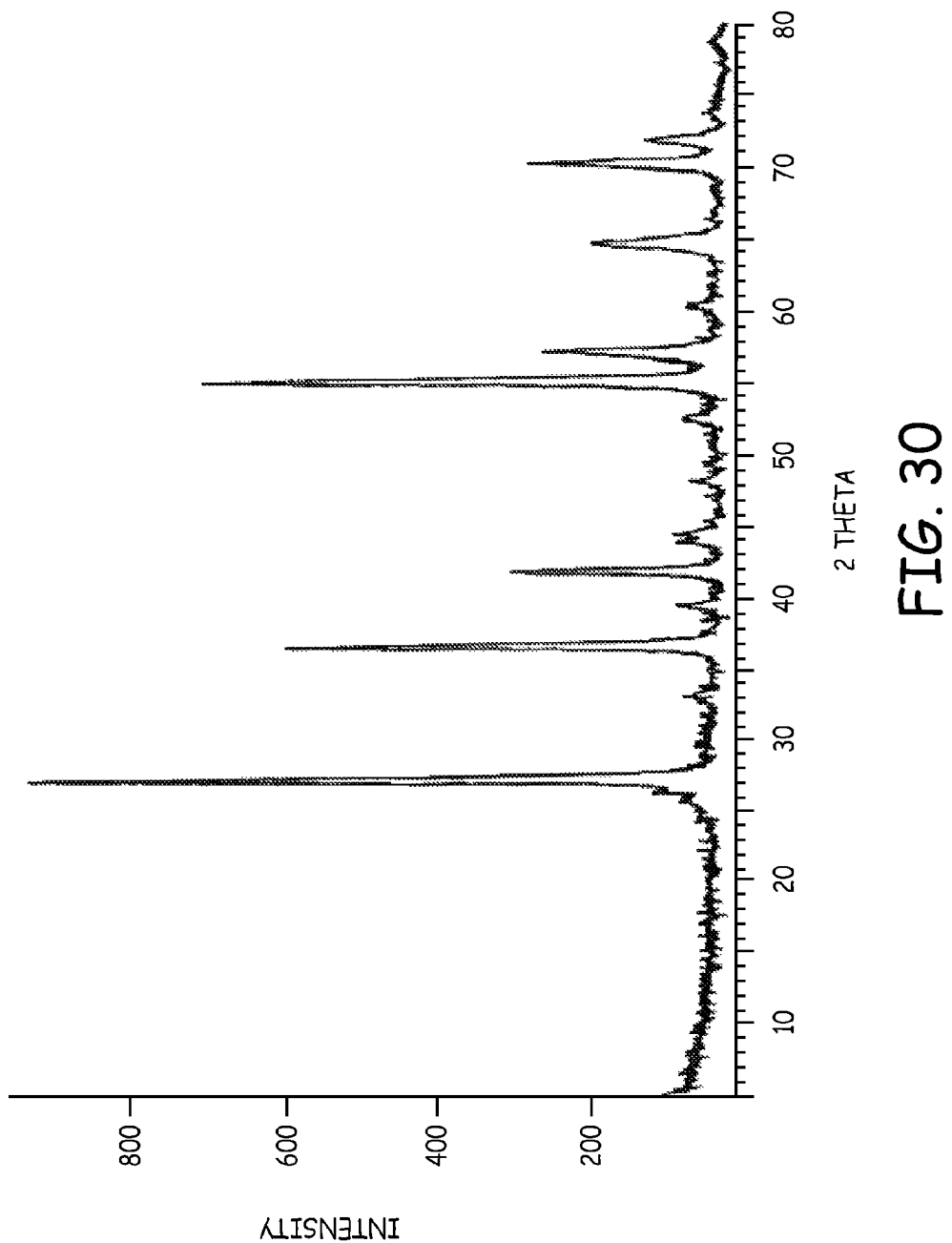
FIG. 30 is an x-ray diffractogram of crystalline $VO_2$ nanoparticles.

An x-ray diffractogram of representative product nanoparticles is shown in FIG. 30. Clear diffraction peaks corresponding to a monoclinic crystalline structure are visible. The identified structure from the diffractogram is almost identical to that of the corresponding bulk material, which has larger particle sizes. Therefore, the novel nanoparticle materials have distinct properties while maintaining the same crystalline lattice of the bulk material. Based on the teachings herein both above and in this example, the particles described in this example can be produced with equivalent properties in appropriate apparatuses and at appropriate conditions at rates in the range(s) of at least about 35 grams per hour and at higher rates described above.

Figure 31:
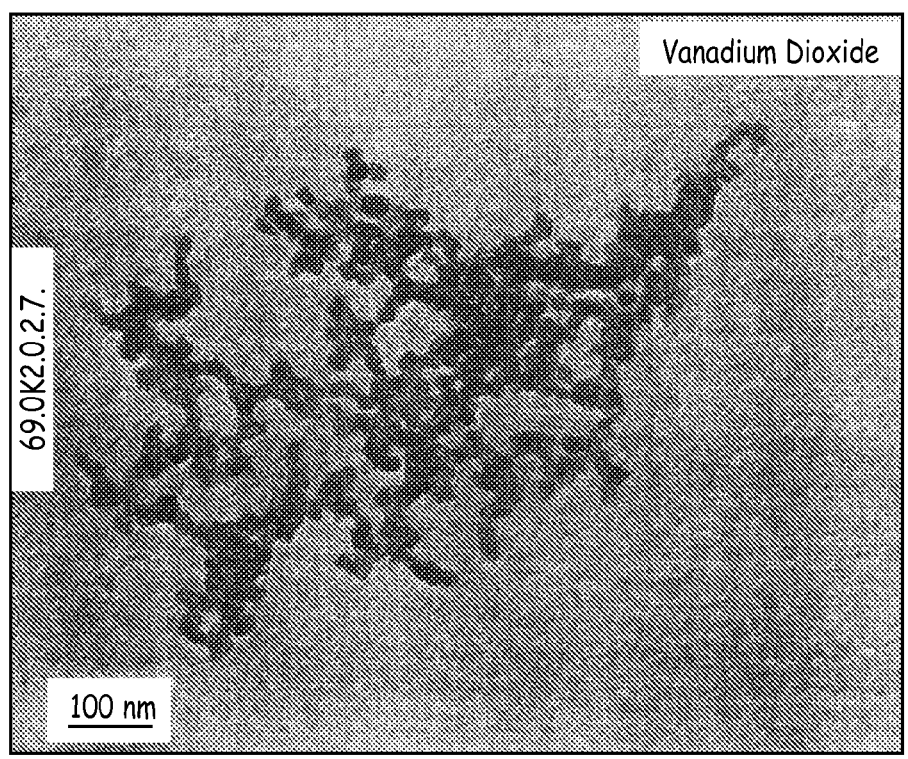
FIG. 31 is a transmission electron microscope view of crystalline $VO_2$ nanoparticles at higher magnification.
Figure 32:
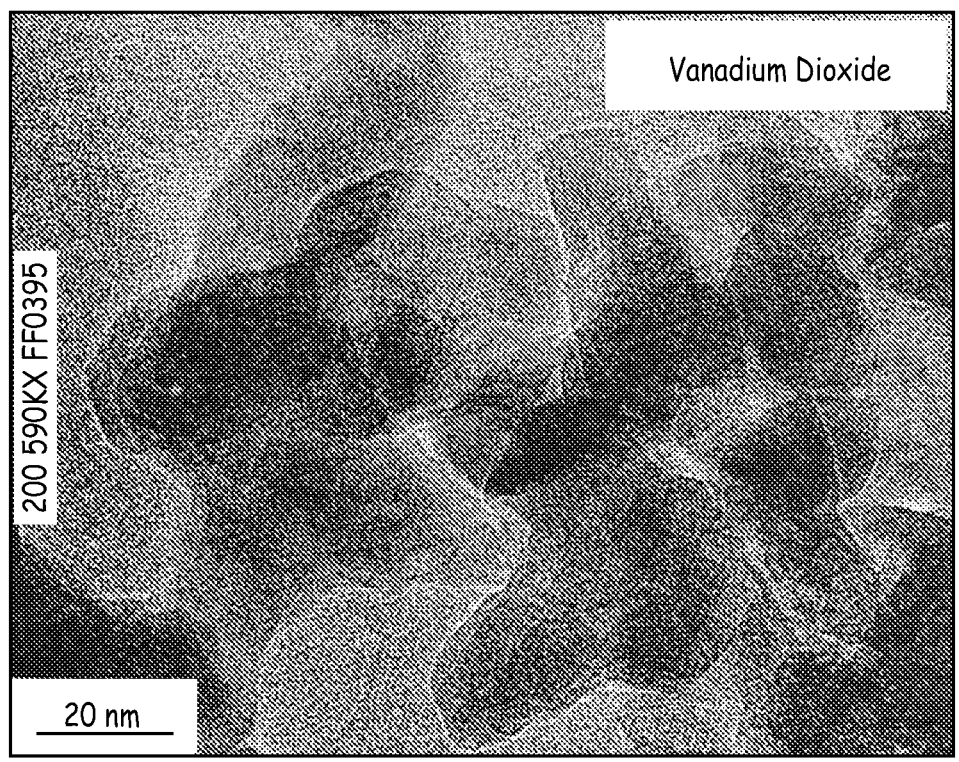
FIG. 32 is a transmission electron microscope view of crystalline $VO_2$ nanoparticles at lower magnification.
Figure 33:
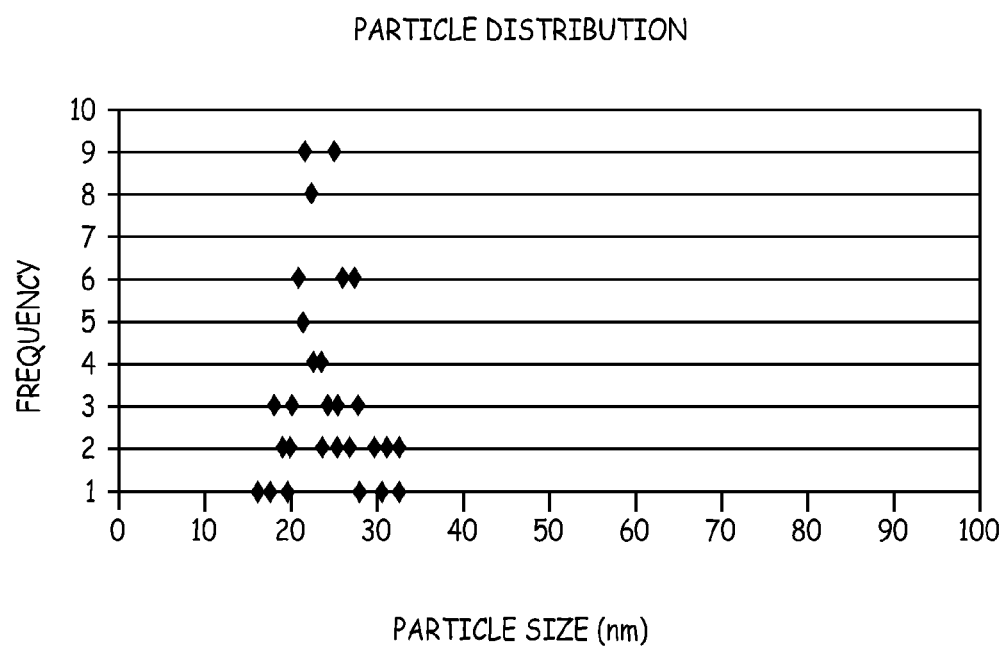
FIG. 33 is a plot depicting the distribution of particle sizes for the crystalline $VO_2$ nanoparticles depicted in FIGS. 31 and 32.

TEM photos at both high and low magnifications were obtained of representative nanoparticles with similar x-ray diffraction patterns, as shown in FIGS. 31 and 32. An approximate size distribution was determined by manually measuring diameters of the particles shown in FIG. 32. The distribution of diameters is shown in FIG. 33. An average particle size of about 22 nm was obtained. Only those particles showing clear particle boundaries were measured and recorded to avoid regions of distorted in the micrograph. This should not bias the measurements obtained since the single view of the micrograph may not show a clear view of all particles because of the orientation of the crystals. It is significant that the particles span a rather narrow range of sizes. In this case, the largest to the smallest particles differ by no more than about 15 nm. Crystallinity of the particles is confirmed in FIG. 31 where the underlying lattice structure is visible.

Example 3

Single Phase $VO_{1.27}$

The experimental arrangement for the production of $VO_{10.27}$ is the same as that described in Example 2. Representative conditions used to produce these particles are given in Table 2, above. Based on the teachings herein both above and in this example, the particles described in this example can be produced with equivalent properties in appropriate apparatuses and at appropriate conditions at rates in the range(s) of at least about 35 grams per hour and at higher rates described above.

Figure 34:
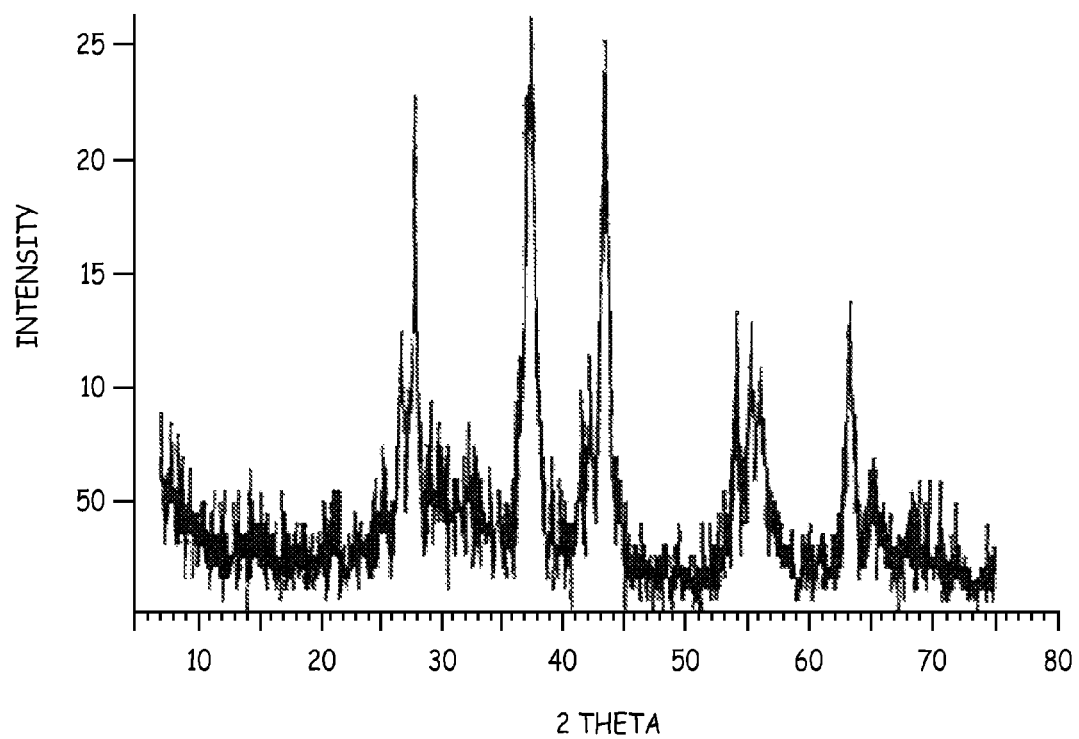
FIG. 34 is an x-ray diffractogram of crystalline $VO_{1.27}$ nanoparticles.

The x-ray diffractogram for this material is shown in FIG. 34, and is characteristic of crystalline $VO_{1.27}$ material.

Example 4

$V_6O_{13}/VO_2$ Mixed Phase Material

The experimental configuration was the same as described with respect to Example 1. The reactant gas nozzle had dimensions ⅝ in×⅛ in. The particular experimental parameters are given in Table 3.

TABLE 3

| Phase | $V_6O_{13} + VO_2$ | $V_6O_{13} + VO_2$ | $VO_2 + V_2O_3$ |
|---|---|---|---|
| Crystal Structure | Monoclinic | Monoclinic | |
| Pressure (Torr) | 110 | 110 | 410 |
| Argon-Win (sccm) | 700 | 700 | 700 |
| Argon-Sld. (slm) | 2.1 | 2.1 | 11.2 |
| Ethylene (sccm) | 173 | 209 | 460 |
| Carrier Gas (sccm) | 140(Ar) | 140(Ar) | Ethylene |
| Oxygen (sccm) | 88 | 88 | 36 |
| Laser Output (watts) | 192 | 100 | 90 |

Figure 35:
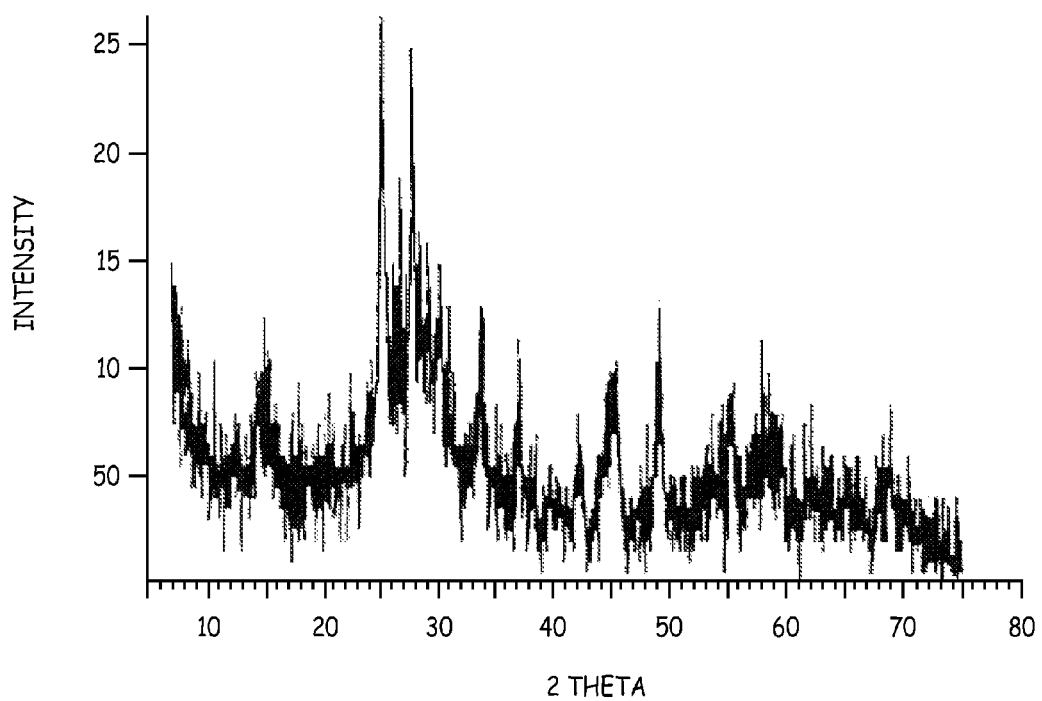
FIG. 35 is an x-ray diffractogram of $V_6O_{13}/VO_2$ mixed phase nanoparticles.

A characteristic x-ray diffractogram of the nanoparticles is shown in FIG. 35. The diffractogram contains a combination of peaks identifiable with both crystalline $V_6O_{13}$ and crystalline $VO_2$. Both types of crystals are monoclinic. The $V_6O_{13}$ phase is the majority phase. Appropriate reaction conditions should yield single phase $V_6O_{13}$. Based on the teachings herein both above and in this example, the particles described in this example can be produced with equivalent properties in appropriate apparatuses and at appropriate conditions at rates in the range(s) of at least about 35 grams per hour and at higher rates described above.

Example 5

$VO_2/V_9O_3$ Mixed Phase Material

Figure 36:
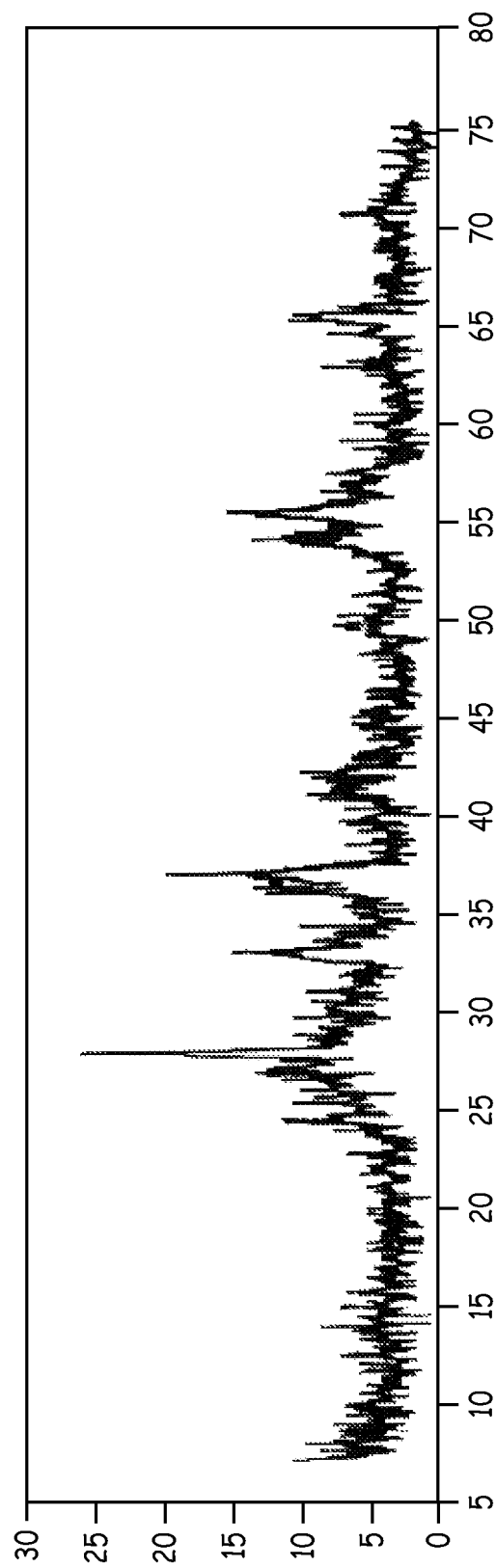
FIG. 36 is an x-ray diffractogram of $VO_2/V_2O_3$ mixed phase nanoparticles.

The experimental configuration was the same as described with respect to Example 4. The reactant gas nozzle had dimensions ⅝ in×1/16 in. Representative experimental parameters to produce these particles are given in Table 3, above. The x-ray diffractogram is shown in FIG. 36. The diffractogram contains a combination of peaks identifiable with both crystalline $VO_2$ and crystalline $V_2O_3$. Note that the conditions for the production of these particles involves a reduced amount of $O_2$ relative to the other gases in the reactant stream. Based on the teachings herein both above and in this example, the particles described in this example can be produced with equivalent properties in appropriate apparatuses and at appropriate conditions at rates in the range(s) of at least about 35 grams per hour and at higher rates described above.

Example 6

Crystalline $V_9O_5$—Oven Processed

Figure 37:
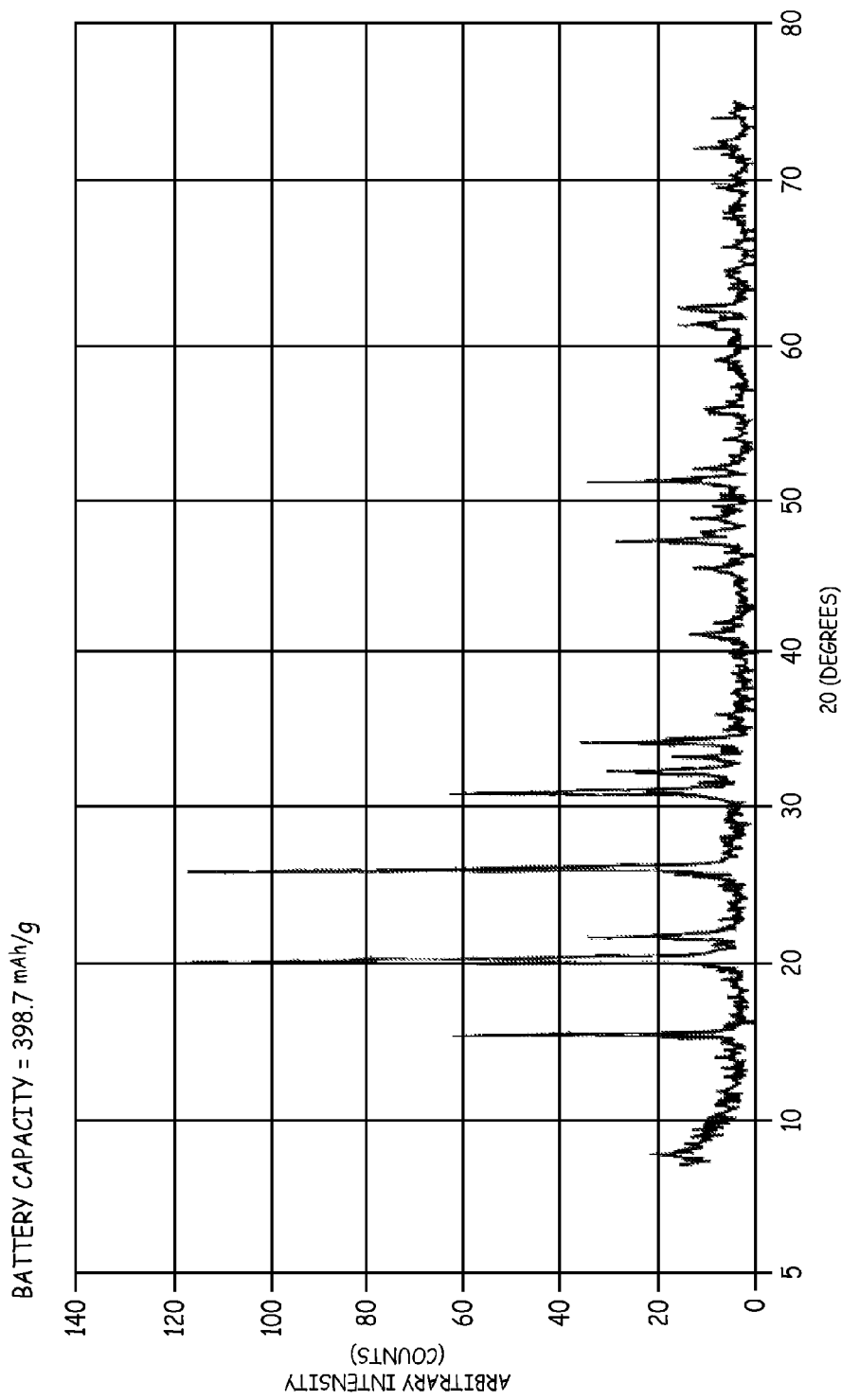
FIG. 37 is an x-ray diffractogram of single phase crystalline $V_2O_5$ nanoparticles.

A first sample of crystalline $V_9O_5$ was produced from amorphous $V_2O_5$ by baking the amorphous particles in an oven for 16.0 hours. The amorphous $V_2O_5$ starting material was produced by laser pyrolysis according to the parameters in the second column of Table 1. The oven was set at a temperature of 202° C. Oxygen gas flowed through a 1.0 in. diameter quartz tube at a flow rate of 105.6 sccm. Between about 100 and about 300 mg of nanoparticles were placed within an open 1 cc vial within the tube in the oven. The resulting nanoparticles were single phase crystalline $V_2O_5$ nanoparticles. The corresponding x-ray diffractogram is presented in FIG. 37.

A second sample of crystalline $V_2O_5$ were made from crystalline $VO_2$ using the same starting materials. The starting materials were crystalline $VO_2$ nanoparticles produced by laser pyrolysis using the conditions specified in the second column of Table 2. The second sample was treated in an oven under the same conditions as the first sample.

Figure 38:
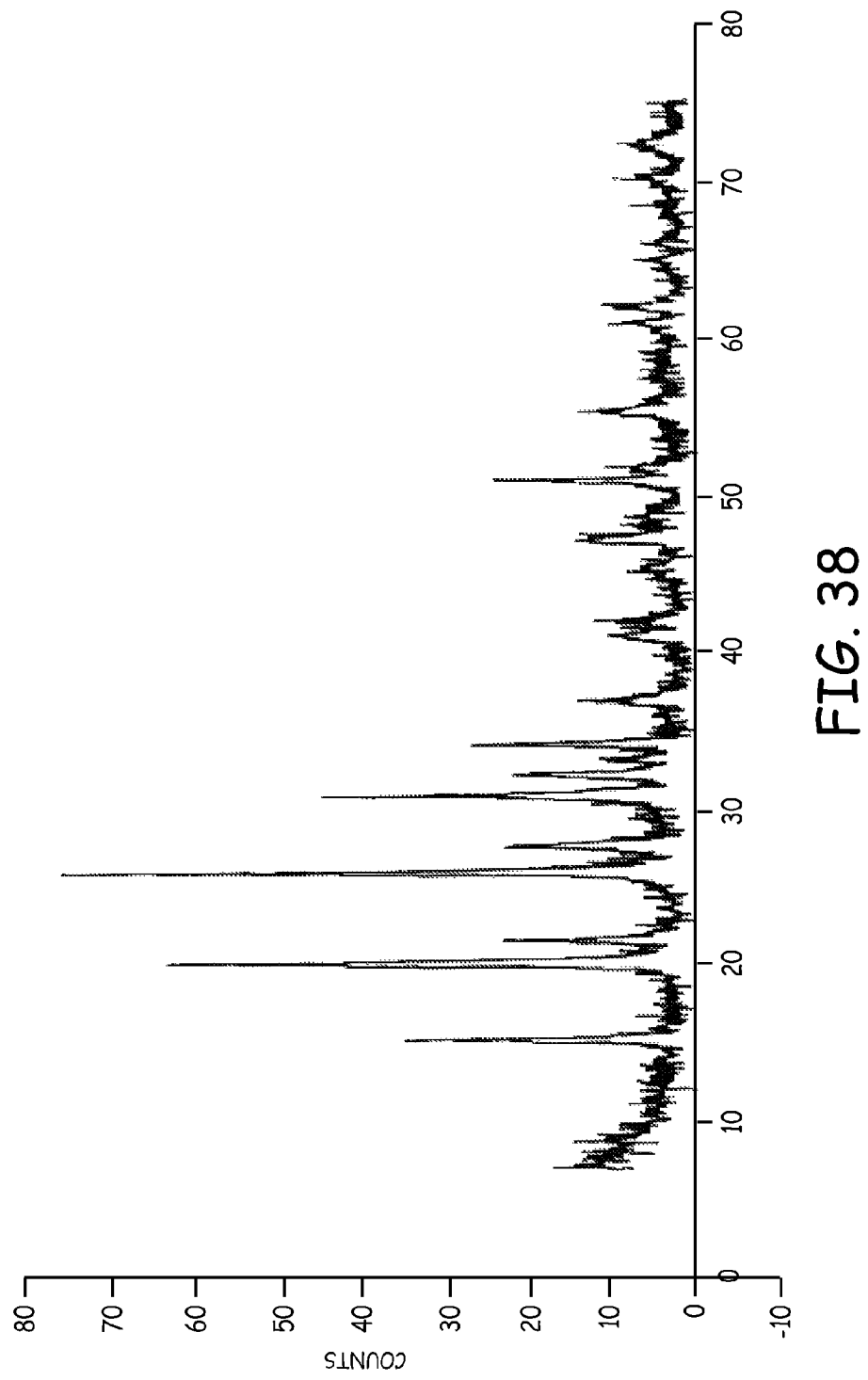
FIG. 38 is an x-ray diffractogram of single phase crystalline $V_2O_5$ nanoparticles produced using different starting materials than used to produce the particles which generated the diffractogram in FIG. 37.

The resulting nanoparticles for the second sample were single phase $V_2O_5$. These had a smaller average diameter than the particles from the first sample because of the smaller size of the starting nanoparticles used to produce the second sample. An x-ray diffractogram for the second sample is shown in FIG. 38. Based on the teachings herein both above and in this example, the particles described in this example can be produced with equivalent properties in appropriate apparatuses and at appropriate conditions at rates in the range(s) of at least about 35 grams per hour and at higher rates described above.

Example 7

Laser Pyrolysis for Formation of Amorphous $SiO_x$

The synthesis of silicon oxide particles described in this example was performed by laser pyrolysis. The particles were produced using essentially the laser pyrolysis apparatus of FIG. 1, described above.

The silicon tetrachloride (Strem Chemical, Inc., Newburyport, Mass.) precursor vapor was carried into the reaction chamber by bubbling Ar gas through SiCl$_4$ liquid in a container at room temperature. C$_2$H$_4$ gas was used as a laser absorbing gas, and Argon was used as an inert gas. The reaction gas mixture containing SiCl$_4$, Ar, O$_2$ and C$_2$H$_4$ was introduced into the reactant gas nozzle for injection into the reaction chamber. The reactant gas nozzle had an opening with dimensions as specified in the last row of Table 4. Additional parameters of the laser pyrolysis synthesis relating to the particles also are specified in Table 4.

TABLE 4

|  | Sample | | | |
| --- | --- | --- | --- | --- |
|  | 1 | 2 | 3 | 4 |
| Crystal Structure | Amorphous | Amorphous | Amorphous | Amorphous |
| Pressure (Torr) | 210 | 180 | 360 | 240 |
| Argon-Win. (sccm) | 700 | 700 | 700 | 700 |
| Argon-Sld. (slm) | 5.6 | 7.0 | 2.0 | 5.6 |
| Argon-Dil. (sccm) | 1120 | 0.0 | 0.0 | 0.0 |
| Ethylene (sccm) | 1340 | 980 | 670 | 603 |
| Carrier Gas (sccm) | 162(Ar) | 196(Ar) | 224(Ar) | 224(Ar) |
| Oxygen (sccm) | 840 | 636 | 308 | 412 |
| Laser Output (watts) | 830 | 620 | 520 | 236 |
| Nozzle Size | ⅝ in × ⅛ in | ⅝ in × ⅛ in | ⅝ in × ⅛ in | ⅝ in × ⅛ in | sccm = standard cubic centimeters per minute
slm = standard liters per minute
Argon-Win. = argon flow through inlets 216, 218
Argon-Sld. = argon flow through annular channel 142
Argon-Dil. = additional argon added to the reaction stream besides the argon carrier gas.

The use of additional argon gas to dilute the reaction stream resulted in production of particles that were less agglomerated.

The production rate of silicon oxide particles was typically about 30 g/hr. Based on the teachings herein both above and in this example, the particles described in this example can be produced with equivalent properties in appropriate apparatuses and at appropriate conditions at rates in the range(s) of at least about 35 grams per hour and at higher rates described above.

Figure 39:
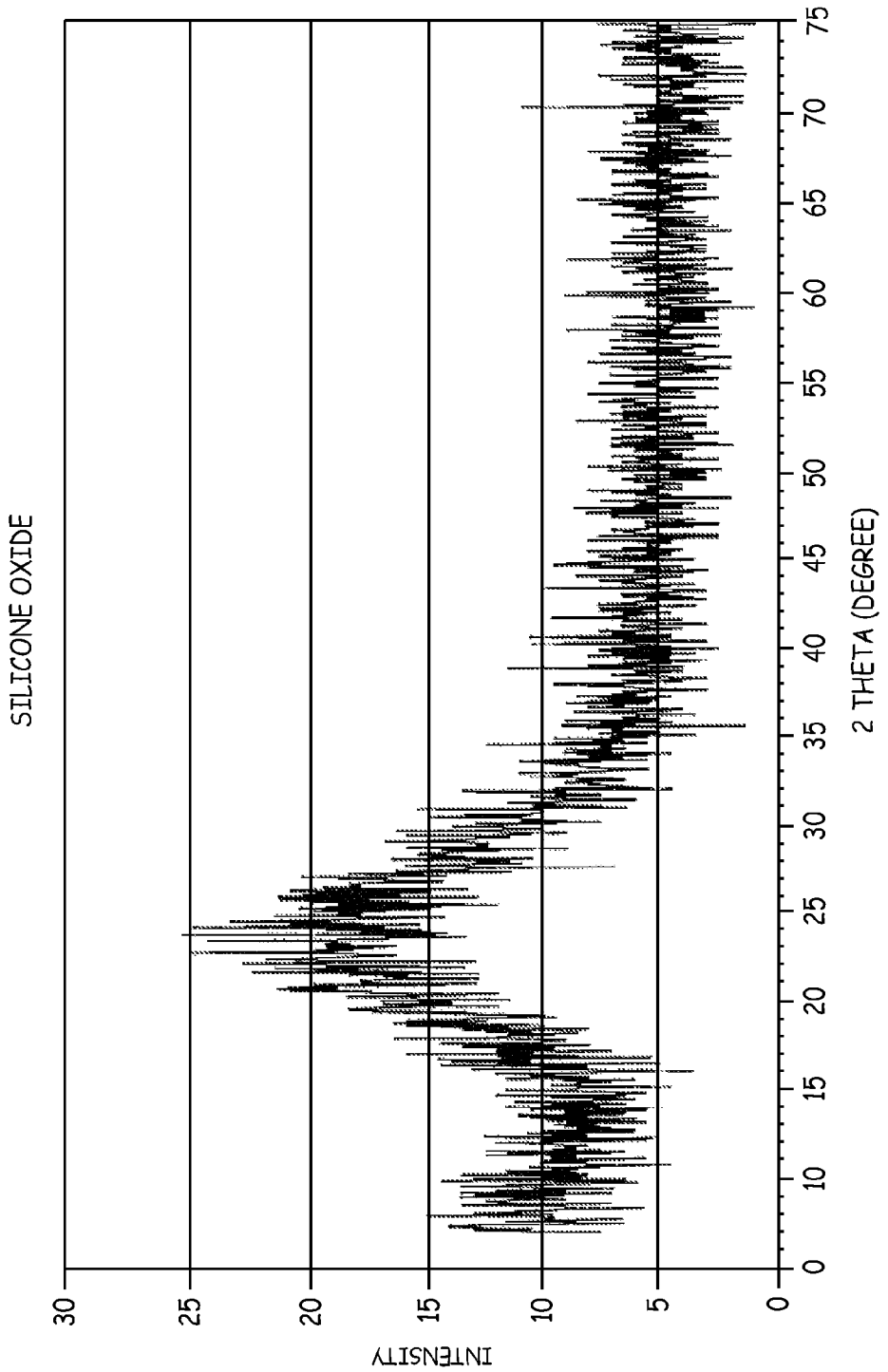
FIG. 39 is an x-ray diffractogram of silicon oxide nanoparticles.

Under the four sets of conditions specified in Table 4, amorphous silicon oxide particles were produced. To evaluate the atomic arrangement, the samples were examined by x-ray diffraction using the Cu(Kα) radiation line on a Siemens D500 x-ray diffractometer. An x-ray diffractogram for a sample produced under the conditions specified in the first column of Table 4 is shown in FIG. 39. The broad peak in FIG. 39 is indicative of an amorphous sample. The other samples yielded comparable x-ray diffraction peaks.

Figure 40:
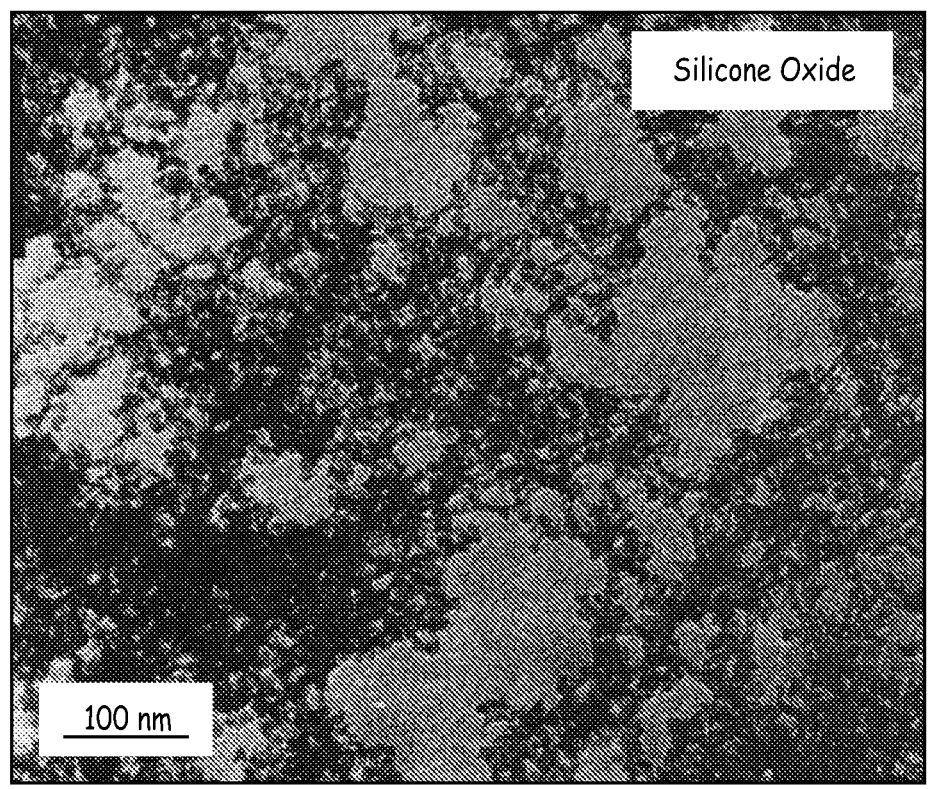
FIG. 40 is a TEM micrograph of nanoparticles whose x-ray diffractogram is shown of FIG. 39.
Figure 41:
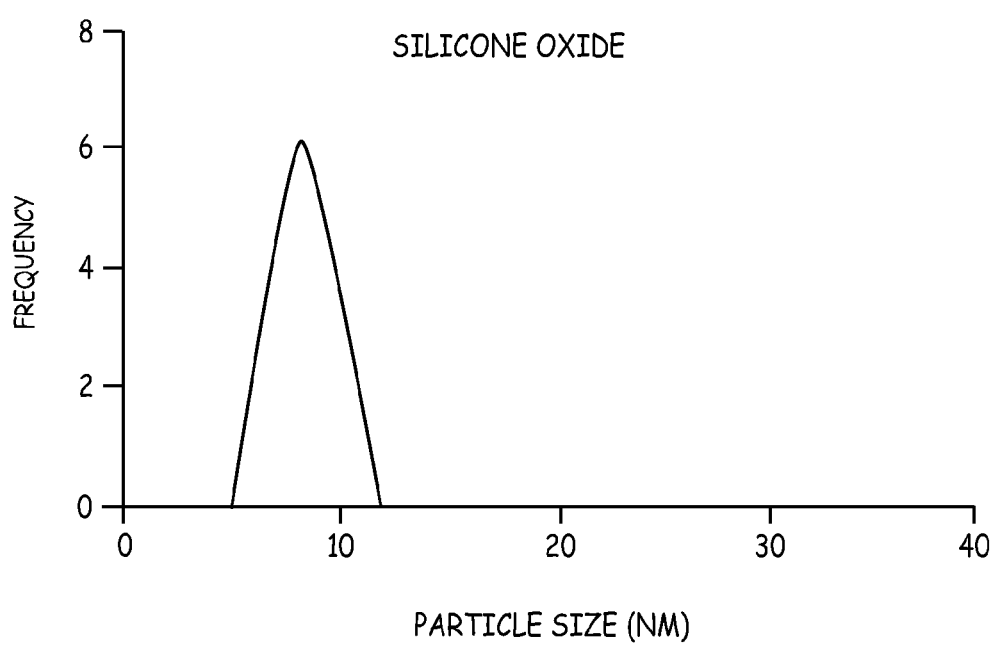
FIG. 41 is a plot of the distribution of primary particle diameters for the nanoparticles shown in the TEM micrograph of FIG. 40.

Transmission electron microscopy (TEM) was used to determine particle sizes and morphology. A TEM micrograph for the particles produced under the conditions of the first column of Table 4 is displayed in FIG. 40. An examination of a portion of the TEM micrograph yielded an average particle size of about 7 nm. The corresponding particle size distribution is shown in FIG. 41. The approximate size distribution was determined by manually measuring diameters of the particles distinctly visible in the micrograph of FIG. 40. Only those particles having clear particle boundaries were measured to avoid regions distorted or out of focus in the micrograph. Measurements so obtained should be more accurate and are not biased since a single view cannot show a clear view of all particles. It is significant that the particles span a rather narrow range of sizes.

For particles produced under the conditions specified in the fourth column of Table 4, the BET surface area was determined to be 264 m$^2$/gram with an N$_2$ gas absorbate. The BET surface area was measured by Particle Technology Labs., Ltd., Downers Grove, IL.

The stoichiometry of the particles was not determined directly. The particles had a dark color upon visual inspection. The darkness may have been the result of oxygen deficiencies relative to silicon dioxide or to deposits on the particles of elemental carbon from the ethylene in the reactant stream. The dark color was eliminated upon heating in an oxygen environment in an oven as described in the following example.

Example 8

Oven Processed

Figure 42:
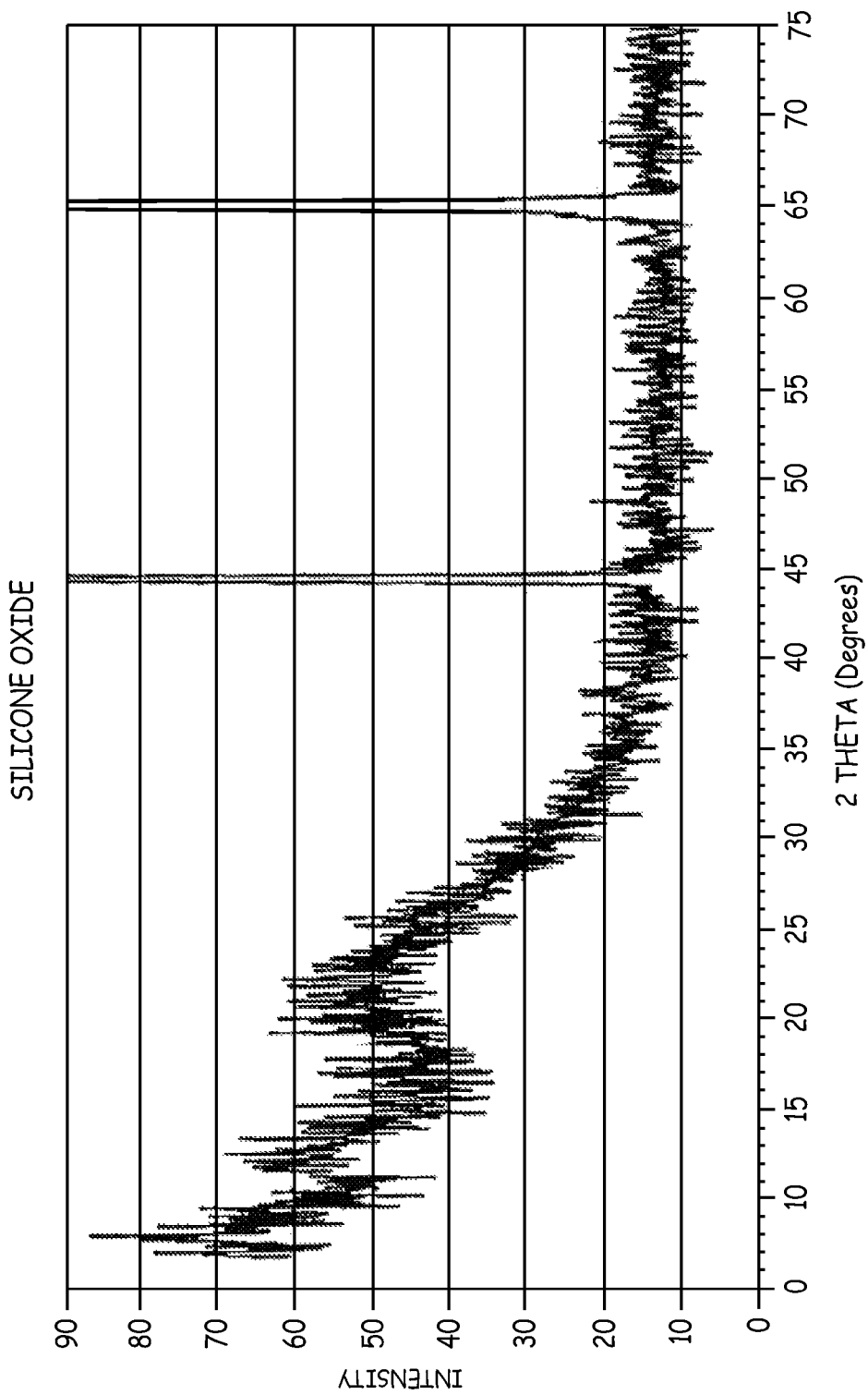
FIG. 42 is an x-ray diffractogram of nanoparticles of silicon oxide following heating in an oven.

A sample of silicon oxide nanoparticles produced by laser pyrolysis according to the conditions specified in the fourth column of Table 4 were heated in an oven under oxidizing conditions. The oven was essentially as described above with respect to FIG. 24. The samples were heated in the oven at about 500° C. for about 2 hours. Oxygen gas was flowed through a 1.0 in diameter quartz tube at a flow rate of about 150 sccm. Between about 100 and about 300 mg of nanoparticles were placed in an open 1 cc vial within the quartz tube projecting through the oven. The resulting particles were white particles. The x-ray diffractogram is shown in FIG. 42. The sharp peaks at about 45° and about 65° are due to the aluminum sample holder. The peak at about 7° is an artifact of the instrument. An additional peak appears at about 12° indicative of a second amorphous phase of silicon oxide. Based on the color of the heated particles, the heating process evidently either removed elemental carbon associated with the particles or added oxygen to the particles to shift the stoichiometry toward SiO$_2$. Based on the teachings herein both above and in this example, the particles described in this example can be produced with equivalent properties in appropriate apparatuses and at appropriate conditions at rates in the range(s) of at least about 35 grams per hour and at higher rates described above.

Figure 43:
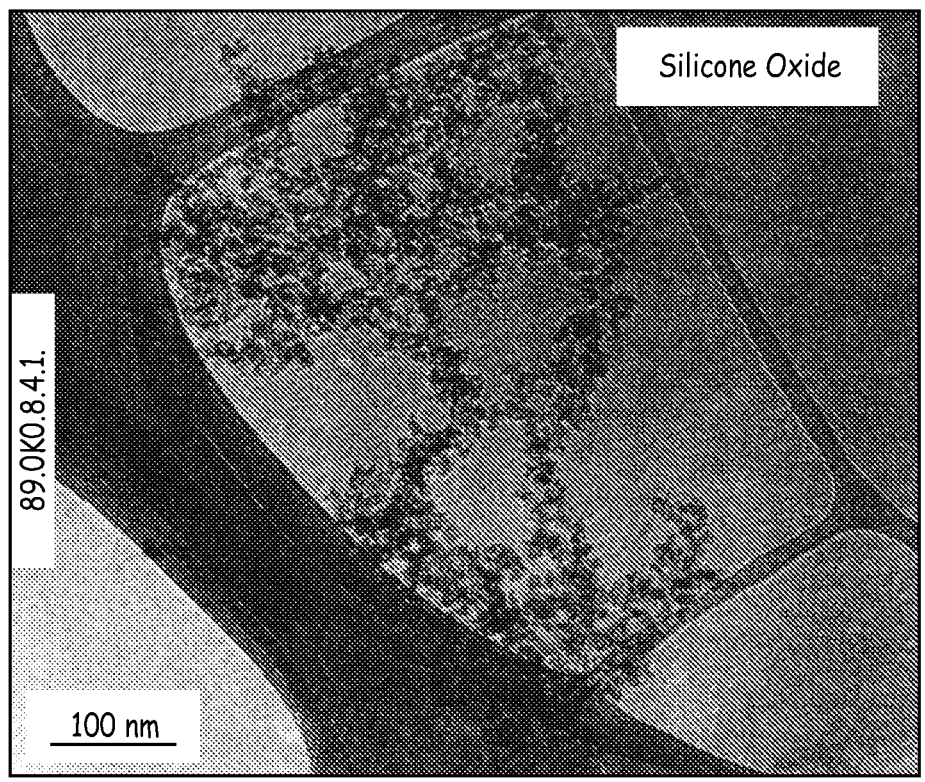
FIG. 43 is a TEM micrograph of silicon oxide nanoparticles following heat treatment in an oven.

A TEM micrograph for the particles is shown in FIG. 43. From an analysis of the TEM micrograph, the average particle diameter is about 10 nm. While it was not determined if the particle diameters were altered by the heat treatment, it is unlikely that significant particle growth, if any, took place since the heat treated particles had a small average diameter.

Example 9

Lithium Manganese Oxide; Aerosol Metal Precursors

The synthesis of magnesium oxide/lithiated manganese oxide particles described in this example was performed by laser pyrolysis. The particles were produced using essentially the laser pyrolysis apparatus of FIG. 1, described above, using the reactant delivery apparatus of FIG. 2.

The manganese chloride (Alfa Aesar, Inc., Ward Hill, Mass.) precursor and lithium chloride (Alfa Aesar, Inc.) precursor were dissolved into deionized water. The aqueous solution had a concentration of 4 molar LiCl and 4 molar MnCl$_2$. The aqueous solution with the two metal precursors was carried into the reaction chamber as an aerosol. $C_2H_4$ gas was used as a laser absorbing gas, and Argon was used as an inert gas. $O_2$, Ar and $C_2H_4$ were delivered into the gas supply tube of the reactant supply system. The reactant mixture containing $MnCl_2$, LiCl, Ar, $O_2$ and $C_2H_4$ was introduced into the reactant nozzle for injection into the reaction chamber.

The reactant nozzle had an opening with dimensions of 5/8 in.×1/16 in. Additional parameters of the laser pyrolysis synthesis relating to the particles are specified in Table 5.

TABLE 5

|  | 1 |
|---|---|
| Crystal Structure | Amorphous |
| Pressure (Torr) | 450 |
| Argon-Window (SCCM) | 700 |
| Argon-Shielding (SLM) | 5.6 |
| Ethylene (SLM) | 1.27 |
| Argon (SLM) | 1.46 |
| Oxygen (SLM) | 1.07 |
| Laser Output (Watts) | 590 |
| Li Precursor | 4 M Lithium Chloride |
| Mn Precursor | 4 M Manganese Chloride |
| Precursor Temperature ° C. | Room Temperature | sccm = standard cubic centimeters per minute
slm = standard liters per minute
Argon-Win. = argon flow through inlets 216, 218
Argon-Sld. = argon flow through annular channel 142.
Argon = Argon directly mixed with the aerosol The production rate of manganese oxide/lithiated manganese oxide particles was typically about 1 g/hr. Based on the teachings herein both above and in this example, the particles described in this example can be produced with equivalent properties in appropriate apparatuses and at appropriate conditions at rates in the range(s) of at least about 35 grams per hour and at higher rates described above.

Figure 44:
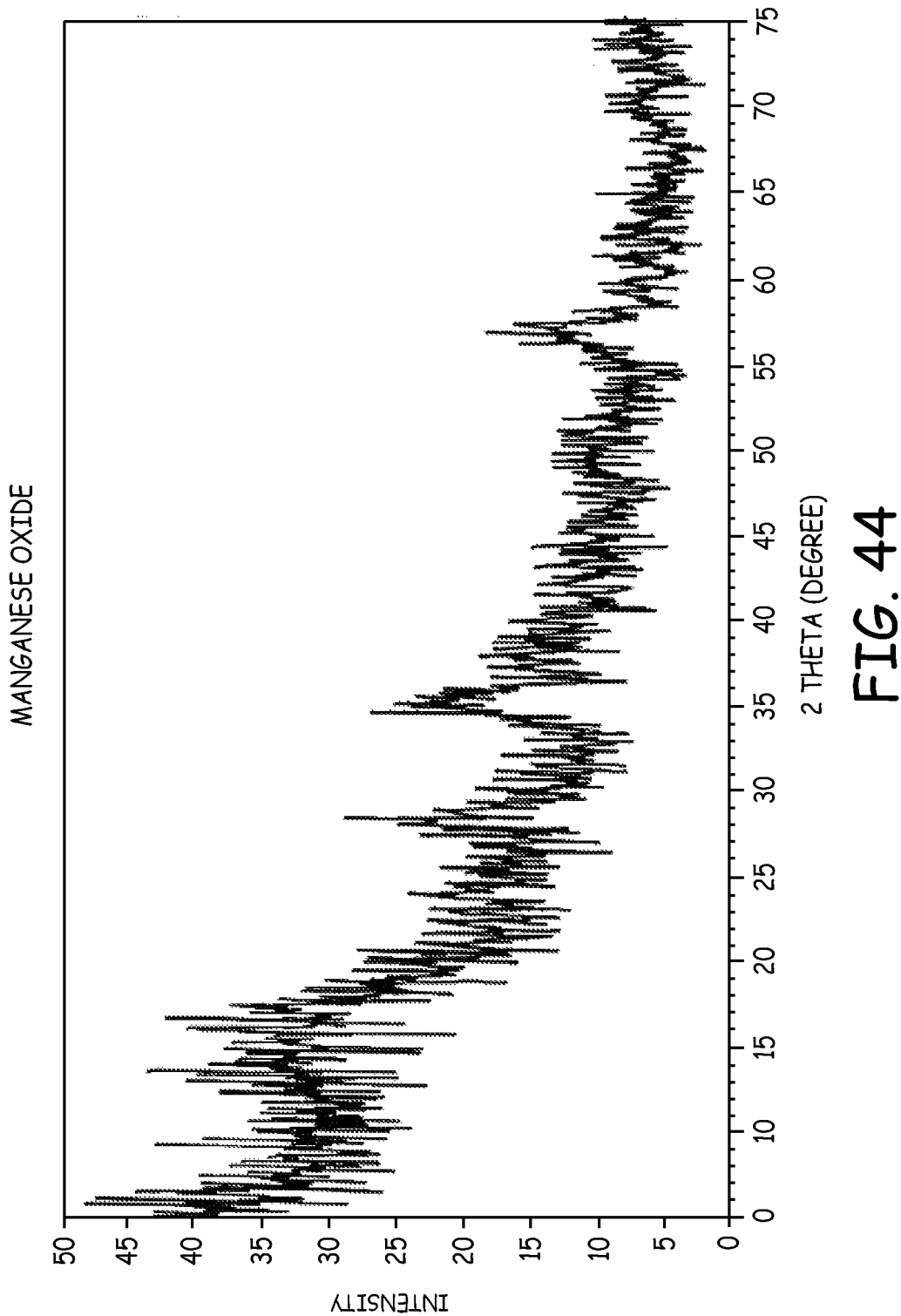
FIG. 44 is an x-ray diffractogram of nanoparticles of lithiated manganese oxide produced by laser pyrolysis of a reactant stream with an aerosol.

To evaluate the atomic arrangement, the samples were examined by x-ray diffraction using the Cu(Kα) radiation line on a Siemens D500 x-ray diffractometer. X-ray diffractograms for a sample produced under the conditions specified in Table 5 is shown in FIG. 44. The x-ray diffractogram shown in FIG. 44 indicates that the sample was amorphous. In particular, a broad peak from about 27° to about 35° corresponds to the amorphous lithiated manganese oxide. A sharp peak at about 15° is due to the presence of a trace amount of manganese chloride contamination. A sharp peak at 53° is due to a trace amount of an unidentified contaminant.

Example 10

Heat Treatment—Lithium Manganese Oxide

A sample of manganese oxide/lithiated manganese oxide nanoparticles produced by laser pyrolysis according to the conditions specified in the Example 9 were heated in an oven under oxidizing conditions. The oven was essentially as described above with respect to FIG. 6. Between about 100 and about 300 mg of nanoparticles were placed in an open 1 cc vial within the quartz tube projecting through the oven. Oxygen gas was flowed through a 1.0 inch diameter quartz tube at a flow rate of 308 cc/min. The oven was heated to about 400° C. The particles were heated for about 16 hours.

Figure 45:
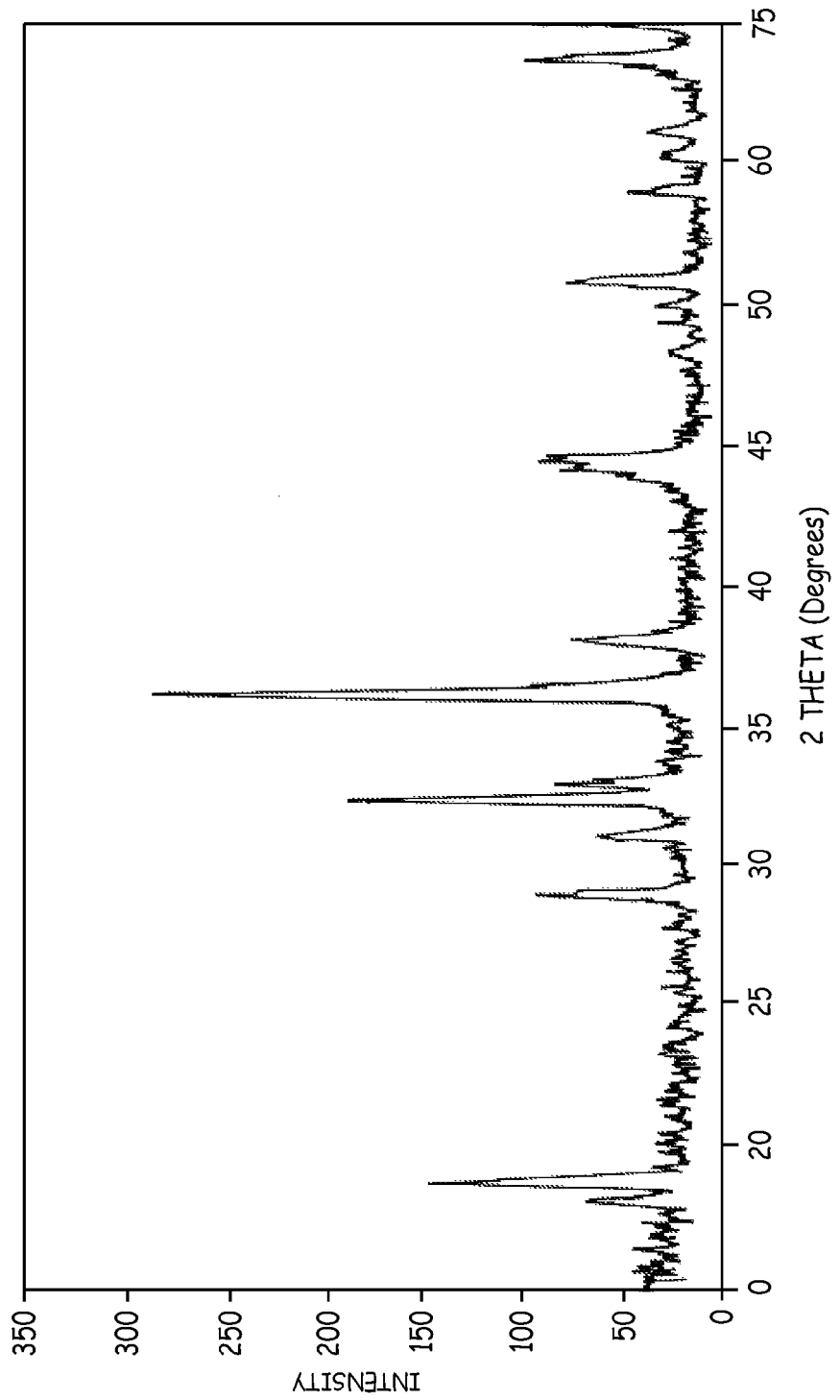
FIG. 45 is an x-ray diffractogram of nanoparticles of lithiated manganese oxide following heating in an oven.

The crystal structure of the resulting heat treated particles were determined by x-ray diffraction. The x-ray diffractogram for heated sample is shown in FIG. 45. The x-ray diffractogram shown in FIG. 45 indicates that the collection of particles involved mixed phase material with major components of $LiMn_2O_4$ (about 60% by volume) and $Mn_3O_4$ (about 30% by volume) and a minor component of $Mn_2O_3$ (about 10% by volume). The $LiMn_2O_4$ compound has a cubic spinel crystal structure. It is possible that the sample included additional amorphous phases of materials. In particular, based on the amount of lithium introduced in the reactant stream, the sample presumably contains additional lithium that is not identified in the crystalline phases. Based on the teachings herein both above and in this example, the particles described in this example can be produced with equivalent properties in appropriate apparatuses and at appropriate conditions at rates in the range(s) of at least about 35 grams per hour and at higher rates described above.

Example 11

Direct Synthesis of Crystalline Lithium Manganese Oxide with an Aerosol

The synthesis of crystalline lithium manganese oxide particles described in this example was performed by laser pyrolysis. The particles were produced using essentially the laser pyrolysis apparatus of FIG. 1, described above.

Two solutions were formed with manganese nitrate (Mn$(NO_3)_2$, Alfa Aesar, Inc., Ward Hill, Mass.) precursor, lithium nitrate (Alfa Aesar, Inc.) precursor and urea ($CH_4N_2O$). The first solution was used to form sample 3 of Table 6. The first solution was an aqueous solution with a concentration of 3 molar $LiNO_3$ and 4 molar $Mn(NO_3)_2$. The solvent for the second solution was a 50:50 percent by weight mixture of isopropyl alcohol and deionized water. The second solution had a concentration of 2 molar $LiNO_3$, 2 molar $Mn(NO_3)_2$, and 3.6 molar urea. The second solution was used to form the first and second samples of Table 6.

The selected solution with the two metal precursors was carried into the reaction chamber as an aerosol. $C_2H_4$ gas was used as a laser absorbing gas, and Argon was used as an inert gas. $O_2$, Ar and $C_2H_4$ were delivered into the gas supply tube of the reactant supply system. The reactant mixture containing $Mn(NO_3)_2$, $LiNO_3$, Ar, $O_2$ and $C_2H_4$ was introduced into the reactant nozzle for delivery into the reaction chamber. The reactant nozzle had an opening with dimensions of 5/8 in.×1/4 in. Additional parameters of the laser pyrolysis synthesis relating are specified in the first two columns of Table 6.

TABLE 6

Figure 46:
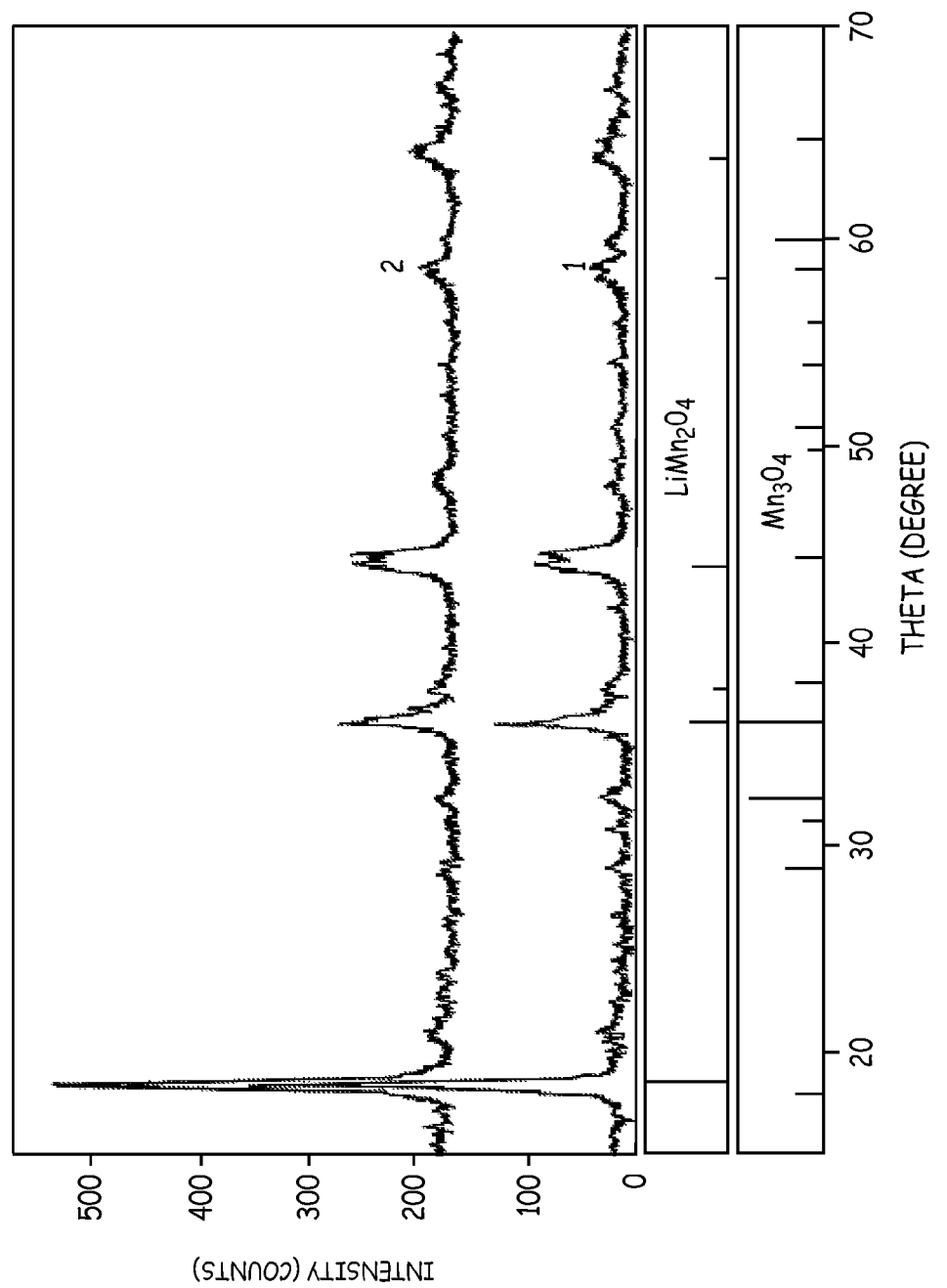
FIG. 46 is an x-ray diffractogram for a sample of lithium manganese oxide particles directly produced by laser pyrolysis.

|  | 1 | 2 | 3 |
|---|---|---|---|
| Crystal Structure | $LiMn_2O_4$ (major) + $Mn_3O_4$ | $LiMn_2O_4$ (major) + $Mn_3O_4$ | $LiMn_2O_4$ (major) + $Mn_3O_4$ |
| Pressure (Torr) | 600 | 600 | 600 |
| Argon-Window (SLM) | 2.24 | 2.24 | 2.24 |
| Argon-Shielding (SLM) | 9.86 | 9.86 | 9.86 |
| Ethylene (SLM) | 0.80 | 0.80 | 1.24 |
| Argon (SLM) | 3.61 | 3.60 | 4.17 |
| Oxygen (SLM) | 0.97 | 0.99 | 1.46 |
| Laser Input (Watts) | 650 | 970 | 380 |
| Laser Output (Watts) | 540 | 830 | 320 |
| Production Rate (gm/hr) | 1.8 | 1.3 | 17.0 |
| Precursor Temperature ° C. | Room Temp. | Room Temp. | Room Temp. | slm = standard liters per minute
Argon-Win. = argon flow through inlets 216, 218
Argon-Sld. = argon flow through annular channel 142.
Argon = Argon directly mixed with the aerosol To evaluate the atomic arrangement, the samples were examined by x-ray diffraction using the Cu(Kα) radiation line on a Siemens D500 x-ray diffractometer. X-ray diffractograms for samples produced under the conditions of columns 1 and 2 specified in Table 6 are shown in FIG. 46. This is a representative diffractogram, although some samples had relatively small peaks due to $Mn_3O_4$ contamination. X-ray diffraction peaks characteristic of spinel lithium manganese oxide are clearly visible in the diffractogram. Small differences in stoichiometry within the spinel structure are difficult to elucidate from the x-ray diffractogram. In addition, the x-ray diffractogram peaks are broad, which may be due to the small particle size or inhomogeneous broadening resulting from either having a mixed phase material or variations in stoichiometry. Nevertheless, the diffractogram is consistent with the sample containing a mixture of $LiMn_2O_4$ and $Li_4Mn_5O_{12}$ or an intermediate stoichiometry material. These conclusions are confirmed by electrochemical evaluation described below. In any case, the crystalline lithium manganese oxide seems to comprise a majority (greater than about 50%) of the material in one form or another.

Figure 47:
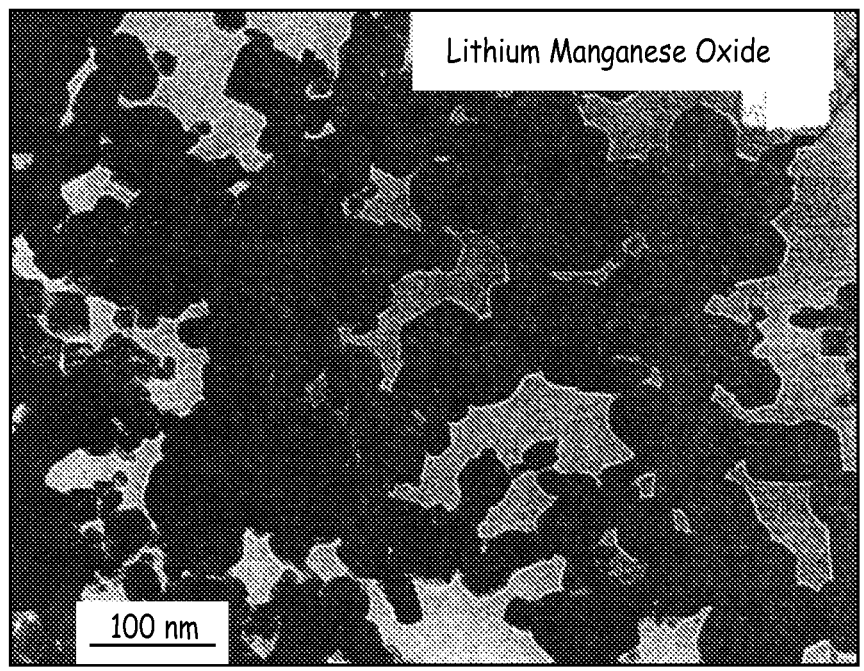
FIG. 47 is a transmission electron micrograph of lithium manganese oxide particles corresponding to the x-ray diffractogram of FIG. 46.
Figure 48:
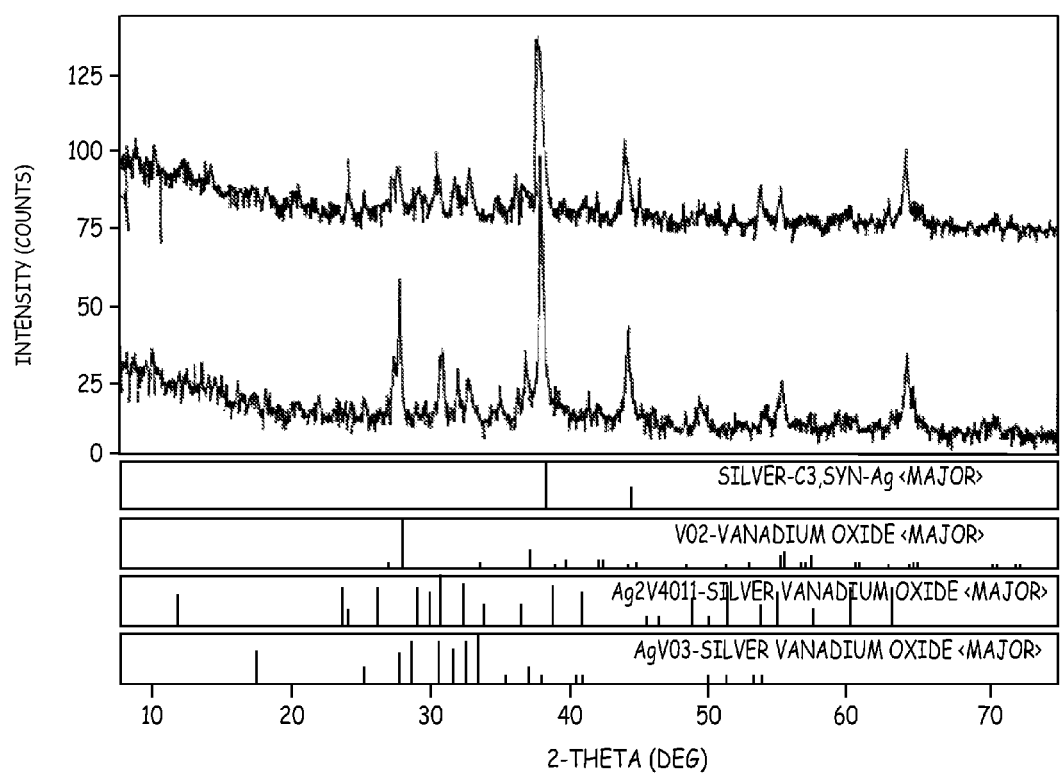
FIG. 48 is a plot of two x-ray diffractograms of mixed phase materials including silver vanadium oxide nanoparticles produced directly by laser pyrolysis, where each plot is produced with materials produced under slightly different conditions.

Transmission electron microscopy (TEM) was used to determine particle sizes and morphology of the as synthesized, crystalline lithium manganese oxide. A TEM micrograph for the lithium manganese oxide of the sample produced under the conditions of column 2 of Table 6 is shown in FIG. 47. The corresponding particle size distribution is shown in FIG. 48. The average particle diameter is about 40 nm. The particle size distribution shows a relatively broad particle size distribution relative to particle size distributions generally obtainable by laser pyrolysis.

Based on the teachings herein both above and in this example, the particles described in this example can be produced with equivalent properties in appropriate apparatuses and at appropriate conditions at rates in the range(s) of at least about 35 grams per hour and at higher rates described above.

Example 12

Heat Processing to Form Silver Vanadium Oxide

This example demonstrates the production of nanoscale silver vanadium oxide using a vanadium oxide nanoparticle starting material. The silver vanadium oxide is produced by a heat processing.

About 9.5 g of silver nitrate ($AgNO_3$) was dissolved into about 15 ml of deionized water. Then, about 10 g of $V_2O_5$ nanoparticles produced by laser pyrolysis were added to the silver nitrate solution to form a mixture. The resulting mixture was stirred on a magnetic stirrer for about 30 minutes. After the stirring was completed the solution was heated to about 160° C. in an oven to drive off the water. The dried powder mixture was ground with a mortar and pestle. Based on the teachings herein both above and in this example, the particles described in this example can be produced with equivalent properties in appropriate apparatuses and at appropriate conditions at rates in the range(s) of at least about 35 grams per hour and at higher rates described above.

Six samples from the resulting ground powder weighing between about 100 and about 300 mg of nanoparticles were placed separately into an open I cc boat. The boat was placed within the quartz tube projecting through an oven to perform the heat processing. The oven was essentially as described above with respect to FIG. 24. Oxygen gas or argon gas was flowed through a 1.0 in diameter quartz tube at a flow rate of about 20 seem. The samples were heated in the oven under the following conditions:
1) 250° C., 60 hrs in argon
2) 250° C., 60 hrs in oxygen
3) 325° C., 4 hrs in argon
4) 325° C., 4 hrs in oxygen
5) 400° C., 4 hrs in argon
6) 400° C., 4 hrs in oxygen.

The samples were heated at approximately the rate of 2° C./min. and cooled at the rate of approximately 1° C./min. The times given above did not include the heating and cooling time.

Figure 49:
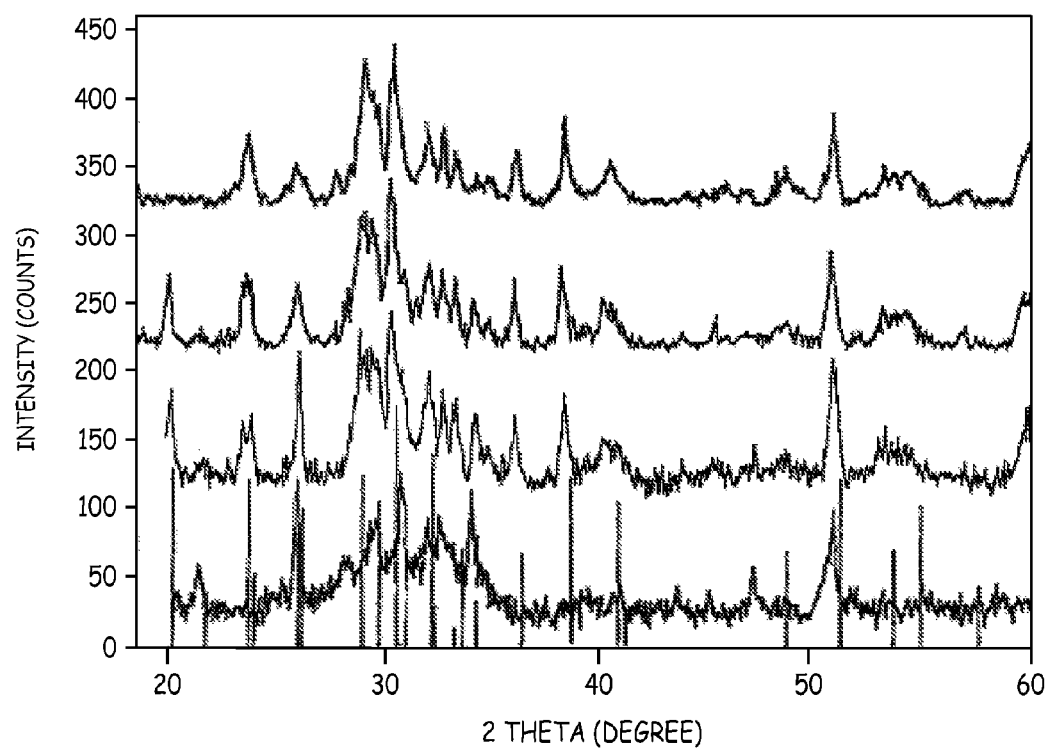
FIG. 49 is a plot of four x-ray diffractograms of silver vanadium oxide produced by heat treating nanocrystalline $V_2O_5$ with silver nitrate in an oxygen atmosphere, where each diffractogram was produced with materials formed under different conditions.
Figure 50:
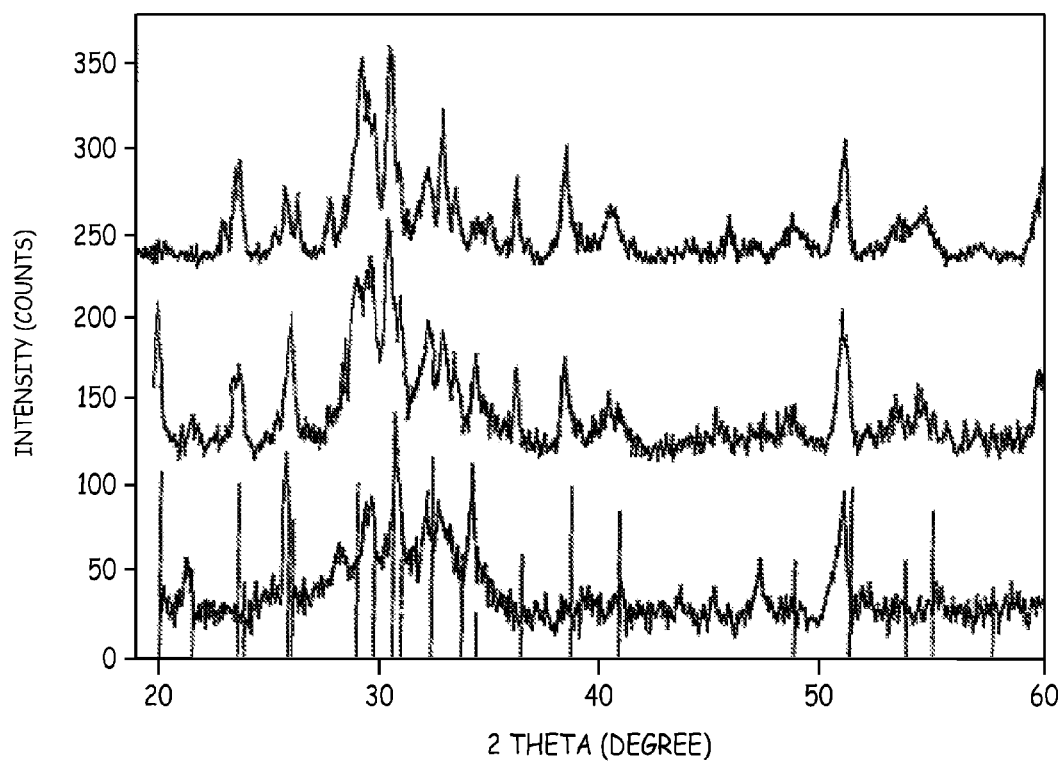
FIG. 50 is a plot of three x-ray diffractograms of silver vanadium oxide produced by heat treating nanocrystalline $V_2O_5$ with silver nitrate in an argon atmosphere, where each diffractogram was produced with materials formed under different conditions.

The structure of the particles following heating was examined by x-ray diffraction. The x-ray diffractograms for the samples heated in oxygen and in argon are shown in FIGS. 49 and 50, respectively. All of the heated samples produces diffractograms with peaks indicating the presence of $Ag_2V_4O_{11}$. The samples heated at 400° C. appear to lack significant amounts of $V_2O_5$. Heating the samples for somewhat longer times at the lower temperatures should eliminate any remaining portions of the $V_2O_5$ starting material.

Figure 51:
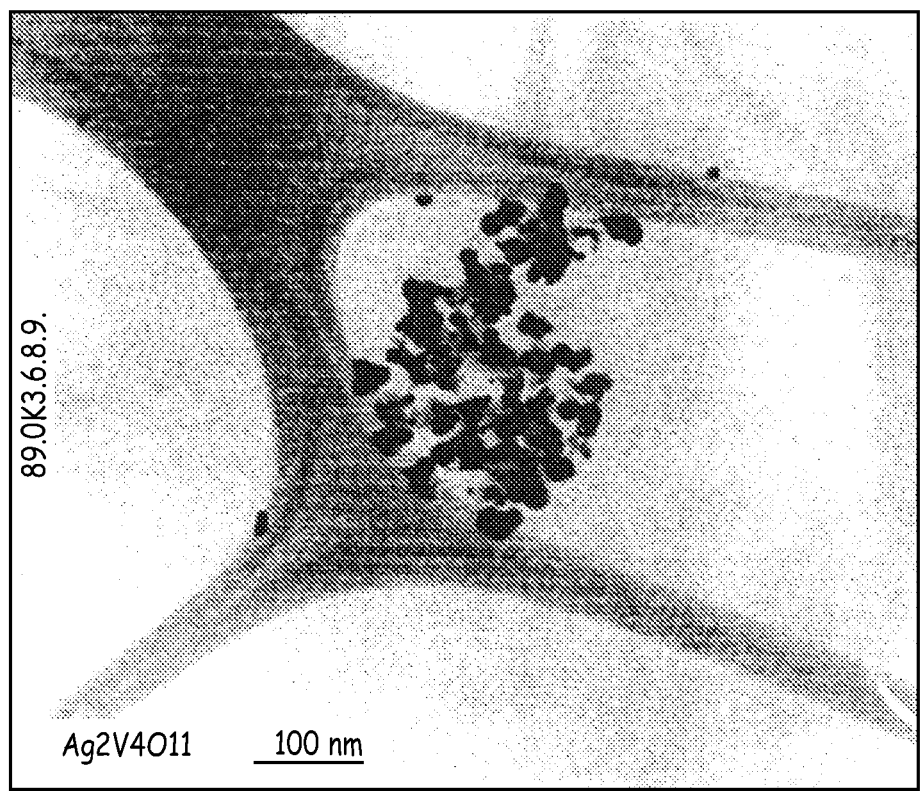
FIG. 51 is a transmission electron microscope view of silver vanadium oxide nanoparticles.
Figure 52:
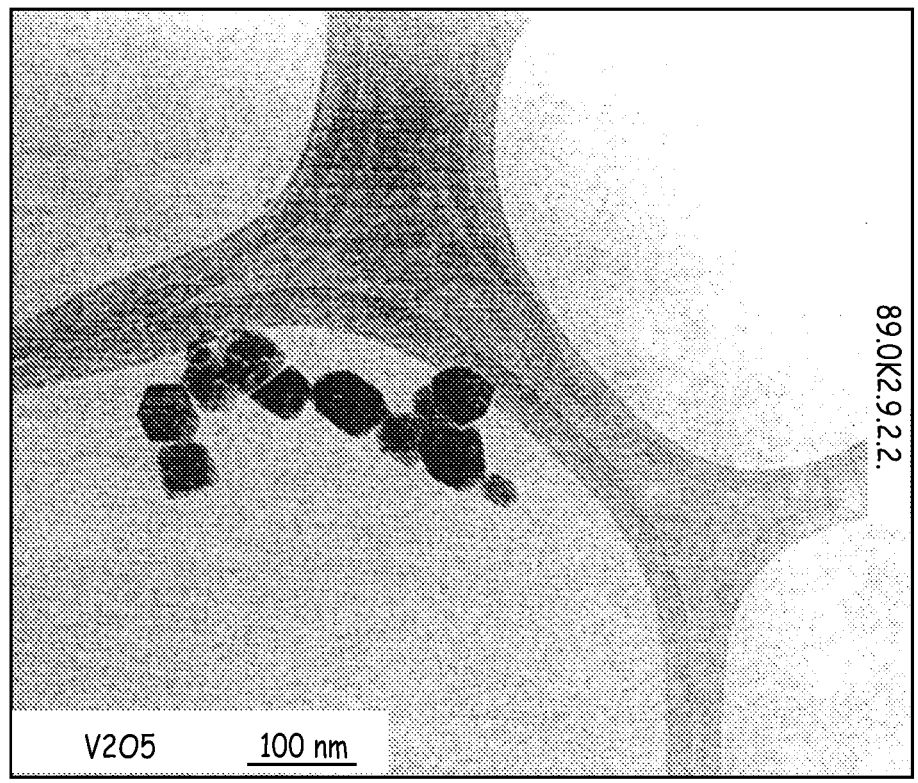
FIG. 52 is a transmission electron microscope view of the $V_2O_5$ nanoparticle samples used to produce the silver vanadium oxide particles shown in FIG. 51.

A transmission electron micrograph of the silver vanadium oxide particles is shown in FIG. 51. For comparison, a transmission electron micrograph of the $V_2O_5$ nanoparticle sample used to form the silver vanadium oxide nanoparticles is shown in FIG. 52, at the same scale as FIG. 51. The silver vanadium oxide particles in FIG. 51 surprisingly have a slightly smaller average diameter than the vanadium oxide nanoparticle starting material in FIG. 52.

Example 13

Direct Laser Pyrolysis Synthesis of Silver Vanadium Oxide Nanoparticles

The synthesis of silver vanadium oxide nanoparticles described in this example was performed by laser pyrolysis. The particles were produced using essentially the laser pyrolysis apparatus of FIG. 1, described above.

Two solutions were prepared for delivery into the reaction chamber as an aerosol. Both solutions were produced with comparable vanadium precursor solutions. To produce the first vanadium precursor solution, a 10.0 g sample of vanadium (III) oxide ($V_2O_3$) from Aldrich Chemical (Milwaukee, Wis.) was suspended in 120 ml of deionized water. A 30 ml quantity of 70% by weight aqueous nitric acid ($HNO_3$) solution was added dropwise to the vanadium (III) oxide suspension with vigorous stirring. Caution was taken because the reaction with nitric acid is exothermic and liberates a brown gas suspected to be $NO_2$. The resulting vanadium precursor solution (about 150 ml) was a dark blue solution. The second vanadium precursor solution involved the scale-up of the first precursor solution by a factor of three in all ingredients.

To produce a first silver solution, a solution of silver carbonate ($Ag_2CO_3$) from Aldrich Chemical (Milwaukee, Wis.) was prepared by suspending 9.2 g of silver carbonate in a 100 ml volume of deionized water. A 10 ml quantity of 70% by weight aqueous nitric acid ($HNO_3$) was added dropwise with vigorous stirring. A clear colorless solution resulted upon completion of the addition of nitric acid. To produce a first metal mixture solution for aerosol delivery, the silver solution was added to the first vanadium precursor solution with constant stirring. The resulting dark blue first metal mixture solution had a molar ratio of vanadium to silver of about 2:1.

To produce a second silver solution, 34.0 g of silver nitrate ($AgNO_3$) from Aldrich Chemical (Milwaukee, Wis.) was dissolved in a 300 ml volume of deionized water. To prepare a second solution of metal mixtures for aerosol delivery, the silver nitrate solution was added to the second vanadium precursor solution with constant stirring. The resulting dark blue second metal mixture solution also had a molar ratio of vanadium to silver of about 2:1.

The selected aqueous solution with the vanadium and silver precursors was carried into the reaction chamber as an aerosol. $C_2H_4$ gas was used as a laser absorbing gas, and Argon was used as an inert gas. $O_2$, Ar and $C_2H_4$ were delivered into the gas supply tube of the reactant supply system. The reactant mixture containing vanadium oxide, silver nitrate, Ar, $O_2$ and $C_2H_4$ was introduced into the reactant nozzle for injection into the reaction chamber. The reactant nozzle had an opening with dimensions of ⅝ in.×¼ in. Additional parameters of the laser pyrolysis synthesis relating to the particle synthesis are specified in Table 7.

TABLE 7

Figure 53:
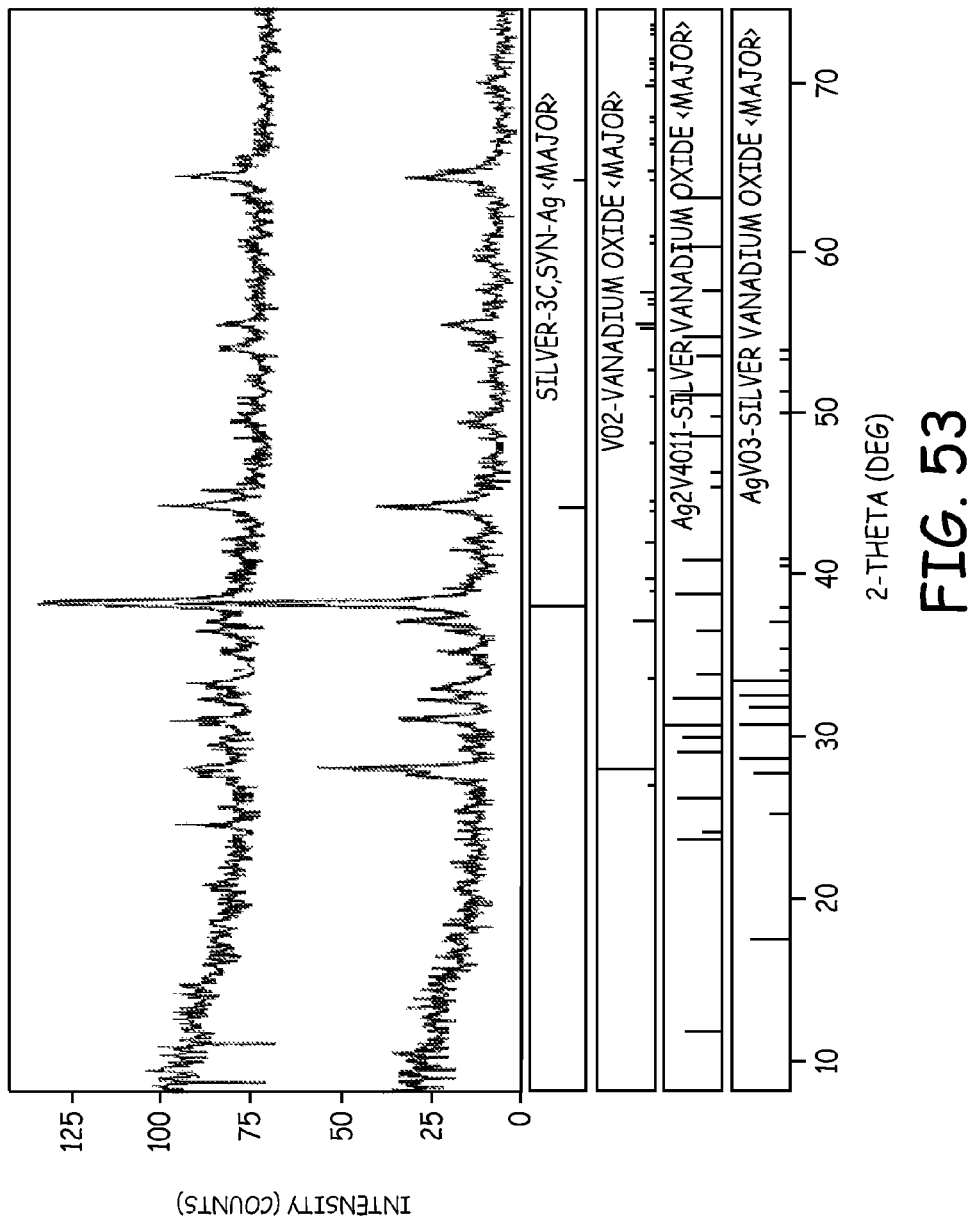
FIG. 53 is a plot of two x-ray diffractograms of mixed phase materials including silver vanadium oxide nanoparticles produced directly by laser pyrolysis, where each plot is produced with materials produced under slightly different conditions.

|  | 1 | 2 |
|---|---|---|
| Crystal Structure | Mixed Phase | Mixed Phase |
| Pressure (Torr) | 600 | 600 |
| Argon-Window (SLM) | 2.00 | 2.00 |
| Argon-Shielding (SLM) | 9.82 | 9.86 |
| Ethylene (SLM) | 0.74 | 0.81 |
| Argon (SLM) | 4.00 | 4.80 |
| Oxygen (SLM) | 0.96 | 1.30 |
| Laser Power (input) (Watts) | 490-531 | 390 |
| Laser Power (output) (Watts) | 445 | 320 |
| Precursor Solution | 1 | 2 |
| Precursor Temperature ° C. | Room Temperature | Room Temperature | slm = standard liters per minute
Argon-Win. = argon flow through inlets 216, 218
Argon-Sld. = argon flow through annular channel 142.
Argon = Argon directly mixed with the aerosol To evaluate the atomic arrangement, the samples were examined by x-ray diffraction using the Cu(Kα) radiation line on a Siemens D500 x-ray diffractometer. X-ray diffractograms for samples 1 (lower curve) and 2 (upper curve) produced under the conditions specified in Table 7 are shown in FIG. 53. The samples had peaks corresponding to $VO_2$, elemental silver and peaks that did not correspond to known materials. A significant crystalline phase for these samples had peaks at 2Θ equal to about 30-31°, 32, 33 and 35. This phase is thought to be a previously unidentified silver vanadium oxide phase. This phase is observed in samples prepared by mixing vanadium oxide nanoparticles and silver nitrate under conditions where the samples are heated for an insufficient time period to produce $Ag_2V_4O_{ii}$. Specific capacity measurements of sample 1 in a coin cell, presented below, are consistent with this interpretation.

Figure 54A:
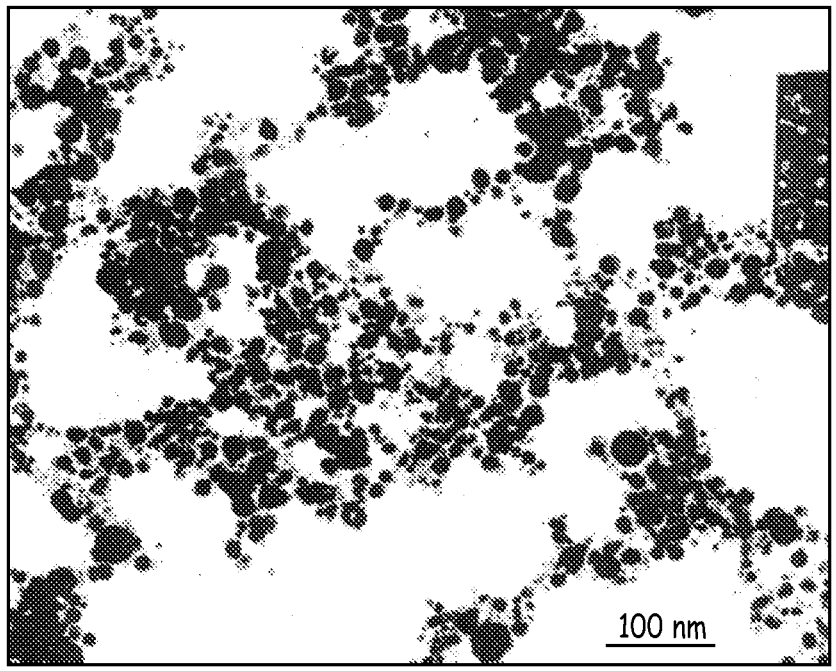
FIG. 54A is a transmission electron micrograph of the materials from the sample corresponding to the upper diffractogram in FIG. 53.
Figure 54B:
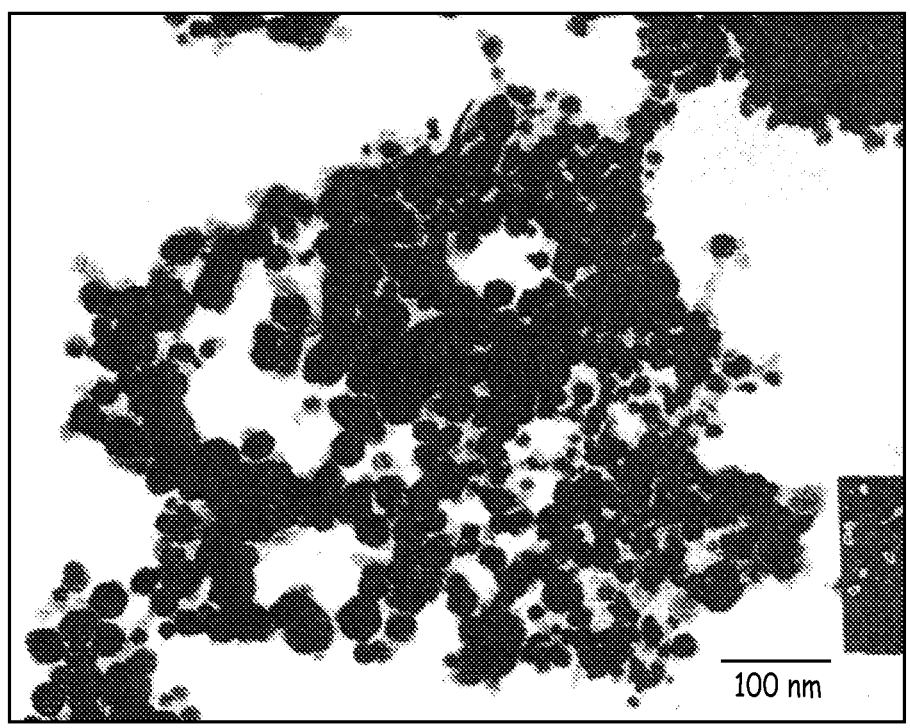
FIG. 54B is a transmission electron micrograph of the materials from the sample corresponding to the lower diffractogram in FIG. 53.

Powders of samples produced under the conditions specified in Table 7 were further analyzed using transmission electron microscopy. The TEM micrographs are shown in FIGS. 54A (first column of Table 7) and 54B (second column of Table 7). The TEM micrograph has a particles falling within different size distributions. This is characteristic of mixed phase materials made by laser pyrolysis, where each material generally has a very narrow particle size distribution. The portion of silver vanadium oxide in the mixed phase material should be increased by an increase in oxygen flow, a decrease in laser power and an increase in pressure.

Based on the teachings herein both above and in this example, the particles described in this example can be produced with equivalent properties in appropriate apparatuses and at appropriate conditions at rates in the range(s) of at least about 35 grams per hour and at higher rates described above.

Example 14

Production of Elemental Silver Nanoparticles

The synthesis of elemental silver nanoparticles described in this example was performed by laser pyrolysis. The particles were produced using essentially the laser pyrolysis apparatus of FIG. 1.

A 1 molar silver nitrate solution was prepared for delivery into the reaction chamber as an aerosol by dissolving 50.96 g of silver nitrate (Aldrich Chemical, Milwaukee, Wis.) into 300 ml deionized water to produce a clear solution. $C_2H_4$ gas was used as a laser absorbing gas, and Argon was used as an inert gas. $O_2$, Ar and $C_2H_4$ were delivered into the gas supply tube of the reactant supply system. The reactant mixture containing silver nitrate, Ar, $O_2$ and $C_2H_4$ was introduced into the reactant nozzle for injection into the reaction chamber. The reactant nozzle had an opening with dimensions of ⅝ in.×¼ in. Additional parameters of the laser pyrolysis synthesis relating to the particle synthesis are specified in Table 8.

TABLE 8

|  | 1 | 2 |
|---|---|---|
| Crystal Structure | face centered cubic | face centered cubic |
| Pressure (Torr) | 450 | 450 |
| Argon-Window (SLM) | 2.00 | 2.00 |
| Argon-Shielding (SLM) | 9.82 | 9.82 |
| Ethylene (SLM) | 1.342 | 0.734 |
| Argon (SLM) | 5.64 | 3.99 |
| Oxygen (SLM) | 1.41 | 0.96 |
| Laser Power (input) (Watts) | 970 | 490 |
| Laser Power (output) (Watts) | 800 | 450 |
| Production Rate (gram/hour) | 1.44 | 1.02 |
| Precursor Temperature ° C. | Room Temperature | Room Temperature | slm = standard liters per minute
Argon-Win. = argon flow through inlets 216, 218
Argon-Sld. = argon flow through annular channel 142.
Argon = Argon directly mixed with the aerosol Based on the teachings herein both above and in this example, the particles described in this example can be produced with equivalent properties in appropriate apparatuses and at appropriate conditions at rates in the range(s) of at least about 35 grams per hour and at higher rates described above.

Figure 55:
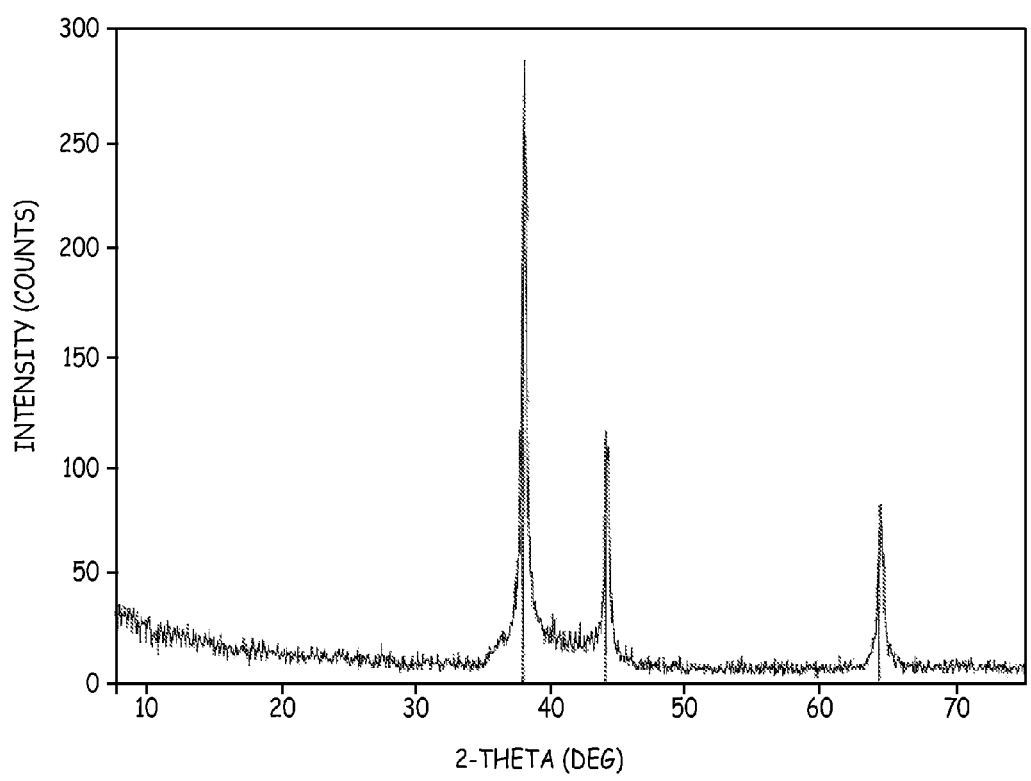
FIG. 55 is an x-ray diffractogram of elemental silver nanoparticles produced by laser pyrolysis under the conditions specified in the first column of Table 8.
Figure 56:
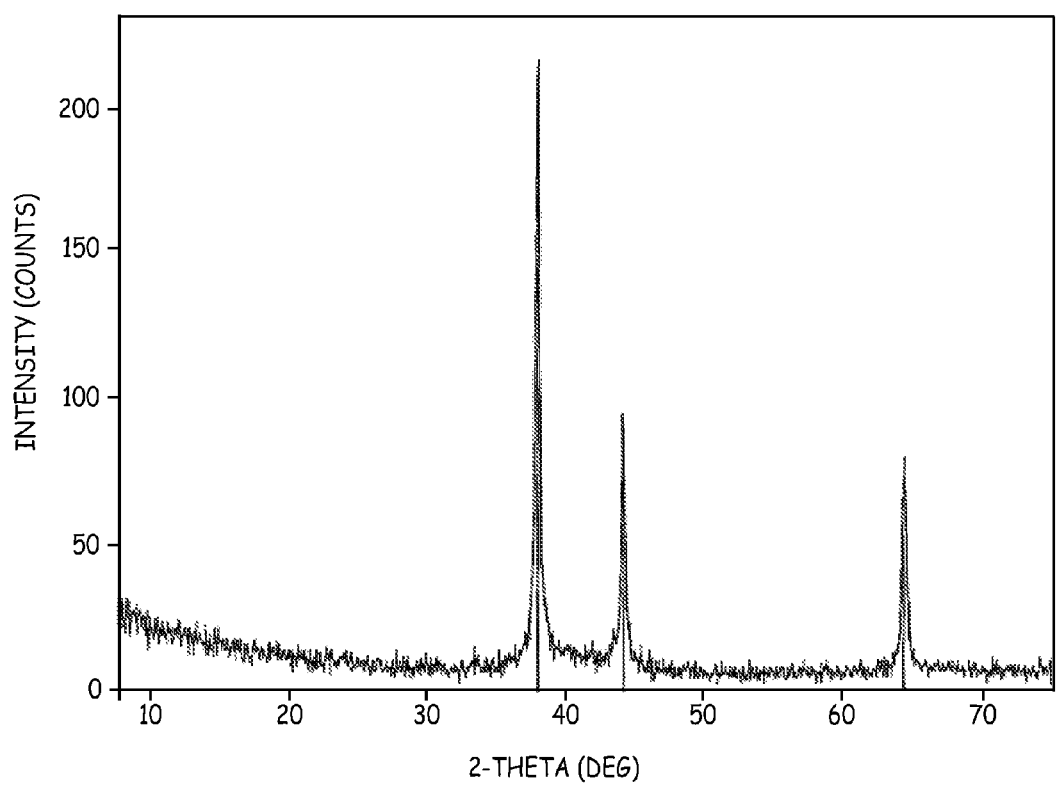
FIG. 56 is an x-ray diffractogram of elemental silver nanoparticles produced by laser pyrolysis under the conditions specified in the second column of Table 8.

To evaluate the atomic arrangement, the samples were examined by x-ray diffraction using the Cu(Kα) radiation line on a Siemens D500 x-ray diffractometer. X-ray diffractograms for sample 1 and sample 2 produced under the conditions specified in Table 8 are shown in FIGS. 55 and 56, respectively. The samples had strong peaks corresponding to elemental silver.

Figure 57:
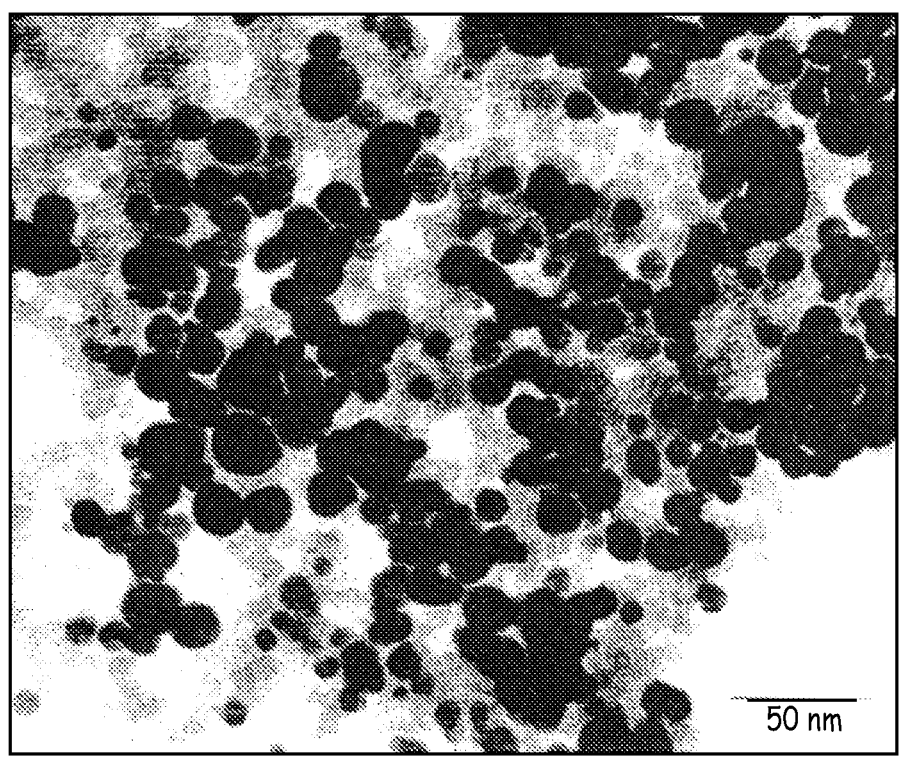
FIG. 57 is a transmission electron micrograph of the materials from the sample corresponding to the diffractogram in FIG. 55.

Powders produced under the conditions of column 1 of Table 8 were further analyzed using transmission electron microscopy. The TEM micrograph is shown in FIG. 57. The particle size distribution in the TEM micrograph is broad relative to particle size distributions involving laser pyrolysis synthesis. The particle size distribution can be narrowed significantly by either using gas phase precursors or a more uniform aerosol delivery.

Representative particles were also analyzed by elemental analysis. A typical elemental analysis of these materials yielded in weight percent about 93.09% silver, 2.40% carbon, 0.05% hydrogen, and 0.35% nitrogen. Oxygen was not directly measured and may have accounted for some of the remaining weight. The elemental analysis was performed by Desert Analytics, Tucson, Ariz.

The carbon component in the nanoparticles likely is in the form of a coating. Such carbon coatings can be formed from the carbon introduced by ethylene within the reactant stream. Generally, the carbon can be removed by heating under an oxidizing atmosphere under mild conditions. The removal of such carbon coatings is described further in U.S. Pat. No. 6,387,531, entitled "Metal (Silicon) Oxide/Carbon Composite Particles," incorporated herein by reference.

Since other group IB elements, copper and gold, have similar chemical properties as silver, substitution of copper or gold precursors for the silver precursors under similar conditions should result in the production of elemental copper or gold nanoparticles.

Example 15

Formation of Silicon Nitride Nanoparticles

Silicon nitride particles were produced by laser pyrolysis. The laser pyrolysis was performed in an apparatus essentially as shown in FIG. 10 with the batch collection apparatus.

The reactant stream included ammonia ($NH_3$) and silane ($SiH_4$) that were delivered as vapor. The reaction conditions are summarized in Table 9.

TABLE 9

| Phase | Silicon nitride |
|---|---|
| Crystal Structure | amorphous |
| Pressure (Torr) | 200 |
| Argon-Win (slm) | 5 |
| Argon-Sld. (slm) | 30 |
| Ammonia (slm) | 3.6-3.8 |
| Silane (slm) | 2.0 |
| Production Rate (gm/hr) | 280 |
| Laser Power - Input (watts) | 800-1000 |
| Laser Power - Output (watts) | 400-500 | slm = standard liters per minute

Based on the teachings herein both above and in this example, the particles described in this example can be produced with equivalent properties in appropriate apparatuses and at appropriate conditions at rates in the range(s) of at least about 35 grams per hour and at higher rates described above.

Figure 58:
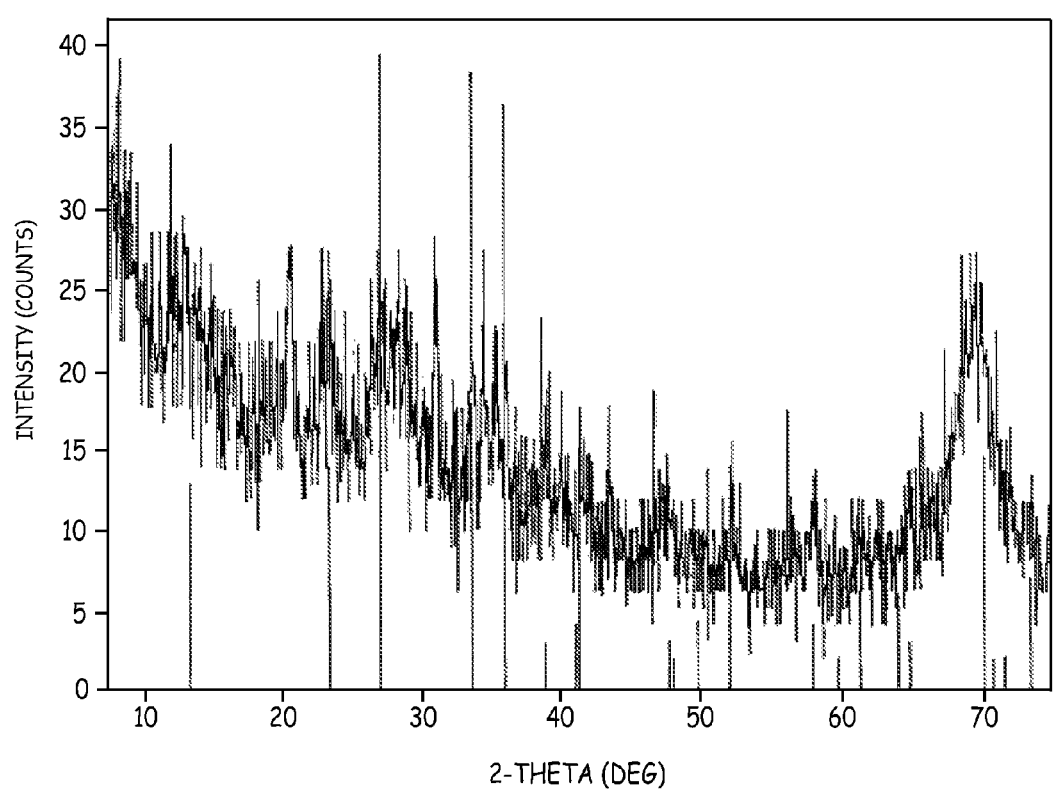
FIG. 58 is an x-ray diffractogram of silicon nitride nanoparticles produced by laser pyrolysis.

An x-ray diffractogram of the silicon nitride nanoparticles using the Cu(Kα) radiation line on a Siemens D500 x-ray diffractometer are shown in FIG. 58. The diffractogram has peaks corresponding to crystalline silicon nitride as well as a broad peak at low scattering angles indicative of a larger degree of an amorphous state.

Figure 59:
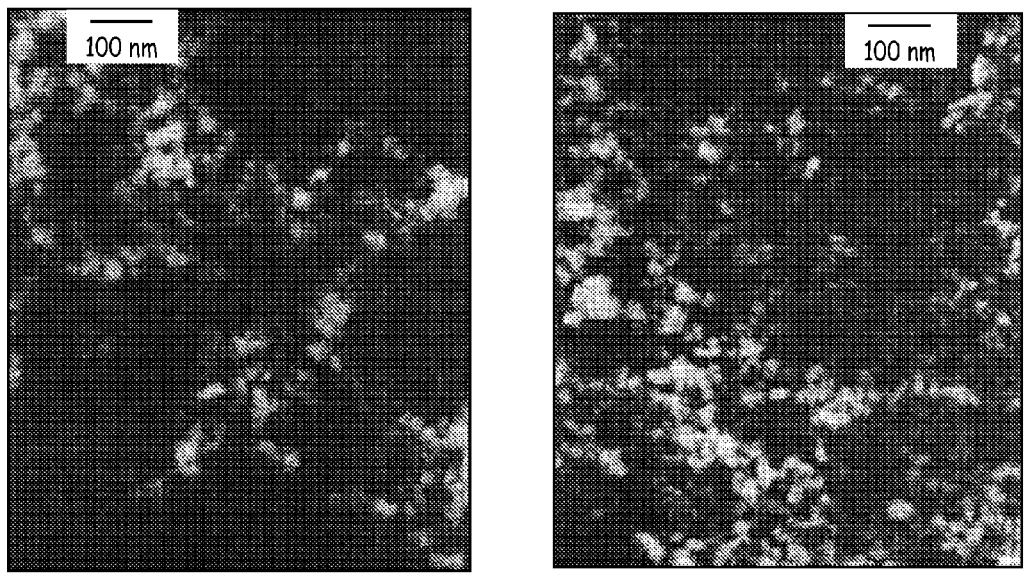
FIG. 59 is two transmission electron micrographs of silicon nitride nanoparticles equivalent to those used to produce the x-ray diffractogram of FIG. 58.
Figure 60:
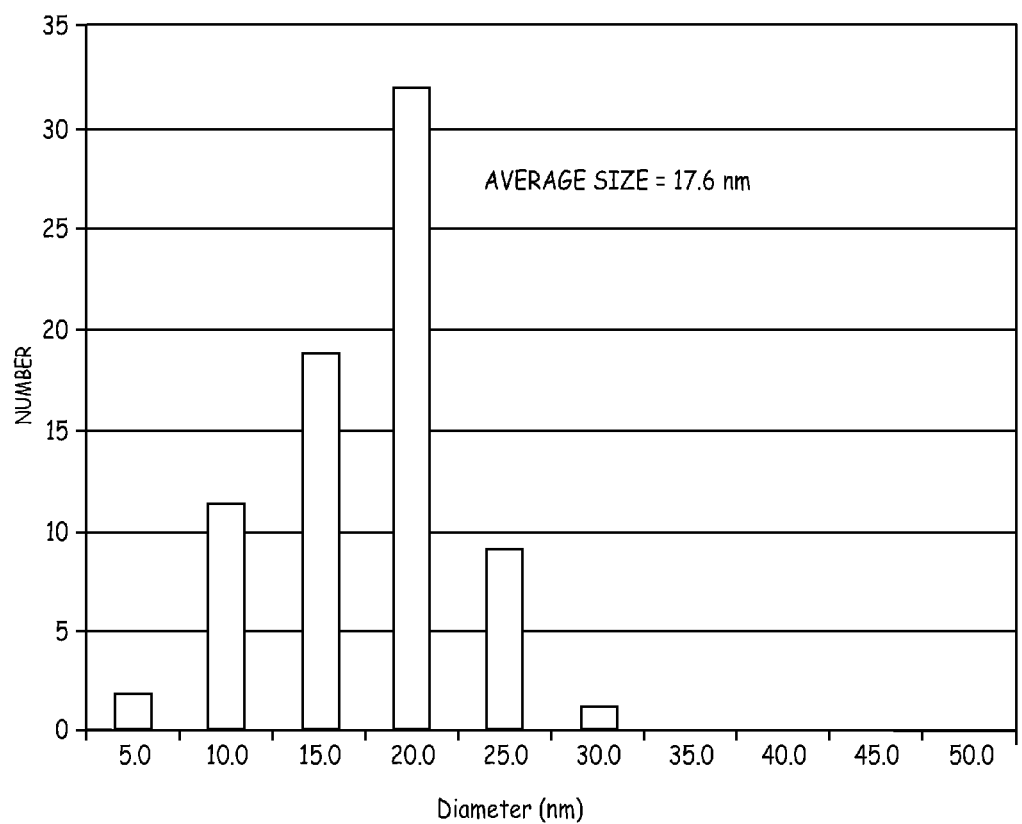
FIG. 60 is a particle size distribution obtained from the micrograph in FIG. 59.

Transmission electron micrographs of the nanoparticles are shown in FIG. 59. An approximate size distribution was determined by manually measuring diameters of the particles shown in FIG. 59. The particle size distribution is shown in FIG. 60. An average particle size of about 17.6 nm was obtained. Only those particles showing clear particle boundaries were measured and recorded to avoid regions distorted in the micrograph. This should not bias the measurements obtained since the single view of the micrograph may not show a clear view of all particles because of the orientation of the particles.

Example 16

Formation of Silicon Carbide Nanoparticles

Amorphous silicon carbide particles were produced by laser pyrolysis. The synthesis was laser pyrolysis apparatus essentially as shown in FIG. 1 with a single slit nozzle.

The dimethyl diethoxysilane (($CH_3CH_2O)_2Si(CH_3)_2$) (Strem Chemical, Inc., Newburyport, Mass.) precursor vapor was carried into the reaction chamber by bubbling Ar gas through the dimethoxysilane liquid stored in a container at room temperature. Additional argon was added as a diluent to the reactant stream. The dimehoxysilane decomposes to form the silicon carbide particles. The reactant gas mixture containing dimethoxysilane, Ar and $C_2H_4$ (optionally) was introduced into the reactant gas nozzle for injection into the reactant chamber. The reactant gas nozzle had dimensions ⅝ in×⅛ in. $C_2H_4$ gas was used, optionally, as a laser absorbing gas for some runs, although dimethoxysilane may absorb $CO_2$ laser radiation sufficiently that ethylene may not be necessary. Argon was used as an inert gas.

Representative reaction conditions for the production of amorphous silicon carbide nanoparticles are described in Table 10.

TABLE 10

| Phase | Silicon carbide | Silicon carbide |
|---|---|---|
| Crystal Structure | Amorphous | Amorphous |
| Pressure (Torr) | 410 | 700 |
| Argon-Win (slm) | 2.24 | 2.24 |
| Argon-Sld. (slm) | 8.40 | 8.40 |
| Ethylene (slm) | 1.61 | 0.00 |
| Carrier Gas - Argon (slm) | 1.13 | 1.97 |
| Dilution Gas - Argon (slm) | 1.4 | 0.0 |
| Precursor Temp. (° C.) | Room Temp. | Room Temp. |
| Production Rate (gm/hr) | 3.0 | 3.28 |
| Laser Power - Input (watts) | 970 | 1140 |
| Laser Power - Output (watts) | 700 | 1020 | slm = standard liters per minute
Argon - Win. = argon flow through inlets 216, 218
Argon - Sld. = argon flow through annular channel 142

Based on the teachings herein both above and in this example, the particles described in this example can be produced with equivalent properties in appropriate apparatuses and at appropriate conditions at rates in the range(s) of at least about 35 grams per hour and at higher rates described above.

Figure 61:
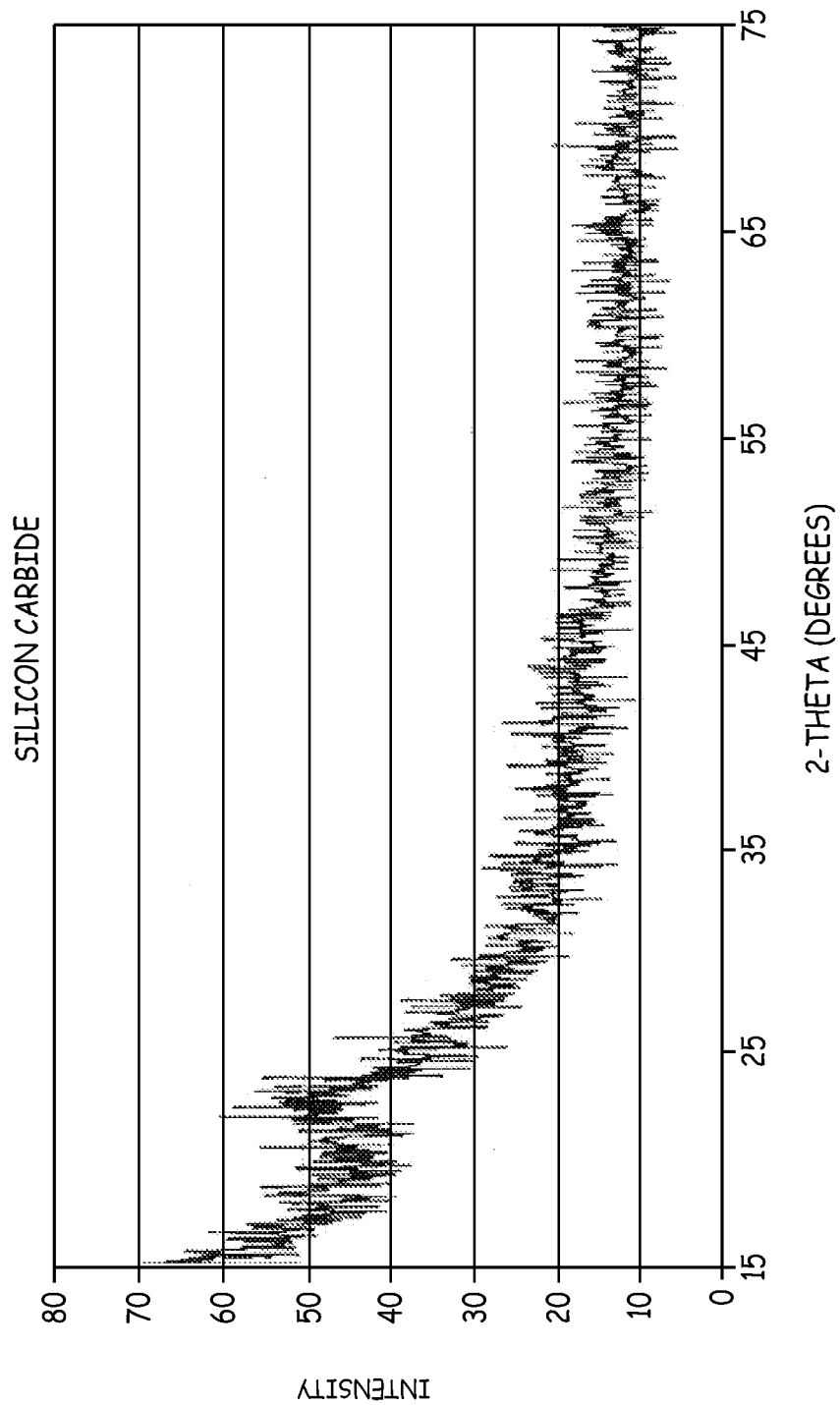
FIG. 61 is an x-ray diffractogram of silicon carbide nanoparticles produced by laser pyrolysis.

An x-ray diffractogram of product nanoparticles produced under the conditions of column 2 of Table 10 is shown in FIG. 61. Broad diffraction peaks at low scattering angles are seen corresponding to amorphous structure.

Figure 62:
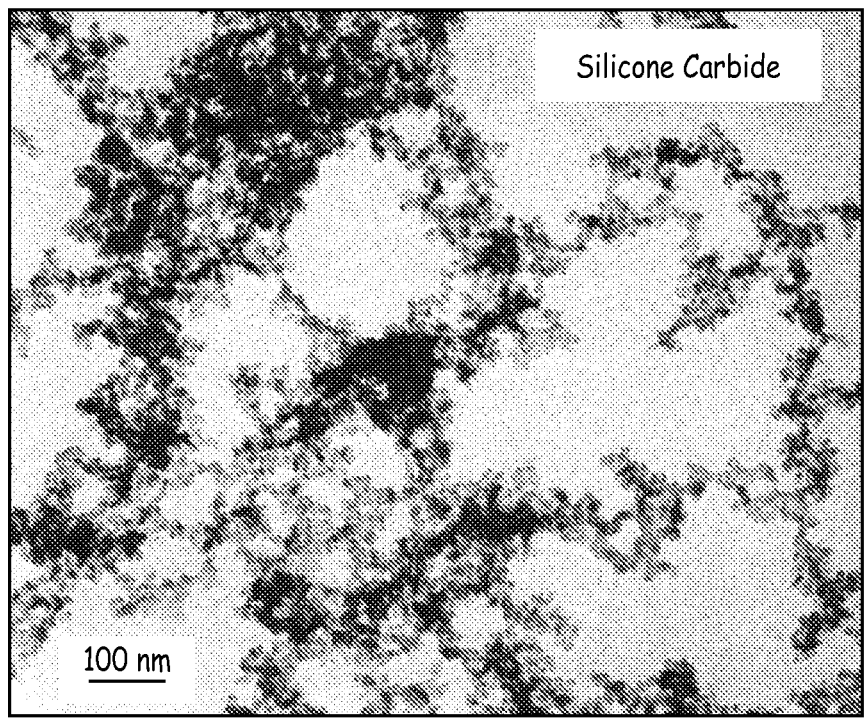
FIG. 62 is a transmission electron micrograph of silicon carbide nanoparticles equivalent of those used to produce the x-ray diffractogram of FIG. 61.
Figure 63:
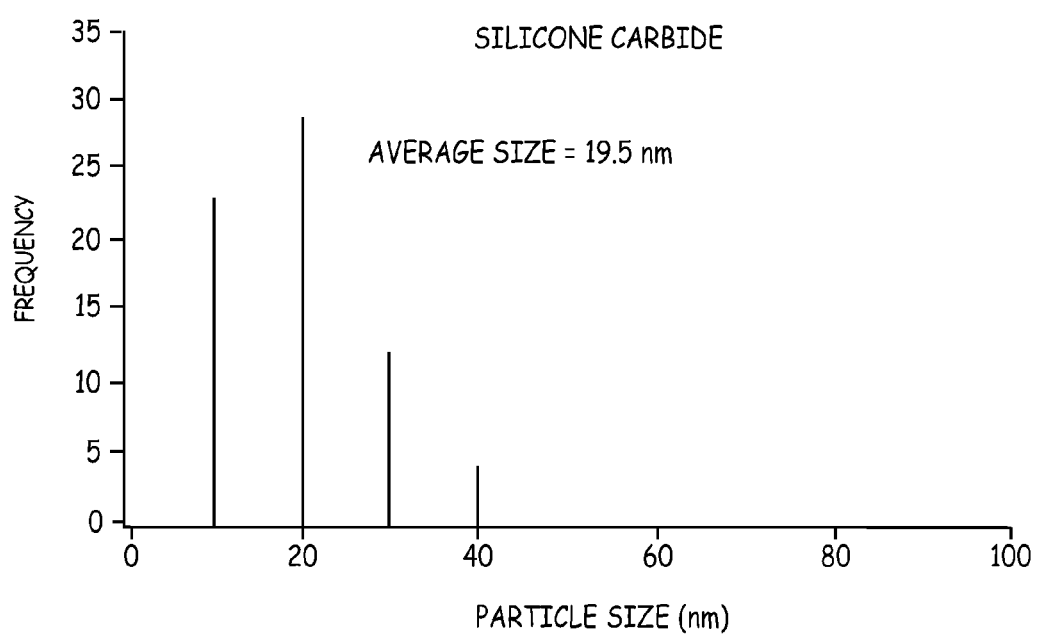
FIG. 63 is a particle size distribution obtained from the micrograph of FIG. 62.

The transmission electron micrograph for the materials used to produce the x-ray diffractogram in FIG. 61 is shown in FIG. 62. An approximate size distribution was determined by manually measuring diameters of the particles shown in FIG. 61. The particle size distribution is shown in FIG. 63. An average particle size of about 19.5 nm was obtained. Only those particles showing clear particle boundaries were measured and recorded to avoid regions distorted in the micrograph. This should not bias the measurements obtained since the single view of the micrograph may not show a clear view of all particles because of the orientation of the crystals.

Example 17

Production of Lithium Iron Phosphate

This example demonstrates the synthesis of lithium iron phosphate by laser pyrolysis. These powders are useful as electroactive materials, as described in the following example. Laser pyrolysis was carried out using a reaction chamber essentially as described above with respect to FIG. 6.

Ammonium phosphate-monobasic ($NH_4H_2PO_4$) (1.0 molar), lithium chloride (LiCl) (1.0 molar) and ferrous chloride ($FeCl_2 \cdot 4H_2O$) (1.0 molar) precursors were dissolved in deionized water. All the precursors were obtained from Aldrich Chemical Co., Milwaukee, Wis. HCl was added to adjust the pH to a low enough value so that the iron remained in a +2 state and so that no precipitate was formed. The pH was between 0 and 2. The solution was stirred for 2-3 hours using a magnetic stirrer. The aqueous precursor solution were carried into the reaction chamber as an aerosol. $C_2H_4$ gas was used as a laser absorbing gas, and nitrogen was used as an inert diluent gas. Molecular oxygen ($O_2$) was used to maintain a neutral environment in the reaction chamber. The reactant mixture containing the precursors, $N_2$, $O_2$ and $C_2H_4$ was introduced into the reactant nozzle for injection into the reaction chamber. Additional parameters of the laser pyrolysis synthesis relating to the particles are specified in Table 11.

TABLE 11

|  | 1 | 2 |
|---|---|---|
| Pressure (Torr) | 180 | 180 |
| Nitrogen F.R.-Window (SLM) | 5 | 5 |
| Nitrogen F.R.-Shielding (SLM) | 20 | 20 |
| Ethylene (SLM) | 5 | 3 |
| Diluent Gas (nitrogen) (SLM) | 12 | 9.5 |
| Oxygen (SLM) | 3 | 3.6 |
| Laser Input (Watts) | 750 | 750 |
| Laser Output (Watts) | 714 | 680 |
| Production Rate (g/hr) | ~1 g | ~1 g |
| Precursor Delivery Rate to Atomizer* (ml/min.) | 10 | 50 | slm = standard liters per minute
Nitrogen - Win. = $N_2$ flow near lens 412.
Nitrogen - Sld. = $N_2$ flow through shielding gas opening 462.
*A majority of the aerosol precursor returns down the nozzle and is recycled.

Based on the teachings herein both above and in this example, the particles described in this example can be produced with equivalent properties in appropriate apparatuses and at appropriate conditions at rates in the range(s) of at least about 35 grams per hour and at higher rates described above.

Figure 64:
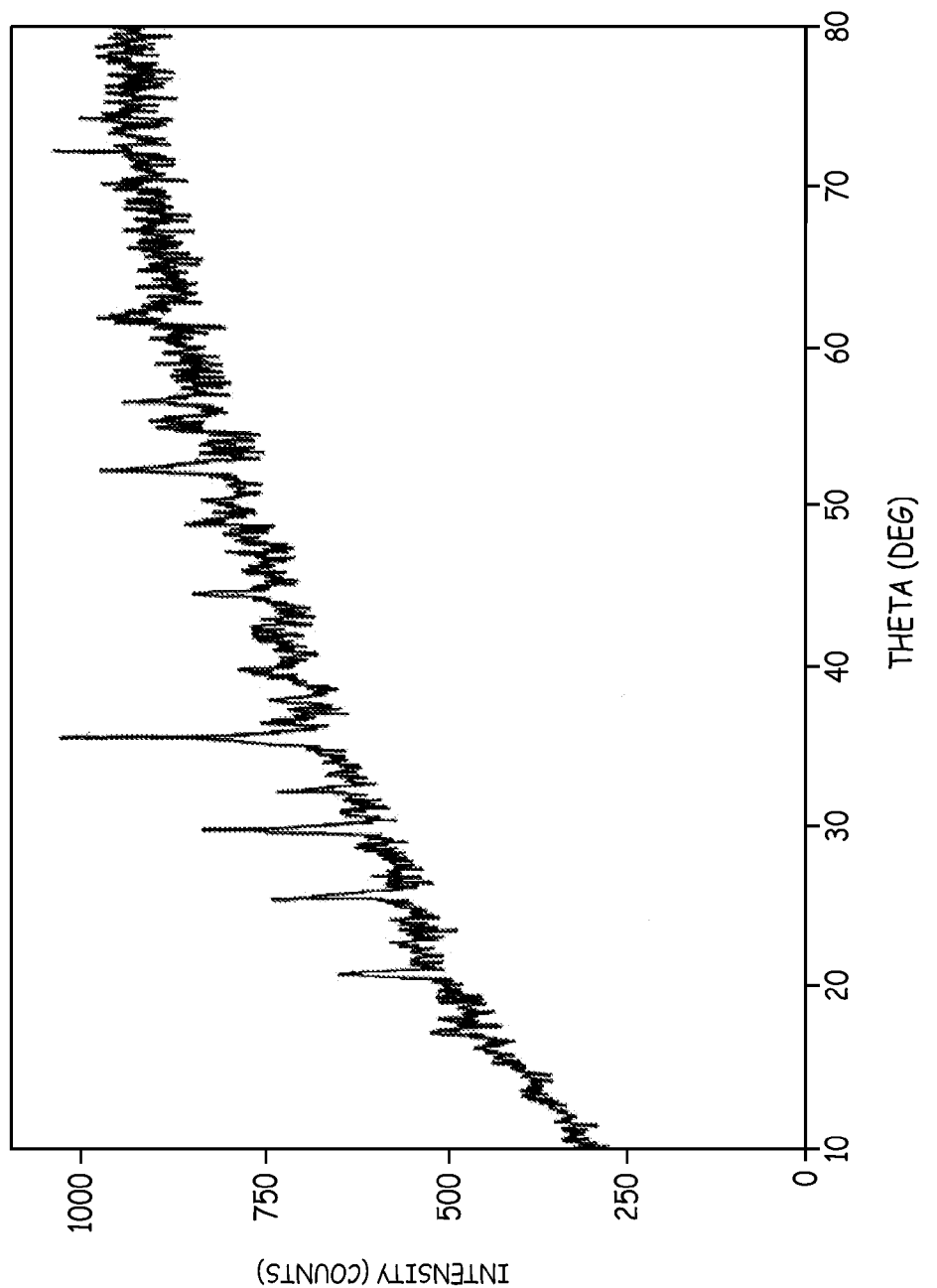
FIG. 64 is a x-ray diffractogram of a sample of lithium iron phosphate produced by laser pyrolysis under one set of conditions.

To evaluate the atomic arrangement, the samples were examined by x-ray diffraction using the Cu(Kα) radiation line on a Rigaku Miniflex x-ray diffractometer. X-ray diffractograms for a sample produced under the conditions specified in column 1 of Table 11 is shown in FIG. 64. In the diffactogram, crystalline phases were identified that corresponded to $LiFePO_4$. A metallic iron impurity seems to contribute a peak at about 45°. Based on the x-ray spectra, the materials produced under the conditions in the first column of Table 11 seemed more crystalline than the particles produced under the conditions in the second column of Table 11 (not shown). Additional peaks may correspond to $FeFe_2O_4$ from the oxidation of $Fe^0$ to $Fe_3O_4$. There may also be some amorphous phases.

Samples of lithium iron phosphate nanoparticles produced by laser pyrolysis according to the conditions specified in Table 11 were heated in an oven under inert conditions. The oven was essentially as described above with respect to FIG. 24. Between about 100 and about 700 mg of nanoparticles were placed in an open 1 cc alumina boat within the quartz tube projecting through the oven. $N_2$ was flowed through a 1.0 inch diameter quartz tube at a flow rate of 100 sccm. The oven was heated to about 500° C. The particles were heated for about 3-7 hours. These particles are referred to subsequently as H1 powders. These heat treated samples yielded good battery results.

The crystal structure of the resulting heat treated particles was determined by x-ray diffraction. The x-ray diffractogram from the heat treated sample indicates a high degree of crystallinity.

Figure 65:
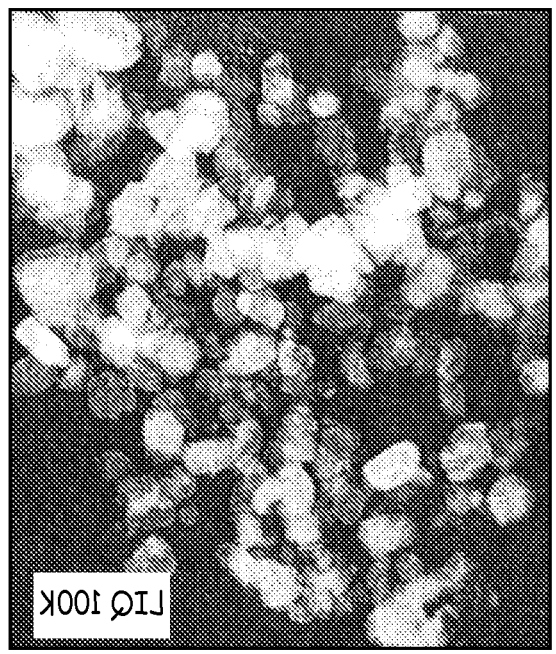
FIG. 65 is a transmission electron micrograph of a sample of lithium iron phosphate produced by laser pyrolysis.

Transmission electron microscopy (TEM) was used to evaluate particle sizes and morphology of the heat treated samples. A TEM micrograph of the heat treated sample starting with materials produced under the conditions in the second column of Table 11 is shown in FIG. 65.

Also, BET surface areas were measured for the a particle sample produced by laser pyrolysis under the conditions specified in column 2 of Table 11 and for the corresponding heat treated sample. The BET surface area was determined with an $N_2$ gas absorbate. The BET surface area was measured with a Micromeritics Tristar 3000™ instrument. The samples produced by laser pyrolysis as specified in column 2 of Table 11 had BET surface areas of 24-25 $m^2/g$. For the heat treated sample, particles had a BET surface area of 11-12 $m^2/g$.

Example 18

Laser Pyrolysis Synthesis of Europium Doped Barium Manganese Aluminum Oxide

This example demonstrates the synthesis of europium doped barium manganese aluminum oxide by laser pyrolysis. These materials are useful as blue phosphor material in plasma displays and fluorescent lamps. Laser pyrolysis was carried out using a reaction chamber essentially as described above with respect to FIGS. 6-8.

Europium nitrate ($Eu(NO_3)_3 \cdot 6H_2O$) (99.99%, 0.0025 molar) precursor, barium nitrate ($Ba(NO_3)_2$) (99.999%, 0.0475 molar), aluminum nitrate ($Al(NO_3)_2 \cdot 9H_2O$) (99.999%, 0.5 molar), and magnesium nitrate ($Mg(NO_3)_2 \cdot XH_2O$) (99.999%, 0.05 molar) precursors were dissolved in deionized water. All the metal precursors were obtained from Alfa Aesar, Inc., Ward Hill, Mass. The solutions were stirred for 2-3 hours on a hot plate using a magnetic stirrer. The aqueous metal precursor solutions were carried into the reaction chamber as an aerosol. $C_2H_4$ gas was used as a laser absorbing gas, and nitrogen was used as an inert diluent gas. The reactant mixture containing the metal precursors, $N_2$, $O_2$ and $C_2H_4$ was introduced into the reactant nozzle for injection into the reaction chamber. Additional parameters of the laser pyrolysis synthesis relating to the particles are specified in Table 12.

TABLE 12

|  | 1 | 2 |
|---|---|---|
| Pressure (Torr) | 300 | 180 |
| Nitrogen F.R.-Window (SLM) | 5.0 | 5.0 |
| Nitrogen F.R.-Shielding (SLM) | 20.0 | 32.0 |
| Ethylene (SLM) | 5.0 | 1.5 |
| Diluent Gas (nitrogen) (SLM) | 14.0 | 6.0 |
| Oxygen (SLM) | 2.7 | 4.5 |
| Laser Input (Watts) | 1400 | 1700 |
| Laser Output (Watts) | 1286 | 1653 |
| Production Rate (g/hr) | 0.6 | 0.7 |

TABLE 12-continued

|  | 1 | 2 |
|---|---|---|
| Precursor Delivery Rate to Atomizer* (ml/min) | 20 | 10 | slm = standard liters per minute
Argon - Win. = argon flow through inlets 216, 218
Argon - Sld. = argon flow through annular channel 142.
*A majority of the aerosol precursor returns down the nozzle and is recycled.

Based on the teachings herein both above and in this example, the particles described in this example can be produced with equivalent properties in appropriate apparatuses and at appropriate conditions at rates in the range(s) of at least about 35 grams per hour and at higher rates described above.

Figure 66:
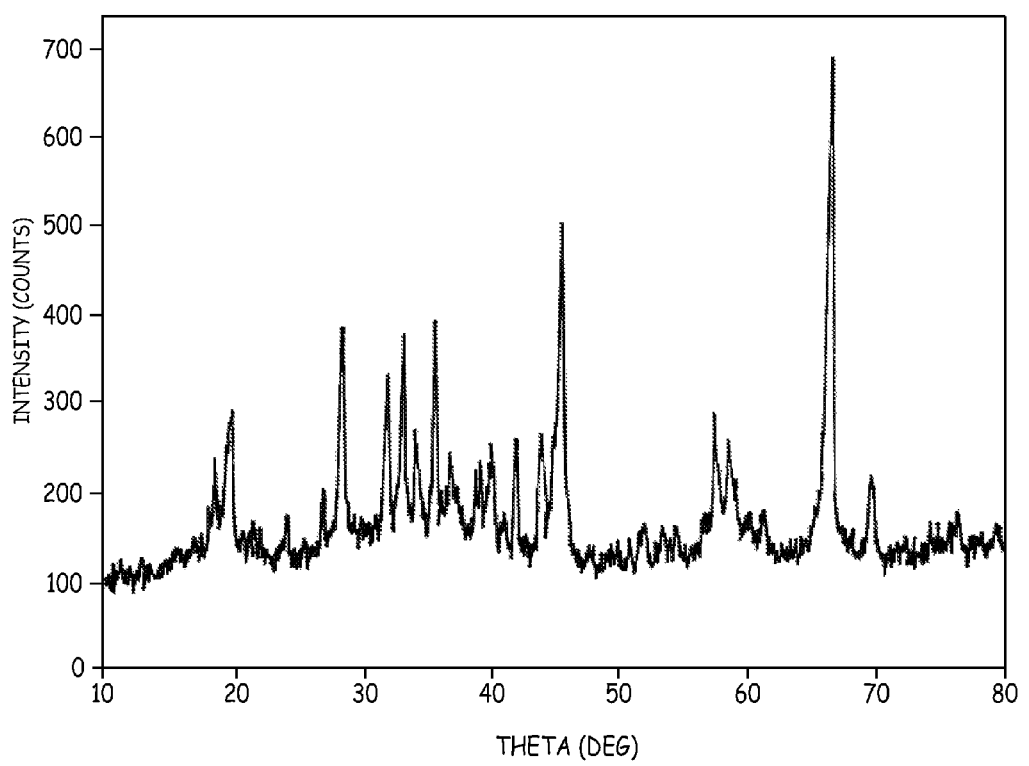
FIG. 66 is an x-ray diffractogram of a sample of europium doped barium magnesium aluminum oxide produced by laser pyrolysis.
Figure 67:
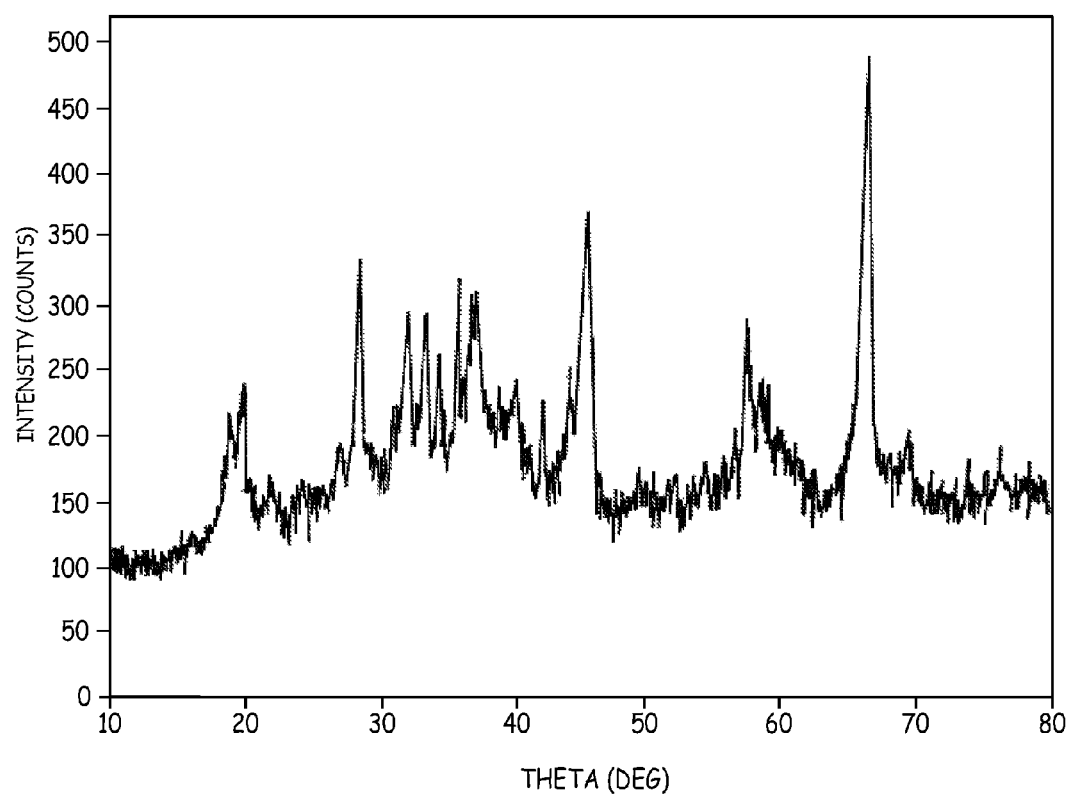
FIG. 67 is an x-ray diffractogram of a sample of europium doped barium magnesium aluminum oxide produced by laser pyrolysis produced under different conditions that used to produce the sample of FIG. 66.

To evaluate the atomic arrangement, the samples were examined by x-ray diffraction using the Cu(Kα) radiation line on a Rigaku Miniflex x-ray diffractometer. X-ray diffractograms for a sample produced under the conditions specified in column 1 and 2 of Table 12 is shown in FIGS. 66 and 67, respectively. In each of the samples, crystalline phases were identified that corresponded to europium doped barium magnesium aluminum oxide ($BaMgAl_{10}O_{17}$:Eu) by comparison with the diffractogram of commercially available powders. Based on the x-ray spectra, the materials produced under the conditions in the first column of Table 12 seemed more crystalline than the particles produced under the conditions in the second column of Table 12. Additional peaks corresponding to additional phases are observed that have not been identified. There may be some amorphous phases.

Samples of europium doped barium magnesium aluminum oxide nanoparticles produced by laser pyrolysis according to the conditions specified in Table 12 were heated in an oven under reducing conditions. Between about 100 and about 700 mg of nanoparticles were placed in an open 1 cc alumina boat within an alumina tube projecting through the oven. A mixture of 96.04% argon and 3.96% hydrogen was flowed through a 3.0 inch diameter quartz tube at a flow rate of 100 sccm. The oven was heated to about 1300° C. The particles produced under the conditions in column 1 of Table 1 were heated for about 2 hours, and the particles produced under the conditions in column 2 of Table 12 were heated for about 2 hours and 30 minutes. These particles are respectively referred to as H1 (starting powders were produced under conditions in column 1 of Table 12) and H2 (starting powders were produced under conditions in column 2 of Table 12).

Figure 68:
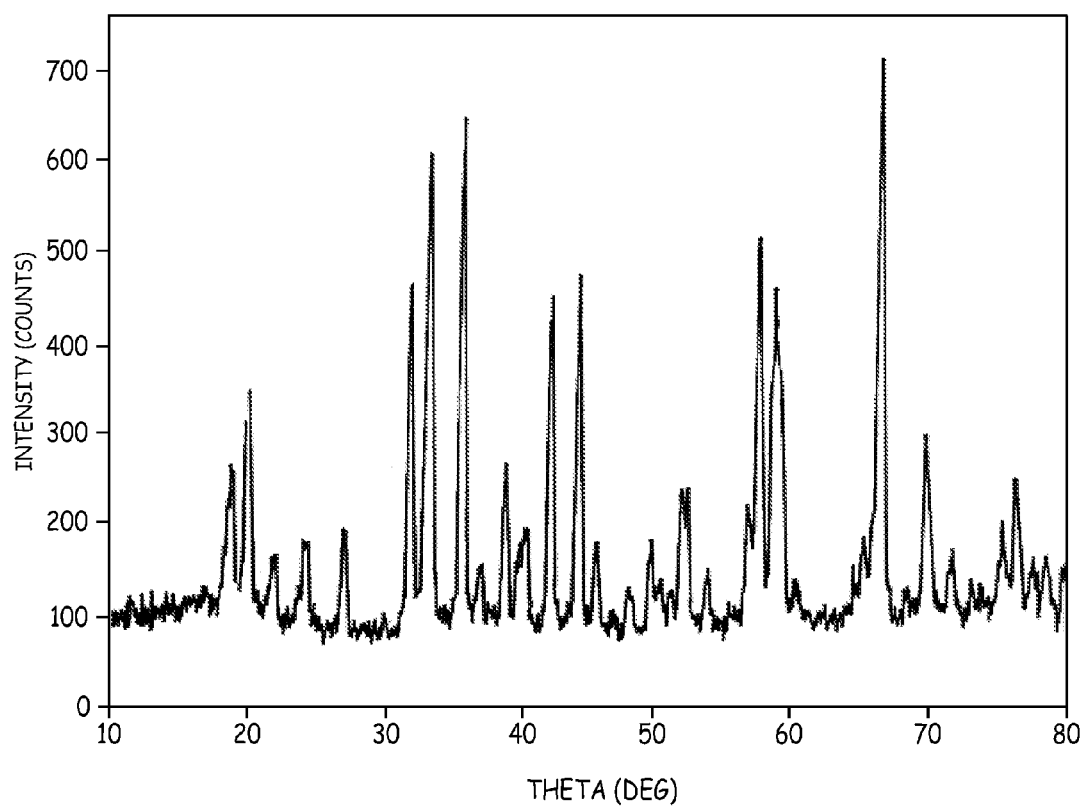
FIG. 68 is an x-ray diffractogram of a first sample produced by laser pyrolysis following a heat treatment.
Figure 69:
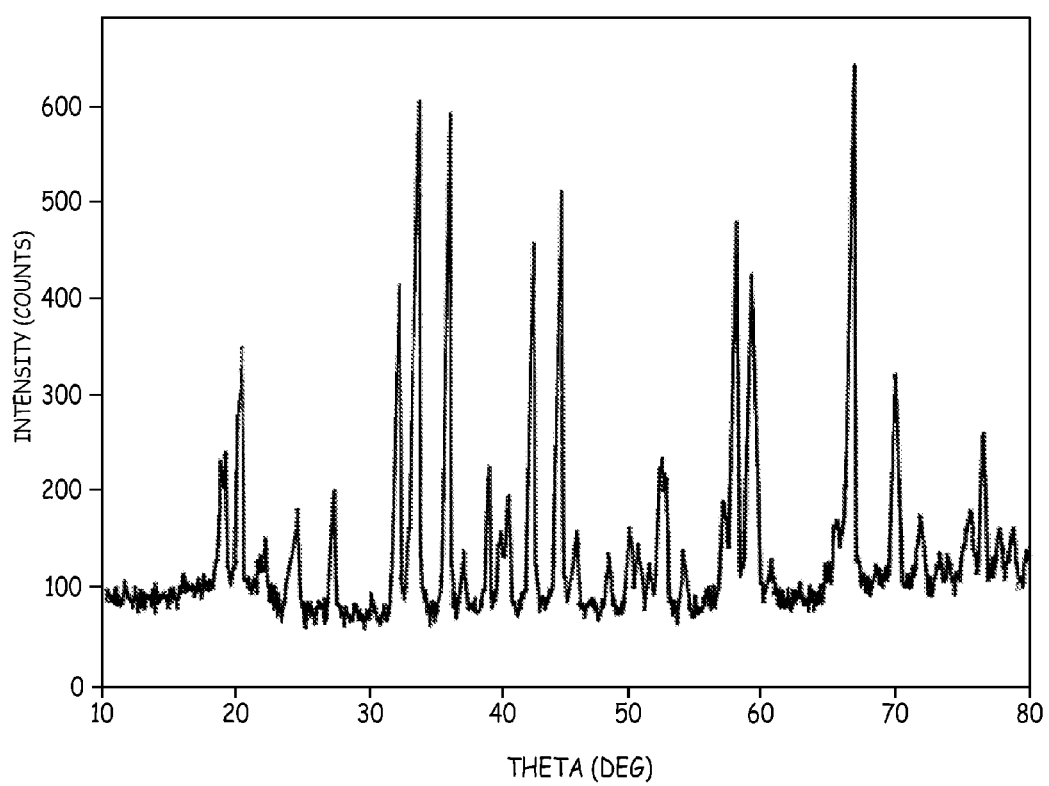
FIG. 69 is an x-ray diffractogram of a second sample produced by laser pyrolysis following a heat treatment.

The crystal structure of the resulting heat treated particles was determined by x-ray diffraction. The x-ray diffractogram for heated sample H1 is shown in FIG. 68, and the x-ray diffractogram for heated sample H2 is shown in FIG. 69. Both x-ray diffractograms in FIGS. 68 and 69 are similar to each other and correspond to highly crystalline, phase pure samples of europium doped barium manganese aluminum oxide.

Figure 70:
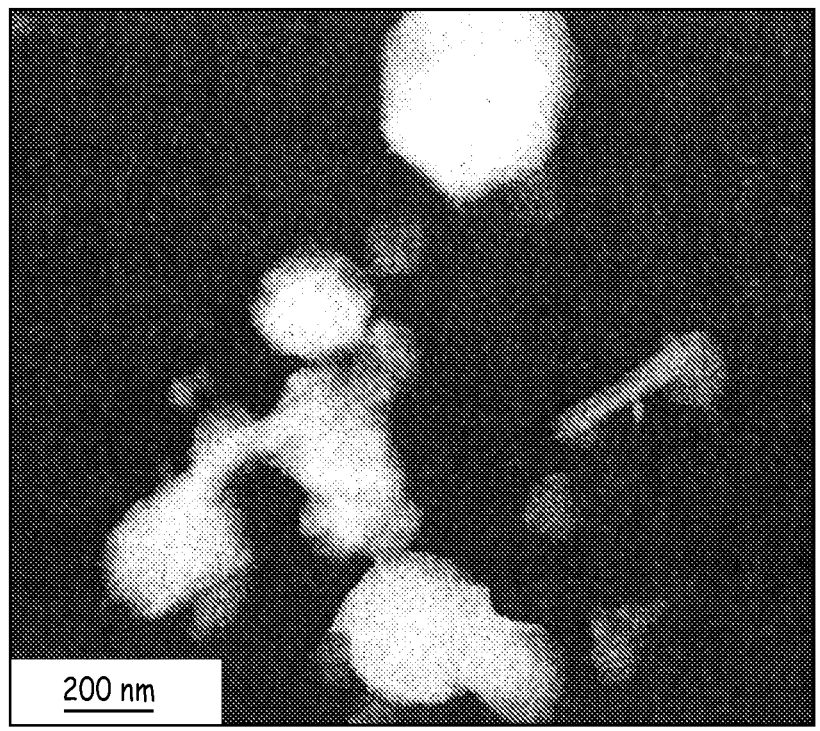
FIG. 70 is a transmission electron micrograph of a powder used to generate the x-ray diffractogram in FIG. 68.

Transmission electron microscopy (TEM) was used to evaluate particle sizes and morphology of the heat treated samples. A TEM micrograph of the particles of sample H2 is shown in FIG. 70. The uniformity of the material can be improved by reducing the reactant density in the laser reaction zone. Also, using chloride salt precursors rather than the nitrate precursors likely would result in more uniform materials based on experiences.

Also, BET surface areas were measured for the two particle samples produced by laser pyrolysis under the conditions specified in columns 1 and 2 of Table 12 and for portions of the samples following heat treatment. The BET surface area was determined with an $N_2$ gas absorbate. The BET surface area was measured with a Micromeritics Tristar 3000™ instrument. The samples produced by laser pyrolysis as specified in columns 1 and 2 of Table 12 had BET surface areas of 11.6 $m^2$/g and 17.8 $m^2$/g, respectively. For the heat treated samples, particles from sample H1 had a BET surface area of 4.41 $m^2$/g, and particles from sample H2 had a BET surface area of 8.44 $m^2$/g.

Example 19

Europium Doped Yttrium Oxide

A europium doped mixed metal oxide nanoparticles have also been produced, in which the mixed metal oxide included a stoichiometric amount of rare earth metal. These materials are useful as red phosphor material in field emission devices. Laser pyrolysis was carried out using a reaction chamber essentially as described above with respect to FIGS. 6-8.

Europium nitrate ($Eu(NO_3)_3.6H_2O$) (99.99%) precursor and yttrium nitrate ($Y(NO_3)_2$) (99.999%) precursors were dissolved in deionized water. All the metal precursors were obtained from Alfa Aesar, Inc., Ward Hill, Mass. The solutions were stirred for 2-3 hours on a hot plate using a magnetic stirrer. The aqueous metal precursor solutions were carried into the reaction chamber as an aerosol. $C_2H_4$ gas was used as a laser absorbing gas, and argon was used as an inert diluent gas. The reactant mixture containing the metal precursors, $N_2$, $O_2$ and $C_2H_4$ was introduced into the reactant nozzle for injection into the reaction chamber. Additional parameters of the laser pyrolysis synthesis relating to the particles of are specified in Table 13.

TABLE 13

|  | 1 |
|---|---|
| Pressure (Torr) | 250 |
| Argon F.R.-Window (SLM) | 10.0 |
| Argon F.R.-Shielding (SLM) | 8.0 |
| Ethylene (SLM) | 2.5 |
| Diluent Gas (argon) (SLM) | 12.0 |
| Oxygen (SLM) | 3.55 |
| Laser Input (Watts) | 1400 |
| Laser Output (Watts) | 1110 |
| Production Rate (g/hr) | 1.1 |
| Precursor Delivery Rate to Atomizer* (ml/min) | 11.8 | slm = standard liters per minute
Argon - Win. = argon flow through inlets 216, 218
Argon - Sld. = argon flow through annular channel 142.
*A majority of the aerosol precursor returns down the nozzle and is recycled.

Based on the teachings herein both above and in this example, the particles described in this example can be produced with equivalent properties in appropriate apparatuses and at appropriate conditions at rates in the range(s) of at least about 35 grams per hour and at higher rates described above.

Figure 71:
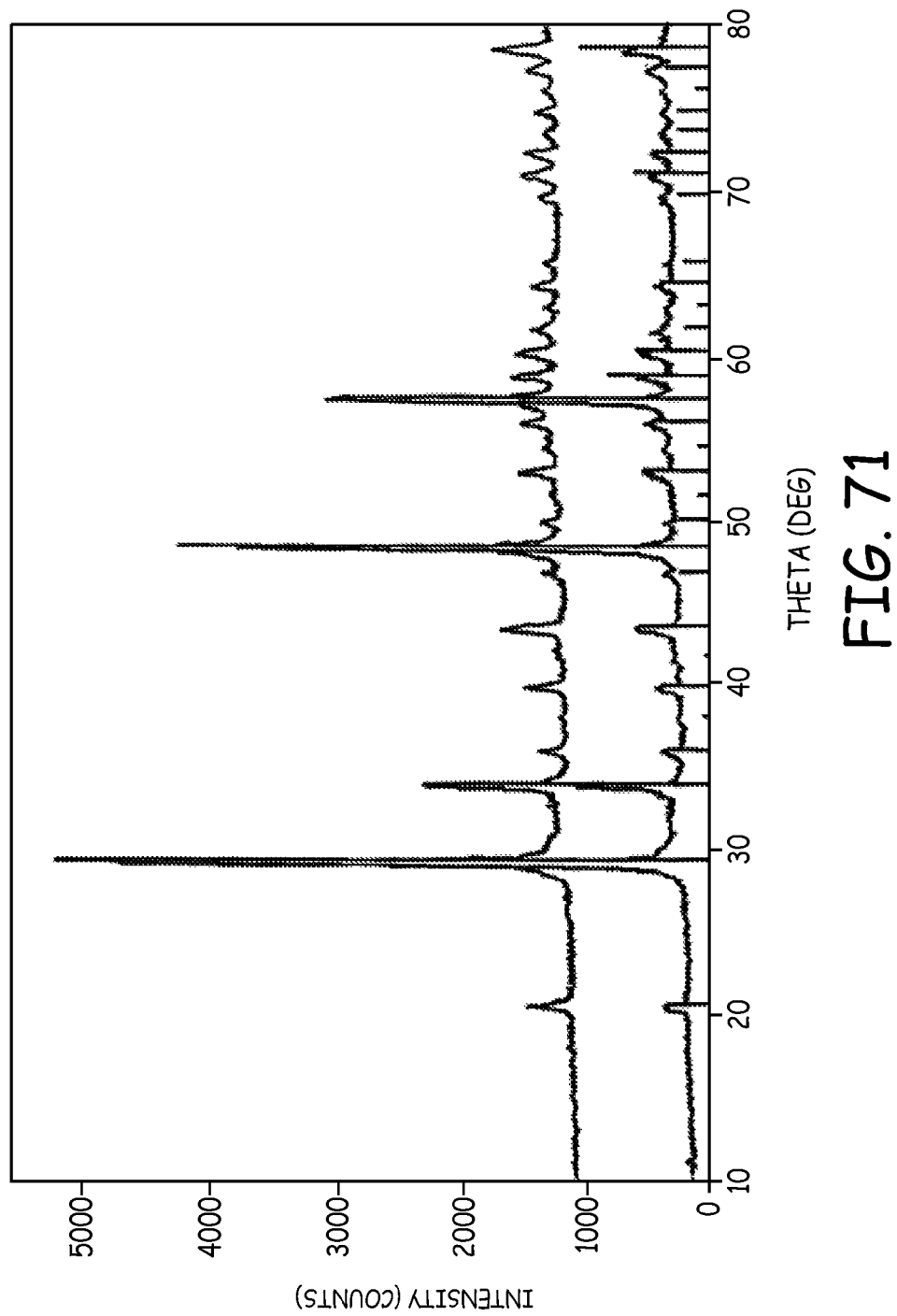
FIG. 71 is an x-ray diffractogram of two samples of $(Y_{0.95}Eu_{0.05})_2O_3$ produced by laser pyrolysis.

To evaluate the atomic arrangement, the samples were examined by x-ray diffraction using the Cu(Kα) radiation line on a Rigaku Miniflex x-ray diffractometer. X-ray diffractograms for two samples produced under the conditions specified in Table 13 are shown in FIG. 71. In each of the samples, crystalline phases were identified that corresponded to europeum doped yttrium oxide ($Y_{0.95}Eu_{0.05}O_3$) by comparison with published diffractogram data, which is indicated by the histogram lines at the bottom of FIG. 71. The similarity of the diffractograms for the two samples demonstrates the reproducibility of the laser pyrolysis synthesis.

Example 20

Lithium Cobalt Oxide

This example describes the production of lithium cobalt oxide nanoparticles. Initially, the synthesis of lithium cobalt oxide precursor particles was performed by laser pyrolysis. Laser pyrolysis was carried out using a reaction chamber essentially as described above with respect to FIGS. 4-6.

Cobalt nitrate ($Co(NO_3)_2.6H_2O$) (Alfa Aesar, Inc., Ward Hill, Mass.) precursor and lithium nitrate ($LiNO_3$) (Alfa Aesar, Inc.) precursor were dissolved in deionized water. Two different concentrations of solutions were used, as specified in Table 14. The aqueous metal precursor solutions were carried into the reaction chamber as an aerosol. $C_2H_4$ gas was used as a laser absorbing gas, and Argon was used as an inert gas. The reactant mixture containing cobalt nitrate, lithium nitrate, Ar, $O_2$ and $C_2H_4$ was introduced into the reactant nozzle for injection into the reaction chamber. Additional parameters of the laser pyrolysis synthesis relating to the particles are specified in Table 14.

TABLE 14

|  | 1 | 2 |
|---|---|---|
| Crystalline Phases | cobalt, cobalt oxide (CoO), $Li_2CO_3$ | cobalt, cobalt oxide (CoO), $Li_2CO_3$ |
| Pressure (Torr) | 150 | 150 |
| Argon F.R.-Window (SLM) | 5 | 5 |
| Argon F.R.-Shielding (SLM) | 20 | 20 |
| Ethylene (SLM) | 4.75 | 4.75 |
| Carrier Gas (Argon) (SLM) | 11 | 11 |
| Oxygen (SLM) | 5.1 | 5.1 |
| Laser Input (Watts) | 1200 | 1200 |
| Laser Output (Watts) | 850 | 920 |
| Production Rate (g/hr) | 8.4 | 2.1 |
| Precursor | 1.49 M cobalt nitrate, 1.93 M lithium nitrate | 0.75 M cobalt nitrate, 0.97 M lithium nitrate | slm = standard liters per minute
Argon - Win. = argon flow through inlets 216, 218
Argon - Sld. = argon flow through annular channel 142.

Based on the teachings herein both above and in this example, the particles described in this example can be produced with equivalent properties in appropriate apparatuses and at appropriate conditions at rates in the range(s) of at least about 35 grams per hour and at higher rates described above.

Figure 72:
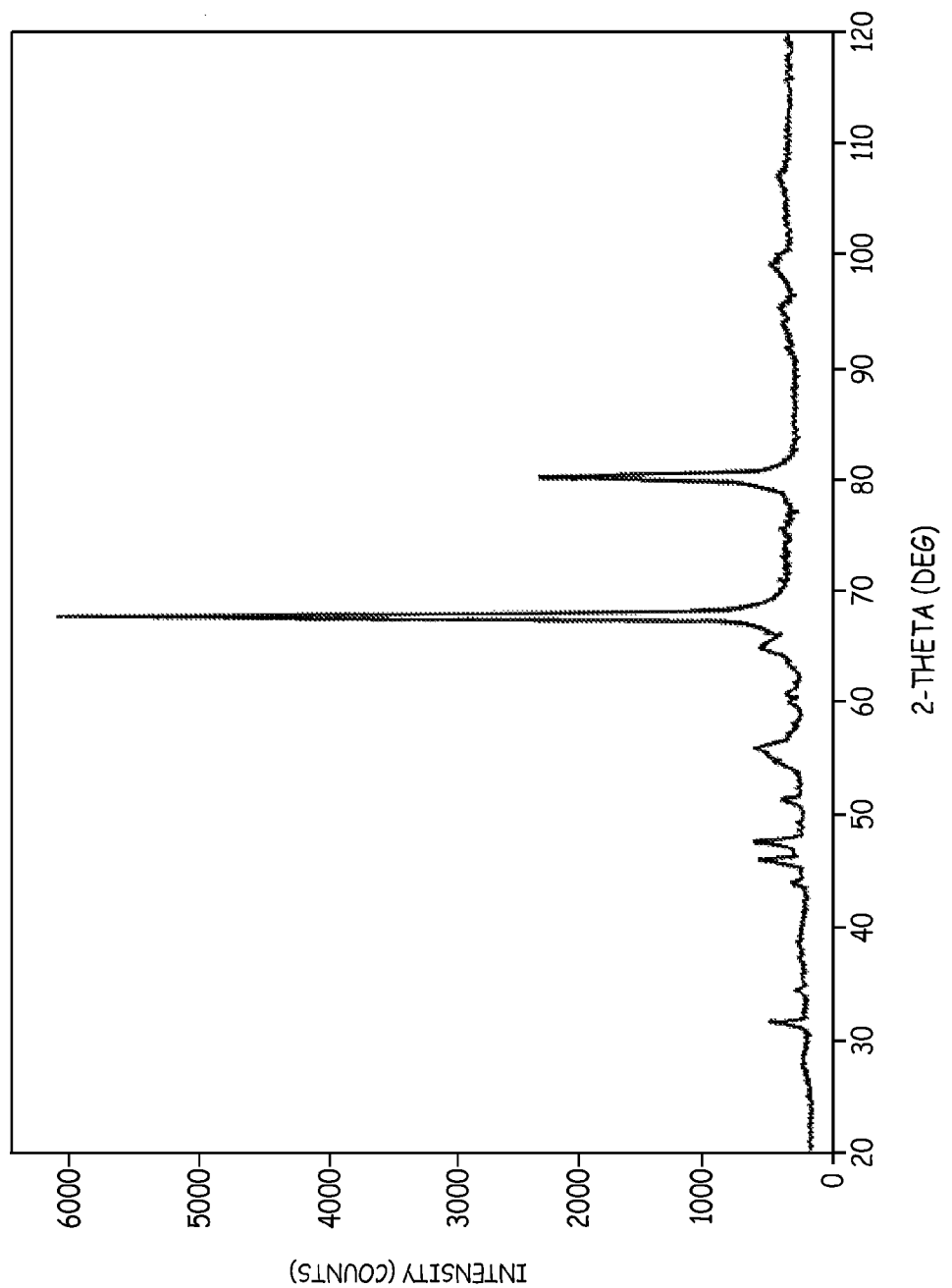
FIG. 72 is an x-ray diffractogram of lithium cobalt oxide nanoparticles produced by laser pyrolysis with gaseous reactants according to the parameters specified in column 1 of Table 14.

To evaluate the atomic arrangement, the samples were examined by x-ray diffraction using the Cr(Kα) radiation line on a Rigaku Miniflex x-ray diffractometer. X-ray diffractograms for a sample produced under the conditions specified in the first column of Table 1 is shown in FIG. 72. Crystalline phases were identified that corresponded to cobalt metal, cobalt oxide (CoO) and lithium carbonate ($Li_2CO_3$). The precursor particles produced under the conditions in the second column of Table 1 had an x-ray diffractogram similar to the diffractogram shown in FIG. 72.

A sample of lithium cobalt oxide precursor nanoparticles produced by laser pyrolysis according to the conditions specified in the first column of Table 1 was heated in an oven under oxidizing conditions. The oven was essentially as described above with respect to FIG. 24. Between about 100 and about 700 mg of nanoparticles were placed in an open 1 cc boat within the quartz tube projecting through the oven. Air was flowed through a 3.0 inch diameter quartz tube at a flow rate of 450 seem. The oven was heated to about 675° C. The particles were heated for about 5 hours. Similarly, a sample produced under the conditions in the second column of Table 14 was heated at 590° C. for five hours in air. When the samples were heated at temperatures greater than about 700° C., significant particle growth was observed. When the particles were heated at temperatures less than about 500° C. a low temperature phase of lithium cobalt oxide was formed that exhibited a lower specific energy over a four volt lithium battery discharge range.

Figure 73:
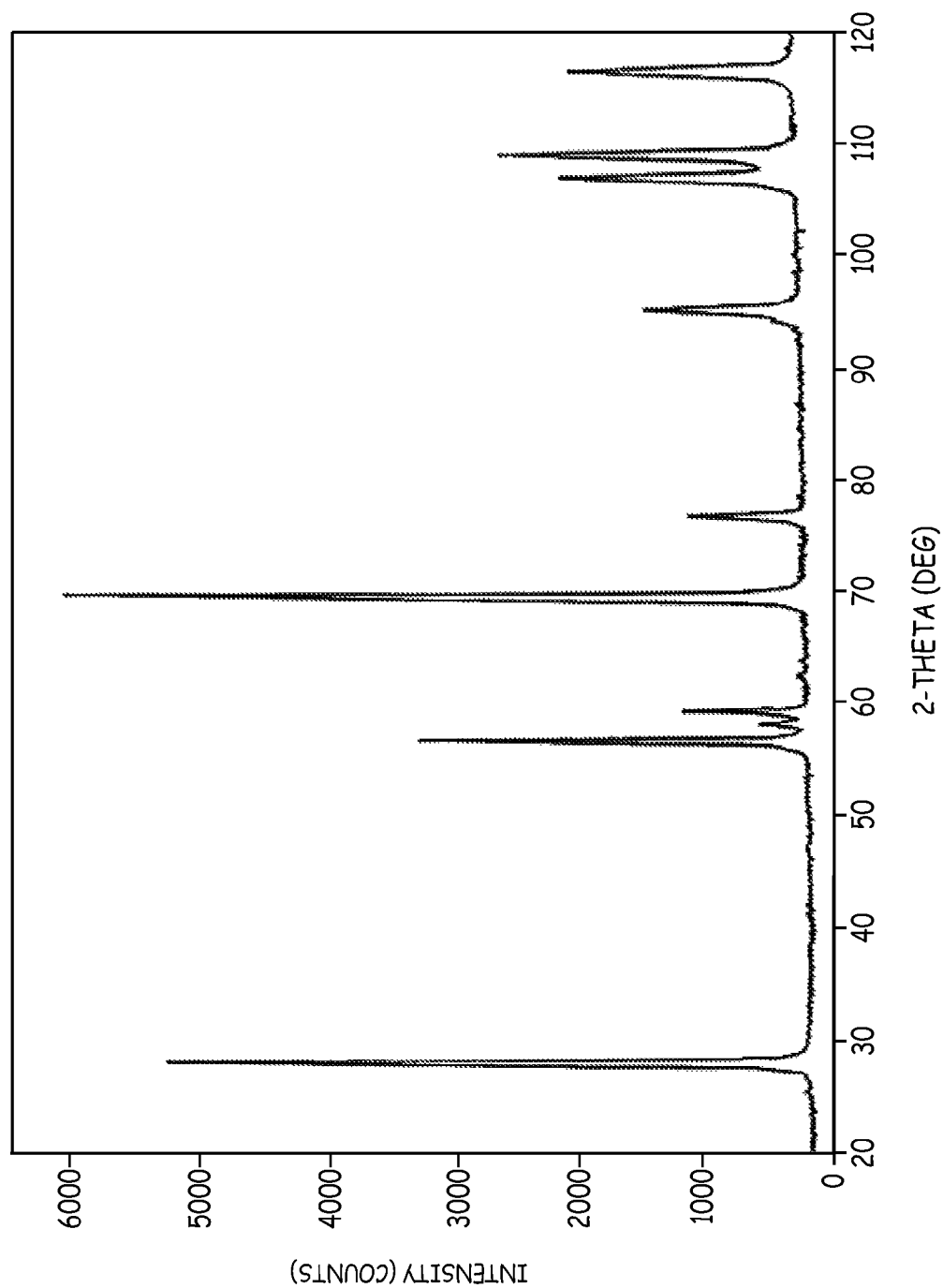
FIG. 73 is an x-ray diffractogram of crystalline lithium cobalt oxide nanoparticles produced by heat treating lithium cobalt oxide precursor nanoparticles.

The crystal structure of the resulting heat treated particles was determined by x-ray diffraction. The x-ray diffractogram for heated sample from the first column of Table 14 is shown in FIG. 73. The x-ray diffractogram shown in FIG. 73 indicates that the collection of particles included crystals of $LiCoO_9$. $LiCoO_2$ is reported to have a rhombohedral crystal structure.

Figure 74:
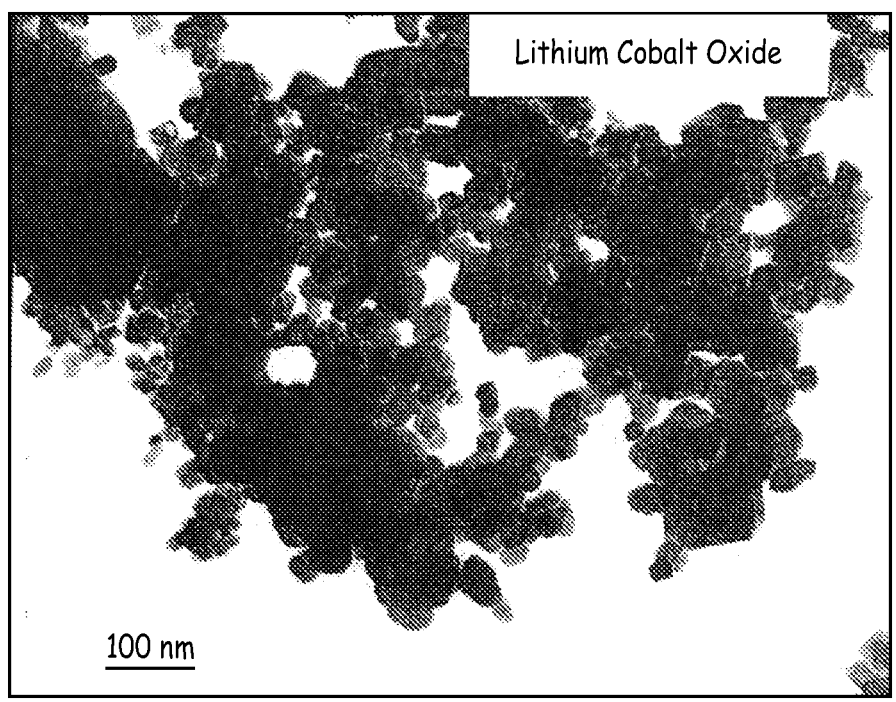
FIG. 74 is a transmission electron microscopy (TEM) micrograph of the crystalline lithium cobalt oxide nanoparticles.
Figure 75:
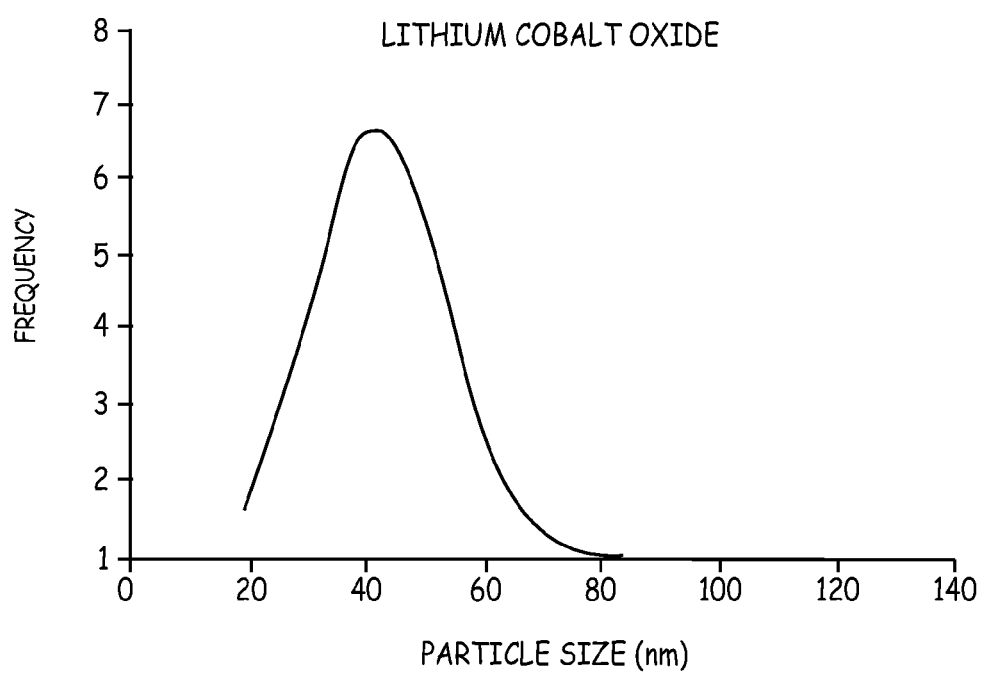
FIG. 75 is a particle size distribution produced from the micrograph of FIG. 74.

Transmission electron microscopy (TEM) was used to evaluate particle sizes and morphology of the heat treated samples. A TEM photograph of the lithium cobalt oxide particles produced following heat treatment of precursor particles formed under the conditions in the first column of Table 14 are shown in FIG. 74. An examination of a portion of the TEM micrograph yielded an average particle size of about 40 nm. The corresponding particle size distribution is shown in FIG. 75. The approximate size distribution was determined by manually measuring diameters of the particles distinctly visible in the micrograph of FIG. 74. Only those particles having clear particle boundaries were measured to avoid regions distorted or out of focus in the micrograph. Measurements so obtained should be more accurate and are not biased since a single view cannot show a clear view of all particles. It is significant that the particles span a rather narrow range of sizes. Some necking and agglomeration is observed in the TEM micrographs. The average dimension of nonspherical particles was used in plotting the particle size distribution.

Also, BET surface areas were measured for the two precursor particle samples produced by laser pyrolysis under the conditions specified in columns 1 and 2 of Table 14 and for portions of the samples following heat treatment. The BET surface area was determined with an $N_2$ gas absorbate. The BET surface area was measured with a Micromeritics Tristar 3000™ instrument. The results are shown in Table 15.

TABLE 15

|  | 1 | 1H[1] | 2 | 2H[2] |
|---|---|---|---|---|
| Surface Area ($m^2$/gm) | 44 | 7 | 101 | 17 |

[1]Sample 1H is sample 1 of Table 1 following heat treatment as described above.
[2]Sample 2H is the sample 2 of Table 1 following heat treatment as described above.

The drop in BET surface area following heat treatment is consistent with grain growth and agglomeration due to the heating process.

Example 21

Lithium Nickel Oxide

This example describes the production of lithium nickel oxide nanoparticles. Initially, the synthesis of lithium nickel oxide precursor particles was performed by laser pyrolysis. Laser pyrolysis was performed using an apparatus essentially as described above with respect to FIGS. 6-8.

Nickel nitrate (Ni(NO$_3$)$_2$.6H$_2$O) (Alfa Aesar, Inc., Ward Hill, Mass.) precursor and lithium nitrate (LiNO$_3$) (Alfa Aesar, Inc.) precursor were dissolved in deionized water with concentration as noted in Table 16. The aqueous metal precursor solutions were carried into the reaction chamber as an aerosol. C$_2$H$_4$ gas was used as a laser absorbing gas, and Argon was used as an inert gas. The reactant mixture containing nickel nitrate, lithium nitrate, Ar, O$_2$ and C$_2$H$_4$ was introduced into the reactant nozzle for injection into the reaction chamber. Additional parameters of the laser pyrolysis synthesis relating to lithium nickel oxide precursor particles are specified in Table 16.

TABLE 16

| | 1 |
|---|---|
| Crystalline Phases | nickel, nickel oxide (NiO), Li$_2$CO$_3$, amorphous phases |
| Pressure (Torr) | 150 |
| Argon F.R.-Window (SLM) | 5 |
| Argon F.R.-Shielding (SLM) | 20 |
| Ethylene (SLM) | 4.75 |
| Carrier Gas (Argon) (SLM) | 12 |
| Oxygen (SLM) | 5.1 |
| Laser Input (Watts) | 1207 |
| Laser Output (Watts) | 1010 |
| Production Rate (g/hr) | 4.9 |
| Precursor | 1.54 M nickel nitrate, 2.0 M lithium nitrate | slm = standard liters per minute
Argon - Win. = argon flow through inlets 216, 218
Argon - Sld. = argon flow through annular channel 142.

Based on the teachings herein both above and in this example, the particles described in this example can be produced with equivalent properties in appropriate apparatuses and at appropriate conditions at rates in the range(s) of at least about 35 grams per hour and at higher rates described above.

Figure 76:
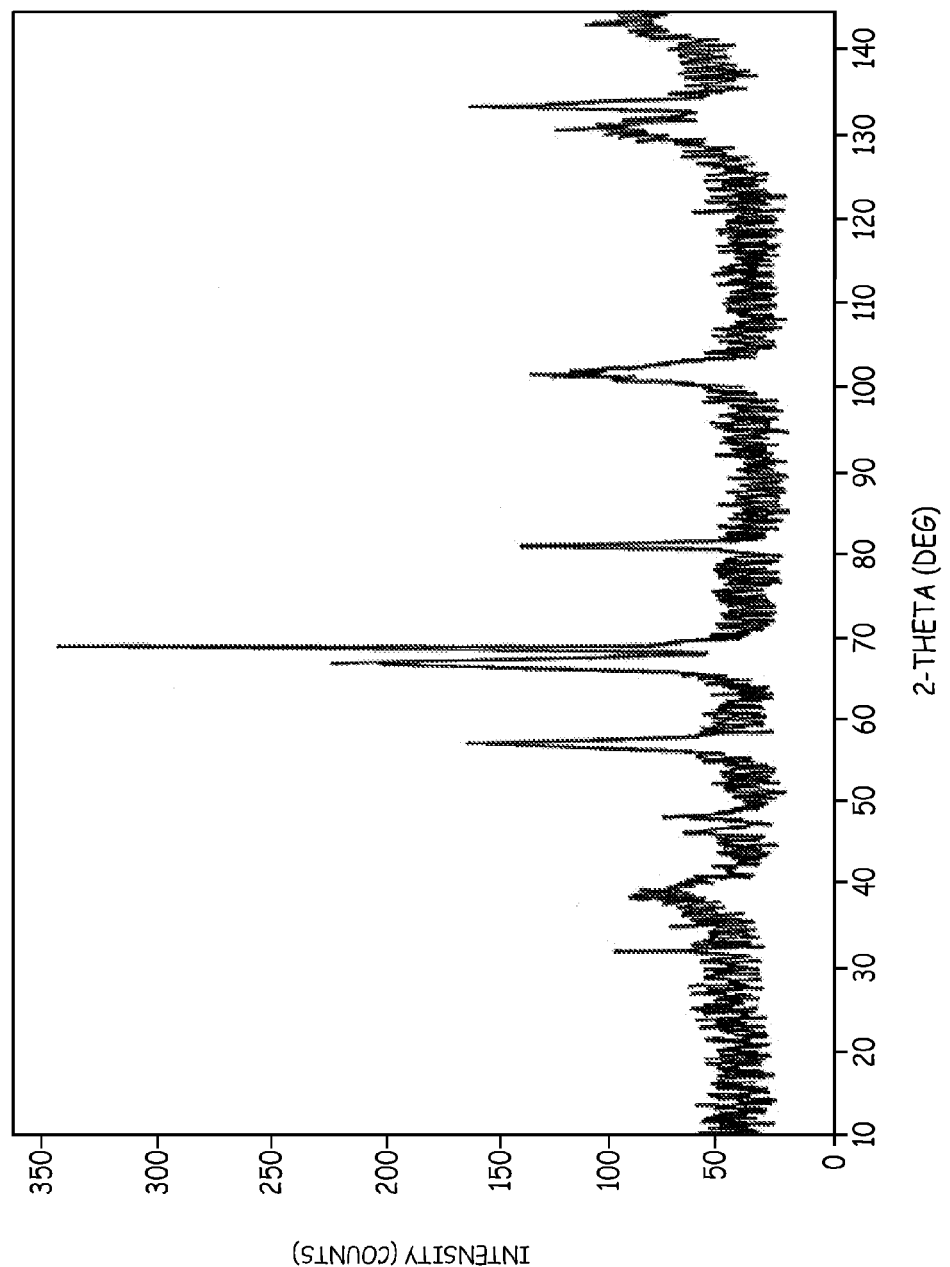
FIG. 76 is an x-ray diffractogram of lithium nickel oxide precursor nanoparticles produced by laser pyrolysis according to parameters specified in Table 16.

To evaluate the atomic arrangement, the samples were examined by x-ray diffraction using the Cr(K$\alpha$) radiation line on a Rigaku Miniflex™ x-ray diffractometer. X-ray diffractograms for a sample produced under the conditions specified in Table 16 is shown in FIG. 76. Crystalline phases were identified that corresponded to nickel metal, nickel oxide (NiO) and lithium carbonate (Li$_2$CO$_3$).

A sample of lithium nickel oxide precursor nanoparticles produced by laser pyrolysis according to the conditions specified in Table 16 was heated in an oven under oxidizing conditions. The oven was essentially as described above with respect to FIG. 24. Between about 100 and about 300 mg of nanoparticles were placed in an open 1 cc boat within the quartz tube projecting through the oven. Air was flowed through a 1.0 inch diameter quartz tube at a flow rate of 200 cc/min. The oven was heated in air to about 400° C. for about 1 hour and then to about 750° C. for about 3 hours.

Figure 77:
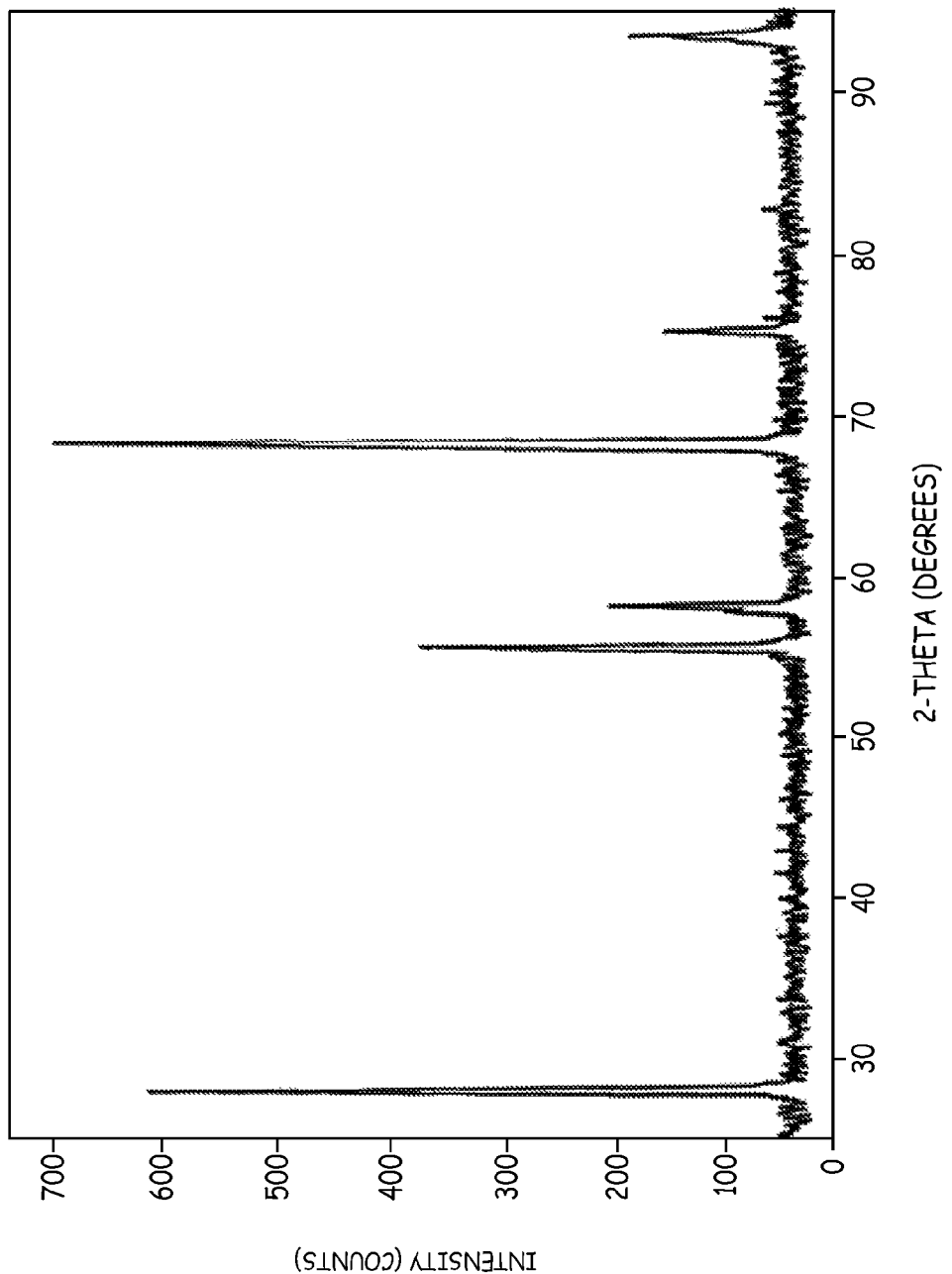
FIG. 77 is an x-ray diffractogram of crystalline lithium nickel oxide nanoparticles produced by heat treating lithium nickel oxide precursor nanoparticles.

The crystal structure of the resulting heat treated particles were determined by x-ray diffraction. The x-ray diffractogram for the heated sample with precursors produced under the conditions listed in Table 16 is shown in FIG. 77. The x-ray diffractogram shown in FIG. 77 indicates that the collection of particles involved crystals of LiNiO$_2$.

Example 22

Lithium Nickel Cobalt Oxide

This example describes the production of lithium nickel cobalt oxide nanoparticles. Initially, the synthesis of lithium nickel cobalt oxide precursor particles was performed by laser pyrolysis. The laser pyrolysis was performed in a reaction chamber essentially as described above with respect to FIGS. 6-8.

Nickel nitrate (Ni(NO$_3$)$_2$.6H$_2$O) (Alfa Aesar) precursor, cobalt nitrate (Co(NO$_3$)$_2$.6H$_2$O) (Alfa Aesar) precursor and lithium nitrate (LiNO$_3$) (Alfa Aesar) precursor were dissolved in deionized water at concentrations as noted in Table 17. The aqueous metal precursor solutions were carried into the reaction chamber as an aerosol. C$_2$H$_4$ gas was used as a laser absorbing gas, and Argon was used as an inert gas. The reactant mixture containing nickel nitrate, cobalt nitrate, lithium nitrate, Ar, O$_2$ and C$_2$H$_4$ was introduced into the reactant nozzle for injection into the reaction chamber. Additional parameters of the laser pyrolysis synthesis for producing lithium nickel cobalt oxide precursor particles are specified in Table 17.

TABLE 17

| | 1 |
|---|---|
| Crystalline Phases | nickel, nickel oxide (NiO), LiCO$_3$, amorphous phases |
| Pressure (Torr) | 150 |
| Argon F.R.-Window (SLM) | 5 |
| Argon F.R.-Shielding (SLM) | 20 |
| Ethylene (SLM) | 4.75 |
| Carrier Gas (Argon) (SLM) | 12 |
| Oxygen (SLM) | 5.1 |
| Laser Input (Watts) | 1207 |
| Laser Output (Watts) | 1030 |
| Production Rate (g/hr) | 3.64 |
| Precursor | 1.74 M nickel nitrate, 0.35 M cobalt nitrate, 2.25 M lithium nitrate | slm = standard liters per minute
Argon - Win. = argon flow through inlets 216, 218
Argon - Sld. = argon flow through annular channel 142.

Based on the teachings herein both above and in this example, the particles described in this example can be produced with equivalent properties in appropriate apparatuses and at appropriate conditions at rates in the range(s) of at least about 35 grams per hour and at higher rates described above.

Figure 78:
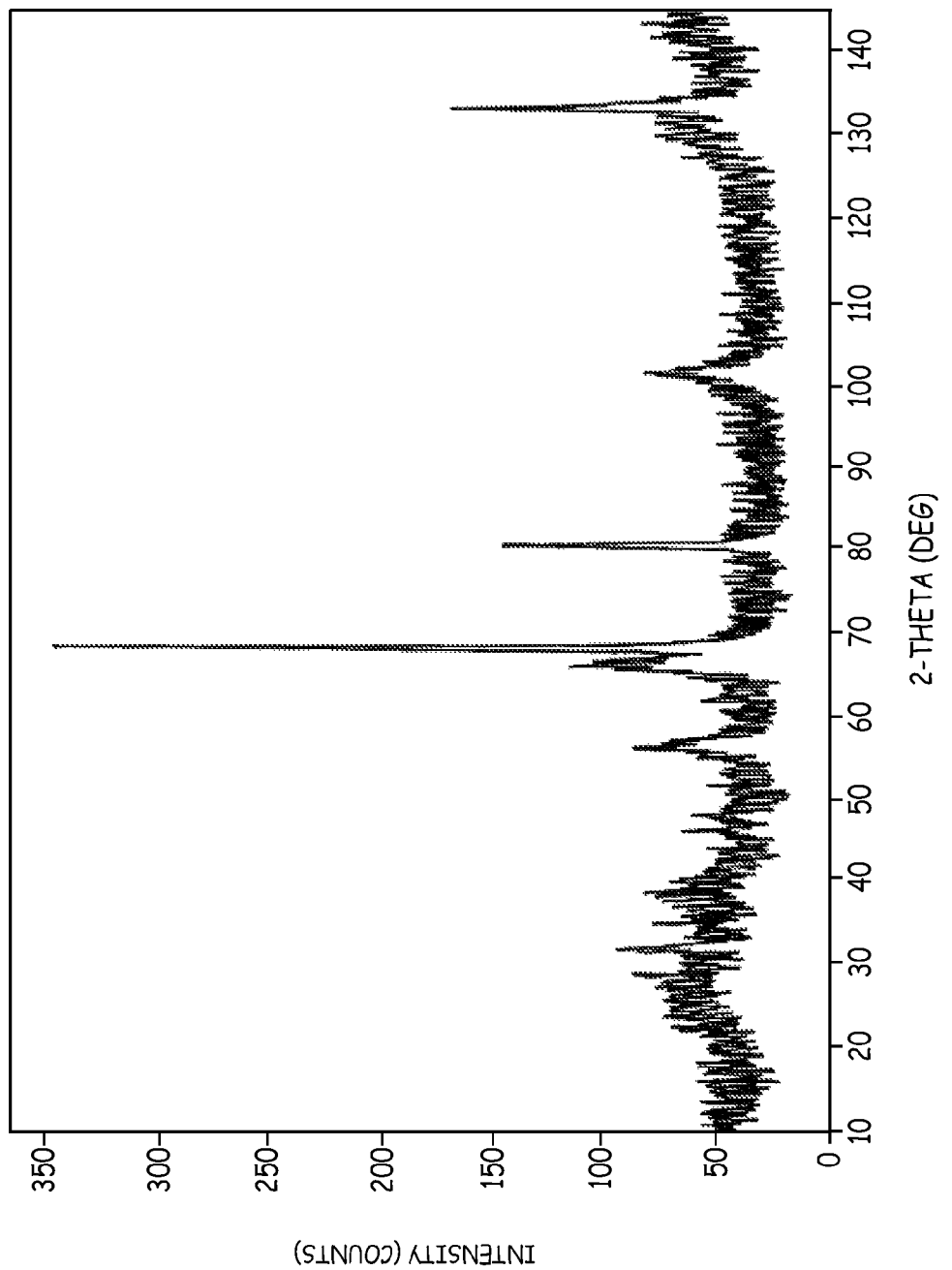
FIG. 78 is an x-ray diffractogram of lithium nickel cobalt oxide nanoparticles produced by laser pyrolysis according to parameters specified in Table 17.

To evaluate the atomic arrangement, the samples were examined by x-ray diffraction using the Cr(K$\alpha$) radiation line on a Rigaku Miniflex™ x-ray diffractometer. X-ray diffractograms for a sample produced under the conditions specified in Table 17 is shown in FIG. 78. Crystalline phases were identified that corresponded to nickel metal, nickel oxide (NiO) and lithium carbonate (Li$_2$CO$_3$). Some amorphous phase material may also be present.

A sample of lithium nickel cobalt oxide precursor nanoparticles produced by laser pyrolysis according to the conditions specified in Table 17 was heated in an oven under oxidizing conditions. The oven was essentially as described above with respect to FIG. 24. Between about 100 and about 700 mg of nanoparticles were placed in a boat within the quartz tube projecting through the oven. Air was flowed through a 1.0 inch diameter quartz tube at a flow rate of 200 cc/min. The oven was heated in air to about 400° C. for about 1 hour and then to about 675° C. for about 3 hours.

Figure 79:
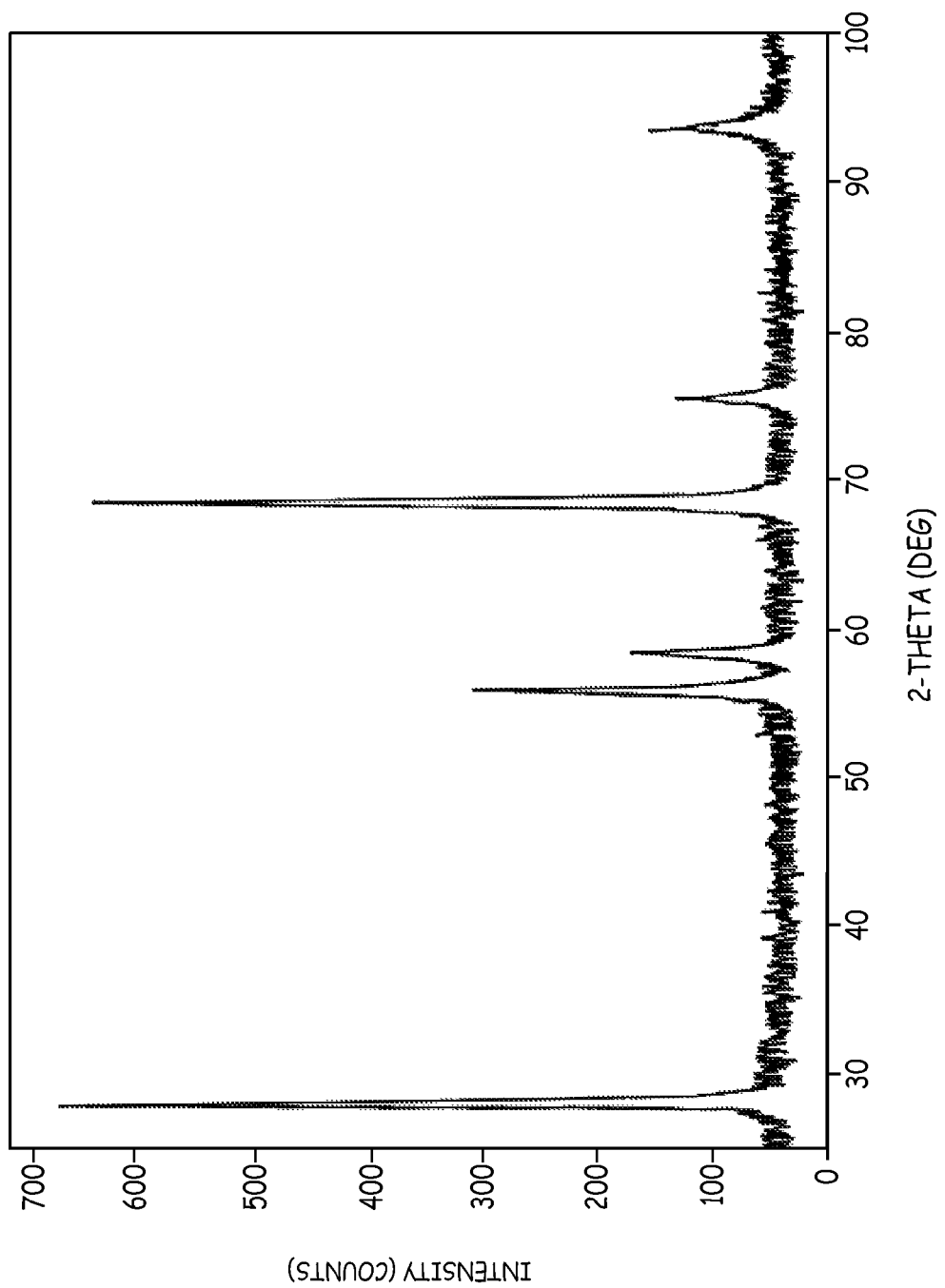
FIG. 79 is an x-ray diffractogram of crystalline lithium nickel cobalt oxide nanoparticles produced by heat treating lithium nickel cobalt oxide precursor nanoparticles.

The crystal structure of the resulting heat treated particles were determined by x-ray diffraction. The x-ray diffractogram for heated sample with precursors produced under the conditions listed in Table 17 is shown in FIG. 79. The x-ray diffractogram shown in FIG. 79 indicates that the collection of particles included crystals of lithium nickel cobalt oxide. The precursors were introduced at a concentration to target a composition of $LiNi_{0.8}Co_{0.2}O_2$.

Example 23

Lithium Titanium Oxide Nanoparticles

The production of nanoparticles of lithium titanium oxide ($Li_4Ti_5O_{12}$) is described in this example. The lithium titanium oxide nanoparticles were produced in a two step process. In the first step, titanium oxide nanoparticles were produced by laser pyrolysis. In the second step, a mixture of titanium oxide nanoparticles and lithium hydroxide were heated.

The titanium oxide particles were produced using essentially a laser pyrolysis apparatus shown in FIG. 1 of U.S. Pat. No. 5,938,979 to Kambe et al., entitled "Electromagnetic Shielding," incorporated herein by reference. Titanium tetrachloride (Strem Chemical, Inc., Newburyport, Mass.) precursor vapor was carried into the reaction chamber by bubbling Ar gas through $TiCl_4$ liquid in a container at room temperature. $C_2H_4$ gas was used as a laser absorbing gas, and argon was used as an inert gas. The reaction gas mixture containing $TiCl_4$, Ar, $O_2$ and $C_2H_4$ was introduced into the reactant gas nozzle for injection into the reaction chamber. The reactant gas nozzle had an opening with dimensions of ⅝ in×⅛ in. The production rate of titanium dioxide particles was typically about 4 g/hr. Additional parameters of the laser pyrolysis synthesis relating to the titanium oxide particles are specified in Table 18.

TABLE 18

|  | 1 |
| --- | --- |
| Crystalline Phases | Anatase & Rutile |
| Pressure (Torr) | 320 |
| Argon F.R.-Window (SCCM) | 700 |
| Argon F.R.-Shielding (SLM) | 7.92 |
| Ethylene (SLM) | 1.34 |
| Carrier Gas (Argon) (SCCM) | 714 |
| Oxygen (SCCM) | 550 |
| Laser Output (Watts) | 450 |
| Nozzle Size | ⅝ in × ⅛ in | sccm = standard cubic centimeters per minute
slm = standard liters per minute
Argon - Win. = argon flow through inlets 216, 218
Argon - Sld. = argon flow through annular channel 142.

Based on the teachings herein both above and in this example, the particles described in this example can be produced with equivalent properties in appropriate apparatuses and at appropriate conditions at rates in the range(s) of at least about 35 grams per hour and at higher rates described above.

Figure 80:
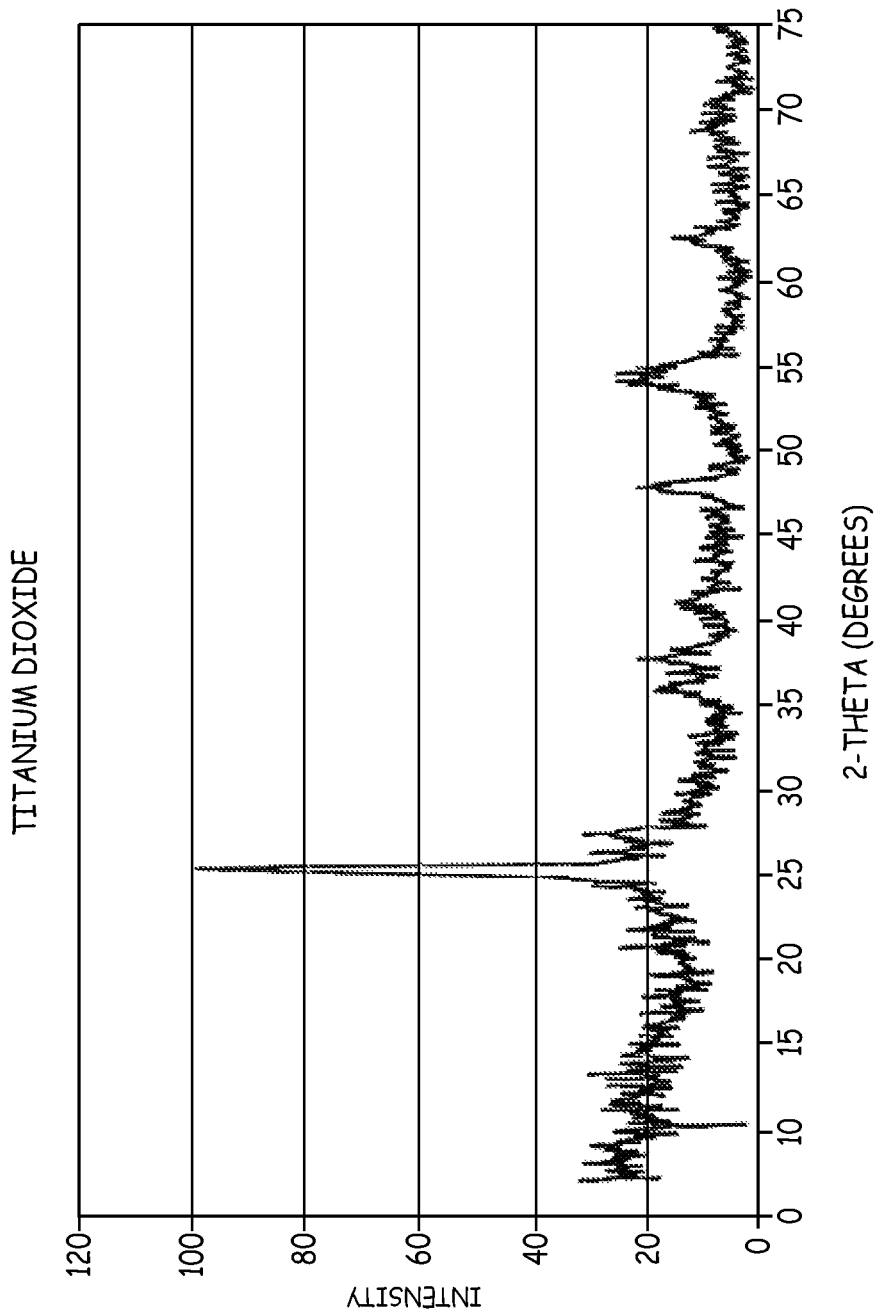
FIG. 80 is an x-ray diffractogram of titanium dioxide nanoparticles.

To evaluate the atomic arrangement, the samples were examined by x-ray diffraction using the Cr(Kα) radiation line on a Rigaku Miniflex™ x-ray diffractometer. X-ray diffractograms for a sample produced under the conditions specified in Table 18 is shown in FIG. 80. The titanium dioxide particles had a crystal structure indicating mixed phases of anatase titanium dioxide and a small portion of rutile titanium dioxide. The diffractogram has a broad peak at about 23° and at low scattering angles indicative of amorphous carbon. The amorphous carbon coating can be removed upon subsequent heating.

Figure 81:
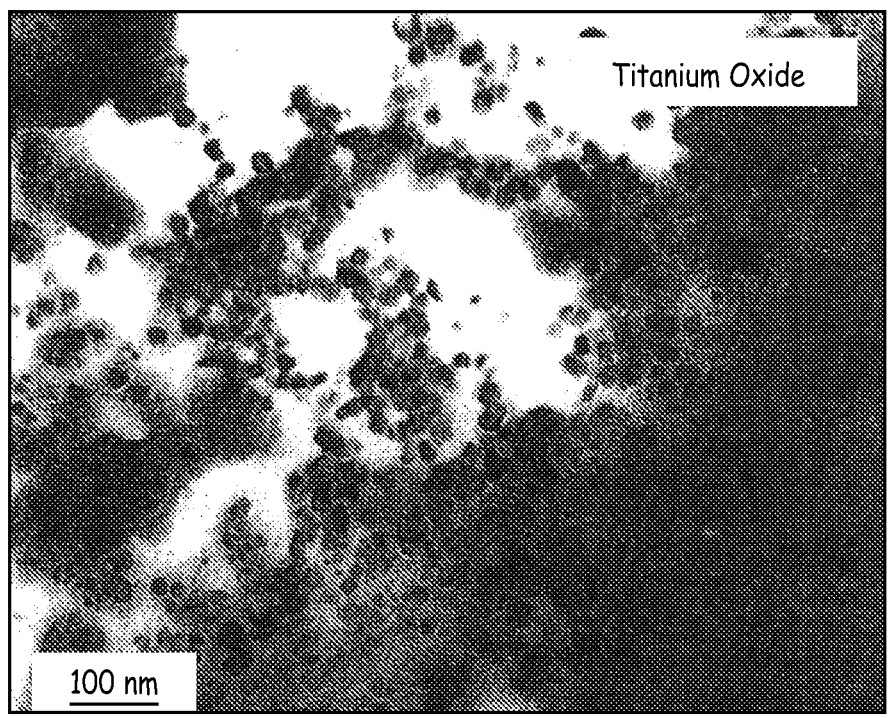
FIG. 81 is a transmission electron micrograph of titanium dioxide nanoparticles.

Transmission electron microscopy (TEM) was used to determine particle sizes and morphology. A TEM micrograph for the particles produced under the conditions of Table 18 is displayed in FIG. 81. The particles had facets corresponding to the crystal lattice of the titanium oxide.

An elemental analysis of the particles was performed. The particles included 55.18 percent by weight carbon and 19.13 percent by weight titanium. Chlorine contamination was found to be 0.42 percent by weight. Oxygen was not directly measured but presumably accounted for most of the remaining weight. The elemental analysis was performed by Desert Analytics, Tucson, Ariz.

To produce the lithium titanium oxide particles, 3.67 g $LiOH.H_2O$ (Alfa Aesar, Inc., Ward Hill, Mass.) and 8.70 g $TiO_2$ nanoparticles (as described above) were mixed together using 22.9 g diglyme as a dispersant. Other dispersants can be used as long as they do not dissolve either reactant. The mixture was combined with 3 mm yttria-stabilized zirconia grinding media in a polypropylene bottle (Union Process, Akron, Ohio). The slurry with the grinding media was mixed for two hours in a shaker mill (SPEX Certiprep, Inc., Metuchen, N.J.).

After mixing the slurry was poured through a sieve to remove the grinding media. The grinding media was rinsed with additional diglyme to remove additional material from the grinding media. Following removal of the grinding media, the slurry was vacuum filtered to remove the solvent and to collect the power on filter paper. The powder was transferred from the filter paper to a glass petri dish.

To remove the remaining solvent, the material was heated at 160° C. for 10 hours under vacuum. The solvent was collected in a trap. To perform the conversion of the material to lithium titanium oxide, the dried material was heated in an alumina boat within a one inch tube furnace, as shown schematically in FIG. 24. $O_2$ is flowed through the tube at a rate of 40 cc/min The heat treatment was continued for 20 hours at 800° C. For comparison commercial $TiO_2$ was processed into $Li_4Ti_4O_{12}$ in the same way.

Figure 82:
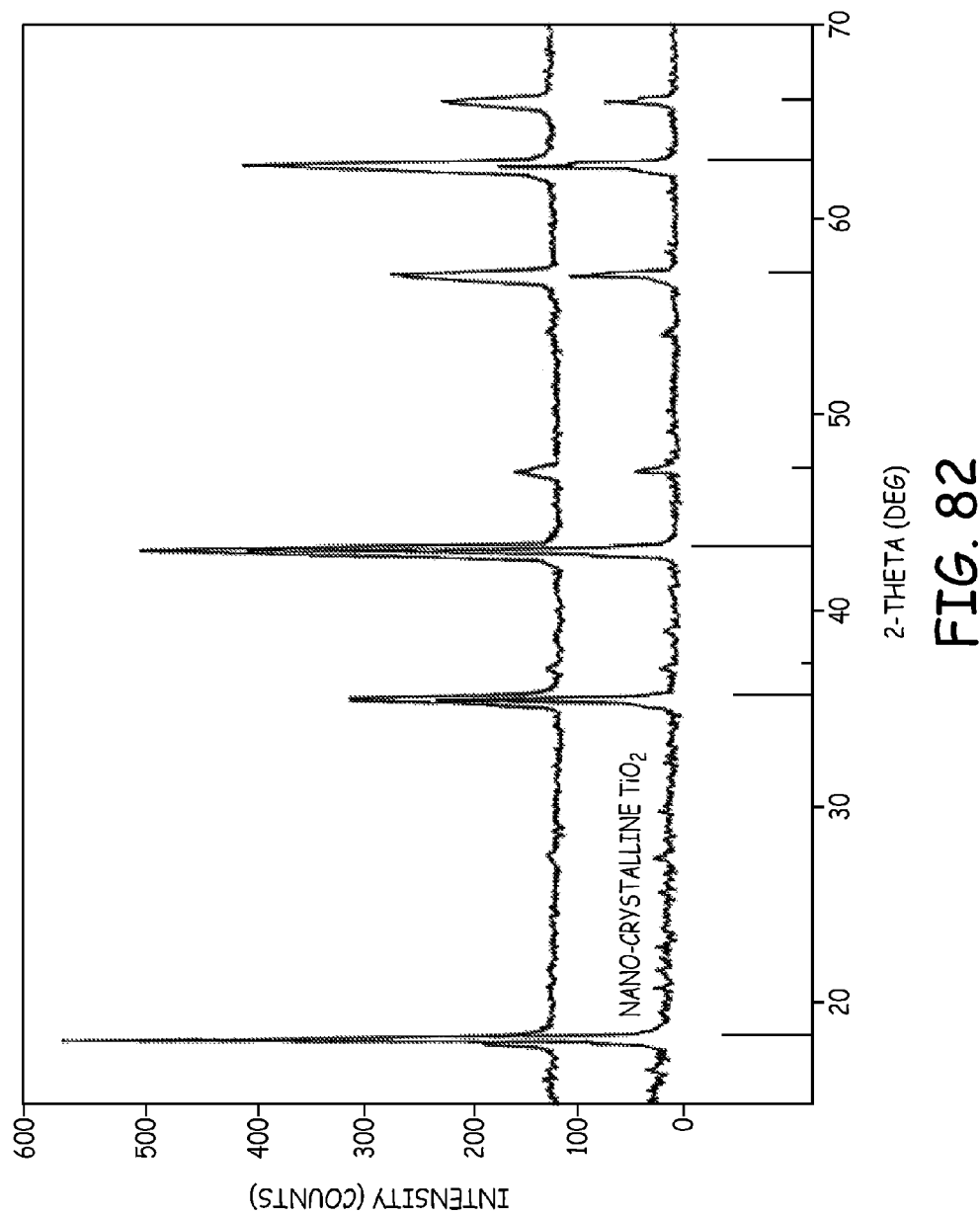
FIG. 82 is a plot of x-ray diffractograms for lithium titanium oxides produced from commercial titanium dioxide (upper curve) and nanoparticles of titanium dioxide (lower curve).

The crystal structures of the resulting heat treated particles were determined by x-ray diffraction using the Cr(Kα) radiation line on a Rigaku Miniflex™ x-ray diffractometer. The x-ray diffractograms for the heated samples are shown in FIG. 82. The upper curve is the diffractogram obtained from the lithium titanium oxide formed from commercial $TiO_2$, and the lower curve is the diffractogram obtained from the lithium titanium oxide formed from nanoparticulate $TiO_2$. The line plot at the bottom of FIG. 82 indicates the known positions and relative intensities of an x-ray diffractogram for $Li_4Ti_5O_{12}$. From a review of the x-ray diffractograms, the synthesized lithium titanium oxide particles had a stoichiometry corresponding to $Li_4Ti_5O_{12}$.

Figure 83:
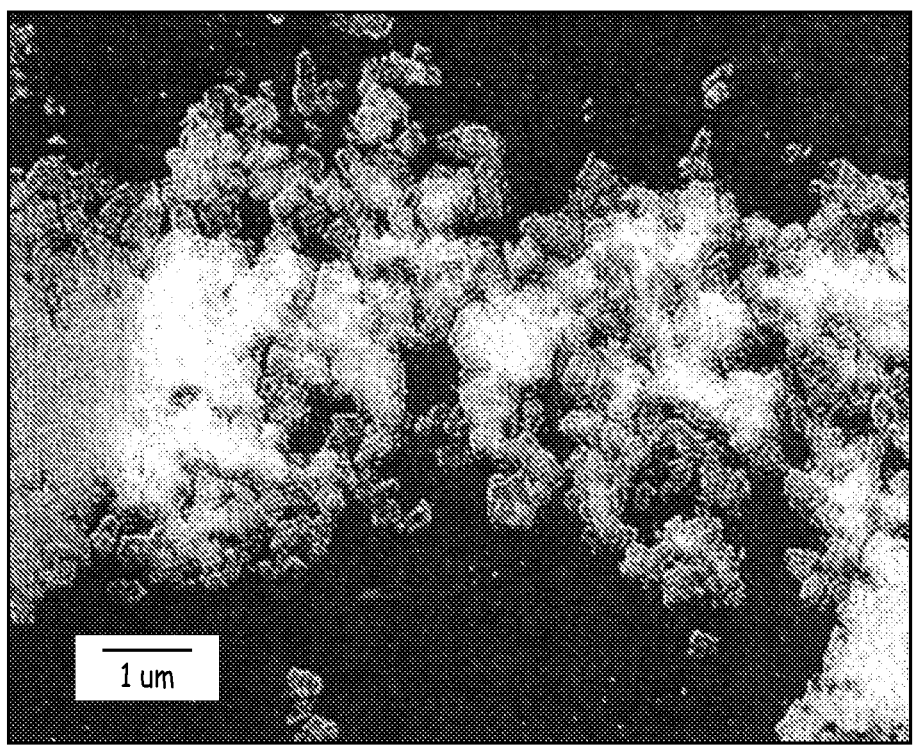
FIG. 83 is a transmission electron micrograph of nanoparticles of lithium titanium oxide with a stoichiometry of $Li_4Ti_5O_{12}$.

A transmission electron micrograph (TEM), shown in FIG. 83, was obtained for the lithium titanium oxide nanoparticles. From the TEM photo, the particles had an average particle diameter of about 200 nm. TEM analysis of the $TiO_2$ nanoparticles indicated a bimodal distribution of particle sizes with average particles sizes of about 15 nm and about 100 nm. A bimodal distribution is generally indicative of a blend of two types of particles with different compositions. It was not know if the distribution of smaller nanoparticles corresponded to carbon particles or titanium oxide particles.

Example 24

Laser Pyrolysis Synthesis of Alumina with Aerosol Precursors

This example demonstrates the synthesis of delta-aluminum oxide by laser pyrolysis with an aerosol. Laser pyrolysis was carried out using a reaction chamber essentially as described above with respect to FIGS. 6-8.

Aluminum nitrate ($Al(NO_3)_2 \cdot 9H_2O$) (99.999%, 1.0 molar) precursor was dissolved in deionized water. The aluminum nitrate precursor was obtained from Alfa Aesar, Inc., Ward Hill, Mass. The solution was stirred on a hot plate using a magnetic stirrer. The aqueous metal precursor solutions were carried into the reaction chamber as an aerosol. $C_2H_4$ gas was used as a laser absorbing gas, and nitrogen was used as an inert diluent gas. The reactant mixture containing the metal precursors, $N_2$, $O_2$ and $C_2H_4$ was introduced into the reactant nozzle for injection into the reaction chamber. Additional parameters of the laser pyrolysis synthesis relating to the particles are specified in Table 19.

TABLE 19

|  | 1 | 2 |
|---|---|---|
| Pressure (Torr) | 200 | 180 |
| Nitrogen F.R.-Window (SLM) | 5 | 5 |
| Nitrogen F.R.-Shielding (SLM) | 20 | 34 |
| Ethylene (SLM) | 2 | 1.25 |
| Diluent Gas (argon) (SLM) | 40 | 20 |
| Oxygen (SLM) | 3.17 | 3.87 |
| Laser Input (Watts) | 910 | 1705 |
| Laser Output (Watts) | 700 | 1420 |
| Production Rate (g/hr) | 1.3 | 0.7 |
| Precursor Delivery Rate to Atomizer* (ml/min) | 2.8 | 1.8 |
| Surface Area of Powders ($m^2/g$) | 13 | 26 | slm = standard liters per minute
Argon - Win. = argon flow past windows 412.
Argon - Sld. = argon flow through slot 462.
*A majority of the aerosol precursor returns down the nozzle and is recycled.

Based on the teachings herein both above and in this example, the particles described in this example can be produced with equivalent properties in appropriate apparatuses and at appropriate conditions at rates in the range(s) of at least about 35 grams per hour and at higher rates described above.

Figure 84:
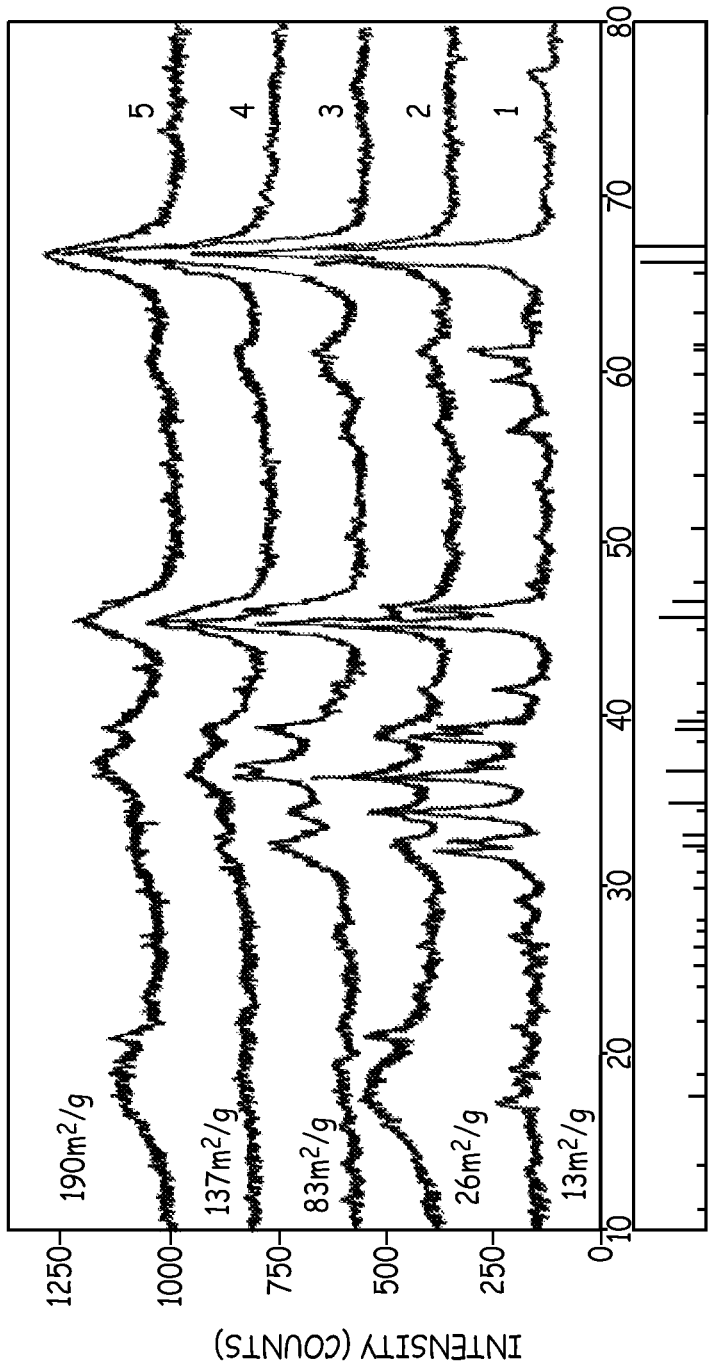
FIG. 84 is a plot of five x-ray diffractograms for samples of aluminum oxide produced by laser pyrolysis produced with either vapor reactants or aerosol reactants. A line plot of the diffractogram peaks for delta-aluminum oxide is presented in the lower insert for comparison.

To evaluate the atomic arrangement, the samples were examined by x-ray diffraction using the Cu(Kα) radiation line on a Rigaku Miniflex x-ray diffractometer. X-ray diffractograms for a sample produced under the conditions specified in column 1 and 2 of Table 19 are shown in FIG. 84, respectively noted 1 and 2 corresponding to samples 1 and 2. In each of the samples, crystalline phases were identified that corresponded to delta-aluminum oxide ($Al_2O_3$) by comparison with known diffractograms.

Also, BET surface areas were measured for the two particle samples produced by laser pyrolysis under the conditions specified in columns 1 and 2 of Table 19. The BET surface area was determined with a Micromeritics Tristar 3000™ instrument using an $N_2$ gas absorbate. The samples produced by laser pyrolysis as specified in columns 1 and 2 of Table 19 had BET surface areas of 13 $m^2/g$ and 26 $m^2/g$, respectively. These results suggest that the particles produced under the conditions in column 2 of Table 19 have a smaller particle size. Impurity levels of C, H, Cl and N were determined by atomic adsorption to be generally less than about 1% by weight.

Figure 85:
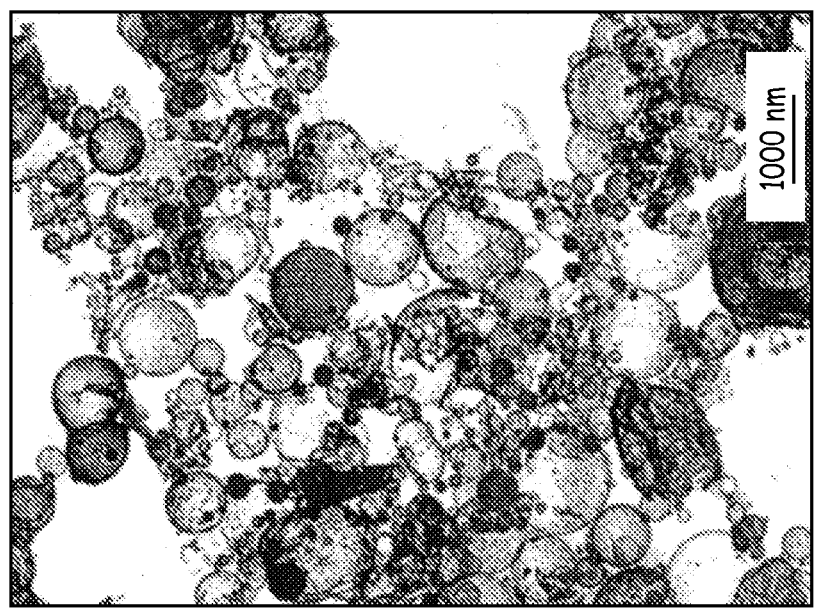
FIG. 85 is a transmission electron micrograph of a sample of aluminum oxide produced by laser pyrolysis with aerosol reactants.

Transmission electron microscopy (TEM) photographs were obtained of aluminum oxide nanoparticles produced under the conditions of column 2 in Table 19. The TEM micrograph is shown in FIG. 85. The particles generally had a spherical morphology. Transparent shell-type particles are visible in the micrograph along with dense particles. Adjustment of the reaction conditions can be used to obtain uniform dense particles.

Example 25

Laser Pyrolysis Synthesis of Alumina with Vapor Precursors

This example describes the laser pyrolysis synthesis of delta-aluminum oxide using vapor precursors. The reaction was carried out in a chamber comparable to the chamber shown in FIG. 6 with a rectangular inlet nozzle with a 1.75 inch×0.11 inch opening for vapor/gaseous reactants.

Aluminum chloride ($AlCl_3$) (Strem Chemical, Inc., Newburyport, Mass.) precursor vapor was carried into the reaction chamber from a sublimation chamber where $N_2$ gas was passed over heated aluminum chloride solid. The reactant gas mixture containing $AlCl_3$, $O_2$, nitrogen and $C_2H_4$ was introduced into the reactant gas nozzle for injection into the reactant chamber. $C_2H_4$ gas was used as a laser absorbing gas. Nitrogen was used as a carrier gas as well as an inert gas to moderate the reaction. Molecular oxygen was used as an oxygen source. Runs with excess oxygen or stoichiometric amounts of oxygen produced the best powders.

Representative reaction conditions for the production of aluminum oxide particles with vapor precursors are described in Table 20.

TABLE 20

|  | Sample | | | |
|---|---|---|---|---|
|  | 3 | 4 | 5 | 6 |
| BET Surface Area | 83 | 137 | 173 | 192 |
| Pressure (Torr) | 120 | 120 | 120 | 120 |
| $N_2$-Win (slm) | 10 | 10 | 10 | 10 |
| $N_2$-Sld. (slm) | 2.8 | 2.8 | 2.8 | 2.8 |
| Ethylene (slm) | 1.25 | 0.725 | 0.725 | 1.25 |
| Carrier Gas - $N_2$ (slm) | 0.72 | 0.71 | 0.71 | 0.72 |
| Oxygen (slm) | 2.4 | 0.7 | 0.7 | 3.8 |
| Laser Power - Input (Watts) | 1500 | 772 | 760 | 1500 |
| Laser Power - Output (Watts) | 1340 | 660 | 670 | 1360 | sccm = standard cubic centimeters per minute
slm = standard liters per minute
Argon - Win. = argon flow past windows 412.
Argon - Sld. = argon flow through slot 462.

Based on the teachings herein both above and in this example, the particles described in this example can be produced with equivalent properties in appropriate apparatuses and at appropriate conditions at rates in the range(s) of at least about 35 grams per hour and at higher rates described above.

An x-ray diffractogram of product nanoparticles for samples 3-5 produced under the conditions in Table 20 are shown in FIG. 84 as the top three spectra appropriately labeled. Samples 3-5 had x-ray diffractograms characteristic of gamma-aluminum oxide. However, with reduced particle sizes, the diffraction peaks broadened out, as expected, such that individual peaks were not resolved. The BET surface areas were measured as described in Example 24. The values of BET surface area are listed in Table 20. These particles had higher surface areas indicating smaller particle sizes than the particles produced with aerosol precursors. Impurity levels of C, H, Cl and N were determined by atomic adsorption to be generally less than about 1% by weight.

Figure 86:
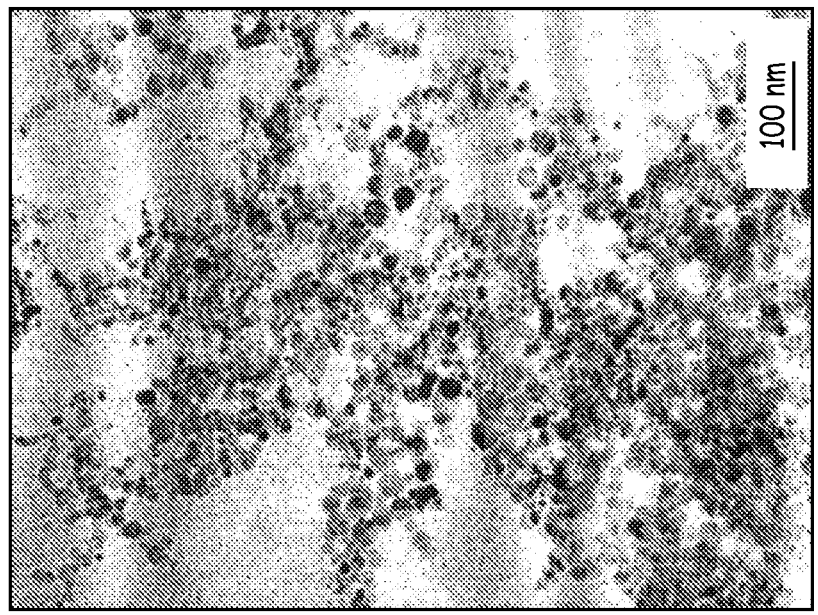
FIG. 86 is a transmission electron micrograph of a sample of aluminum oxide particles produced by laser pyrolysis with vapor reactants.
Figure 87:
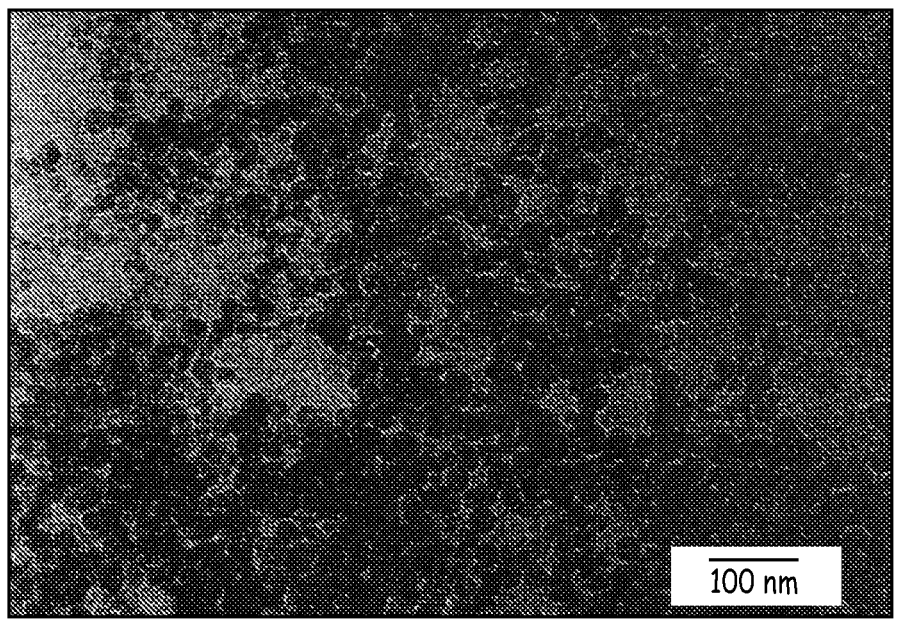
FIG. 87 is a transmission electron micrograph of another sample of aluminum oxide particles produced by laser pyrolysis with vapor reactants.

A transmission electron micrograph was obtained for a similar aluminum oxide powder produced by laser pyrolysis with vapor precursors having a BET surface area of about 77 m$^2$/g. The micrograph is shown in FIG. 86. The particles had an average particle size well under 100 nm. Also, a TEM micrograph for a sample produced under the conditions of the second column in Table 20 (sample 4) was obtained. The micrograph is shown in FIG. 87. The particles look highly crystalline with crystal facets being clearly visible. These particles had an average particle size of less than about 20 nm and a very uniform particle size distribution. Calculated surface areas based on the observed particle sizes were approximately the same as the measured BET surface areas, indicating that the particles were dense, non-porous particles.

Sample 6 produced under the conditions in column 4 of Table 20 was delta-aluminum oxide with a carbon coating. The presence of the carbon coating allowed for the heat treating the aluminum oxide particles in a reducing atmosphere for the production of alpha-aluminum oxide without sintering the particles, as described further below. The production of metal oxide particles with carbon coatings is described further in U.S. Pat. No. 6,387,531 to Bi et al., entitled "Metal (Silicon) Oxide/Carbon Composites," incorporated herein by reference.

Example 26

Heat Treatment of Alumina Particles from Laser Pyrolysis

The starting materials for the heat treatment were aluminum oxide particles produced under the conditions described in Examples 24 and 25. The heat treatment resulted primarily in the production of alpha-aluminum oxide from delta-aluminum oxide.

The nanoparticles were heat treated at in a box by placing the samples in a 2 inch×6 inch alumina crucible. Firing was performed in laboratory air conditions except for heat treatment with a forming gas. The nanoparticles were converted by the heat treatment to crystalline alpha-Al$_2$O$_3$ particles with some of the samples having a minority portion of theta-Al$_2$O$_3$, as described below for specific samples.

A first heat treated sample (H1) was prepared from a delta-aluminum oxide produced as described the second column of Table 19. The sample was heated as specified in Table 21 and they were cooled by the rate of the natural cooling of the furnace when it is turned off

TABLE 21

| Sample | H1 | H2 | H3 | H4 | H5 |
|---|---|---|---|---|---|
| Temperature (° C.) | 1200 | 1200 | 1200 | 1265 | 1250 |
| Heating Time (hours) | 2 | 12 | 60 | 12 | 3 |
| Heating Rate (° C./min.) | 15 | 15 | 15 | 15 | 7 |
| Gas Properties | Ambient Air | Ambient Air | Ambient Air | Ambient Air | Ambient Air |

Figure 88:
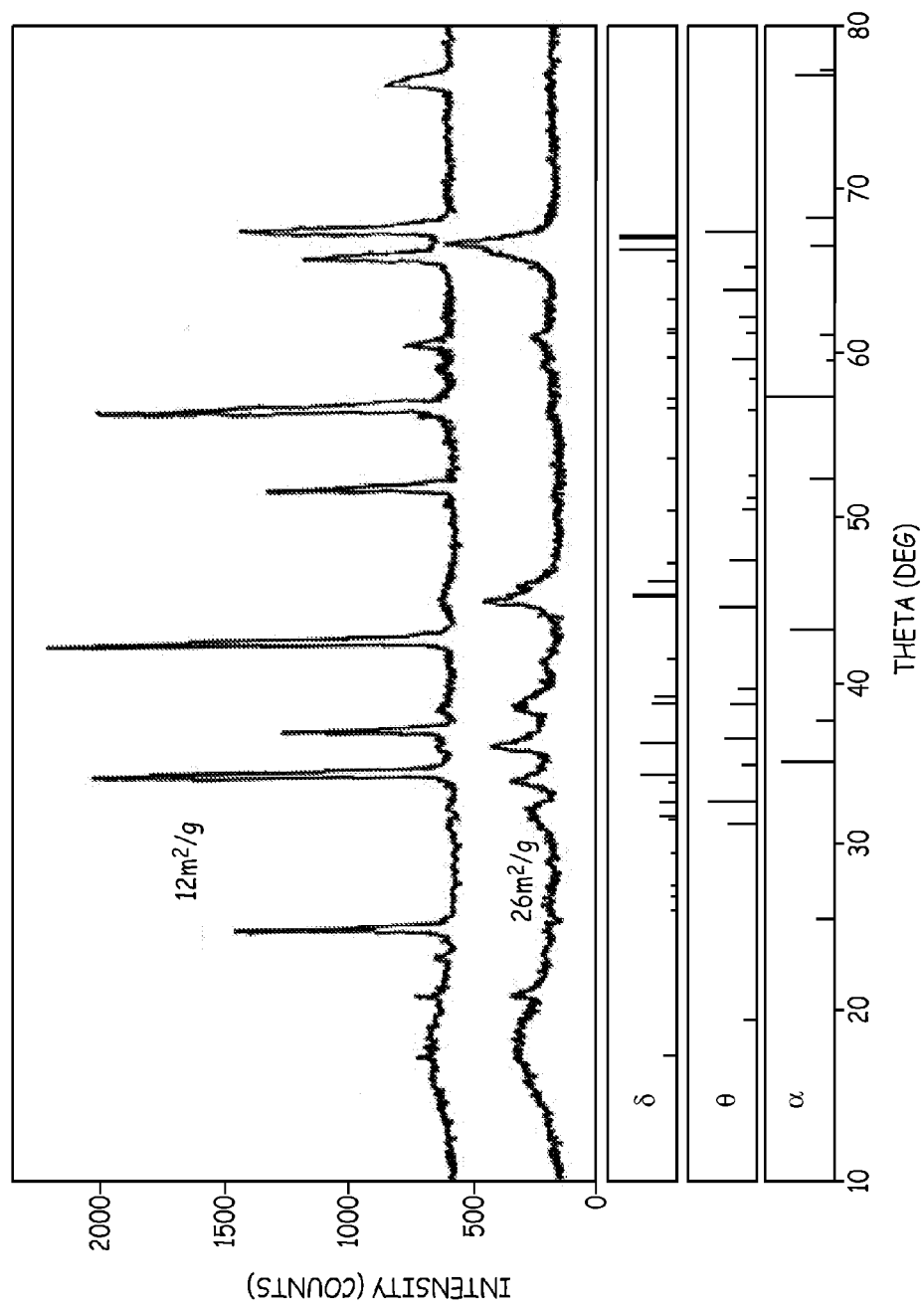
FIG. 88 is a plot of an x-ray diffractogram for a sample of aluminum oxide particles following a heat treatment (upper curve) and a corresponding sample prior to heat treatment (lower plot) produced by laser pyrolysis with aerosol reactants. For comparison, a line plot of the diffractogram peaks for three phases of aluminum oxide are presented in the bottom of the figure.

The crystal structure of the resulting heat treated particles (H1) was determined by x-ray diffraction. An x-ray diffractogram of sample H1 along with a diffractogram of the corresponding powders without heat treatment is presented in FIG. 88. The top diffractogram was produced with the heat treated material and the lower diffractogram is the sample before heat treatment. The heat treatment converted the initially delta-aluminum oxide into relatively pure phase alpha-aluminum oxide with a very small amount of theta-aluminum oxide. Following heat treatment, the particles had a BET surface area of about 12 m$^2$/g. The drop in surface area generally would correspond to collapse of the hollow particles into dense particles, although some sintering may also take place.

Figure 89:
FIG. 89 is a transmission electron micrograph of a sample of aluminum oxide particles following heat treatment in which the sample, prior to heat treatment, was produced by laser pyrolysis with aerosol reactants.

Transmission electron microscopy (TEM) was used to evaluate particle sizes and morphology of the heat treated samples. A TEM micrograph of sample H1 is shown in FIG. 89. As seen in FIG. 89, not all of the hollow particles have collapsed into dense particles. The uniformity of the material can be improved by reducing the reactant density in the laser reaction zone.

In addition, a sample of delta-aluminum oxide produced with vapor phase reactants by laser pyrolysis was heat treated to generate mixed phase aluminum oxide with a majority alpha-aluminum oxide and some remaining delta-aluminum oxide and theta aluminum oxide. Three different samples (H2, H3, H4) of the same starting material produced as described in Example 25 were heat treated under conditions specified in Table 21. The samples (H2, H3, H4) had BET surface areas of 31 m$^2$/g, 19 m$^2$/g and 7 m$^2$/g, respectively. The x-ray diffractograms for the three heat treated samples are shown in FIG. 90. The sample with 31 m$^2$/g surface area was mostly converted to alpha-aluminum oxide, although some delta-aluminum oxide remained. The 7 m$^2$/g sample was pure alpha-aluminum oxide with high crystallinity, according to the x-ray diffractogram spectrum.

Figure 91:
FIG. 91 is a transmission electron micrograph of a sample of aluminum oxide particles following heat treatment in which the sample, prior to heat treatment, was produced by laser pyrolysis with vapor reactants.

A TEM micrograph of the 31 m$^2$/g heat treated sample is shown in FIG. 91. Small uniform particles are visible along with larger interconnected structures. Selected area diffraction was used to differentiate the delta-aluminum oxide particles from alpha-aluminum oxide particles. Selected area diffraction of the smaller particles in the TEM micrograph indicated that the particles were highly crystalline with d-spacing values that matched well with delta-phase or theta-phase crystals. Overall, the sample was roughly 81% alpha-phase.

Figure 92:
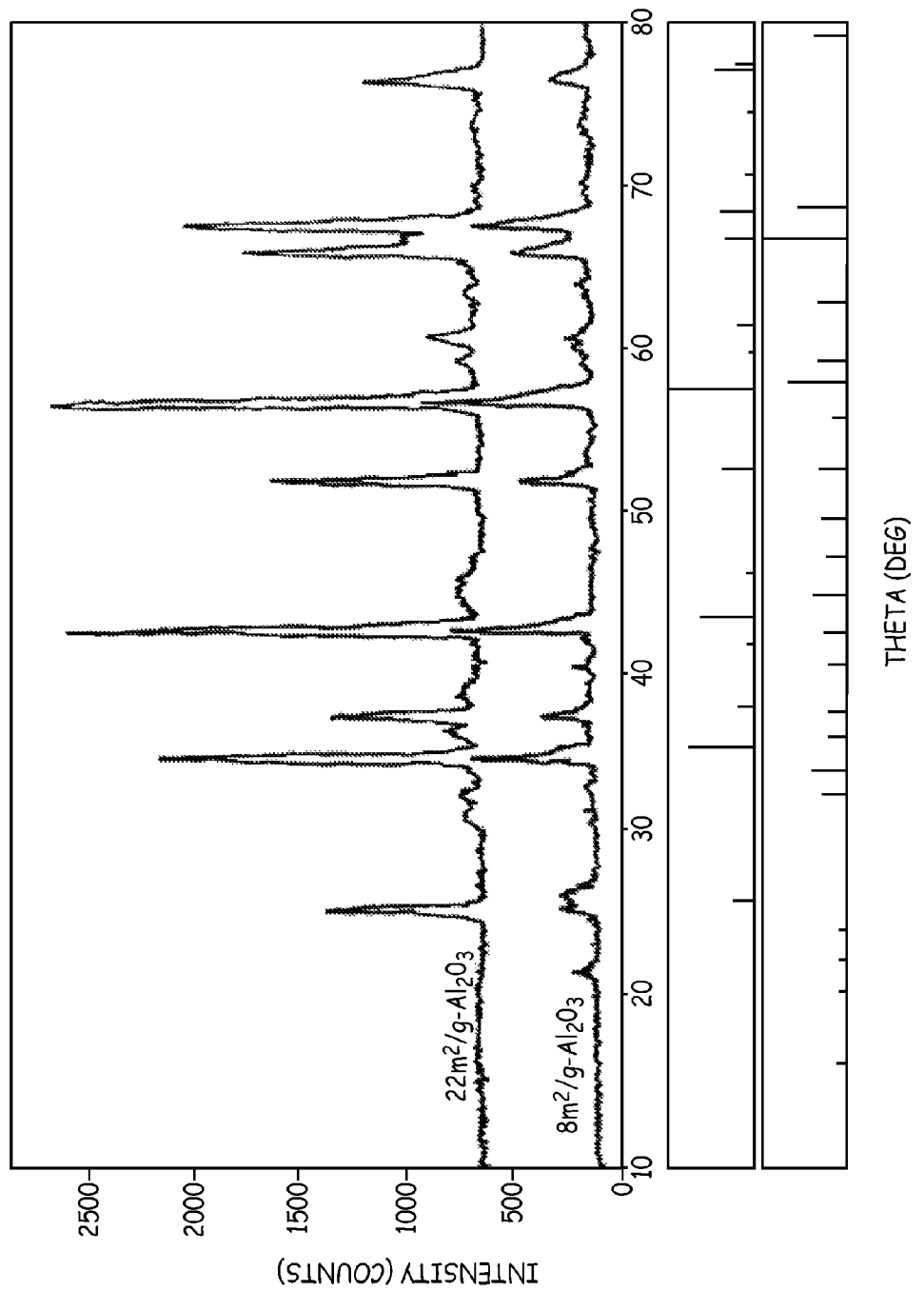
FIG. 92 is a plot of x-ray diffractograms for a sample of alpha-aluminum oxide (lower curve) and for a sample of alpha-aluminum oxide following the heat treatment of delta-aluminum oxide produced by laser pyrolysis with vapor reactants (upper curve). For comparison, a line plot of the diffractogram peaks for two phases of aluminum oxide are presented in the bottom of the figure.

For comparison, the x-ray diffractogram spectrum of a heat treated sample (H5) with 22 m$^2$/g surface area is shown in FIG. 92 along with the x-ray diffractogram spectrum of a commercial sample of delta-aluminum oxide from St. Gobain (France) having a BET surface area of 8 m$^2$/g. The heat treat sample H5 was produced from a sample originally produced by laser pyrolysis with vapor precursors with heat treatment conditions specified in Table 21. The heat treated sample was majority alpha-aluminum oxide with a small amount of delta-aluminum oxide. The commercial sample had unidentified peaks corresponding to an unknown contaminant. An elemental analysis of the commercial sample identified approximately 9 weight percent contaminants compared with less than about 0.5 weight percent for the heat treated laser pyrolysis sample.

Based on the teachings herein both above and in this example, the particles described in this example can be produced with equivalent properties in appropriate apparatuses and at appropriate conditions at rates in the range(s) of at least about 35 grams per hour and at higher rates described above.

Example 27

Zinc Oxide Particles

The synthesis of zinc oxide particles described in this example was performed by laser pyrolysis. The particles were produced using essentially the laser pyrolysis apparatus of FIG. 1, described above, using an aerosol delivery apparatus.

The zinc nitrate.6H$_2$O (Aldrich Chemical Co., Milwaukee, Wis.) precursor was carried into the reaction chamber as an aerosol of a 4M aqueous zinc nitrate solution made with deionized water. C$_2$H$_4$ gas was used as a laser absorbing gas, molecular oxygen was used as an oxygen source, and Argon was used as an inert gas. The Ar, O$_2$ and C$_2$H$_4$ were supplied as carrier gases. The reactant mixture containing Zn(NO$_3$)$_2$, Ar, H$_2$O, O$_2$ and C$_2$H$_4$ was introduced into the reactant nozzle for injection into the reaction chamber. The reactant nozzle had an opening with dimensions of ⅝ in.×¼ in. Additional parameters of the laser pyrolysis synthesis relating to the particles are specified in Table 22.

TABLE 22

| | |
|---|---|
| Crystalline Phase | Zinc Oxide (ZnO) + unidentified |
| Crystal Structure | Zincite |
| Pressure (Torr) | 450 |
| Argon F.R.-Window (SLM) | 2.24 |
| Argon F.R.-Shielding (SLM) | 9.86 |
| Ethylene (SLM) | 1.42 |
| Argon (SLM) | 8.35 |
| Oxygen (SLM) | 1.71 |
| Laser Input (Watts) | 970 |
| Laser Output (Watts) | 770 |
| Precursor | Zinc Nitrate solution in water |
| Precursor Molarity | 4 M |
| Precursor Temperature ° C. | Room Temperature | slm = standard liters per minute
Argon - Win. = argon flow through inlets 216, 218
Argon - Sld. = argon flow through annular channel 142.

The production rate of zinc oxide particles was about 3 g/hr. Based on the teachings herein both above and in this example, the particles described in this example can be produced with equivalent properties in appropriate apparatuses and at appropriate conditions at rates in the range(s) of at least about 35 grams per hour and at higher rates described above.

Figure 93:
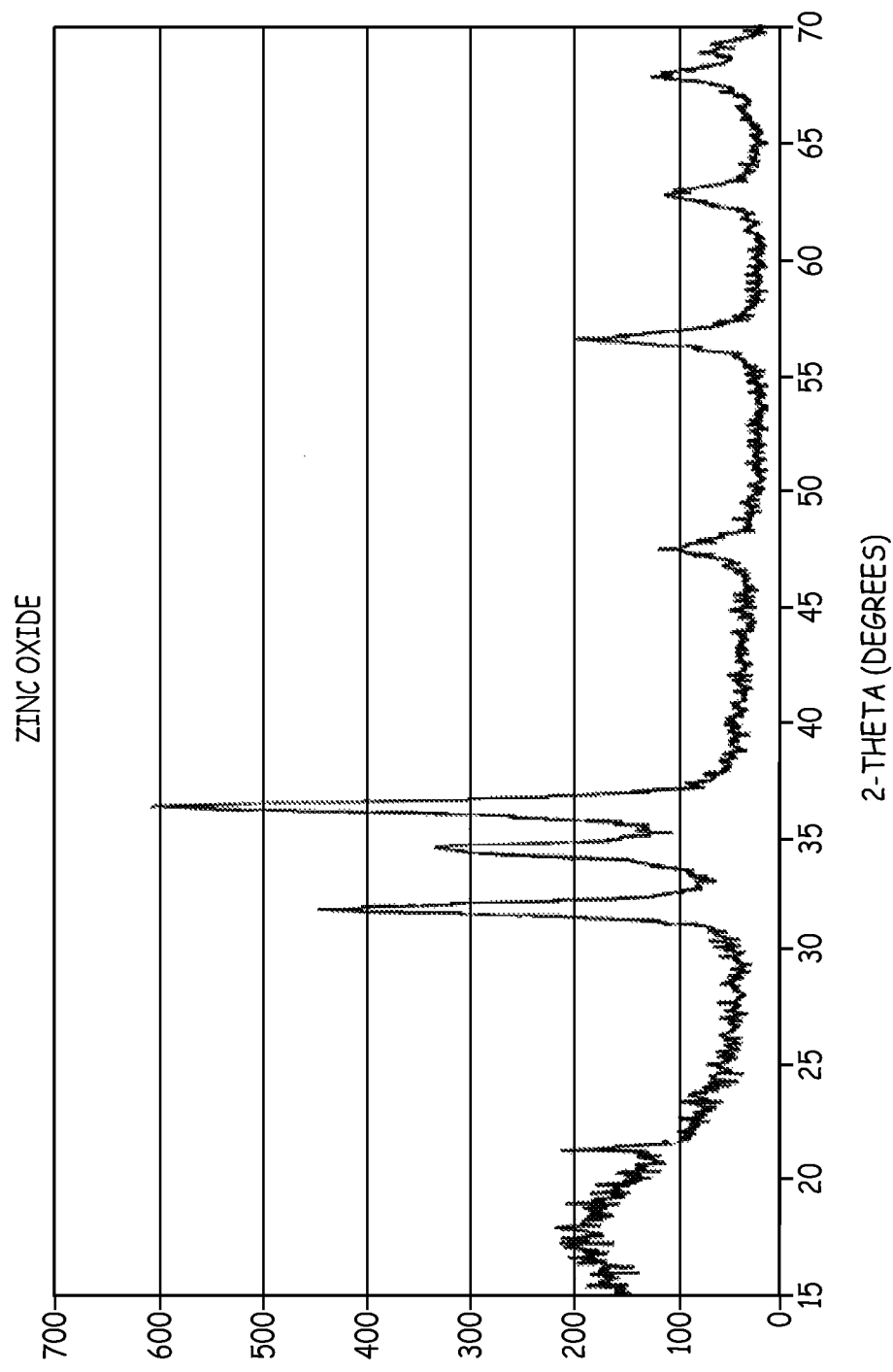
FIG. 93 is an x-ray diffractogram of zinc oxide nanoparticles produced by laser pyrolysis.

To evaluate the atomic arrangement, the samples were examined by x-ray diffraction using the Cu(Kα) radiation line on a Siemens D500 x-ray diffractometer. X-ray diffractograms for a sample produced under the conditions specified in Table 22 is shown in FIG. 93. The particles had an x-ray diffractogram corresponding to zinc oxide, ZnO. The sharp peak in the diffractogram at a value of 2Θ equal to about 22° was unidentified, indicating that another crystalline phase was present in the sample. Also, a broad peak centered at a value of 2Θ equal to about 18° indicates the presence of an unidentified amorphous phase, possibly amorphous zinc oxide. Thus, three phases of materials evidently were present in the product powders.

An elemental analysis of the product powders yielded 71.55 percent by weight zinc and minor contaminants of 1.68 percent carbon, 0.2 percent nitrogen and 0.08 percent hydrogen. The particles had a gray color presumably due to the presence of the carbon. Assuming that the remaining weight is oxygen, the material is somewhat rich in oxygen relative to ZnO. Previously unknown phases of zinc oxide may be present. The carbon contamination can be removed by heating under mild conditions in an oxygen atmosphere. The removal of carbon contaminants from metal oxide nanoparticles is described further in copending and commonly assigned U.S. patent application Ser. No. 09/136,483 to Kumar et al., entitled "Aluminum Oxide Particles," incorporated herein by reference.

Based on these results, the reaction conditions can be varied empirically to obtain single phase crystalline ZnO by varying the parameters, such as reactant flow rates, pressure and laser power/temperature, to locate the conditions for the production of single phase zinc oxide. Since significant quantities of crystalline ZnO were produced under the conditions presented in Table 22, parameters suitable for production of the single phase material will be similar to these parameters.

Figure 94:
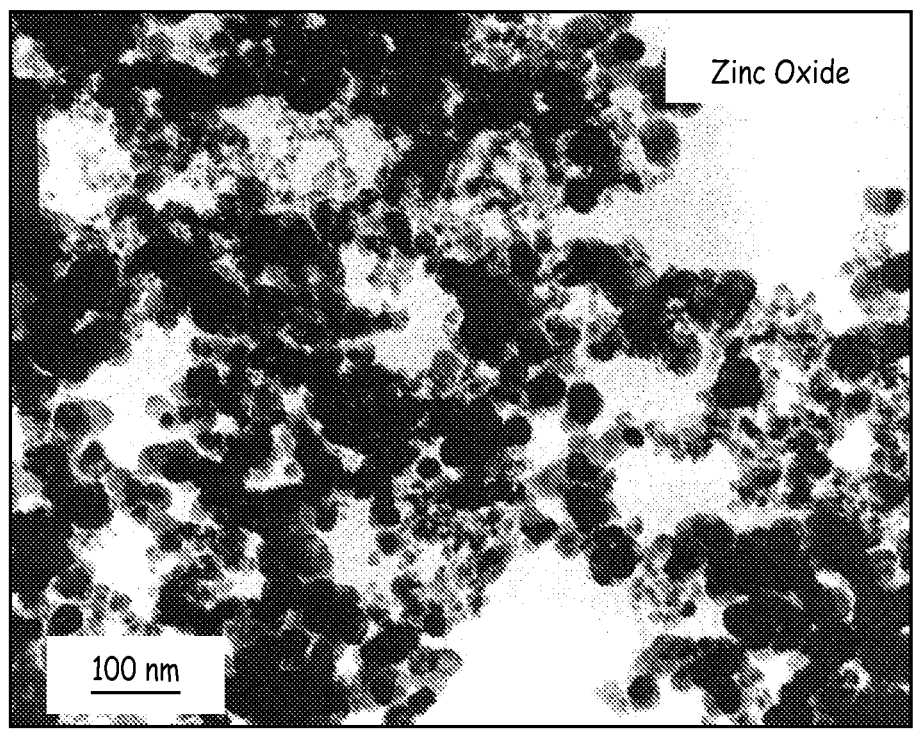
FIG. 94 is a TEM micrograph of nanoparticles whose x-ray diffractogram is shown of FIG. 93.
Figure 95:
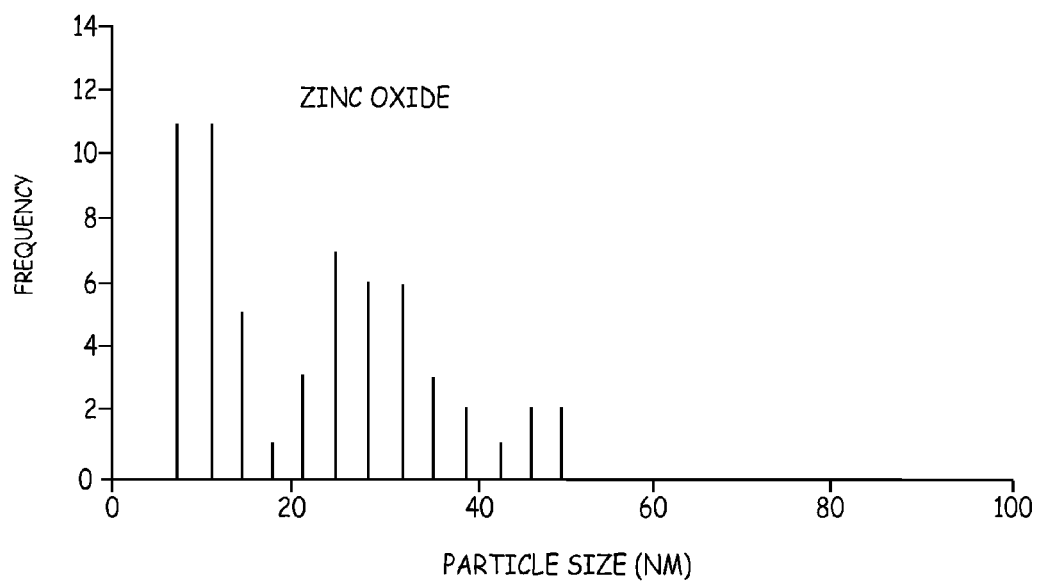
FIG. 95 is a plot of the distribution of primary particle diameters for the nanoparticles shown in the TEM micrograph of FIG. 94.

Transmission electron microscopy (TEM) was used to determine particle sizes and morphology. A TEM micrograph for the particles produced under the conditions of Table 22 is displayed in FIG. 94. The corresponding particle size distribution is shown in FIG. 95. The approximate size distribution was determined by manually measuring diameters of the particles distinctly visible in the micrograph of FIG. 94. Only those particles having clear particle boundaries were measured to avoid regions distorted or out of focus in the micrograph. Measurements so obtained should be more accurate and are not biased since a single view cannot show a clear view of all particles. The particle size distribution shown in FIG. 95 has a bimodal or trimodal distribution indicative of multiple phases of materials. As noted above, different phases of materials form different size particles. If the laser pyrolysis is performed under conditions selected to yield a single phase of product particles, a narrow size distribution should result for particles of the particular phase. In particular, the resulting single phase crystalline ZnO would have an extremely narrow particle size distribution corresponding roughly to one of the three peak widths from FIG. 95.

Example 28

Crystalline SnO$_x$ (1<x<2), Sample 1

The synthesis of SnO$_x$ described in this example was performed by laser pyrolysis. The SnCl$_4$ (Strem Chemical, Inc., Newburyport, Mass.) precursor vapor was carried into the reaction chamber by bubbling Ar gas through the SnCl$_4$ liquid in a container at room temperature. C$_2$H$_4$ gas was used as a laser absorbing gas, and Argon was used as an inert gas. The reactant gas mixture containing SnCl$_4$, Ar, O$_2$ and C$_2$H$_4$ is introduced into the reactant gas nozzle for injection into the reaction chamber. The reactant gas nozzle has an opening with dimensions as specified in the first column of Table 23. Additional parameters of the laser pyrolysis synthesis relating to the particles also are specified in the first column of Table 23.

TABLE 23

| Stoichiometry | SnO$_x$ | SnO$_x$ | SnO$_x$ |
|---|---|---|---|
| Crystal Structure | Tetragonal | Tetragonal | Tetragonal |
| Pressure (Torr) | 320 | 320 | 180 |
| Argon - Win. (sccm) | 700 | 700 | 700 |
| Argon - Sld. (slm) | 1.96 | 1.96 | 1.96 |
| Carrier Gas (sccm) | 280 (Ar) | 280 (Ar) | 280 (Ar) |
| Ethylene (sccm) | 1206 | 444 | 681 |
| Oxygen (sccm) | 554 | 218 | 484 |
| Laser Output (watts) | 380 | 430 | 430 |
| Nozzle Size | ⅝ in × ⅛ in | ⅝ in × 1/16 in | ⅝ in × ⅛ in | sccm = standard cubic centimeters per minute
slm = standard liters per minute
Argon - Win. = argon flow through inlets 216, 218
Argon - Sld. = argon flow through annular channel 142

Figure 96:
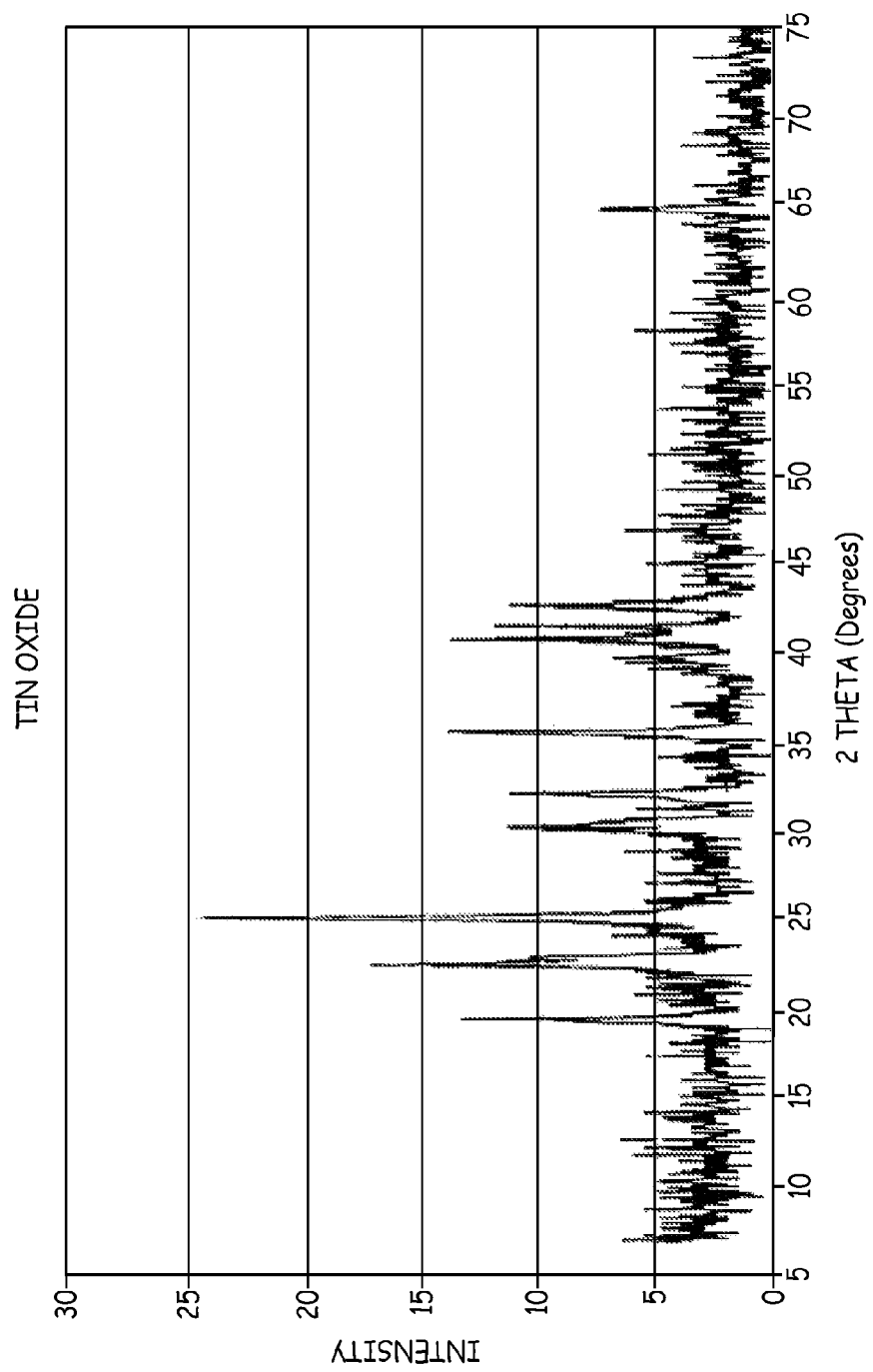
FIG. 96 is an x-ray diffractogram of $SnO_x$ nanoparticles.
Figure 97:
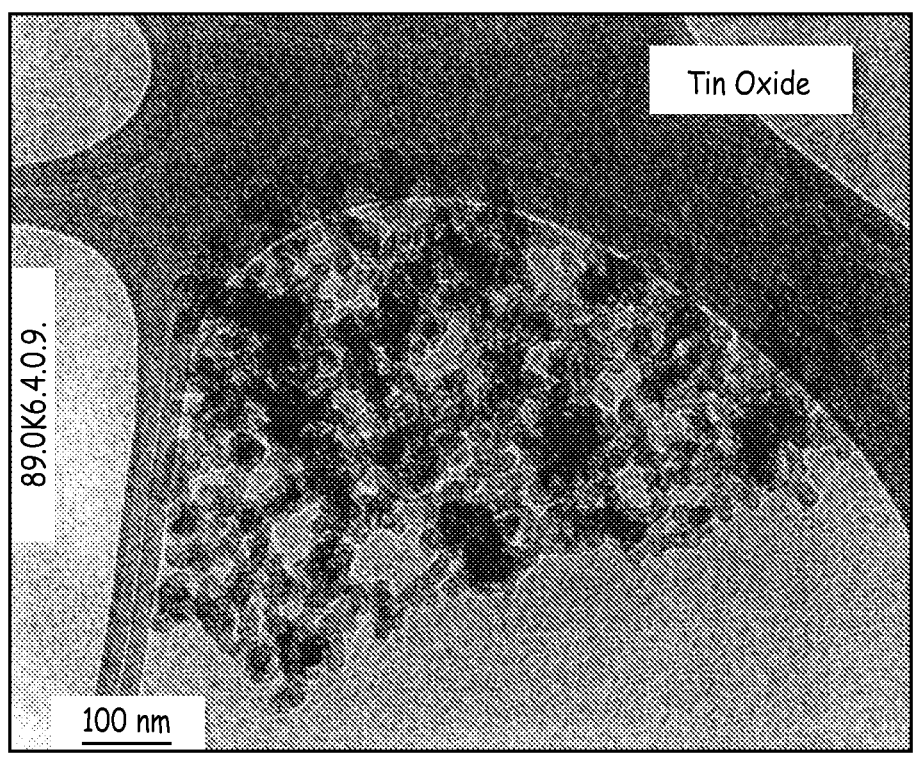
FIG. 97 is a TEM micrograph of nanoparticles used for the diffractogram of FIG. 96.

The synthesized tin oxide nanoparticles could be handled directly in air. The production rate of nanoparticles was typically about 5-10 g/hr. Based on the teachings herein both above and in this example, the particles described in this example can be produced with equivalent properties in appropriate apparatuses and at appropriate conditions at rates in the range(s) of at least about 35 grams per hour and at higher rates described above. Under the conditions specified in the first column of Table 23, crystalline $SnO_x$ was produced. To evaluate the crystal lattice, the samples were examined by x-ray diffraction using the Cu(Kα) radiation line on a Siemens D500 x-ray diffractometer. The x-ray diffractogram is displayed in FIG. 96. More than 10 peaks indicative of a crystalline phase were observed between 18 and 60 degrees. Transmission electron microscopy (TEM) was used to determine particle sizes and morphology. A TEM micrograph is displayed in FIG. 97.

Figure 98:
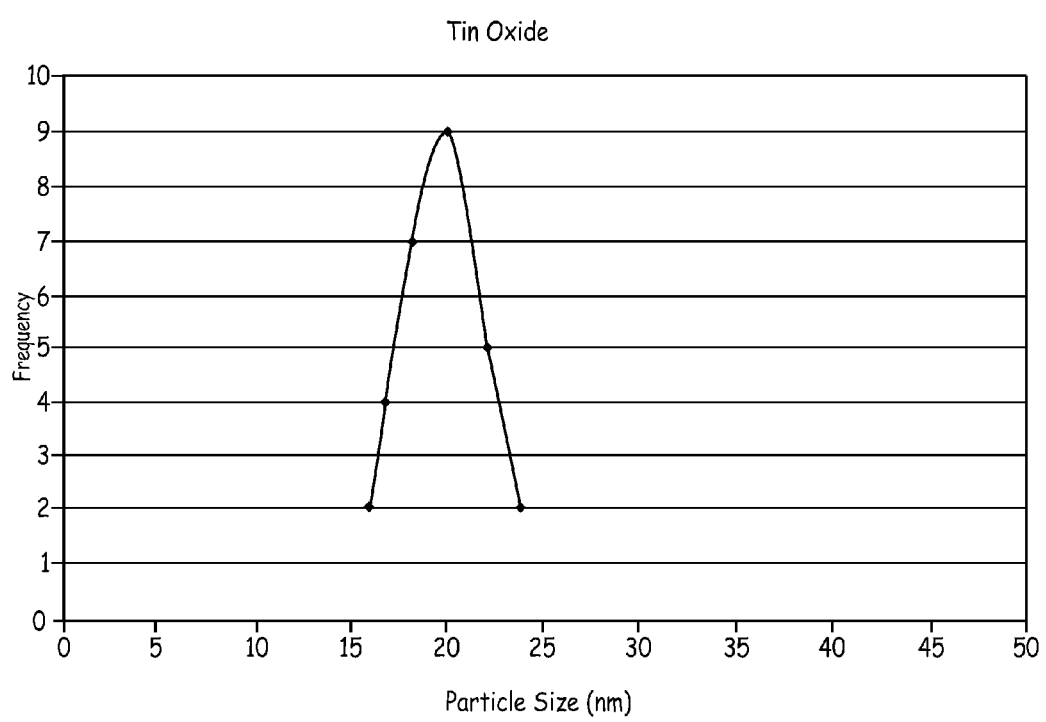
FIG. 98 is a plot of the distribution of particle diameters for the nanoparticles based on the micrograph of FIG. 97.

An examination of a portion of the TEM micrograph yielded an average particle size of about 20 nm. The corresponding particle size distribution is shown in FIG. 98. Behind the nanoparticles, images of carbon films used to hold the nanoparticles can be seen. The approximate size distribution was determined by manually measuring diameters of the particles distinctly visible in the micrograph of FIG. 98. Only those particles having clear particle boundaries were measured, to avoid regions distorted or out of focus in the micrograph. Measurements so obtained should be more accurate and are not biased since a single view in the micrograph cannot show a clear view of all particles because of the orientation of the crystals. It is significant that the particles span a rather narrow range of sizes.

Figure 99:
FIG. 99 is a plot indicating the position of x-ray diffraction peaks resulting from tin oxide in FIG. 96, with contributions from $SnCl_2$ being removed.

The tin oxide nanoscale sample evidently contained some residual tin chlorides, $SnCl_2$. This was evident from dark regions in the micrograph as well as the appearance of certain lines in the x-ray diffractogram. Nevertheless, the tin chlorides were distinct materials not disturbing the tin oxide lattice as is evident by the crystallinity of the sample and the distinct identification of specific lines in the diffractogram with the tin chlorides and other lines with the tin oxides. The specific lines in the diffractogram corresponding to tin oxide could be associated with a tetragonal lattice. The pattern of lines, however, could not be associated with any known tin oxide material or combination of known materials (mixed phase). Evidently, the nanoparticles produced have a stoichiometry and/or lattice structure different from known tin oxide materials. Removing the contributions to the diffractogram from $SnCl_2$, diffraction peaks due to the new tin oxide material can be identified. These peaks from the new tin oxide material are plotted in FIG. 99.

Example 29

$SnO_x$ (1<x<2), Sample 2

These particles were produced using a similar laser pyrolysis apparatus as described in Example 28. For the production of particle described in this example, the reactant gas nozzle had dimensions of ⅝ in×  1/16 in. The reaction conditions used to produce the particles of this example are presented in the second column of Table 23.

Figure 100:
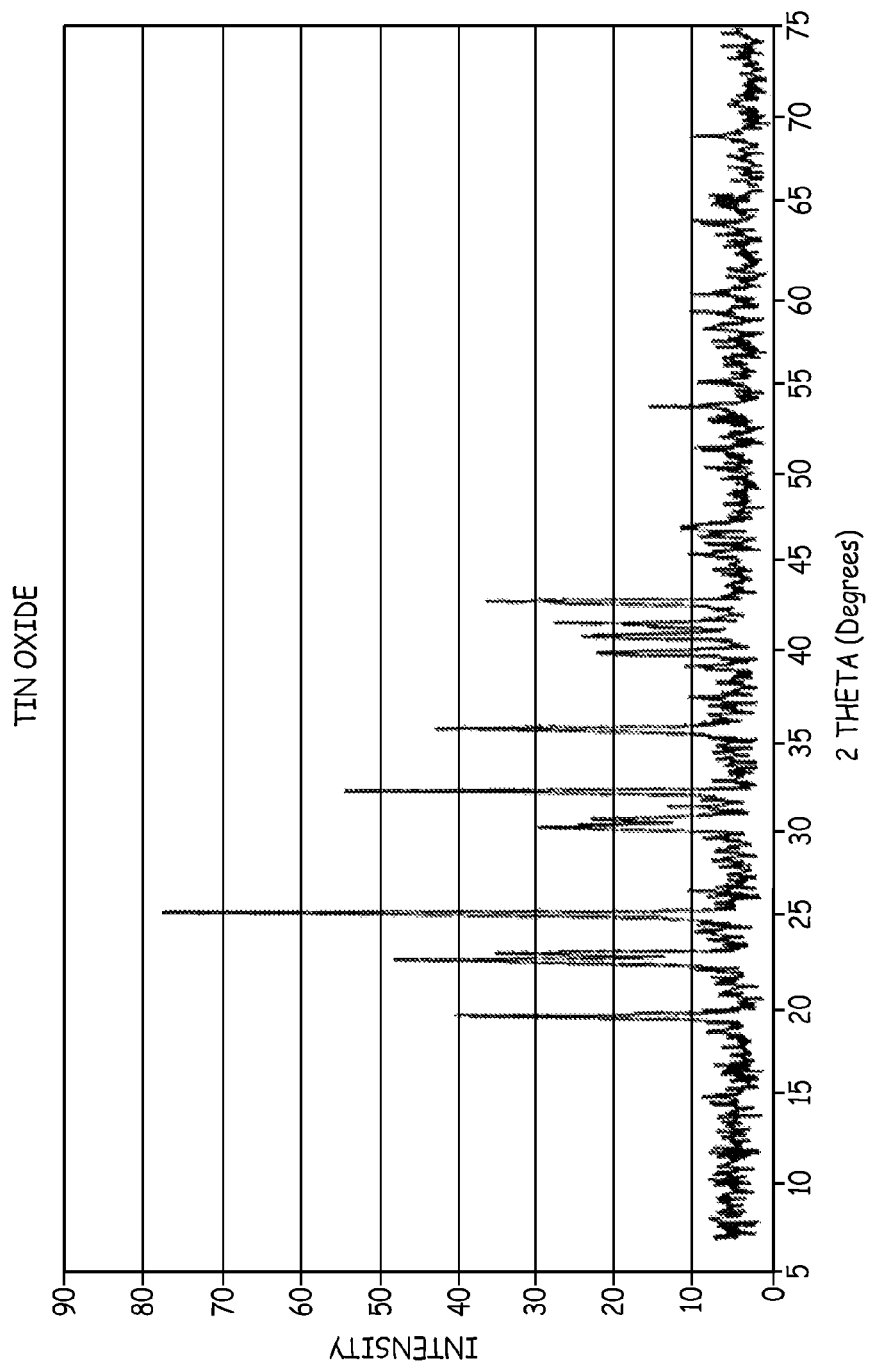
FIG. 100 is an x-ray diffractogram of $SnO_x$ nanoparticles of Example 29.

An x-ray diffractogram of representative product nanoparticles is shown in FIG. 100. Clear diffraction peaks corresponding to a tetragonal crystalline structure are visible. The diffractogram in FIG. 100 is very similar to the diffractogram in FIG. 96 indicating that the crystals involved the same underlying lattice and stoichiometry. The peaks in FIG. 100 are sharper than in FIG. 96 indicating that the particles used to obtain FIG. 100 has a larger particle size and/or a higher degree of crystallinity.

Figure 101:
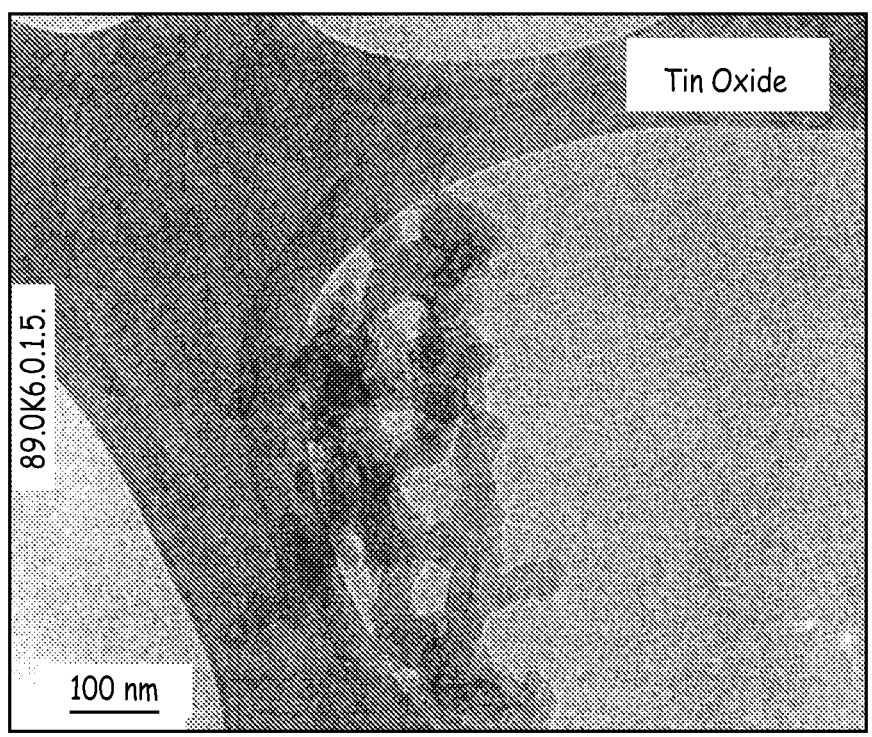
FIG. 101 is a TEM micrograph of nanoparticles of Example 29.

TEM micrographs at high magnification were obtained for the particles in this example, as shown in FIG. 101. Again, the particles span a rather narrow range of sizes. In this case, the largest to smallest particles differ by no more than about 15 nm in diameter. An average particle size of about 45 nm was obtained. Based on the teachings herein both above and in this example, the particles described in this example can be produced with equivalent properties in appropriate apparatuses and at appropriate conditions at rates in the range(s) of at least about 35 grams per hour and at higher rates described above.

Example 30

Crystalline $SnO_x$, Sample 3

The experimental arrangement for the production of the nanoparticles described in this example was the same as that described in Example 28. The reaction conditions are given in the third column of Table 23. A significant difference in the laser pyrolysis conditions used to produce the nanoparticles of this Example relative to the conditions used to produce the nanoparticles of Examples 28 and 29 were the use of a lower chamber pressure.

Figure 102:
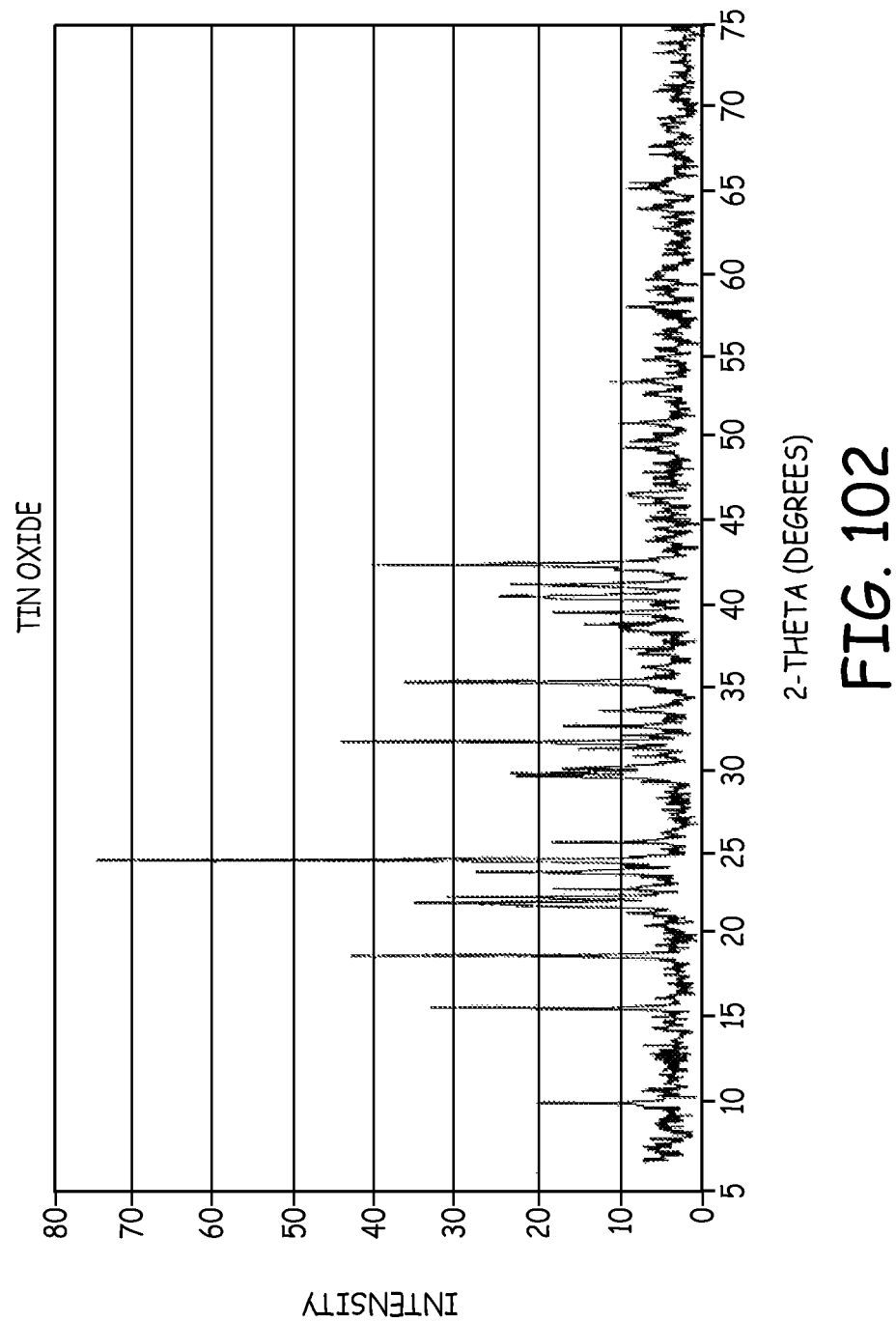
FIG. 102 is an x-ray diffractogram of $SnO_x$ nanoparticles of Example 30.
Figure 103:
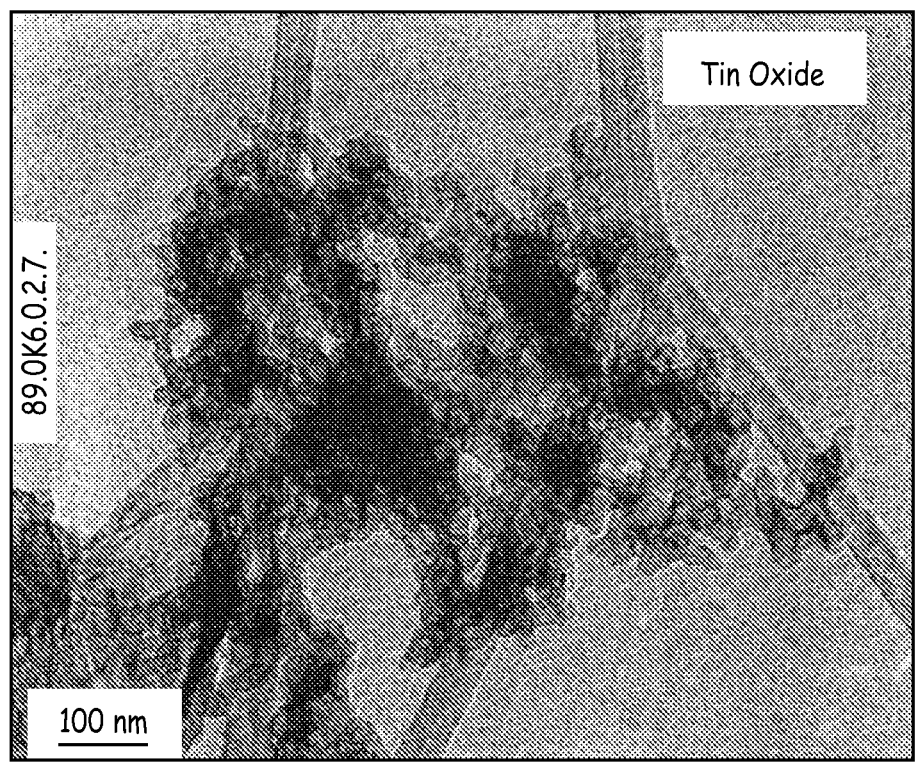
FIG. 103 is a TEM micrograph of nanoparticles of Example 30.

The x-ray diffractogram for this material is shown in FIG. 102. Compared with the diffractograms in FIGS. 96 and 100, the diffractogram in FIG. 102 had several extra peaks. These peaks may arise from residual tin chloride. This possibility is supported by the TEM image, as shown in FIG. 103. Some residual tin chloride can be seen as dark images covering some of the particles. From an examination of the micrograph, the average particle size was around 30 nm. Based on the teachings herein both above and in this example, the particles described in this example can be produced with equivalent properties in appropriate apparatuses and at appropriate conditions at rates in the range(s) of at least about 35 grams per hour and at higher rates described above.

Example 31

Crystalline $SnO_2$, Oven Processed

Figure 104:
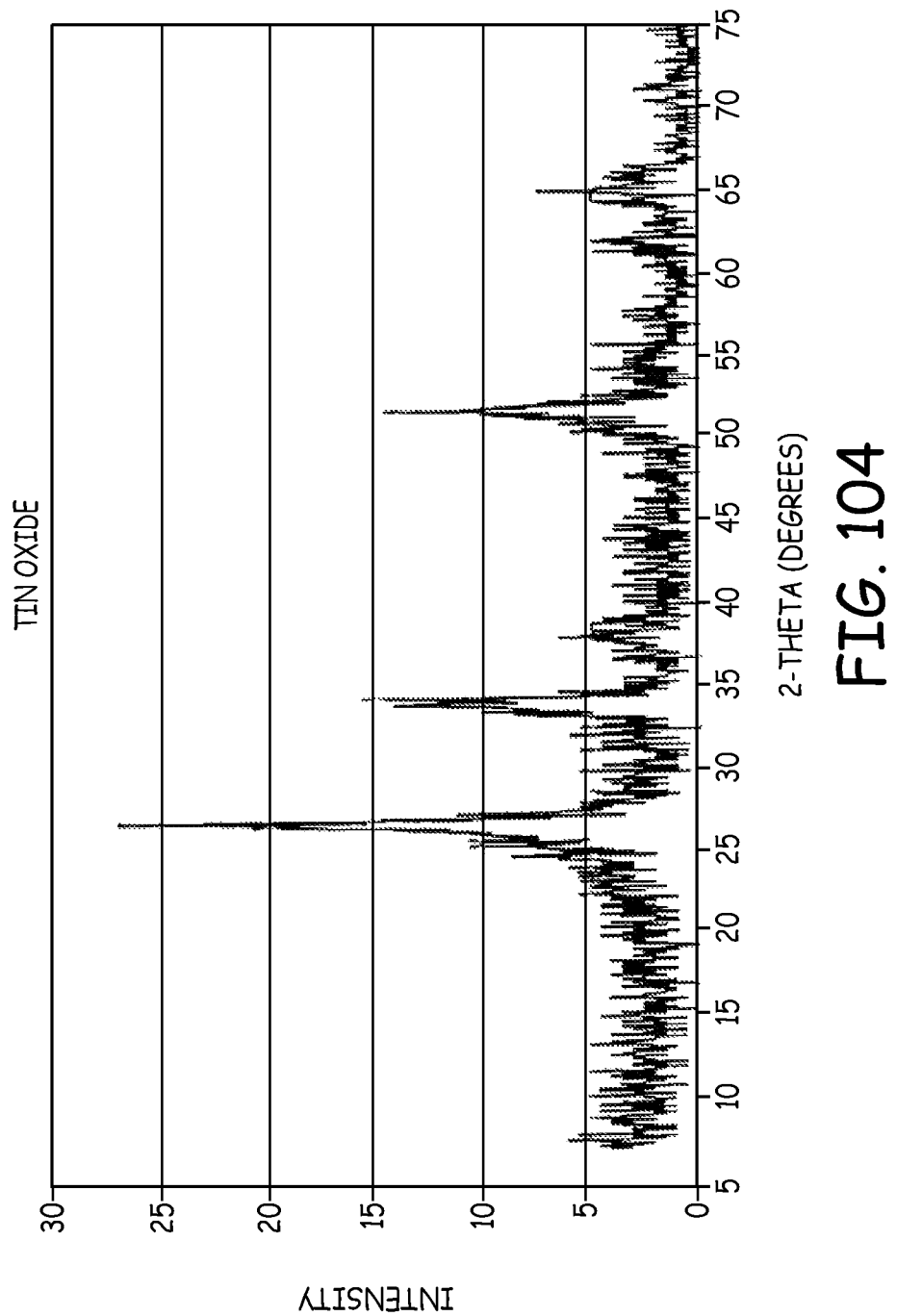
FIG. 104 is an x-ray diffractogram of $SnO_2$ nanoparticles of Example 31.

A sample of crystalline $SnO_x$ as described in Example 28 was baked in an oven under oxidizing conditions. The oven was essentially as described in FIG. 24. The samples were baked in the oven at about 300° C. for about 12 hours. Oxygen gas flowed through a 1.0 in diameter quartz tube at a flow rate of about 106 sccm. Between about 100 and about 300 mg of nanoparticles were placed in an open 1 cc vial within the quartz tube projecting through the oven. The resulting nanoparticles were single phase $SnO_2$ (Cassiterite) nanoparticles. The corresponding x-ray diffractogram is presented in FIG. 104.

Figure 105:
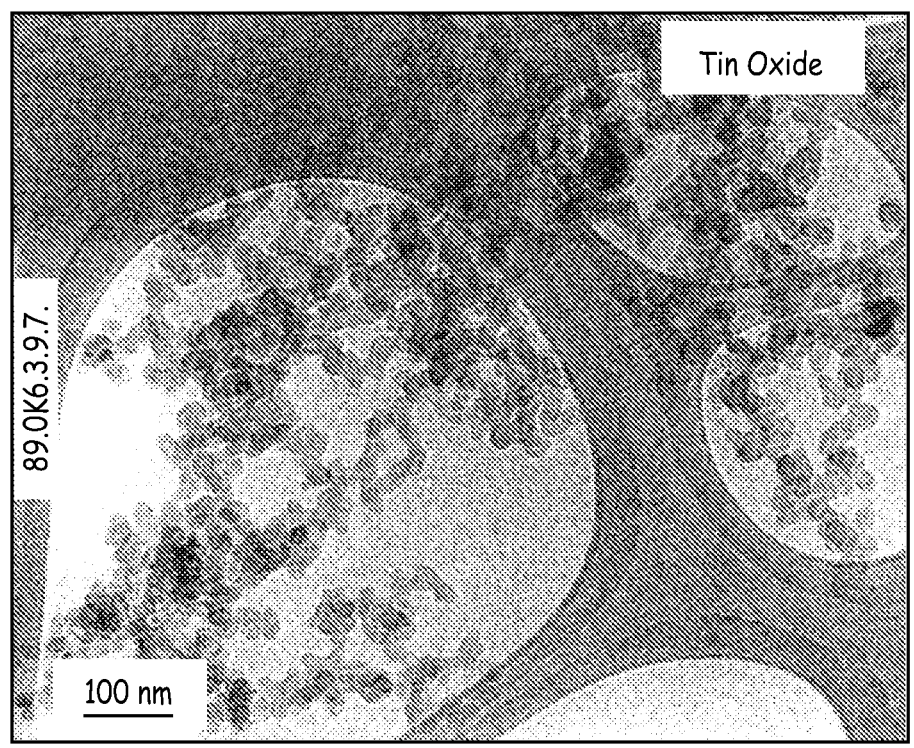
FIG. 105 is a TEM micrograph of nanoparticles of Example 31.
Figure 106:
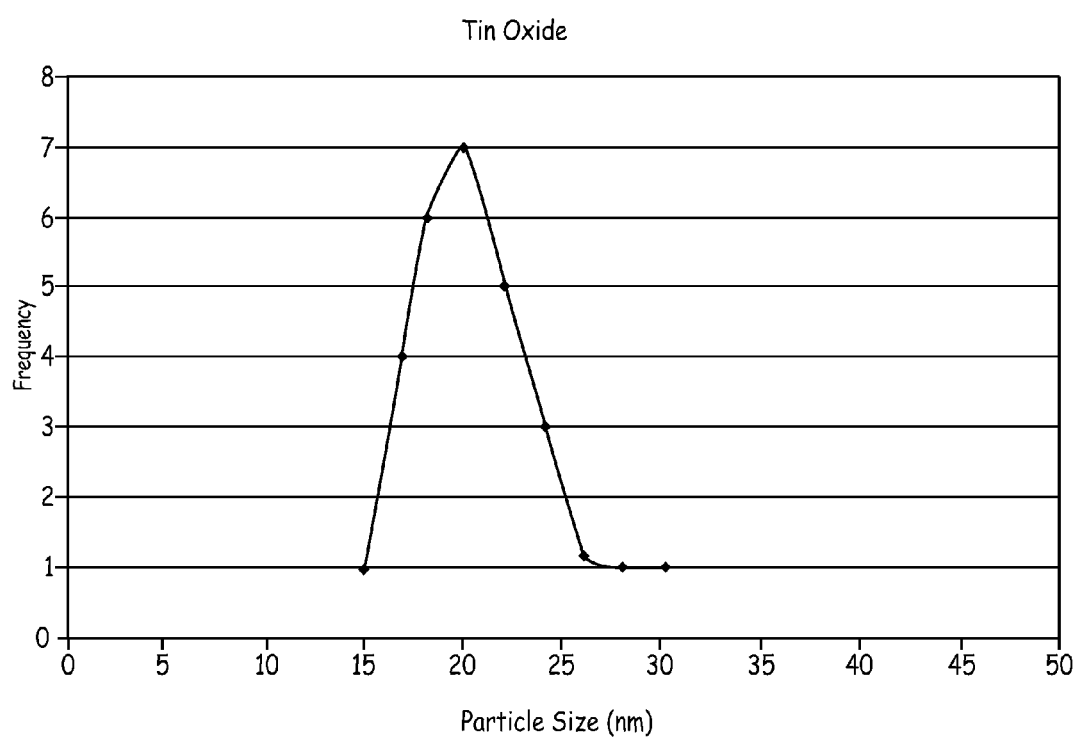
FIG. 106 is a plot of the distribution of particle diameters for the nanoparticles of Example 31 based on the micrograph of FIG. 105.

A TEM micrograph of these nanoparticles is shown in FIG. 105. A uniform size and shape was obtained again. The average particle diameter was about 20 nm. The particle size distribution is depicted in FIG. 106. The distribution in FIG. 106 is very similar to the distribution in FIG. 98, indicating that little if any sintering of the particles occurred. Based on the teachings herein both above and in this example, the particles described in this example can be produced with equivalent properties in appropriate apparatuses and at appropriate conditions at rates in the range(s) of at least about 35 grams per hour and at higher rates described above.

Example 32

Erbium Doped Silica Glass

This example describes the coating of a silicon substrate with a silica glass including alumina and sodium oxide glass formers and an erbium dopant using light reactive deposition and consolidation.

Particle coating was performed using light reactive deposition in which wafer coating was performed within the reaction chamber by sweeping the substrate through a product particle stream. The wafer was a silicon wafer with a thermal oxide under-cladding. The apparatus used to coat a substrate/wafer in the reaction stream is comparable to the apparatus shown in FIGS. 20-22 with an aerosol precursor delivery system. The coating was performed with a static coating configuration. An oxygen/ethylene flame was started first. Then, the aerosol flow was started. When a stable process flame was observed, the wafer was translated into the coating position about 17 inches above the laser beam. At this distance, the product particle flow has spread such that the entire surface is simultaneously coated approximately uniformly. The wafer was left in the flow for about 20 minutes.

A solution was formed combining 66 grams (g) tetraethoxysilane ($Si(OC_2H_5)_4$ or TEOS, 99.9% pure), 25.6 g aluminum nitrate ($Al(NO_3)_3 \cdot 9H_2O$, >98% pure), 9.5 g sodium nitrate ($NaNO_3$, 99% pure), and 1.9 g erbium nitrate ($Er(NO_3)_3 \cdot 5H_2O$, 99.99% pure) in a isopropyl alcohol (530 g, 99.5% pure)/water (250 g) solvent mixture. An aerosol of the solution was carried into the reaction chamber along with argon, ethylene and molecular oxygen gasses. Argon gas was mixed with the reactant stream as a diluent/inert gas to moderate the reaction. $C_2H_4$ gas was used as a laser absorbing gas. $O_2$ was used as an oxygen source.

The reaction conditions for the production of the powder coating coatings are described in Table 24. Flame temperature was measured using three thermo-couples located in the flow about 1 inch above the laser beam.

TABLE 24

| | |
|---|---|
| Pressure (Torr) | 180 |
| Ethylene (slm) | 0.75 |
| Oxygen (slm) | 3.7 |
| Argon Dilution Gas (slm) | 6 |
| Precursor Flow (ml/min) | 20 |
| Laser Power - Input (watts) | 815 |
| Flame Temperature (° C.) | 1100 | slm = standard liters per minute

Following completion of the coating run, the wafers have a coating across the surface of the wafer. The chemical composition of the coating was measured using Energy Dispersive X-Ray Analysis (EDXA, Oxford Instruments Model 7021) attached to a Hitachi S-3000H scanning electron microscope, which was used for microscopy. The EDXA scans were acquired at 500× magnification using a 20 kV accelerating voltage and a W filament operating at about 85 mA current. The interaction volume was estimated to have a diameter of approximately 2 microns. EDXA scans were taken on the coated surface. The powder coating had the following compositions as measured by EDXA: O—49.1 weight percent (wt %), Si—31.7 wt %, Na—9.9 wt %, Al—5.1 wt %, Er 2.4 wt %, and impurity (C, H, N etc.) total 2.2 wt %. Based on the teachings herein both above and in this example, the particles described in this example can be produced with equivalent properties in appropriate apparatuses and at appropriate conditions at rates in the range(s) of at least about 35 grams per hour and at higher rates described above.

The coated wafers were heated in a muffle furnace (Neytech, Model Centurion Qex). The wafers were first heated at 650° C. in an oxygen atmosphere to remove carbon contaminants and then at 975° C. in a helium atmosphere to complete consolidation of the glass. Along with the heating and cooling conditions, the heat processing is summarized in Table 25.

TABLE 25

| Heating Segment | Gas | Gas Flow (sccm) | Ramp Rate (C/min) | Target Temp | Hold Time (hours:mins) |
|---|---|---|---|---|---|
| 1 | $O_2$ | 250 | 50 | 650 | — |
| 2 | $O_2$ | 250 | — | 650 | 0:10 |
| 3 | He | 250 | 10 | 975 | — |
| 4 | He | 250 | — | 975 | 1 |
| 5 | He | 250 | −100 | 100 | — | sccm—standard cubic centimeters per minute

After being removed from the oven, the wafers had a clear glass on their surface. The consolidated glass had a thickness from about 4 microns to about 6 microns. The consolidated glass was found to have the following compositions by EDXA analysis: O—50.2 wt %, Si—34.1 wt %, Na—10.5 wt %, Al—3.7 wt %, Er—1.5 wt %, and total impurities 0.1 wt %.

As utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

The embodiments described above are intended to be illustrative and not limiting. Additional embodiments are within the claims. Although the present invention has been described with reference to preferred embodiments, workers skilled in the art will recognize that changes may be made in form and detail without departing from the spirit and scope of the invention.

What is claimed is:

1. A method for the synthesis of selected inorganic submicron particles, the method comprising:
   reacting a silicon precursor and a dopant precursor within a flow through a reaction chamber to form product particles, wherein the precursors are delivered from one or more inlets through a reaction zone within the reaction chamber and wherein the flow of precursors comprises only gases; and
   collecting the product particles in a collector wherein the product particles comprise doped silicon particles having an average particle size no more than about 250 nm.

2. The method of claim 1 wherein the reacting of the precursors is driven by a light beam.

3. The method of claim 2 wherein the light beam is generated by a laser.

4. The method of claim 3 wherein the laser is an infrared laser.

5. The method of claim 2 wherein the inlet has an elongated shape that generates an elongated flow aligned to pass the elongated flow through the light beam.

6. The method of claim 5 wherein the reactant inlet nozzle comprises an inlet opening that is elongated with an aspect ratio of at least about 5.

7. The method of claim 1 wherein the reacting of the flow is driven thermally through the delivery of heat energy to the flow.

8. The method of claim 1 wherein the dopant comprises B, Al, Ga, In, or combinations thereof.

9. The method of claim 1 wherein the dopant comprises P, Sb or combinations thereof.

10. The method of claim 1 wherein the product particles have a dopant concentration from about 0.001 to about 5 mole percent.

11. The method of claim 1 wherein the product particles are crystalline.

12. The method of claim 1 wherein the chamber pressure during the reaction is from about 80 Torr to about 650 Torr.

13. The method of claim 1 wherein the collector is associated with a collection system connected to the reaction chamber such that the flow of product particles enters the collection system.

14. The method of claim 1 wherein the product particles can be harvested from the collection system in a continuous operation mode.

15. The method of claim 1 wherein the product particles comprise effectively no particles with a primary particle diameter greater than about 4 times the average particle diameter.

16. The method of claim 1 wherein at least about 95 percent of the product particles have a primary particle diameter greater than about 60 percent of the average primary particle diameter and less than about 140 percent of the average primary particle diameter.

17. The method of claim 1 wherein the dopant precursor comprises $BH_3$ or $B_2H_6$.

18. The method of claim 1 wherein the dopant precursor comprises $PH_3$.

19. A method for the synthesis of selected inorganic submicron particles, the method comprising:
reacting a germanium precursor and a dopant precursor within a flow through a reaction chamber to form product particles, wherein the precursors are delivered from one or more inlets through a reaction zone within the reaction chamber and wherein the flow of precursors only comprises gases; and
collecting the product particles in a collector wherein the product particles comprise doped germanium particles having an average particle size no more than about 250 nm.

* * * * *